(12) United States Patent
Markhovsky et al.

(10) Patent No.: US 11,733,341 B2
(45) Date of Patent: *Aug. 22, 2023

(54) MULTI-PATH MITIGATION IN TRACKING OBJECTS USING COMPRESSED RF DATA

(71) Applicant: Qualcomm Technologies, Inc., San Diego, CA (US)

(72) Inventors: Felix Markhovsky, Dallas, TX (US); Truman Prevatt, Dallas, TX (US); Russ Markhovsky, Dallas, TX (US); Michael John Buynak, Dallas, TX (US)

(73) Assignee: QUALCOMM Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,377

(22) Filed: Feb. 3, 2022

(65) Prior Publication Data

US 2022/0155405 A1  May 19, 2022

Related U.S. Application Data

(63) Continuation of application No. 16/791,898, filed on Feb. 14, 2020, now Pat. No. 11,255,945, which is a
(Continued)

(51) Int. Cl.
*G01S 5/02* (2010.01)
*H04W 64/00* (2009.01)
(Continued)

(52) U.S. Cl.
CPC .......... *G01S 5/0236* (2013.01); *G01S 5/0231* (2013.01); *G01S 7/4861* (2013.01); *G01S 7/4865* (2013.01); *G01S 19/05* (2013.01); *H04W 64/003* (2013.01)

(58) Field of Classification Search
CPC .... G01S 5/0236; G01S 5/0231; G01S 7/4861; G01S 7/4865; G01S 19/05; H04W 64/003
See application file for complete search history.

(56) References Cited

U.S. PATENT DOCUMENTS 4,334,314 A 6/1982 Nard et al.
4,455,556 A 6/1984 Koshio et al.
(Continued)

FOREIGN PATENT DOCUMENTS

CN 1291062 A 4/2001
CN 1413056 A 4/2003
(Continued)

OTHER PUBLICATIONS

European Patent Application No. 15827815.0; Partial Supplementary Search Report; dated Apr. 30, 2018; 14 pages.
(Continued)

*Primary Examiner* — Thomas D Alunkal
(74) *Attorney, Agent, or Firm* — Thien T. Nguyen

(57) ABSTRACT

A split architecture is disclosed for determining the location of a wireless device in a heterogeneous wireless communications environment. A detector within the device or another component of the environment receives signals including parameters for a localization signal of the device. The parameters describe known in advance signals within the signals. Additional metadata including each frame start of the signals and assistance data and auxiliary information are also received. The known in advance signals are detected based on the parameters of the localization signal. Samples extracted from the known in advance signals are then processed and compressed and sent with other collect data to a locate server remote from the detector. The location server uses that information as well as similar information about the environment to calculate the location of the device, as
(Continued)

well as perform tracking and navigation of the device, and report such results to the environment.

20 Claims, 46 Drawing Sheets

Related U.S. Application Data continuation of application No. 16/367,014, filed on Mar. 27, 2019, now Pat. No. 10,845,453.

(60) Provisional application No. 62/653,450, filed on Apr. 5, 2018, provisional application No. 62/648,883, filed on Mar. 27, 2018.

(51) Int. Cl.
*G01S 7/4861* (2020.01)
*G01S 19/05* (2010.01)
*G01S 7/4865* (2020.01)

(56) References Cited

U.S. PATENT DOCUMENTS

| | | | |
|---|---|---|---|
| 5,045,860 A | 9/1991 | Hodson | |
| 5,525,967 A | 6/1996 | Azizi et al. | |
| 5,564,025 A | 10/1996 | De Freese et al. | |
| 5,604,503 A | 2/1997 | Fowler et al. | |
| 5,774,876 A | 6/1998 | Woolley et al. | |
| 5,881,055 A | 3/1999 | Kondo | |
| 5,973,643 A | 10/1999 | Hawkes et al. | |
| 6,091,362 A | 7/2000 | Stilp et al. | |
| 6,208,295 B1 | 3/2001 | Dogan et al. | |
| 6,211,818 B1 | 4/2001 | Zach | |
| 6,266,014 B1 | 7/2001 | Fattouche et al. | |
| 6,275,186 B1 | 8/2001 | Kong | |
| 6,300,905 B1 | 10/2001 | Chen et al. | |
| 6,435,286 B1 | 8/2002 | Stump et al. | |
| 6,515,623 B2 | 2/2003 | Johnson | |
| 6,788,199 B2 | 9/2004 | Crabtree et al. | |
| 6,810,293 B1 | 10/2004 | Chou et al. | |
| 6,812,824 B1 | 11/2004 | Goldinger et al. | |
| 6,856,280 B1 | 2/2005 | Eder et al. | |
| 6,904,079 B2 | 6/2005 | Hoffmann et al. | |
| 7,110,774 B1 | 9/2006 | Davis et al. | |
| 7,167,456 B2 | 1/2007 | Iwamatsu et al. | |
| 7,245,677 B1 | 7/2007 | Pare | |
| 7,271,764 B2 | 9/2007 | Golden et al. | |
| 7,292,189 B2 | 11/2007 | Orr et al. | |
| 7,561,048 B2 | 7/2009 | Yushkov et al. | |
| 7,668,124 B2 | 2/2010 | Karaoguz | |
| 7,668,228 B2 | 2/2010 | Feller et al. | |
| 7,696,923 B2 | 4/2010 | Houri et al. | |
| 7,872,583 B1 | 1/2011 | Yushkov et al. | |
| 7,898,977 B2 | 3/2011 | Roese et al. | |
| 7,969,311 B2 | 6/2011 | Markhovsky et al. | |
| 7,974,627 B2 | 7/2011 | Mia et al. | |
| 8,140,102 B2 | 3/2012 | Nory et al. | |
| 8,305,215 B2 | 11/2012 | Markhovsky et al. | |
| 8,681,809 B2 | 3/2014 | Sambhwani et al. | |
| 8,934,375 B2 | 1/2015 | Li et al. | |
| 8,971,797 B2 | 3/2015 | Sheynblat et al. | |
| 9,288,623 B2 | 3/2016 | Markhovsky et al. | |
| 9,699,607 B2 * | 7/2017 | Markhovsky | G01S 3/46 |
| 9,813,867 B2 | 11/2017 | Lee et al. | |
| 9,913,244 B2 | 3/2018 | Markhovsky et al. | |
| 9,955,301 B2 | 4/2018 | Markhovsky et al. | |
| 10,091,616 B2 | 10/2018 | Prevatt | |
| 10,117,218 B2 | 10/2018 | Markhovsky et al. | |
| 10,281,557 B2 | 5/2019 | Markhovsky et al. | |
| 10,433,111 B2 | 10/2019 | Prevatt et al. | |
| 10,440,512 B2 | 10/2019 | Prevatt et al. | |
| 10,506,376 B2 * | 12/2019 | Markhovsky | G01S 5/011 |
| 10,834,531 B2 | 11/2020 | Markhovsky et al. | |
| 10,845,453 B2 * | 11/2020 | Markhovsky | G01S 13/765 |
| 10,863,313 B2 | 12/2020 | Markhovsky et al. | |
| 10,873,830 B2 | 12/2020 | Markhovsky et al. | |
| 11,012,811 B2 | 5/2021 | Markhovsky et al. | |
| 11,070,942 B2 | 7/2021 | Prevatt et al. | |
| 11,125,850 B2 | 9/2021 | Markhovsky et al. | |
| 11,131,744 B2 | 9/2021 | Markhovsky et al. | |
| 11,255,945 B2 * | 2/2022 | Markhovsky | G01S 19/05 |
| 11,375,341 B2 | 6/2022 | Markhovsky et al. | |
| 11,388,554 B2 | 7/2022 | Markhovsky et al. | |
| 11,395,105 B2 | 7/2022 | Markhovsky et al. | |
| 11,474,188 B2 | 10/2022 | Markhovsky et al. | |
| 2001/0044309 A1 | 11/2001 | Bar et al. | |
| 2002/0155845 A1 | 10/2002 | Martorana | |
| 2003/0008156 A1 | 1/2003 | Pocius et al. | |
| 2003/0008663 A1 | 1/2003 | Stein et al. | |
| 2003/0139188 A1 | 7/2003 | Chen et al. | |
| 2003/0146871 A1 | 8/2003 | Karr et al. | |
| 2004/0021599 A1 | 2/2004 | Hall et al. | |
| 2004/0203429 A1 | 10/2004 | Anderson et al. | |
| 2005/0035897 A1 | 2/2005 | Perl et al. | |
| 2005/0085257 A1 | 4/2005 | Laird et al. | |
| 2005/0093709 A1 | 5/2005 | Franco et al. | |
| 2005/0285782 A1 | 12/2005 | Bennett | |
| 2005/0285793 A1 * | 12/2005 | Sugar | G01S 5/14 342/465 |
| 2006/0009235 A1 | 1/2006 | Sheynblat et al. | |
| 2006/0050625 A1 | 3/2006 | Krasner | |
| 2006/0145853 A1 | 7/2006 | Richards et al. | |
| 2006/0193371 A1 | 8/2006 | Maravic | |
| 2006/0209936 A1 | 9/2006 | Eerola et al. | |
| 2006/0220851 A1 | 10/2006 | Wisherd | |
| 2006/0232467 A1 | 10/2006 | Small | |
| 2006/0267841 A1 | 11/2006 | Lee et al. | |
| 2006/0273955 A1 | 12/2006 | Manz | |
| 2007/0053340 A1 | 3/2007 | Guilford | |
| 2007/0139200 A1 | 6/2007 | Yushkov et al. | |
| 2007/0248180 A1 | 10/2007 | Bowman et al. | |
| 2007/0287498 A1 | 12/2007 | Wang et al. | |
| 2008/0030345 A1 | 2/2008 | Austin et al. | |
| 2008/0037512 A1 | 2/2008 | Aljadeff et al. | |
| 2008/0123608 A1 | 5/2008 | Edge et al. | |
| 2008/0204322 A1 | 8/2008 | Oswald et al. | |
| 2008/0285505 A1 | 11/2008 | Carlson et al. | |
| 2008/0311870 A1 * | 12/2008 | Walley | G01S 5/10 455/186.1 |
| 2008/0318596 A1 * | 12/2008 | Tenny | H04W 64/00 455/456.2 |
| 2009/0017841 A1 | 1/2009 | Lewis et al. | |
| 2009/0176507 A1 | 7/2009 | Wu et al. | |
| 2009/0201203 A1 | 8/2009 | Le Sage et al. | |
| 2010/0013712 A1 | 1/2010 | Yano | |
| 2010/0091826 A1 | 4/2010 | Chen et al. | |
| 2010/0120394 A1 | 5/2010 | Mia et al. | |
| 2010/0178936 A1 | 7/2010 | Wala et al. | |
| 2010/0273504 A1 | 10/2010 | Bull et al. | |
| 2010/0273506 A1 | 10/2010 | Stern-Berkowitz et al. | |
| 2010/0311437 A1 * | 12/2010 | Palanki | G01S 5/021 455/456.1 |
| 2010/0317343 A1 | 12/2010 | Krishnamurthy et al. | |
| 2010/0317351 A1 | 12/2010 | Gerstenberger et al. | |
| 2011/0039574 A1 | 2/2011 | Charbit et al. | |
| 2011/0090120 A1 | 4/2011 | Kisigami et al. | |
| 2011/0105144 A1 | 5/2011 | Siomina et al. | |
| 2011/0111751 A1 | 5/2011 | Markhovsky et al. | |
| 2011/0117926 A1 | 5/2011 | Hwang et al. | |
| 2011/0124347 A1 | 5/2011 | Chen et al. | |
| 2011/0143770 A1 | 6/2011 | Charbit et al. | |
| 2011/0143773 A1 | 6/2011 | Kangas et al. | |
| 2011/0149887 A1 | 6/2011 | Khandekar et al. | |
| 2011/0159893 A1 | 6/2011 | Siomina et al. | |
| 2011/0256882 A1 | 10/2011 | Markhovsky et al. | |
| 2011/0286349 A1 | 11/2011 | Tee et al. | |
| 2011/0309983 A1 | 12/2011 | Holzer et al. | |
| 2012/0009948 A1 | 1/2012 | Powers et al. | |
| 2012/0020320 A1 | 1/2012 | Issakov et al. | |
| 2012/0051445 A1 | 3/2012 | Frank et al. | |
| 2012/0093400 A1 | 4/2012 | Saito | |
| 2012/0129550 A1 | 5/2012 | Hannan et al. | |
| 2012/0182180 A1 | 7/2012 | Wolf et al. | |

(56) References Cited

U.S. PATENT DOCUMENTS

| | | |
|---|---|---|
| 2012/0188889 A1 | 7/2012 | Sambhwani et al. |
| 2012/0232367 A1 | 9/2012 | Allegri |
| 2012/0258729 A1 | 10/2012 | Siomina et al. |
| 2012/0277988 A1 | 11/2012 | Sosulin et al. |
| 2012/0293373 A1 | 11/2012 | You |
| 2012/0302254 A1 | 11/2012 | Charbit et al. |
| 2013/0023285 A1 | 1/2013 | Markhovsky et al. |
| 2013/0045754 A1 | 2/2013 | Markhovsky et al. |
| 2013/0083683 A1 | 4/2013 | Hwang et al. |
| 2013/0130710 A1* | 5/2013 | Boyer .................. G01S 5/04 455/456.1 |
| 2013/0235807 A1 | 9/2013 | Lee et al. |
| 2013/0237260 A1 | 9/2013 | Lin et al. |
| 2013/0244653 A1 | 9/2013 | Song et al. |
| 2013/0252629 A1 | 9/2013 | Wigren et al. |
| 2013/0265196 A1* | 10/2013 | Conwell ............... H01Q 3/24 342/372 |
| 2013/0288692 A1 | 10/2013 | Dupray et al. |
| 2014/0045520 A1 | 2/2014 | Lim et al. |
| 2014/0120947 A1 | 5/2014 | Siomina |
| 2014/0177745 A1 | 6/2014 | Krishnamurthy et al. |
| 2014/0288811 A1 | 9/2014 | Oura |
| 2014/0329542 A1 | 11/2014 | Hooli et al. |
| 2017/0248678 A1* | 8/2017 | Markhovsky ......... G01S 5/0257 |
| 2021/0306800 A1 | 9/2021 | Prevatt et al. |
| 2022/0386079 A1 | 12/2022 | Markhovsky et al. |

FOREIGN PATENT DOCUMENTS

| | | |
|---|---|---|
| CN | 1484769 A | 3/2004 |
| CN | 1997911 A | 7/2007 |
| CN | 101150345 | 3/2008 |
| CN | 101238648 A | 8/2008 |
| CN | 102137488 A | 7/2011 |
| CN | 102138280 A | 7/2011 |
| CN | 102203634 A | 9/2011 |
| CN | 102210168 A | 10/2011 |
| CN | 102379141 A | 3/2012 |
| CN | 102388319 A | 3/2012 |
| CN | 102572443 A | 7/2012 |
| CN | 102648422 A | 8/2012 |
| CN | 103502836 A | 1/2014 |
| CN | 103842840 A | 6/2014 |
| CN | 104040367 A | 9/2014 |
| EP | 0467036 | 1/1992 |
| EP | 1245967 A1 | 10/2002 |
| EP | 1863190 A1 | 12/2007 |
| GB | 2380881 A | 4/2003 |
| JP | 02-247590 | 10/1990 |
| JP | 08-265250 | 10/1996 |
| JP | 09-139708 | 5/1997 |
| JP | H11-178043 | 7/1999 |
| JP | 2000-511369 A | 8/2000 |
| JP | 2000-241523 | 9/2000 |
| JP | 2000-354268 | 12/2000 |
| JP | 2001-503576 | 3/2001 |
| JP | 2001-147262 | 5/2001 |
| JP | 2001-197548 | 7/2001 |
| JP | 2002-044706 A | 2/2002 |
| JP | 2002-058058 | 2/2002 |
| JP | 2002-532979 | 10/2002 |
| JP | 2003-501664 | 1/2003 |
| JP | 2003-174662 | 6/2003 |
| JP | 2005-521060 | 7/2005 |
| JP | 2006-080681 | 3/2006 |
| JP | 2007-013500 | 1/2007 |
| JP | 2007-502414 A | 2/2007 |
| JP | 2007-298503 | 11/2007 |
| JP | 2008-503758 | 2/2008 |
| JP | 2008-202996 | 9/2008 |
| JP | 2008-249333 A | 10/2008 |
| JP | 2009021987 A | 1/2009 |
| JP | 2009-520193 | 5/2009 |
| JP | 2009-528546 | 8/2009 |
| JP | 2010-230467 | 10/2010 |
| JP | 2010-239395 | 10/2010 |
| JP | 2011-510265 | 3/2011 |
| JP | 2011-080799 A | 4/2011 |
| JP | 2011-149809 | 8/2011 |
| JP | 2011-227089 | 11/2011 |
| JP | 2012080575 A | 4/2012 |
| JP | 2012-513014 A | 6/2012 |
| JP | 2012-526491 | 10/2012 |
| JP | 2012-529842 | 11/2012 |
| JP | 2012-530394 | 11/2012 |
| JP | 2012-255680 A | 12/2012 |
| JP | 2012-531830 | 12/2012 |
| JP | 2013-003047 A | 1/2013 |
| JP | 2013-181876 | 9/2013 |
| JP | 2017-531934 A | 10/2017 |
| KR | 2001-0108081 A | 12/2001 |
| KR | 2002-0065830 A | 8/2002 |
| KR | 2005-0062550 A | 6/2005 |
| KR | 10-2008-0086889 | 9/2008 |
| KR | 2011-0067120 A | 6/2011 |
| KR | 2014-0068911 A | 6/2014 |
| WO | WO 1997/046034 A1 | 12/1997 |
| WO | WO 1998/019488 | 5/1998 |
| WO | WO 2000/035208 | 6/2000 |
| WO | WO 2000/075681 | 12/2000 |
| WO | WO 2002/071093 | 9/2002 |
| WO | WO02087275 A2 | 10/2002 |
| WO | WO 2003/081277 | 10/2003 |
| WO | WO 2005/088561 | 9/2005 |
| WO | WO 2006076830 | 7/2006 |
| WO | WO 2006/095463 | 9/2006 |
| WO | WO 2007083889 | 7/2007 |
| WO | WO 2007/136419 | 11/2007 |
| WO | WO2008016901 A2 | 2/2008 |
| WO | WO 2008/126694 | 10/2008 |
| WO | WO 2010/104436 | 9/2010 |
| WO | WO 2010/129885 | 11/2010 |
| WO | WO 2010/134933 | 11/2010 |
| WO | WO 2010/151829 | 12/2010 |
| WO | WO-2010151217 A2 | 12/2010 |
| WO | WO 2011/016804 | 2/2011 |
| WO | WO 2011/021974 | 2/2011 |
| WO | WO 2012/108813 | 8/2012 |
| WO | WO2012144429 A1 | 10/2012 |
| WO | WO 2013/020122 A2 | 2/2013 |
| WO | WO 2014/053487 A1 | 4/2014 |
| WO | WO 2014/064656 | 5/2014 |
| WO | WO 2014/093400 | 6/2014 |
| WO | WO 2015/116322 A2 | 8/2015 |
| WO | WO 2016/019354 | 2/2016 |

OTHER PUBLICATIONS

European Patent Application No. 15827815.0; Extended Search Report; dated Jul. 13, 2018; 12 pages.
European Patent Application No. 15853177.2; Extended Search Report; dated May 15, 2018; 11 pages.
European Patent Application No. 18157335.3; Extended Search Report; dated Jun. 18, 2018; 10 pages.
International Patent Application No. PCT/US2013/74212; Int'l Preliminary Report on Patentability; dated Mar. 27, 2015; 38 pages.
European Patent Application No. 09845044.8; Extend European Search Report; dated Mar. 3, 2014; 7 pages.
International Patent Application No. PCT/US2013/074212; International Search Report and the Written Opinion; dated May 20, 2014; 19 pages.
European Patent Application No. 06851205.2: Extended European Search Report dated Aug. 21, 2013, 13 pages.
3.sup.rd Generation Partnership Project EST TSI 136 214, V9.1.0, "LTE; Evolved Universal Terrestrial Radio Access (E-UTRA); Physical Layer-Measurements" (Release 9), Apr. 2010, 15 pages.
3.sup.rd Generation Partnership Project ETSI TS 136 211 V9.1.0, "LTE; Evolved Universal Terrestrial Radio Access (E-UTRA); Physical Channels and Modulation" (Release 9), Apr. 2010, 87 pages.

(56) References Cited

OTHER PUBLICATIONS 3.sup.rd Generation Partnership Project TS 36.211 V9.1.0, "Technical Specification Group Radio Access Network; Evolved Universal Terrestrial Radio Access (E-UTRA); Physical Channels and Modulation" (Release 9), Mar. 2010, 85 pages.
3.sup.rd Generation Partnership Project, (3GPP) TS 25.215 V3.0.0, "3.sup.rd Generation Partnership Project; Technical Specification Group Radio Access Network; Physical layer—Measurements", Oct. 1999, 19 pages.
3.sup.rd Generation Partnership Project, (3GPP) TS 36.211 V10.0.0 "Third Generation Partnership Project; Technical Specification Group Radio Access Network; Evolved Universal Terrestrial Radio Access (E-UTRA); Physical Channels and Modulation", (Release 10), Dec. 2010, 102 pages.
3.sup.rd Generation Partnership Project, (3GPP) TS 36.305 V9.3.0, "3.sup.rd Generation Partnership Project; Technical Specification Group Radio Access Network; Evolved Universal Terrestrial Radio Access Network; (E-UTRAN) Stage 2 Functional Specification of User Equipment (UE) Positioning in E-Utran)" (Release 9), Jun. 2010, 52 pages.
Alsindi, "Performance of TOA estimation algorithms in different indoor multipath conditions", Worcester Polytchnic Institute, Apr. 2004, 123 pages.
Dobkin, "Indoor Propagation and Wavelength" WJ Communications, Jul. 10, 2002, V 1.4, 8 pages.
Goldsmith, "EE359—Lecture Outline 2: Wireless Communications", Aug. 2010, http://www.stanford.edu/class/ee359/lectures2.sub.--1pp.pdf, 12 pages.
Goldsmith, "Wireless Communication", Cambridge University Press, 2005, 644 pages.
Hashemi et al., MRI: the basics, Lippincott Williams & Wilkinson, Chapter 23 thru 31, Philadelphia, PA, Apr. 2010, 269-356.
Rantala et al., "Indoor propagation comparison between 2.45 GHz and 433 MHz transmissions", IEEE Antennas and Propagation Society International Symposium, 2002, 1, 240-243.
Ruiter, "Factors to consider when selecting a wireless network for vital signs monitoring", 1999, 9 pages.
Salous, "Indoor and Outdoor UHF Measurements with a 90MHz Bandwidth", IEEE Coloquium on Propagation Chracteristics and Related System Techniques for Beyond Line-of-Site Radio, 1997, 6 pages.
Stone, "Electromagnetic signal attenuation in construction materials", NIST Construction Automation Program Report No. 3, Oct. 1997, NISTIR 6055, 101 pages.
Zyren, "Overview of the 3GPP Long Term Evolution Physical Layer", White Paper, Jul. 2007, 27 pages.
International Patent Application No. PCT/US2014/070184; Int'l Search Report and the Written Opinion; dated Oct. 28, 2015; 15 pages.
International Patent Application No. PCT/US2014/70184; Int'l Preliminary Report on Patentability; dated Apr. 11, 2016; 20 pages.
European Patent Application No. 13863113.0; Extended Search Report; dated Jun. 10, 2016; 7 pages.
U.S. Appl. No. 14/105,098, filed Dec. 12, 2003, Markhovsky et al.
European Patent Application No. 12819568.2; Extended Search Report; dated May 8, 2015; 7 pages.
Sahad, "Signal Propagation & Path Loss Models"; p. 17-30.
Sakaguchi et al.; "Influence of the Model Order Estimation Error in the ESPIRIT Based High Resolution Techniques"; IEICE Trans. Commun.; vol. E82-B No. 3; Mar. 1999; p. 561-563.
Borkowski et al.; "Performance of Cell ID+RTT Hybrid Positioning Method for UMTS Radio Networks"; Institute of Comm. Engineering; Tampere Univ. of Tech.; 2004; 6 pages.
Lin et al.; "Microscopic Examination of an RSSI-Signature-Based Indoor Localization System"; Dept. of Electrical Engineering; HotEmNets; Jun. 2-3, 2008; 5 pages.
Lee; "Accuracy Limitations of Hyperbolic Multilateration Systems"; Technical Note 1973-11; Massachusetts Institute of Technology, Lincoln Laboratory; 1973; 117 pages.
International Patent Application No. PCT/US2015/43321; Int'l Search Report and the Written Opinion; dated Dec. 22, 2015; 23 pages.
International Patent Application No. PCT/US2015/57418; Int'l Search Report; dated Feb. 26, 2016; 5 pages.
International Patent Application No. PCT/US2015/043321; Int'l Preliminary Report on Patentability; dated Jun. 16, 2016; 26 pages.
European Patent Application No. 16173140.1; Extended Search Report; dated Oct. 11, 2016; 8 pages.
International Patent Application No. PCT/US2019/024415; Int'l Search Report and the Written Opinion; dated Jun. 19, 2019; 13 pages.
International Patent Application No. PCT/US2019/024415; Int'l Preliminary Report on Patentability; dated Apr. 27, 2020; 21 pages.
European Patent Application No. 19776168.7; Extended Search Report; dated Apr. 13, 2021; 12 pages.
Gunter Seeber; "Satellite Geodesy: Foundations, Methods and Applications, Second Edition"; Satellite Geodesy; Dec. 2003; p. 92-93.
European Search Report—EP19198079—Search Authority—Munich—dated Jan. 15, 2020.
International Search Report and Written Opinion—PCT/US2012/049664—ISA/EPO—dated Feb. 27, 2013.
International Search Report and Written Opinion—PCT/US2016/056173—ISA/EPO—dated Dec. 29, 2016.
Seeber G., "Satellite Geodesy: Foundations, Methods and Applications, Second Edition", Satellite Geodesy, vol. 4, No. 3, Dec. 2003, pp. 92-93.
Supplementary European Search Report—EP16854515—Search Authority—Munich—dated Apr. 25, 2019.
Polaris Wireless Inc: "Comparisons of OTDOA and RTT Location Methods in LTE", 3GPP TSG-RAN WG1#57bis, R1-092596, Los Angeles, California, USA, Jun. 29-Jul. 3, 2009, 5 Pages, Jul. 3, 2009, pp. 1-10.
Xiao Z., "Study on Key Technologies of Ultra Wideband Positioning and RAKE Reception", Xi'an University of Electronic Science and Technology, China Doctoral Dissertations Full-text Database (Information Technology Edition), pp. 62-64, publicized at Mar. 31, 2011.

* cited by examiner

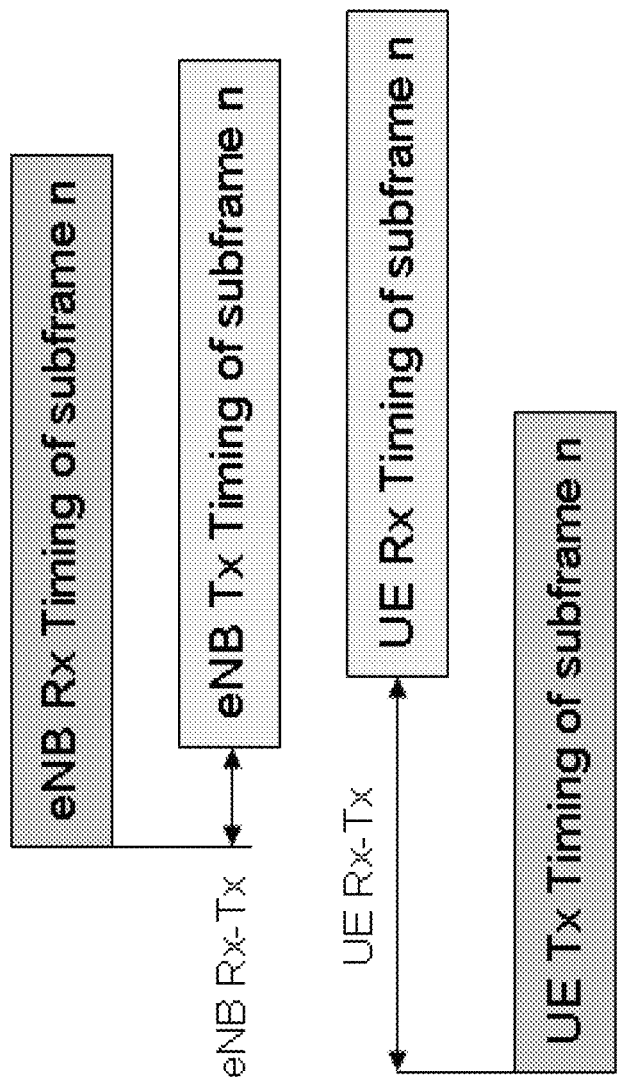
Fig. 38 eNB and UE receive-transmit timing difference

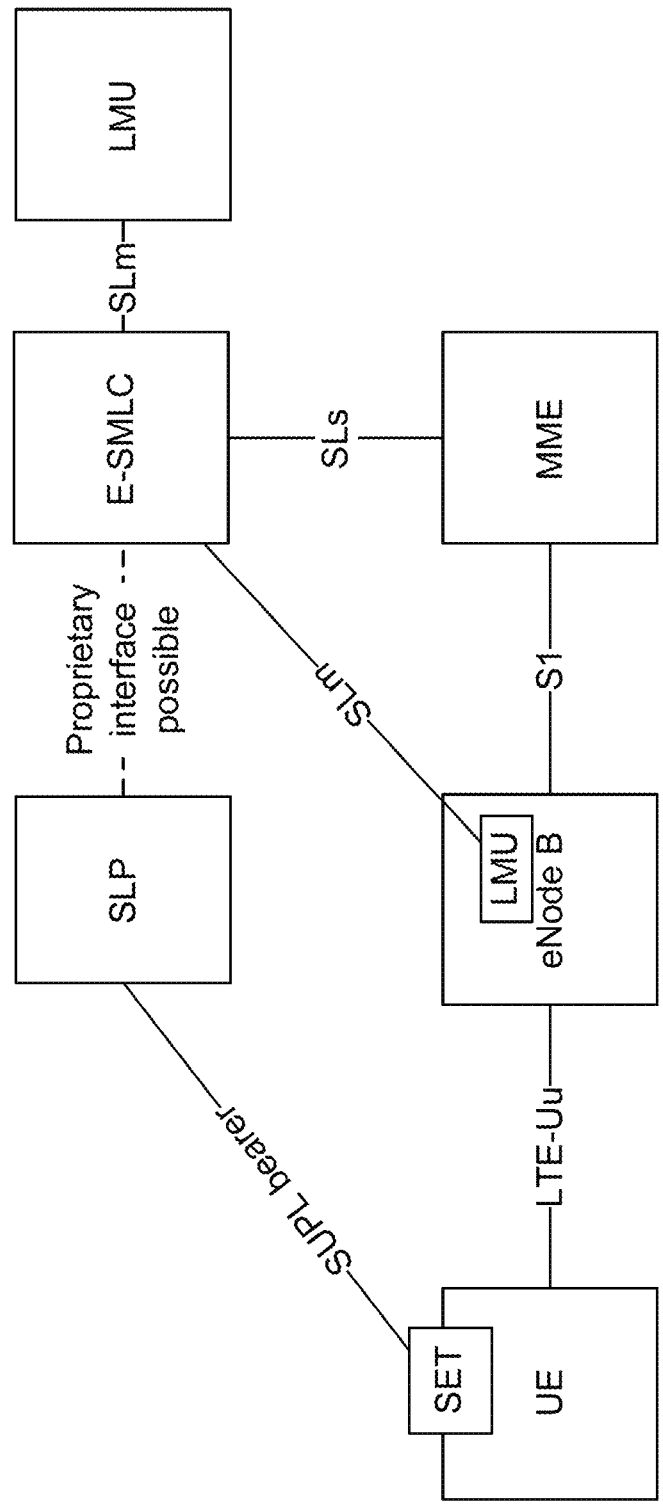
FIG. 39 Architecture for UE positioning within E-UTRAN

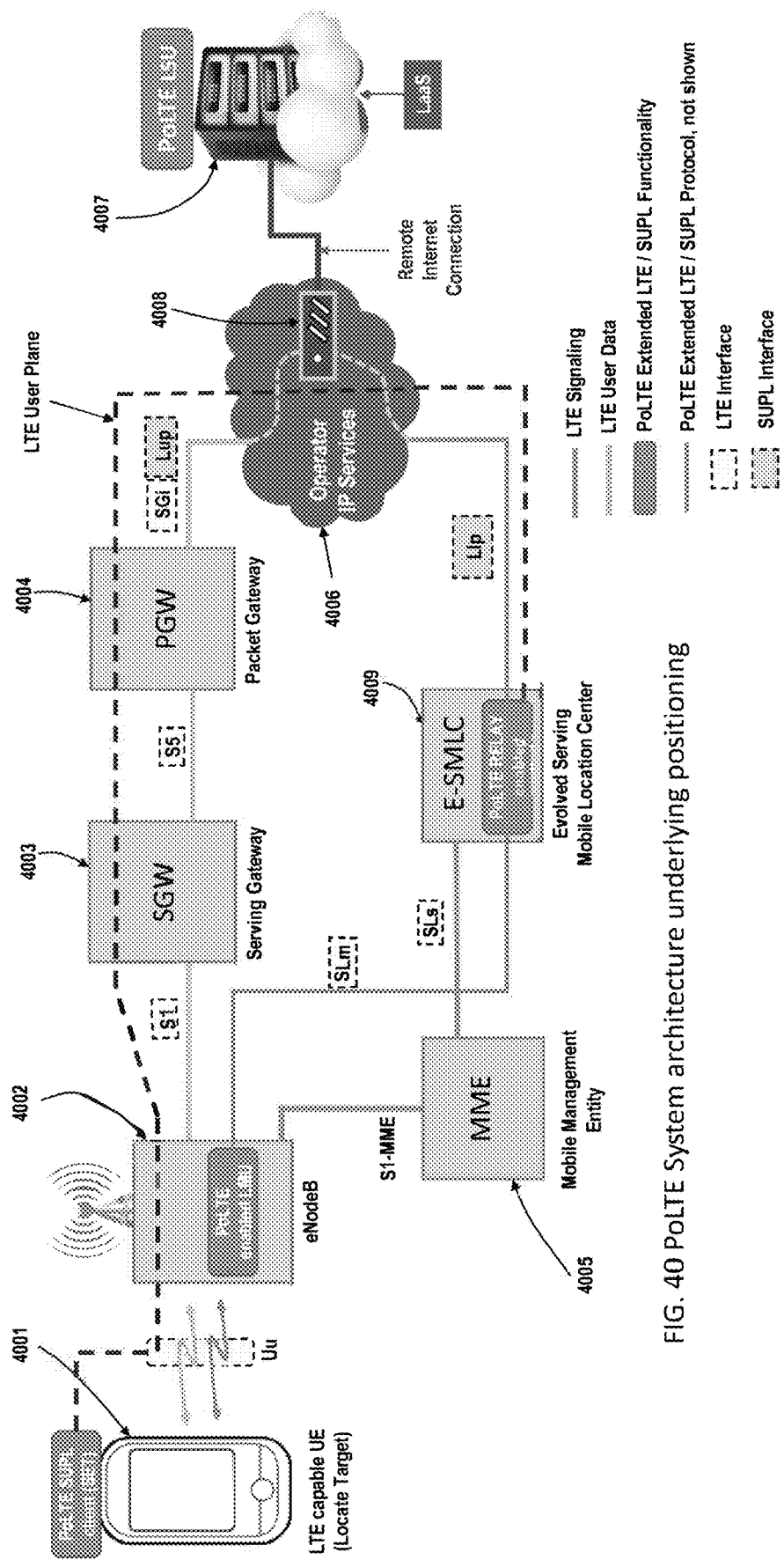
FIG. 40 PoLTE System architecture underlying positioning

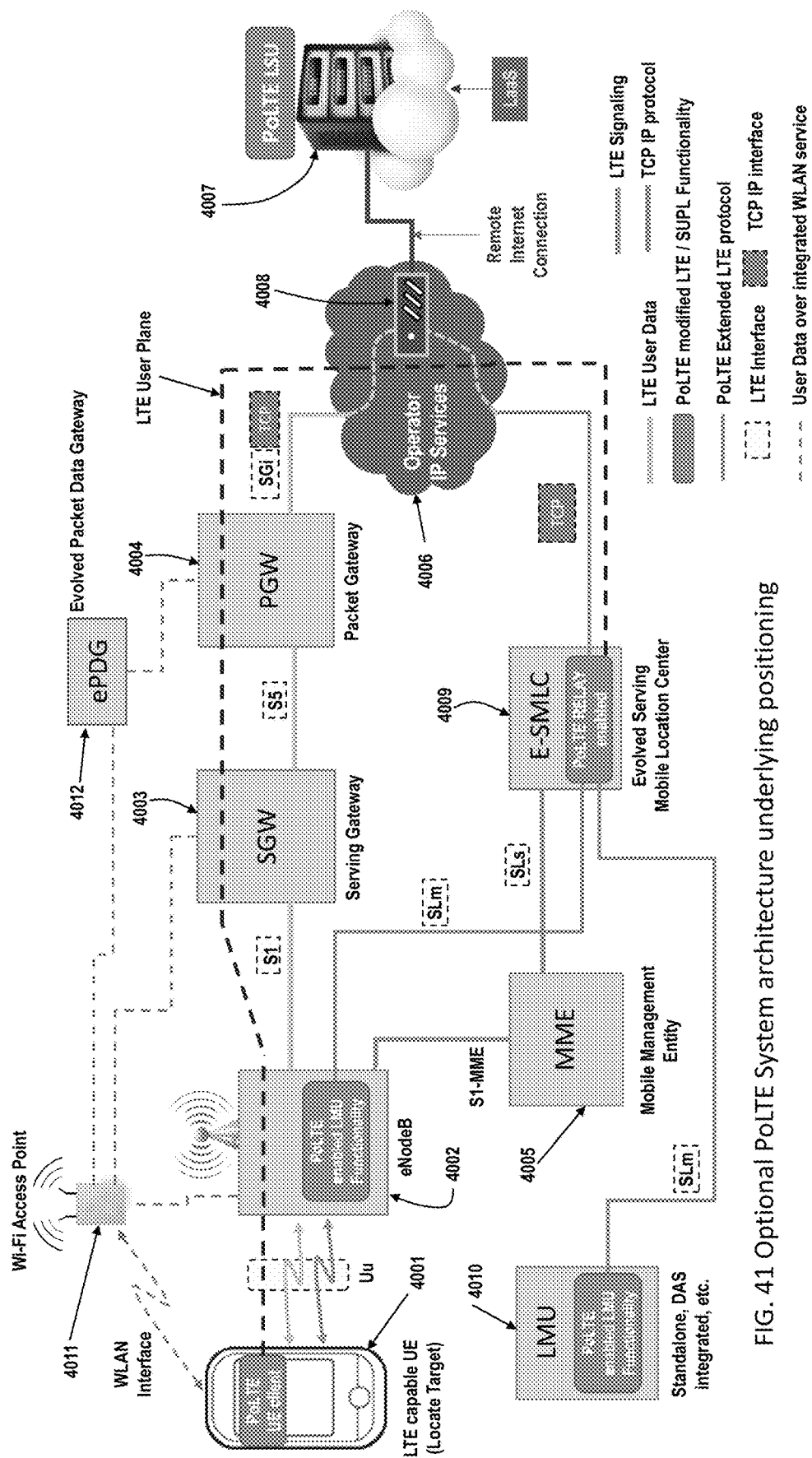
FIG. 41 Optional PoLTE System architecture underlying positioning

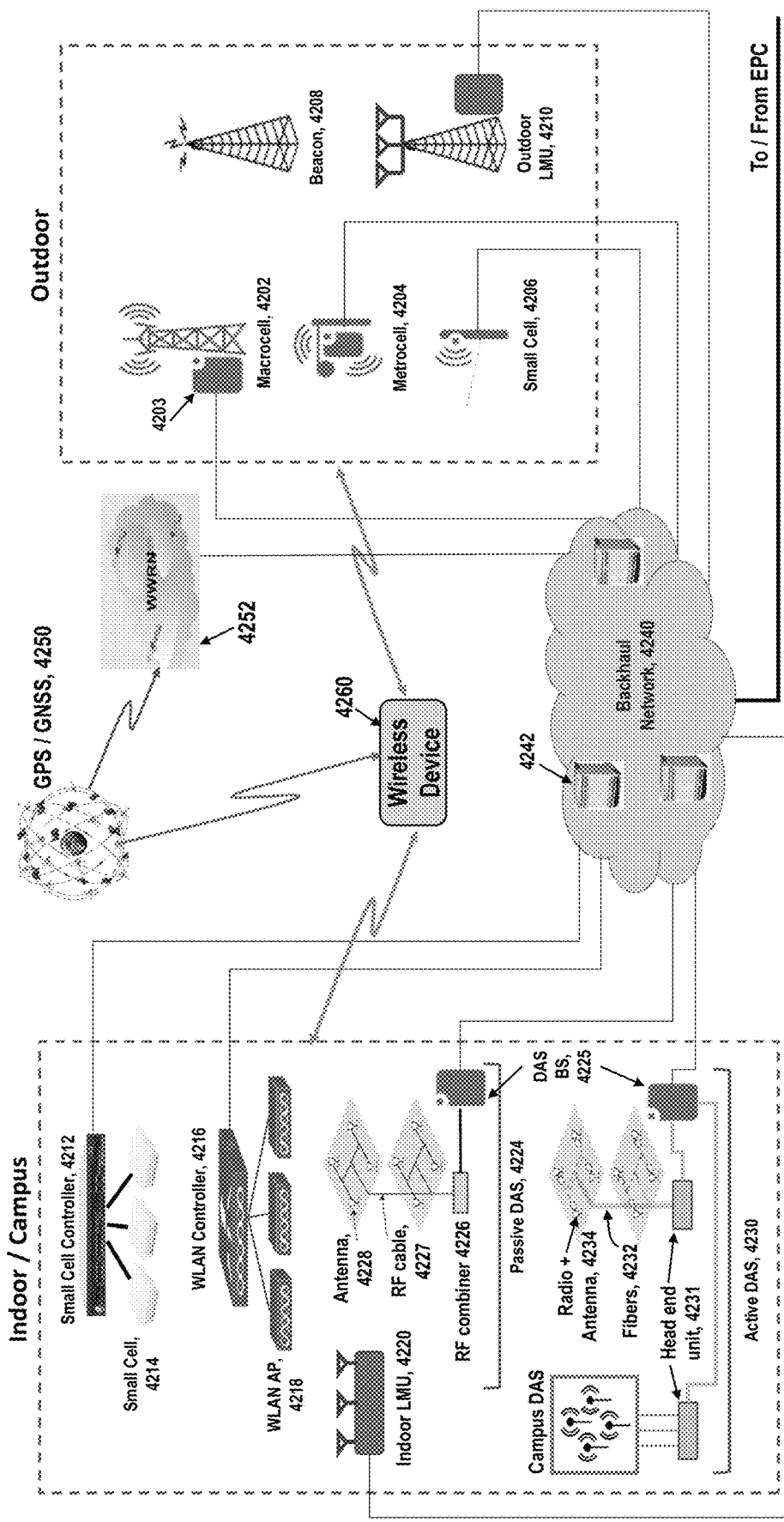
FIG. 42 Current multi-network / multiple types of access nodes environment

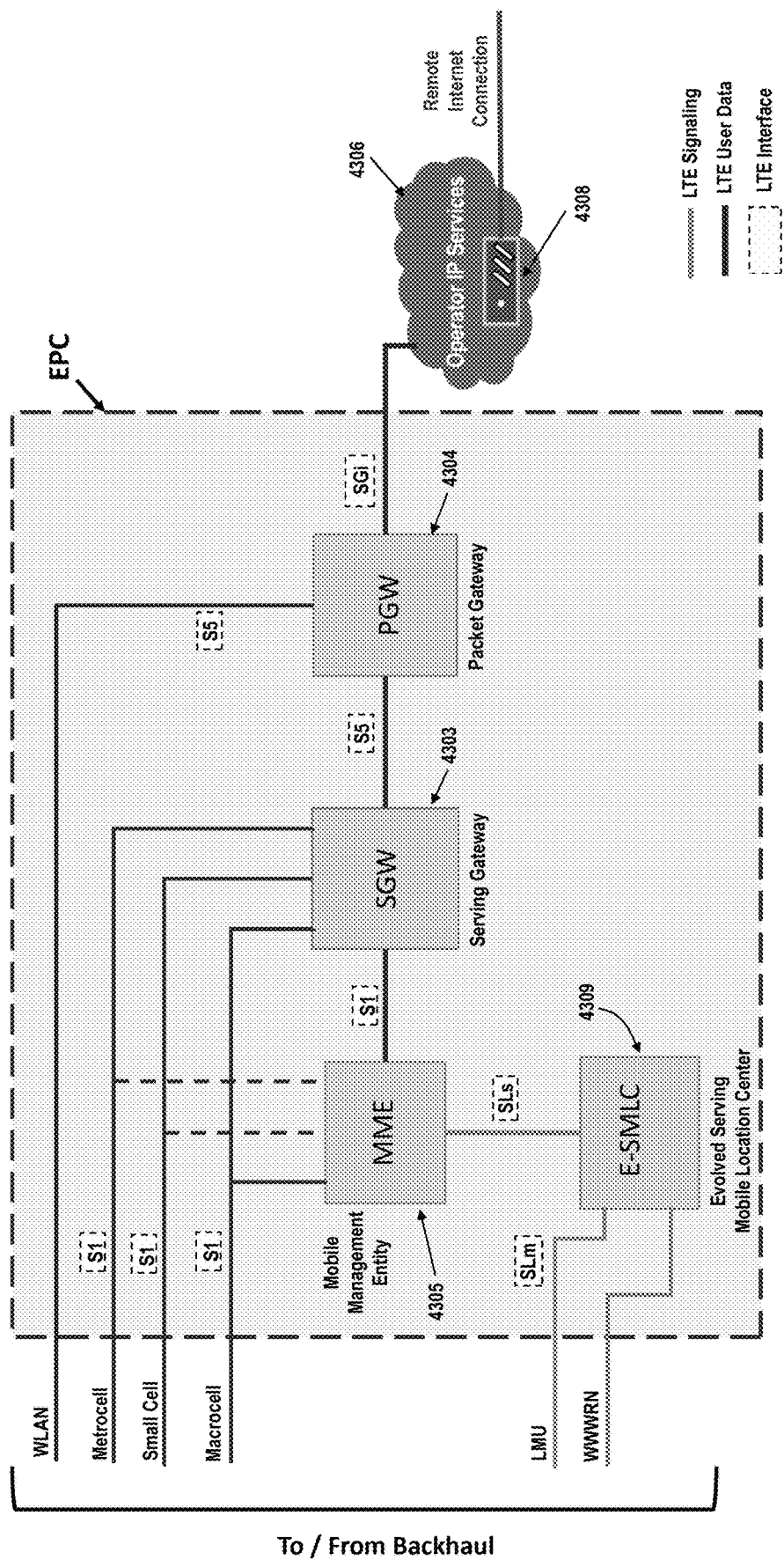
FIG. 43A Current LTE EPC architecture

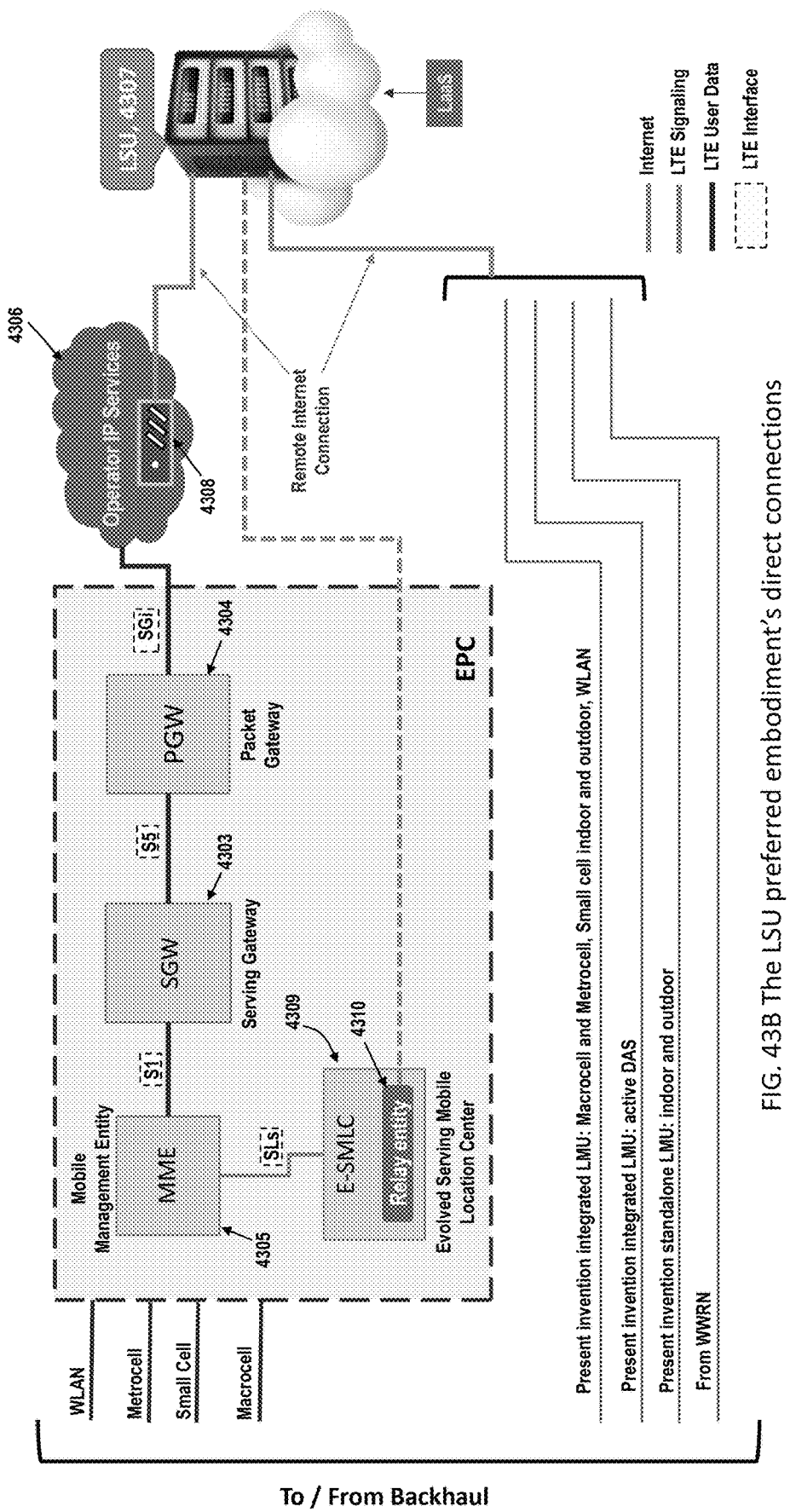
FIG. 43B The LSU preferred embodiment's direct connections

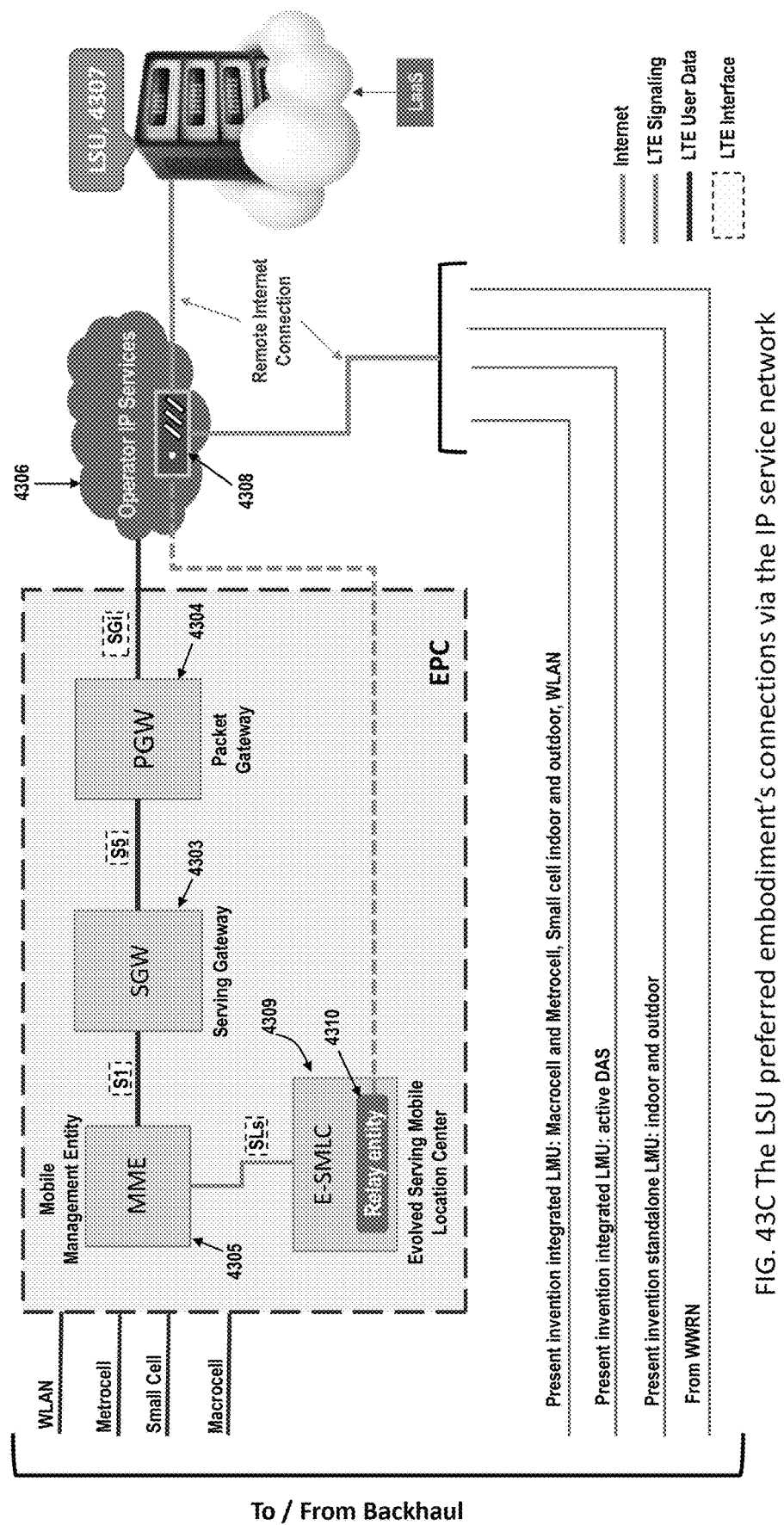
FIG. 43C The LSU preferred embodiment's connections via the IP service network

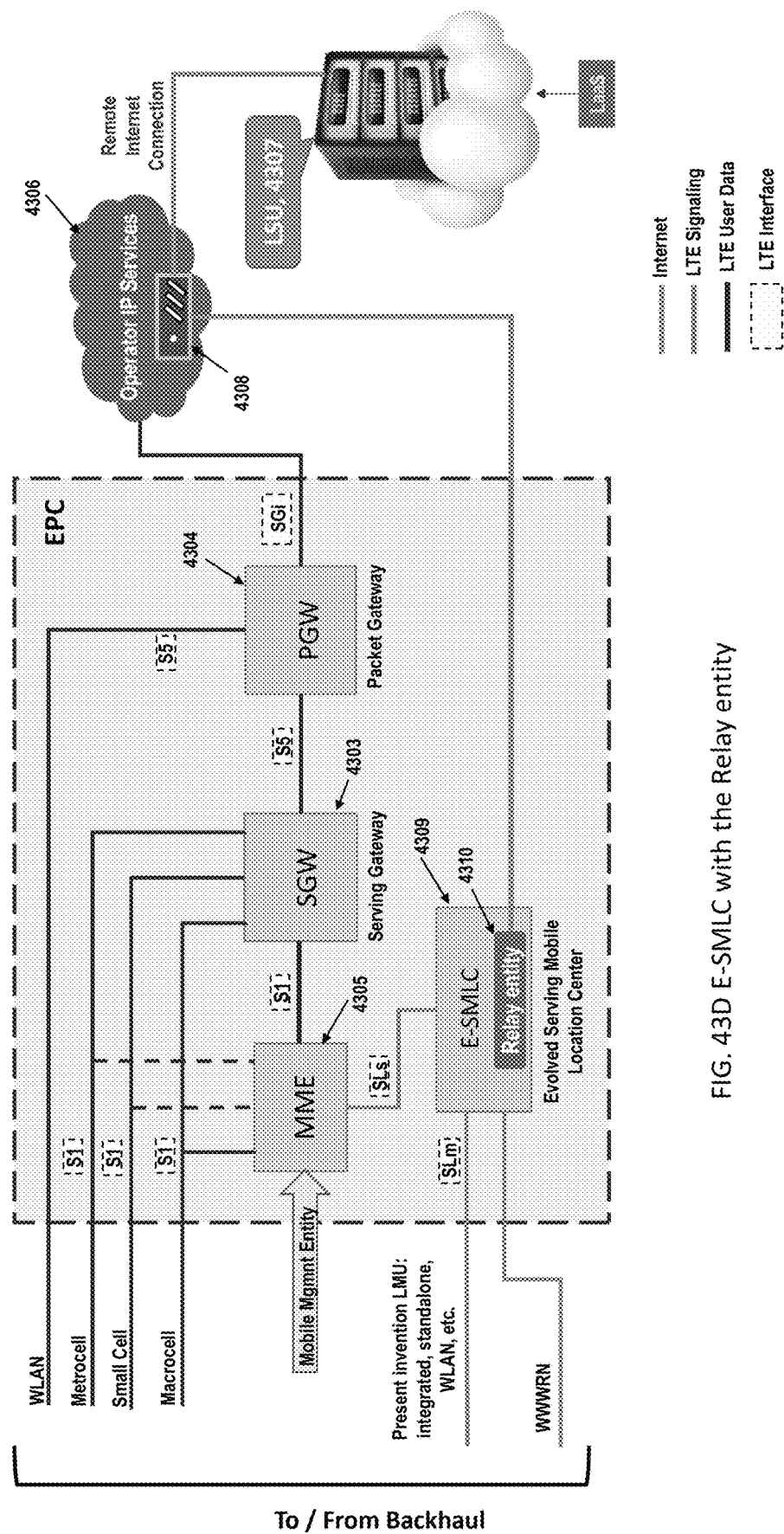
FIG. 43D E-SMLC with the Relay entity

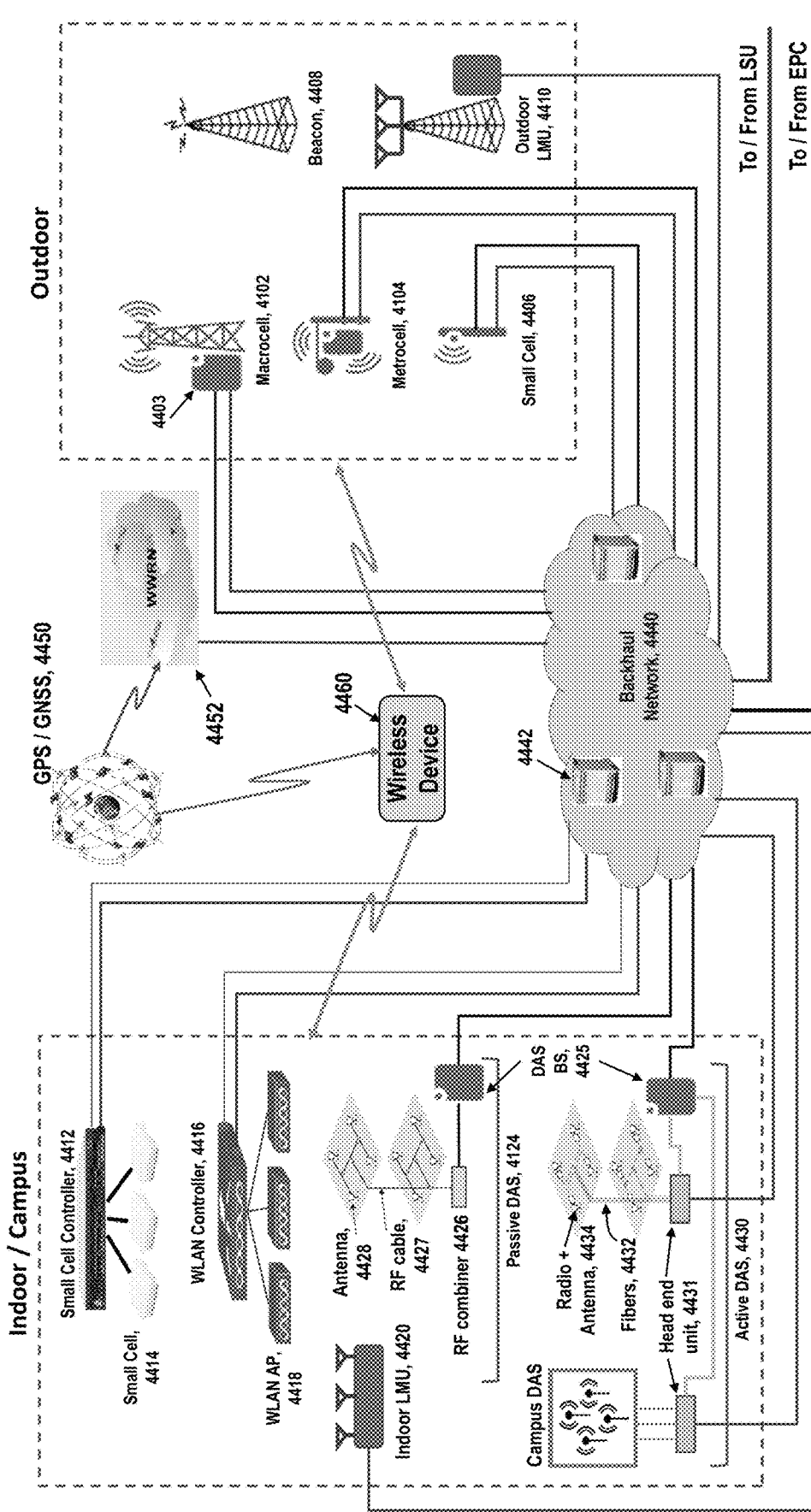
FIG. 44 Preferred embodiment of the unified framework / platform

MULTI-PATH MITIGATION IN TRACKING OBJECTS USING COMPRESSED RF DATA

CROSS REFERENCE TO RELATED APPLICATIONS

This application is a continuation of U.S. patent application Ser. No. 16/791,898, filed Feb. 14, 2020; which is a continuation of U.S. patent application Ser. No. 16/367,014, filed Mar. 27, 2019, now U.S. Pat. No. 10,845,453 issued Nov. 24, 2020; which claims benefit under 35 U.S.C. § 119(e) of Provisional U.S. Patent Application No. 62/653,450, filed Apr. 5, 2018; and Provisional U.S. Patent Application No. 62/648,883, filed Mar. 27, 2018.

U.S. patent application Ser. No. 16/367,014, filed Mar. 27, 2019, is related by subject matter to that which is disclosed in the following commonly assigned applications: U.S. patent application Ser. No. 16/164,724, filed Oct. 18, 2018; U.S. patent application Ser. No. 15/900,654, filed Feb. 20, 2018; and U.S. patent application Ser. No. 15/595,702, filed May 15, 2017; the contents of each of which are incorporated herein by reference in their entirety.

TECHNICAL FIELD

The present embodiment relates to wireless communications and wireless networks systems and systems for a Radio Frequency (RF)-based identification, tracking and locating of objects, including RTLS (Real Time Locating Service), LTE based locating services, and Location-as-a-Service (Laas). The present embodiment also relating to the unified framework/platform (architecture, functional entities and operations) that shall accommodate all-inclusive wireless devices wireless signals, positioning technologies, methods/techniques, including hybrid/fusion localizations.

BACKGROUND

RF-based identification and location-finding systems for determination of relative or geographic position of objects are generally used for tracking single objects or groups of objects, as well as for tracking individuals. Conventional location-finding systems have been used for position determination in an open, outdoor environment. RF-based, Global Positioning System (GPS)/Global Navigation Satellite System (GNSS), and assisted GPSs/GNSSs are typically used. However, conventional location-finding systems suffer from certain inaccuracies when locating the objects in closed (i.e., indoor) environments, as well as outdoors.

Cellular wireless communication systems provide various methods of locating user equipment (UE) position indoors and in environments that are not well suited for GPS. The most accurate methods are positioning techniques that are based on the multilateration/trilateration methods. For example, LTE (Long Term Evolution) standard release 9 specifies the DL-OTDOA (Downlink Observed Time Difference of Arrival) and release 11 specifies the U-TDOA (Uplink Time Difference of Arrival) techniques that are derivatives of the multilateration/trilateration methods.

Since time synchronization errors impact locate accuracy, the fundamental requirement for multilateration/trilateration based systems is the complete and precise time synchronization of the system to a single common reference time. In cellular networks, the DL-OTDOA and the U-TDOA locating methods also require, in the case of DL-OTDOA, that transmissions from multiple antennas be time synchronized, or in the case of U-TDOA, that multiple receivers be time synchronized.

The LTE standards release 9 and release 11 do not specify the time synchronization accuracy for the purpose of locating, leaving this to wireless/cellular service providers. On the other hand, these standards do provide limits for the ranging accuracy. For example, when using 10 MHz ranging signal bandwidth, the requirement is 50 meters @67% reliability for the DL-OTDOA and 100 meters @67% reliability for the U-TDOA.

The above noted limits are the result of a combination of ranging measurements errors and errors caused by the lack of precision synchronization, e.g. time synchronization errors. From the relevant LTE test specifications (3GPP TS 36.133 version 10.1.0 release 10) and other documents, it is possible to estimate the time synchronization error, assuming that the synchronization error is uniformly distributed. One such estimate amounts to 200 ns (100 ns peak-to-peak). It should be noted that the Voice over LTE (VoLTE) functionality also requires cellular network synchronization down to 150 nanoseconds (75 ns peak-to-peak), assuming that the synchronization error is uniformly distributed. Therefore, going forward, the LTE network's time synchronization accuracy will be assumed to be within 150 ns.

As for distance location accuracy, FCC directive NG 911 specifies locate accuracy requirements of 50 meters and 100 meters. However, for the Location Based Services (LBS) market, the indoors location requirements are much more stringent—3 meters @67% reliability. As such, the ranging and locate error introduced by the time synchronization error of 150 ns (the standard deviation of 43 ns) is much larger than the 3 meters ranging error (standard deviation of 10 ns).

While a cellular network's time synchronization might be adequate to satisfy the mandatory FCC NG E911 emergency location requirements, this synchronization accuracy falls short of the needs of LBS or RTLS system users, who require significantly more accurate locating. Thus, there is a need in the art for mitigating the locate error induced by lack of accurate time synchronization for cellular/wireless networks for the purpose of supporting LBS and RTLS.

While LTE 4G deployments support Location Based Service (LBS) that utilize available location information of the terminal, proposed 5G deployment are going to replace LBS support with Location-as-a-Service (Laas) data delivery. In accordance with this model, location data will be collected by communication service carriers and made available to client through APIs. This approach is intended to better protect the privacy of physical location data for enterprise customers and consumers, but it raises a number of issues as well.

Positioning in 5G networks can be carried out either within UE devices (device-centric) or in a network-centric manner, or in both (as per LTE standards). However, the network-centric option has several advantages over other approaches. First, network-centric positioning enables more advanced positioning technology to be utilized and updated with computational capabilities greatly exceeding those available in UE devices. Network-centric positioning also makes it easier to upgrade positioning algorithms and make other changes. Positioning within UE devices tends to create logistical burdens (for carriers) because the carriers are dependent on the device manufacturers to implement necessary changes and the computational resources of the devices are more limited. Furthermore, the network-centric option allows the positioning engine to be continuously running in the background enabling ubiquitous high-accuracy positioning that provide up-to-date location information with a low latency, while also allowing location information to be obtained everywhere under the network coverage area, including indoors and within urban corridor environments. And, because the network-centric option relieves the UEs of the heavy computational burden required for positioning, network-centric positioning is more energy efficient from the device's perspective; achieving significant UE power consumption improvements.

Specifically, UE power consumption improvement is very important for wireless modems targeting IoT (Internet of Things) applications. These modems may also employ additional (to the network-centric positioning) strategies in order do save power.

In general, wireless networks utilize two positioning methods: uplink Time Difference of Arrival (TDOA) and downlink OTDOA. The uplink method makes use of signals that are transmitted by the UE to the network elements and the downlink method makes use of signals that are transmitted from the network elements to the UE. Specifically, these network elements are the various types of cells (macro, small, distributed, etc.) and the signals are reference signals. Each method has its own tradeoffs and, depending upon the environment, one method can be more advantageous than another. Both methods rely on the multilateration locate method. However, in case of the downlink OTDOA, the cell-tower transmit power is two orders magnitude higher than the UE transmitter power. As a result, the downlink OTDOA method provides more ubiquitous coverage. At the same time, uplink locate may also support the Angle of Arrival (AoA)/Direction of Arrival (DoA) method, where AoA/DoA is measured based on uplink transmissions from the UE and the known configuration of the eNodeB, aka eNoB/eNB, antenna array. This approach has a potential for a higher locate accuracy, but that accuracy depends heavily on characteristics of a particular cell's antennas. On the other hand, the uplink TDOA and AoA methods is inherently network-centric as the relevant UE transmissions can be received and collected by the network elements, for example eNoB.

Traditional implementations of the downlink OTDOA are either UE assisted (e.g., 3GPP 36.305 v14) or UE based. In the UE assisted scheme, the UE must perform the downlink timing measurements. These measurements involve estimating the Reference Signals Time Difference (RSTD) between reference signals from several cells. Those time differences are then reported to a network element called the Evolved Serving Mobile Location Center (E-SMLC) for further processing. As a result, a considerable amount of technology is required to mitigate the downlink timing measurements errors that are caused by the RF propagation phenomena. Otherwise, the UE positioning accuracy is severely impacted. However, mitigating such errors requires employing state of the art locating signal processing technology, which comes at a cost of heavy computational burden on the UE resources. There is therefore a need to improve downlink OTDOA performance without requiring the UEs to have greater computational resources and without creating logistical burdens for carriers and UE manufacturers.

At the same time there is a need for the network-centric architecture that enables the Location-as-a-Service (Laas) data delivery and for such an architecture to make advanced features possible that were not feasible before, such as joint Uplink/Downlink or Downlink/Uplink UE positioning that improves the locate system reliability and position fix accuracy. A further need exists for such an architecture to enable multiple location techniques to be performed at the same time on the same data and to enable. Finally, such architecture needs to allow more towers and infrastructure to be seen since the entire database of all of the network elements is available.

Wireless devices, also known as user equipment (UE), draw on a wide range of technologies to obtain long range location information, including GPS, cellular signals, Wi-Fi (WLAN) signals, Beacon signals and various passive and active sensors, for example gyro sensors. Since no single technology can address all geolocating environments and/or performance requirements, multiple technologies are combined into a hybrid a.k.a. fusion positioning.

In addition, there is a multitude of geolocation methods and/or techniques such as Uplink, Downlink and enhanced cell ID positioning; assisted GNSS/GPS, Triangulation, Trilateration, Multilateration, RF Fingerprinting, RSS (Received Signal Strength), etc.

While not all existing wireless communication networks integrate multiple positioning technologies, the integration effort is highest in cellular communication networks. However, these networks' geolocation architectures and functions are technology/methods/techniques specific, thus limiting the ability to follow changing industries'/customers' requirements and/or to take advantage of advances in the geolocation technologies and methods/techniques, including hybrid/fusion positioning.

This architecture fragmentation is caused by the current cellular networks strategy favoring low bandwidth when communicating with a localization server. This explains the past popularity of probabilistic localization algorithms and methods, including RF fingerprinting, that collect a number of the received signal strength indicators (RSSIs) of each network node visible at that location and send this information (data) to localization server for determining target position fix. Over time, customers and applications demanded higher levels of performance, including indoor (Wireless E911 Location Accuracy requirements from the Fourth Report and Order from the (FCC) Federal Communications Commission). This have exposed the RF fingerprinting limitations like accuracy degradation in target moving scenarios, the constant need of laborious human involvement to build and update the so-called fingerprint maps and also the existence of localization ambiguity and error floor phenomenon.

Responding to the aforementioned demand for higher locate accuracy and reliability, the wireless industry has deployed methods and technologies that have potential for precise positioning. In wireless communication networks the most widely used are Downlink and Uplink positioning, which include Time of Arrival (TOA), Time Differences of Arrival (TDOA), Time of Flight (TOF), Angle of Arrival (AOA), and Received Signal Phase techniques.

The potential of better accuracy also comes with higher computational demand. Yet, acquiescing with the low bandwidth approach, the existing wireless communication networks architectures require wireless devices and/or specific (dedicated) network elements/components to determine the TOA, TDOA, a.k.a. RSTD/RTOA, TOF, AOA, etc. and their metrics, i.e. observation results, to be sent to the network localization server that is responsible for making the positioning calculations using these observations. This is heavily taxing computational resources of wireless devices and/or specific network components to the point of inhibiting implementation of the ever-advancing geolocation algorithms/methods (because of computational resources constrains), limiting further improvements of positioning performance. It should be noted that computational constrains of wireless devices or specific (dedicated) network elements are arising from limited size, cost, power consumption requirements and also logistics burden and HW/SW legacy restrictions.

Unable to meet customers'/applications' demands using a single locating technology/method, the wireless industry is employing a combination of two or more technologies/methods, i.e. hybrid approach. However, hybrid locate performance gains are incremental in nature and cannot address all of customers'/applications' demands. For example, combining GPS/GNSS and LTE DL OTDOA improves geolocation in outdoor environments, but indoors this hybrid method brings no improvement because GPS/GNSS does not operate in indoor environments.

At the same time, hybrid localization adds cost, increases power consumption and solution complexity. Emerging IoT (Internet of Things) applications require wireless devices (sensors) of very low cost, small size, extremely low power consumption, low complexity and ubiquitous coverage in broad range of environments, as well as deep inside buildings. This is especially true for Cat-M and NBIOT IOT based solutions where batter life is of great importance and the devices typically do not have robust on board processors. Other challenges include long hibernation times, short time to first fix (TTFF) and signals' narrow bandwidth that impacting the geolocation accuracy. Subsequently, hybrid solution(s) cannot be used because of additional cost, power consumption, larger size. Besides, mitigating effects of narrow signals bandwidth combined with deep inside buildings environments necessitate cutting edge algorithms, which require a significant computational power/resources that are out of reach for IoT wireless devices. Thus, no adequate location solution for low cost, long battery life.

Present day WLAN Access Points (APs) feature multiple antennas at the transmitter and the receiver as well as signals structure that enable cutting edge localization. Thus, it is conceivable to use hybrid positioning for indoor environments, utilizing both: Wi-Fi and LTE signals. However, the cutting-edge Wi-Fi target localization is performed by the WLAN infrastructure, while the LTE target localization is typically split between the wireless device and the LTE infrastructure positioning server. Also, Wi-Fi and LTE hybrids will need additional processing to combine the intermediate Wi-Fi and LTE results to finalize target position.

One option is for the wireless device to carry out all intermediate Wi-Fi and LTE computations, sending results to the LSU server, to determine the target location. Another option is for the wireless device to perform all computations to determine its own position. Considering wireless devices computation resources constrains, neither option is suitable for supporting advanced geolocation technology.

Yet, another option is for the WLAN infrastructure to provide the intermediate and/or other locate information to the LSU, to determine the wireless device location. However, this option is placing computational and logistical (algorithms/and processing updates, WLAN and LTE coordination, etc.) burdens on the WLAN infrastructure.

GPS/GNSS locating technology is an important part of the wireless device localization solutions. Whereas GPS/GNSS fails in indoors and dense urban environments, its accuracy is unmatched in rural and suburban environment. Furthermore, assisted GPS/GNSS (AGPS/AGNSS) method (mode) expanding GPS/GNSS capabilities to many dense urban environments, albeit at reduced accuracy/reliability. Cellular networks providing the necessary assisted data to wireless devices equipped with GPS/GNSS receiver so that it can operate in the AGPS/AGNSS mode. These receivers are also responsible for determining observation results: pseudo-ranges, pseudo Doppler, etc., that are sent to the network's location server where the position calculation takes place. Alternatively, wireless device (GPS/GNSS) receiver is capable of standalone operation—calculating its own location, with or without assistance from the cellular network.

Thus, the network-assisted GPS/GNSS operation rely on signaling between each wireless device's GPS/GNSS receiver and the network infrastructure and at the same time demand significant computational resources for calculation observation results and its metric; and in the standalone operation mode even more computational resources are needed for calculating both: the observation results and device own location. Either option is increasing receiver's cost, size and power drain.

Other technologies, like Bluetooth, Terrestrial Beacon System, etc., are also used for localization in wireless networks. When integrated into cellular network, because of the aforementioned wireless device geolocation low communication bandwidth strategy these technology specific functions are spread out across wireless devices and network elements. This impede the future advances in the wireless networks positioning performance, fails to meet customers'/applications' performance demands and imposing heavy computational load on wireless devices and/or network components, logistics burden on the network and HW/SW legacy restrictions for new advanced algorithms support.

Advanced wireless network architectures, for example 5G (a unified, more capable New Radio, global 3GPP standard), contemplating the Location-as-a-Service (LaaS) data delivery, whereby the wireless devices acting as gateways to the computing cloud and LaaS specifically for protected physical location data. However, the current geolocation architectures fragmentation is ill fit for the LaaS support because of the abovementioned deficiencies and physical location data security concerns.

Thus, there is a need in the art for unified framework/platform (architecture, functional entities and operations) that shall accommodate all-inclusive wireless devices wireless signals, positioning technologies, methods/techniques, including hybrid/fusion localizations. The key benefits are superior localization accuracy, reliability, energy efficient wireless devices, Location-as-a-Service (LaaS) data delivery, enhanced security, facilitation of new features development, reduced logistical burden and legacy restrictions; scalable computational capabilities greatly exceeding those available in mobile devices and/or an individual network's infrastructure element(s).

SUMMARY

The present disclosure relates to methods and systems for Radio Frequency (RF)-based identification, tracking and locating of objects, including Real Time Locating Service (RTLS) systems that substantially obviate one or more of the disadvantages associated with existing systems. The methods and systems can use partially synchronized (in time) receivers and/or transmitters. According to an embodiment, RF-based tracking and locating is implemented in cellular networks, but could be also implemented in any wireless system and RTLS environments. The proposed system can use software implemented digital signal processing and software defined radio technologies (SDR). Digital signal processing (DSP) can be used as well.

One approach described herein employs clusters of receivers and/or transmitters precisely time synchronized within each cluster, while the inter-cluster time synchronization can be much less accurate or not required at all. The present embodiment can be used in all wireless systems/networks and include simplex, half duplex and full duplex modes of operation. The embodiment described below operates with wireless networks that employ various modulation types, including OFDM modulation and/or its derivatives. Thus, the embodiment described below operates with LTE networks and it is also applicable to other wireless systems/networks.

As described in one embodiment, RF-based tracking and locating is implemented on 3GPP LTE cellular networks will significantly benefit from the precisely synchronized (in time) receivers and/or transmitters clusters. The proposed system can use software- and/or hardware-implemented digital signal processing.

As described in embodiments, a network-centric architecture supports LaaS data delivery, and which is designed for 5G and other networks when all signal processing and position estimates are done in the cloud, i.e., outside of the UE and/or eNodeB. There are several options in terms of how this can be done. In the case of uplink locate, the relevant UE reference signals transmissions can be collected/pre-processed by the eNodeB in macro environment or LMU(s) in other environments and forwarded to the Locate Server Unit (LSU) for further processing and UE position determination. In case of the downlink (OTDOA), the task of collecting and pre-processing of the downlink reference signals may be performed by the UE. The UE may then send collected downlink data to the LSU. In case of the downlink (OTDOA), the UE may also handle the communication with the LSU, using the Control Plane and/or the LTE User (data) Plane. Consequently, signaling may be in line with OMA Secure User Plane Location (SUPL) protocol and/or 3GPP, for example LTE Positioning Protocol (LPP). In case of the uplink AoA/DoA the eNodeB may handle the communication with the LSU, using the LPPa and SLmAP (SLm Application Protocol) protocols or MTTQ.

As described in embodiments, this network-centric architecture may enable advanced features that were not feasible before. These include: (a) utilizing the downlink OTDOA to determine the distance between the serving cell/tower and the UE and uplink AoA/DoA to determine the UE location, while also mitigating the OTDOA synchronization error impact on this uplink/downlink UE positioning by utilizing tracking algorithms/technology; (b) utilizing tracking algorithms/technology to improve the UE positioning in cases where the uplink AoA/DoA plus RTT (Round Trip Time) aka Time Advance (TA or TADV) method is used to determine the UE position; and (c) utilizing tracking algorithms/technology to estimate and to correct/mitigate the synchronization error in the downlink OTDOA locating method.

As described in embodiments, downlink (OTDOA) UE locate methods include a navigation processor utilizing the multilateration technique/method, aka hyperbolic navigation. This multilateration technique entails solving a number of hyperbolic (RSTD/TDOA) equations. There are iterative methods and non-iterative (close form) solutions. In one embodiment, a hybrid approach is described that splits the number of available (hearable) reference points (base stations) to have multiple sets of three RSTD/TDOA subsets and finds closed-form solutions for each subset. Thereafter, location consistency algorithms may be utilized to finalize the position fix. In a second embodiment, the position fix may be improved utilizing a combination of iterative and non-iterative solutions from the same set of RSTD/TDOA values. In a third embodiment, initial position estimates may be determined for the UE location, based on iterative and non-iterative algorithms, by utilizing the uplink AoA/DoA estimate(s) and the RTT.

As described in embodiments, a wireless network environment sometimes defies the multilateration method, which requires at least three reference points (for 2-D locate) to obtain the locate fix because only two high power cells are used to flood a large area with RF signals. Accordingly, when RTT is available, the UE is located along an arc defined by the serving sector azimuth beam width and the RTT/2 range. When AoA/DoA estimates are available, that the UE position may be determined at the hyperbola and arc intersection vicinity. Both of these methods may also be used. When neither RTT nor AoA/DoA estimates are available, the UE location is determined by scoring intersection points corresponding to each cell/tower (sector) on a chosen hyperbola is given a score for each tower (sector). Scoring is based on a difference in angles between the direction a cell is pointing and the direction to a point on the hyperbola and a distance from each point to the corresponding cell/tower. Scores may be weighted according to their corresponding cell/tower's SNR.

As described in embodiments, the LSU may include a communication processor that is configured for signaling and information exchange with UEs, the eNodeB, and/or network elements. The signaling may be in line with the OMA SUPL protocol and/or 3GPP LPP/LPPa, or a combination of LPP, LPPa and SUPL, as well as other protocols that are or may be used for communication with the network, for example LCS-AP protocol.

As described in embodiments, the LSU components may be instructions stored in memory and configured to execute on a processor of a 4.5G MEC (Mobile Edge Computing) server located at a communication network's edge, The LSU components may be integrated as a hosted app on 4.5G MEC. In a 5G deployment, the LSU components may be hosted in the core network computing cloud. The LSU being hosted in the core network computing cloud may support LaaS data delivery, whereby the UEs act as gateways to the core network computing cloud and LaaS specifically for protected physical location data.

As described in embodiments, the LSU may include a downlink signal processor as well as an uplink signal processor and a navigation processor.

As described in embodiments, the unified framework/platform is concurrently supporting wireless device positioning in an environment consisting of one or more wireless communication networks, for example cellular, WLAN, etc., and/or one or more dedicated locate systems like GPS/GNSS, Terrestrial Beacon systems, etc.

As described in embodiments, the unified framework/platform is performing all of the signal processing, localization, tracking and navigation tasks outside of the wireless device and/or specific (dedicated) network elements (WLAN AP, eNodeB, LMU, E-SMLC, etc.), while wireless device and/or network element are responsible for collecting and pre-processing a snap-shot of signals that are used for wireless device localization, tracking and navigation.

As described in embodiments, all of the signal processing, localization, tracking and navigation is carried out in the LSU, while pre-processing of a snap-shot of signals include sending the snap-shot data to the LSU and, optionally, performing compression operations to reduce the amount of the snap-shot data to be sent to the LSU.

As described in embodiments herein, the LSU:

1. May be deployed inside the network infrastructure or operator's IP service network;

2. May be deployed on a server at Edge facility of cloud computing-based centralized Radio Access Network (C-RAN) baseband processing, where it may be integrated as a hosted Application.

3. May be hosted in the network' computing cloud and/or operator's service network cloud via a Secure Remote Internet Connection.

4. May be a fully hosted and managed cloud service, connected to one or more operator' network infrastructure and/or IP service network via a Secure Remote Internet Connection(s).

5. May be hosted by a standalone private network such as CBRS, Licensed Assisted Access Networks or WLAN network.

The latter three embodiments support the LaaS data delivery.

Pertaining wireless networks, the downlink communication is whenever a wireless device receiving signals from one or more network's nodes (cell base station, WLAN AP, satellite, etc.). At the same time, the uplink communication is whenever one or more network's nodes (cell base station, WLAN AP, etc.) and/or dedicated infrastructure elements (LMU) receiving signals transmitted from/by a wireless device. Wireless device localization process that utilizes the downlink signals is called the downlink positioning. Similarly, localization process that utilizes the uplink signals is called the uplink positioning.

Pertaining positioning specific networks (systems), the signals used for wireless device localization are typically either downlink or uplink, for example GPS/GNSS, Terrestrial Beacon systems, etc.

As described in embodiments herein, the unified framework/platform:

1. Relieving wireless device and/or specific (dedicated) network elements of heavy computational burden.

2. Enabling LaaS for current and future network architectures/environments.

3. Enabling advances features that were not feasible before (using existing architectures), for example joint uplink/downlink or downlink/uplink positioning that improves the locate system reliability and position fix accuracy.

4. Providing scalable (practically unlimited) computational bandwidth and resources, supporting new advanced localization technologies.

5. Reducing logistical burden associated with multiple networks management and interfaces, new technologies upgrades and HW/SW legacy restrictions.

6. Enabling machine learning to improve the localization reliability and position fix accuracy.

7. Can run the wireless device positioning process continuously in the background.

8, Leveraging historical data and crowd sourcing.

Thus, enabling ubiquitous high-accuracy positioning that provide up-to-date location information with a low latency and without compromising the wireless device power consumption.

As described in embodiments, the LSU may include one or more of signal processors operating on snap-shots data from one or more wireless devices and/or one or more network's specific (dedicated) elements.

As described in embodiments, the LSU's one or more of signal processors operating on downlink and/or uplink snapshots data.

As described in embodiments, the LSU also includes navigation processor a.k.a. positioning engine—receiving outputs from one or more signal processors and performing position estimation and position tracking calculations by utilizing numerous localization (geolocation) methods/techniques/technologies, including combination of several methods, techniques and technologies, i.e. hybrid positioning.

As described in embodiments, the LSU signal processors and positioning engine also receiving auxiliary/assistance information.

As described in embodiments, the LSU's signal processors may be part of the positioning engine.

As described in embodiments, the LSU may include a communication processor that is configured for signaling and information exchange with wireless devices and/or one or more networks and network's specific (dedicated) elements within one or more network. For example, the signaling may be in line with the OMA SUPL protocol and/or 3GPP LPP/LPPa protocols, MTTQ, etc.

Additional features and advantages of the embodiments will be set forth in the description that follows, and in part will be apparent from the description, or may be learned by practice of the embodiments. The advantages of the embodiments will be realized and attained by the structure particularly pointed out in the written description and claims hereof as well as the appended drawings.

It is to be understood that both the foregoing general description and the following detailed description are exemplary and explanatory and are intended to provide further explanation of the embodiments as claimed.

BRIEF DESCRIPTION OF THE DRAWINGS

The accompanying drawings, which are included to provide a further understanding of the embodiments and are incorporated in and constitute a part of this specification, illustrate embodiments and together with the description serve to explain the principles of the embodiments. In the drawings:

FIG. 38 illustrates eNB and UE receive-transmit timing difference.

FIG. 39 illustrates architecture for UE positioning within E-UTRAN.

FIG. 40 illustrates an embodiment for a wireless network system architecture for UE positioning.

FIG. 41 illustrates optional embodiment for a wireless network system architecture for UE positioning.

FIG. 42 illustrates current multi-network/multiple types of access nodes environment.

FIG. 43A illustrates current LTE EPC architecture.

FIG. 43B illustrates the LSU embodiment's direct connections.

FIG. 43C illustrates the LSU embodiment's connections via the IP service network.

FIG. 43D illustrates E-SMLC with the Relay entity.

FIG. 44 illustrates an embodiment of the unified framework/platform.

DETAILED DESCRIPTION OF ILLUSTRATIVE EMBODIMENTS

Figure 1:
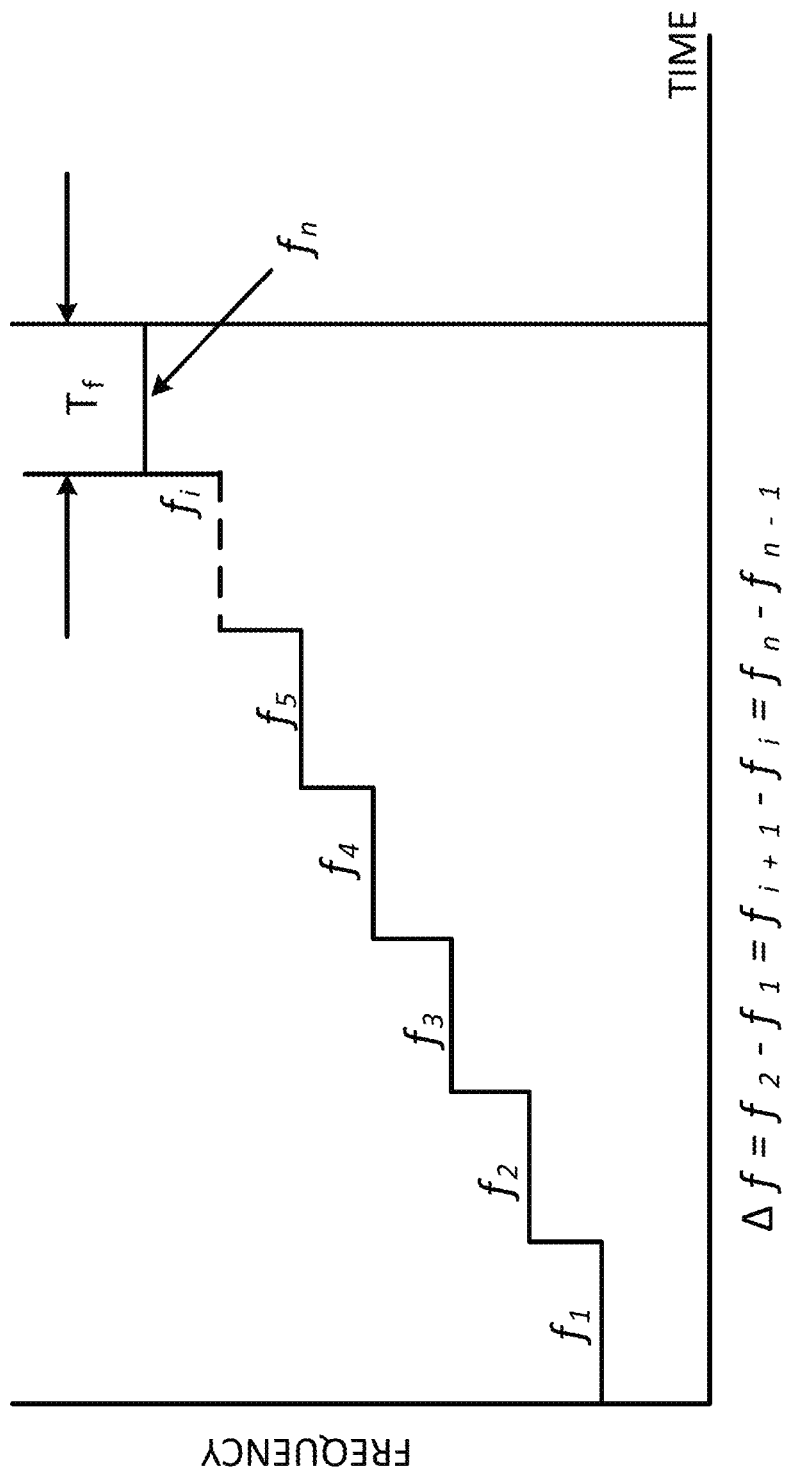
FIG. 1 and FIG. 1A illustrate narrow bandwidth ranging signal frequency components, in accordance with an embodiment.

Reference will now be made in detail to the embodiments of the present embodiments, examples of which are illustrated in the accompanying drawings.

The present embodiments relate to a method and system for RF-based identification, tracking and locating of objects, including RTLS. According to an embodiment, the method and system employs a narrow bandwidth ranging signal. The embodiment operates in VHF band, but can be also used in HF, LF and VLF bands as well as UHF band and higher frequencies. It employs multi-path mitigation processor. Employing multi-path mitigation processor increases the accuracy of tracking and locating implemented by a system.

The embodiment includes small, highly portable base units that allow users to track, locate and monitor multiple persons and objects. Each unit has its own ID. Each unit broadcasts an RF signal with its ID, and each unit is able to send back a return signal, which can include its ID as well as voice, data and additional information. Each unit processes the returned signals from the other units and, depending on the triangulation or trilateration and/or other methods used, continuously determines their relative and/or actual locations. The embodiments can also be easily integrated with products such as GPS devices, smart phones, two-way radios and PDAs. The resulting product will have all of the functions of the stand-alone devices while leveraging the existing display, sensors (such as altimeters, GPS, accelerometers and compasses) and processing capacity of its host. For example, a GPS device with the device technology describe herein will be able to provide the user's location on a map as well as to map the locations of the other members of the group.

The size of the embodiment based on an FPGA implementation is between approximately 2×4×1 inches and 2×2×0.5 inches, or smaller, as integrated circuit technology improves. Depending on the frequency used, the antenna will be either integrated into the device or protrude through the device enclosure. An ASIC (Application Specific Integrated Circuit) based version of the device will be able to incorporate the functions of the FPGA and most of the other electronic components in the unit or Tag. The ASIC-based stand-alone version of the product will result in the device size of 1×0.5×0.5 inches or smaller. The antenna size will be determined by the frequency used and part of the antenna can be integrated into the enclosure. The ASIC based embodiment is designed to be integrated into products can consist of nothing more than a chipset. There should not be any substantial physical size difference between the Master or Tag units.

The devices can use standard system components (off-the-shelf components) operating at multiple frequency ranges (bands) for processing of multi-path mitigation algorithms. The software for digital signal processing and software-defined radio can be used. The signal processing software combined with minimal hardware, allows assembling the radios that have transmitted and received waveforms defined by the software.

U.S. Pat. No. 7,561,048 discloses a narrow-bandwidth ranging signal system, whereby the narrow-bandwidth ranging signal is designed to fit into a low-bandwidth channel, for example using voice channels that are only several kilohertz wide (though some of low-bandwidth channels may extend into a few tens of kilohertz). This is in contrast to conventional location-finding systems that use channels from hundreds of kilohertz to tens of megahertz wide.

The advantage of this narrow-bandwidth ranging signal system is as follows: 1) at lower operating frequencies/bands, conventional location-finding systems ranging signal bandwidth exceeds the carrier (operating) frequency value. Thus, such systems cannot be deployed at LF/VLF and other lower frequencies bands, including HF. Unlike conventional location-finding systems, the narrow-bandwidth ranging signal system described in U.S. Pat. No. 7,561,048 can be successfully deployed on LF, VLF and other bands because its ranging signal bandwidth is far below the carrier frequency value; 2) at lower end of RF spectrum (some VLF, LF, HF and VHF bands), e.g., up to UHF band, conventional location-finding systems cannot be used because the FCC severely limits the allowable channel bandwidth (12-25 kHz), which makes it impossible to use conventional ranging signals. Unlike conventional location-finding systems, the narrow-bandwidth ranging signal system's ranging signal bandwidth is fully compliant with FCC regulations and other international spectrum regulatory bodies; and 3) it is well known (see MM: the basics, by Ray H. Hashemi, William G. Bradley . . . —2003) that independently of operating frequency/band, a narrow-bandwidth signal has inherently higher SNR (Signal-to-Noise-Ratio) as compared to a wide-bandwidth signal. This increases the operating range of the narrow-bandwidth ranging signal location-finding system independently of the frequency/band it operates, including UHF band.

Thus, unlike conventional location-finding systems, the narrow-bandwidth ranging signal location-finding system can be deployed on lower end of the RF spectrum for example VHF and lower frequencies bands, down to LF/VLF bands, where the multipath phenomena is less pronounced. At the same time, the narrow-bandwidth ranging location-finding system can be also deployed on UHF band and beyond, improving the ranging signal SNR and, as a result, increasing the location-finding system operating range.

To minimize multipath, e.g., RF energy reflections, it is desirable to operate on VLF/LF bands. However, at these frequencies the efficiency of a portable/mobile antenna is very small (about 0.1% or less because of small antenna length (size) relative to the RF wave length). In addition, at these low frequencies the noise level from natural and manmade sources is much higher than on higher frequencies/bands, for example VHF. Together, these two phenomena may limit the applicability of location-finding system, e.g. its operating range and/or mobility/portability. Therefore, for certain applications where operating range and/or mobility/portability are very important a higher RF frequencies/bands may be used, for example HF, VHF, UHF and UWB.

At VHF and UHF bands, the noise level from natural and manmade sources is significantly lower compared to VLF, LF and HF bands; and at VHF and HF frequencies the multi-path phenomena (e.g., RF energy reflections) is less severe than at UHF and higher frequencies. Also, at VHF, the antenna efficiency is significantly better, than on HF and lower frequencies, and at VHF the RF penetration capabilities are much better than at UHF. Thus, the VHF band provides a good compromise for mobile/portable applications. On the other hand in some special cases, for example GPS where VHF frequencies (or lower frequencies) cannot penetrate the ionosphere (or get deflected/refracted), the UHF can be a good choice. However, in any case (and all cases/applications) the narrow-bandwidth ranging signal system will have advantages over the conventional wide-bandwidth ranging signal location-finding systems.

The actual application(s) will determine the exact technical specifications (such as power, emissions, bandwidth and operating frequencies/band). Narrow bandwidth ranging allows the user to either receive licenses or receive exemption from licenses, or use unlicensed bands as set forth in the FCC because narrow band ranging allows for operation on many different bandwidths/frequencies, including the most stringent narrow bandwidths: 6.25 kHz, 11.25 kHz, 12.5 kHz, 25 kHz and 50 kHz set forth in the FCC and comply with the corresponding technical requirements for the appropriate sections. As a result, multiple FCC sections and exemptions within such sections will be applicable. The primary FCC Regulations that are applicable are: 47 CFR Part 90—Private Land Mobile Radio Services, 47 CFR Part 94 personal Radio Services, 47 CFR Part 15—Radio Frequency Devices. (By comparison, a wideband signal in this context is from several hundred KHz up to 10-20 MHz.)

Typically, for Part 90 and Part 94, VHF implementations allow the user to operate the device up to 100 mW under certain exemptions (Low Power Radio Service being an example). For certain applications the allowable transmitted power at VHF band is between 2 and 5 Watts. For 900 MHz (UHF band) it is 1 W. On 160 kHz-190 kHz frequencies (LF band) the allowable transmitted power is 1 Watt.

Narrow band ranging can comply with many if not all of the different spectrum allowances and allows for accurate ranging while still complying with the most stringent regulatory requirements. This holds true not just for the FCC, but for other international organizations that regulate the use of spectrum throughout the world, including Europe, Japan and Korea.

The following is a list of the common frequencies used, with typical power usage and the distance the tag can communicate with another reader in a real world environment (see Indoor Propagation and Wavelength Dan Dobkin, WJ Communications, V 1.4 7/10/02):

| 915 MHz | 100 mW | 150 feet |
| 2.4 GHz | 100 mW | 100 feet |
| 5.6 Ghz | 100 mW | 75 feet |

The proposed system works at VHF frequencies and employs a proprietary method for sending and processing the RF signals. More specifically, it uses DSP techniques and software-defined radio (SDR) to overcome the limitations of the narrow bandwidth requirements at VHF frequencies.

Operating at lower (VHF) frequencies reduces scatter and provides much better wall penetration. The net result is a roughly ten-fold increase in range over commonly used frequencies. Compare, for example, the measured range of a prototype to that of the RFID technologies listed above:

| 216 MHz | 100 mw | 700 feet |

Utilizing narrow band ranging techniques, the range of commonly used frequencies, with typical power usage and the distance the tag communication range will be able to communicate with another reader in a real world environment would increase significantly:

|  | From: | To: |
|---|---|---|
| 915 MHz  100 mW | 150 feet | 500 feet |
| 2.4 GHz  100 mW | 100 feet | 450 feet |
| 5.6 Ghz  100 mW | 75 feet | 400 feet |

Battery consumption is a function of design, transmitted power and the duty cycle of the device, e.g., the time interval between two consecutive distance (location) measurements. In many applications the duty cycle is large, 10× to 1000×. In applications with large duty cycle, for example 100×, an FPGA version that transmits 100 mW of power will have an up time of approximately three weeks. An ASIC based version is expected to increase the up time by 10×. Also, ASICs have inherently lower noise level. Thus, the ASIC-based version may also increase the operating range by about 40%.

Those skilled in the art will appreciate that the embodiment does not compromise the system long operating range while significantly increases the location-finding accuracy in RF challenging environments (such as, for example, buildings, urban corridors, etc.)

Typically, tracking and location systems employ Track-Locate-Navigate methods. These methods include Time-Of-Arrival (TOA), Differential-Time-Of-Arrival (DTOA) and combination of TOA and DTOA. Time-Of-Arrival (TOA) as the distance measurement technique is generally described in U.S. Pat. No. 5,525,967. A TOA/DTOA-based system measures the RF ranging signal Direct-Line-Of-Site (DLOS) time-of-flight, e.g., time-delay, which is then converted to a distance range.

In case of RF reflections (e.g., multi-path), multiple copies of the RF ranging signal with various delay times are superimposed onto the DLOS RF ranging signal. A track-locate system that uses a narrow bandwidth ranging signal cannot differentiate between the DLOS signal and reflected signals without multi-path mitigation. As a result, these reflected signals induce an error in the estimated ranging signal DLOS time-of-flight, which, in turn, impacts the range estimating accuracy.

The embodiment advantageously uses the multi-path mitigation processor to separate the DLOS signal and reflected signals. Thus, the embodiment significantly lowers the error in the estimated ranging signal DLOS time-of-flight. The proposed multi-path mitigation method can be used on all RF bands. It can also be used with wide bandwidth ranging signal location-finding systems. And it can support various modulation/demodulation techniques, including Spread Spectrum techniques, such as DSS (Direct Spread Spectrum) and FH (Frequency Hopping).

Additionally, noise reduction methods can be applied in order to further improve the method's accuracy. These noise reduction methods can include, but are not limited to, coherent summing, non-coherent summing, Matched filtering, temporal diversity techniques, etc. The remnants of the multi-path interference error can be further reduced by applying the post-processing techniques, such as, maximum likelihood estimation (like e.g., Viterbi Algorithm), minimal variance estimation (Kalman Filter), etc.

The embodiment can be used in systems with simplex, half-duplex and full duplex modes of operation. Full-duplex operation is very demanding in terms of complexity, cost and logistics on the RF transceiver, which limits the system operating range in portable/mobile device implementations. In half-duplex mode of operation the reader (often referred to as the "master") and the tags (sometimes also referred to as "slaves" or "targets") are controlled by a protocol that only allows the master or the slave to transmit at any given time.

The alternation of sending and receiving allows a single frequency to be used in distance measurement. Such an arrangement reduces the costs and complexity of the system in comparison with full duplex systems. The simplex mode of operation is conceptually simpler, but requires a more rigorous synchronization of events between master and target unit(s), including the start of the ranging signal sequence.

In present embodiments the narrow bandwidth ranging signal multi-path mitigation processor does not increase the ranging signal bandwidth. It uses different frequency components, advantageously, to allow propagation of a narrow bandwidth ranging signal. Further ranging signal processing can be carried out in the frequency domain by way of employing super resolution spectrum estimation algorithms (MUSIC, rootMUSIC, ESPRIT) and/or statistical algorithms like RELAX, or in time-domain by assembling a synthetic ranging signal with a relatively large bandwidth and applying a further processing to this signal. The different frequency component of narrow bandwidth ranging signal can be pseudo randomly selected, it can also be contiguous or spaced apart in frequency, and it can have uniform and/or non-uniform spacing in frequency.

The embodiment expands multipath mitigation technology. The signal model for the narrowband ranging is a complex exponential (as introduced elsewhere in this document) whose frequency is directly proportional to the delay defined by the range plus similar terms whose delay is defined by the time delay related to the multipath. The model is independent of the actual implementation of the signal structure, e.g., stepped frequency, Linear Frequency Modulation, etc.

The frequency separation between the direct path and multipath is nominally extremely small and normal frequency domain processing is not sufficient to estimate the direct path range. For example a stepped frequency ranging signal at a 100 KHz stepping rate over 5 MHz at a range of 30 meters (100.07 nanoseconds delay) results in a frequency of 0.062875 radians/sec. A multipath reflection with a path length of 35 meters would result in a frequency of 0.073355. The separation is 0.0104792. Frequency resolution of the 50 sample observable has a native frequency resolution of 0.12566 Hz. Consequently, it is not possible to use conventional frequency estimation techniques for the separation of the direct path from the reflected path and accurately estimate the direct path range.

To overcome this limitation the embodiments use a unique combination of implementations of subspace decomposition high resolution spectral estimation methodologies and multimodal cluster analysis. The subspace decomposition technology relies on breaking the estimated covariance matrix of the observed data into two orthogonal subspaces, the noise subspace and the signal subspace. The theory behind the subspace decomposition methodology is that the projection of the observable onto the noise subspace consists of only the noise and the projection of the observable onto the signal subspace consists of only the signal.

The super resolution spectrum estimation algorithms and RELAX algorithm are capable of distinguishing closely placed frequencies (sinusoids) in spectrum in presence of noise. The frequencies do not have to be harmonically related and, unlike the Digital Fourier Transform (DFT), the signal model does not introduce any artificial periodicity. For a given bandwidth, these algorithms provide significantly higher resolution than Fourier Transform. Thus, the Direct Line Of Sight (DLOS) can be reliably distinguished from other multi-paths (MP) with high accuracy. Similarly, applying the thresholded method, which will be explained later, to the artificially produced synthetic wider bandwidth ranging signal makes it possible to reliably distinguish DLOS from other paths with high accuracy.

In accordance with the embodiment, the Digital signal processing (DSP), can be employed by the multi-path mitigation processor to reliably distinguish the DLOS from other MP paths. A variety of super-resolution algorithms/techniques exist in the spectral analysis (spectrum estimation) technology. Examples include subspace based methods: MUltiple SIgnal Characterization (MUSIC) algorithm or root-MUSIC algorithm, Estimation of Signal Parameters via Rotational Invariance Techniques (ESPRIT) algorithm, Pisarenko Harmonic Decomposition (PHD) algorithm, RELAX algorithm, etc.

The noted super-resolution algorithms work on the premise that the signals impinging on the antennas are not fully correlated. Thus, the performance degrades severely in a highly correlated signal environment as may be encountered in multipath propagation. Multipath mitigation techniques may involve a preprocessing scheme called spatial smoothing. As a result, the multipath mitigation process may become computationally intensive, complicated, i.e., increases the complexity of the system implementation. Multipath mitigation with lower system computational costs and implementation complexity may be achieved by using the super-resolution Matrix Pencil (MP) algorithm. The MP algorithm is classified as a non-search procedure. Therefore, it is computationally less complicated and eliminates problems encountered in search procedures used in other super-resolution algorithms. Moreover, the MP algorithm is not sensitive to correlated signals and only requires a single channel estimate and can also estimate the delays associated with coherent multipath components.

In all of the abovementioned super-resolution algorithms the incoming (i.e., received) signal is modeled as a linear combination of complex exponentials and their complex amplitudes of frequencies. In case of a multi-path, the received signal will be as follows:

$$r(t) = \beta \times e^{i 2\pi f \times t} \sum_{k=0}^{k=L-1} \alpha_k \times e^{-i 2\pi f \times \tau_K}, \quad (1)$$

where $\beta \times e^{i 2\pi f \times t}$ is the transmitted signal, f is the operating frequency, L is the number of multi-path components, and $\alpha_K = |\alpha_K| \times e^{j\theta_K}$ and $\tau_K$ are the complex attenuation and propagation delay of the K-th path, respectively. The multi-path components are indexed so that the propagation delays are considered in ascending order. As a result, in this model $\tau_0$ denotes the propagation delay of the DLOS path. Obviously, the $\tau_0$ value is of the most interest, as it is the smallest value of all $\tau_K$. The phase $\theta_K$ is normally assumed random from one measurement cycle to another with a uniform probability density function U (0,2π). Thus, we assume that $\alpha_K$=const (i.e., constant value)

Parameters $\alpha_K$ and $\tau_K$ are random time-variant functions reflecting motions of people and equipment in and around buildings. However, since the rate of their variations is very slow as compared to the measurement time interval, these parameters can be treated as time-invariant random variables within a given measurement cycle.

All these parameters are frequency-dependent since they are related to radio signal characteristics, such as, transmission and reflection coefficients. However, in the embodiment, the operating frequency changes very little. Thus, the abovementioned parameters can be assumed frequency-independent.

Equation (1) can be presented in frequency domain as:

$$A(f) = \sum_{k=0}^{k=L-1} \alpha_k \times e^{-i(2\pi \times \tau_K)f}, \quad (2)$$

where: A(f) is complex amplitude of the received signal, $(2\pi \times \tau_K)$ are the artificial "frequencies" to be estimated by a super-resolution algorithm and the operating frequency f is the independent variable; $\alpha_K$ is the K-th path amplitude.

In the equation (2) the super-resolution estimation of $(2\pi \times \tau_K)$ and subsequently $\tau_K$ values are based on continuous frequency. In practice, there is a finite number of measurements. Thus, the variable f will not be a continuous variable, but rather a discrete one. Accordingly, the complex amplitude A(f) can be calculated as follows:

$$\hat{A}(f_n) = \sum_{k=0}^{k=L-1} \alpha_k \times e^{-i(2\pi \times \tau_k) \times f_n}, \quad (3)$$

where $\hat{A}(f_n)$ are discrete complex amplitude estimates (i.e., measurements) at discrete frequencies $f_n$.

In equation (3) $\hat{A}(f_n)$ can be interpreted as an amplitude and a phase of a sinusoidal signal of frequency $f_n$ after it propagates through the multi-path channel. Note that all spectrum estimation based super-resolution algorithms require complex input data (i.e. complex amplitude).

In some cases, it is possible to convert real signal data, e.g. Re $(\hat{A}(f_n))$, into a complex signal (e.g., analytical signal). For example, such a conversion can be accomplished by using Hilbert transformation or other methods. However, in case of short distances the value $\tau_0$ is very small, which results in very low $(2\pi \times \tau_K)$ "frequencies".

These low "frequencies" create problems with Hilbert transform (or other methods) implementations. In addition, if only amplitude values (e.g., Re($\hat{A}(f_n)$)) are to be used, then the number of frequencies to be estimated will include not only the $(2\pi \times \tau_K)$ "frequencies", but also theirs combinations. As a rule, increasing the number of unknown frequencies impacts the accuracy of the super-resolution algorithms. Thus, reliable and accurate separation of DLOS path from other multi-path (MP) paths requires complex amplitude estimation.

The following is a description of a method and the multi-path mitigation processor operation during the task of obtaining complex amplitude $\hat{A}(f_n)$ in presence of multi-path. Note that, while the description is focused on the half-duplex mode of operation, it can be easily extended for the full-duplex mode. The simplex mode of operation is a subset of the half-duplex mode, but would require additional events synchronization.

In half-duplex mode of operation the reader (often referred to as the "master") and the tags (also referred to as "slaves" or "targets") are controlled by a protocol that only allows the master or the slave to transmit at any given time. In this mode of operation the tags (target devices) serve as Transponders. The tags receive the ranging signal from a reader (master device), store it in the memory and then, after certain time (delay), re-transmit the signal back to the master.

Figure 1A:
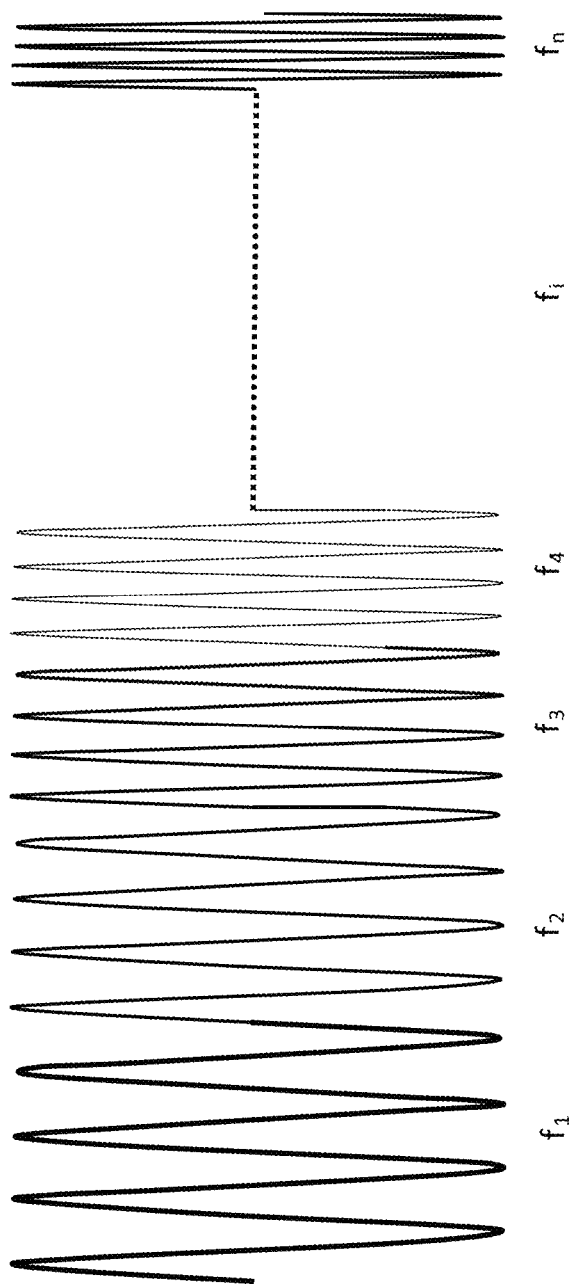

An example of ranging signal is shown in FIG. 1 and FIG. 1A. The exemplary ranging signal employs different frequency components that are contiguous. Other waveforms, including pseudo random, spaced in frequency and/or time or orthogonal, etc. can be also used for as long as the ranging signal bandwidth remains narrow. In FIG. 1 the time duration $T_f$ for every frequency component is long enough to obtain the ranging signal narrow-bandwidth property.

Figure 2:
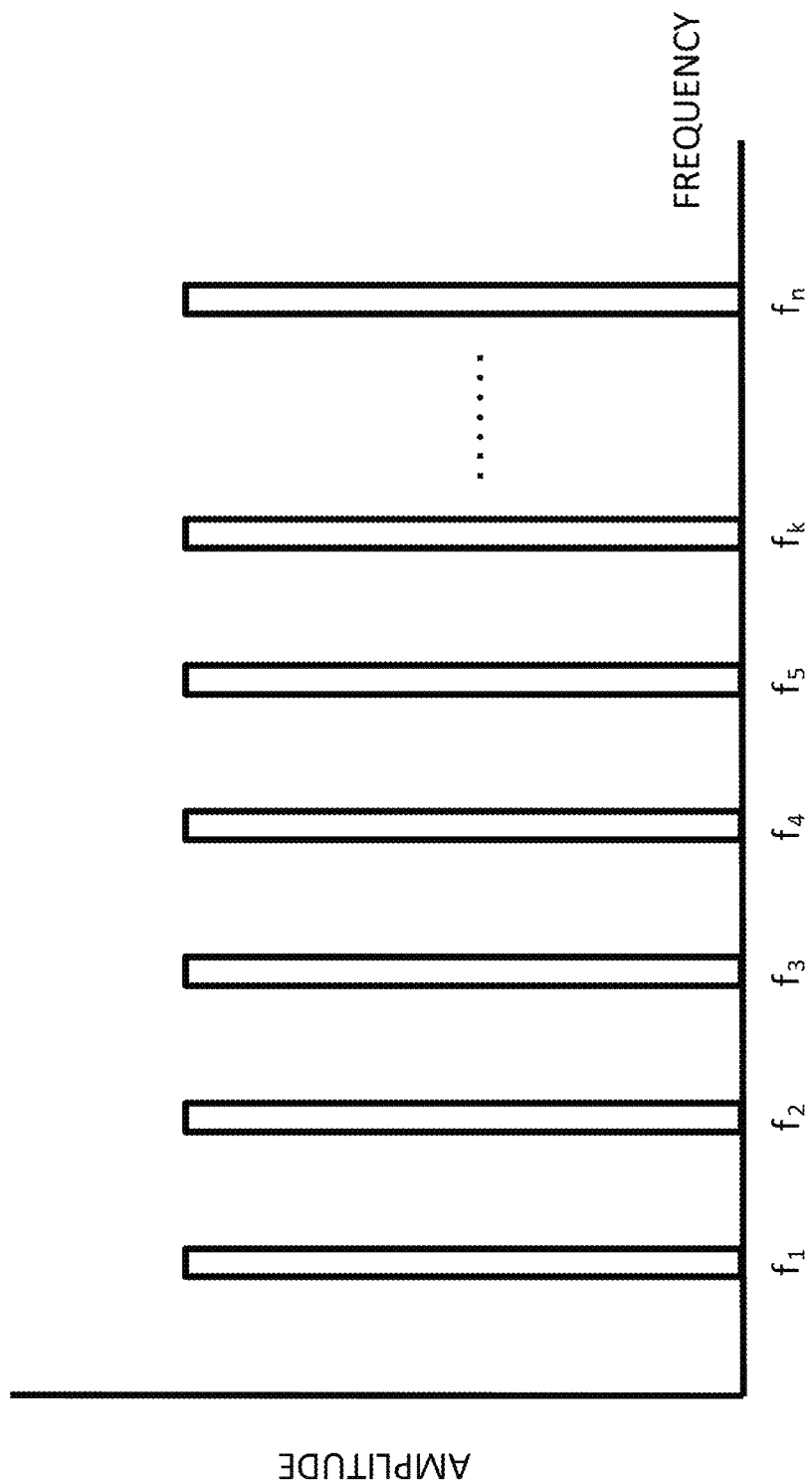
FIG. 2 illustrates exemplary wide bandwidth ranging signal frequency components.

Another variation of a ranging signal with different frequency components is shown on FIG. 2. It includes multiple frequencies ($f_1$, $f_2$, $f_3$, $f_4$, $f_n$) transmitted over long period of time to make individual frequencies narrow-band. Such signal is more efficient, but it occupies in a wide bandwidth and a wide bandwidth ranging signal impacts the SNR, which, in turn, reduces the operating range. Also, such wide bandwidth ranging signal will violate FCC requirements on the VHF band or lower frequencies bands. However, in certain applications this wide-bandwidth ranging signal allows an easier integration into existing signal and transmission protocols. Also, such a signal decreases the track-locate time.

These multiple-frequency ($f_1$, $f_2$, $f_3$, $f_4$, $f_n$) bursts may be also contiguous and/or pseudo random, spaced in frequency and/or time or orthogonal, etc.

The narrowband ranging mode will produce the accuracy in the form of instantaneous wide band ranging while increasing the range at which this accuracy can be realized, compared to wide band ranging. This performance is achieved because at a fixed transmit power, the SNR (in the appropriate signal bandwidths) at the receiver of the narrow band ranging signal is greater than the SNR at the receiver of a wideband ranging signal. The SNR gain is on the order of the ratio of the total bandwidth of the wideband ranging signal and the bandwidth of each channel of the narrow band ranging signal. This provides a good trade-off when very rapid ranging is not required, e.g., for stationary and slow-moving targets, such as a person walking or running.

Master devices and Tag devices are identical and can operate either in Master or Transponder mode. All devices include data/remote control communication channels. The devices can exchange the information and master device(s) can remotely control tag devices. In this example depicted in FIG. 1 during an operation of a master (i.e., reader) multi-path mitigation processor originates the ranging signal to tag(s) and, after a certain delay, the master/reader receives the repeated ranging signal from the tag(s).

Thereafter, master's multi-path mitigation processor compares the received ranging signal with the one that was originally sent from the master and determines the $\hat{A}(f_n)$ estimates in form of an amplitude and a phase for every frequency component $f_n$. Note that in the equation (3) $\hat{A}(f_n)$ is defined for one-way ranging signal trip. In the embodiment the ranging signal makes a round-trip. In other words, it travels both ways: from a master/reader to a target/slave and from the target/slave back to the master/reader. Thus, this round-trip signal complex amplitude, which is received back by the master, can be calculated as follows:

$$|\hat{A}_{RT}(f_n)| = |\hat{A}(f_n)|^2 \text{ and } \angle \hat{A}_{RT}(f_n) = 2 \times (\angle \hat{A}(f_n)) \tag{4}$$

There are many techniques available for estimating the complex amplitude and phase values, including, for example, matching filtering $|\hat{A}(f_n)|$ and $\angle \hat{A}(f_n)$. According to the embodiment, a complex amplitude determination is based on $|\hat{A}(f_n)|$ values derived from the master and/or tag receiver RSSI (Received Signal Strength Indicator) values. The phase values $\angle \hat{A}_{RT}(f_n)$ are obtained by comparing the received by a reader/master returned base-band ranging signal phase and the original (i.e., sent by reader/master) base band ranging signal phase. In addition, because master and tag devices have independent clock systems a detailed explanation of devices operation is augmented by analysis of the clock accuracy impact on the phase estimation error. As the above description shows, the one-way amplitude $|\hat{A}(f_n)|$ values are directly obtainable from target/slave device. However, the one-way phase $\angle |\hat{A}(f_n)|$ values cannot be measured directly.

In the embodiment, the ranging base band signal is the same as the one depicted in FIG. 1. However, for the sake of simplicity, it is assumed herein that the ranging base band signal consists of only two frequency components each containing multiple periods of cosine or sine waves of different frequency: $F_1$ and $F_2$. Note that $F_1=f_1$ and $F_2=f_2$. The number of periods in a first frequency component is L and the number of periods in a second frequency component is P. Note that L may or may not be equal to P, because for $T_f$=constant each frequency component can have different number of periods. Also, there is no time gap between each frequency component, and both $F_1$ and $F_2$ start from the initial phase equal to zero.

Figure 3A:
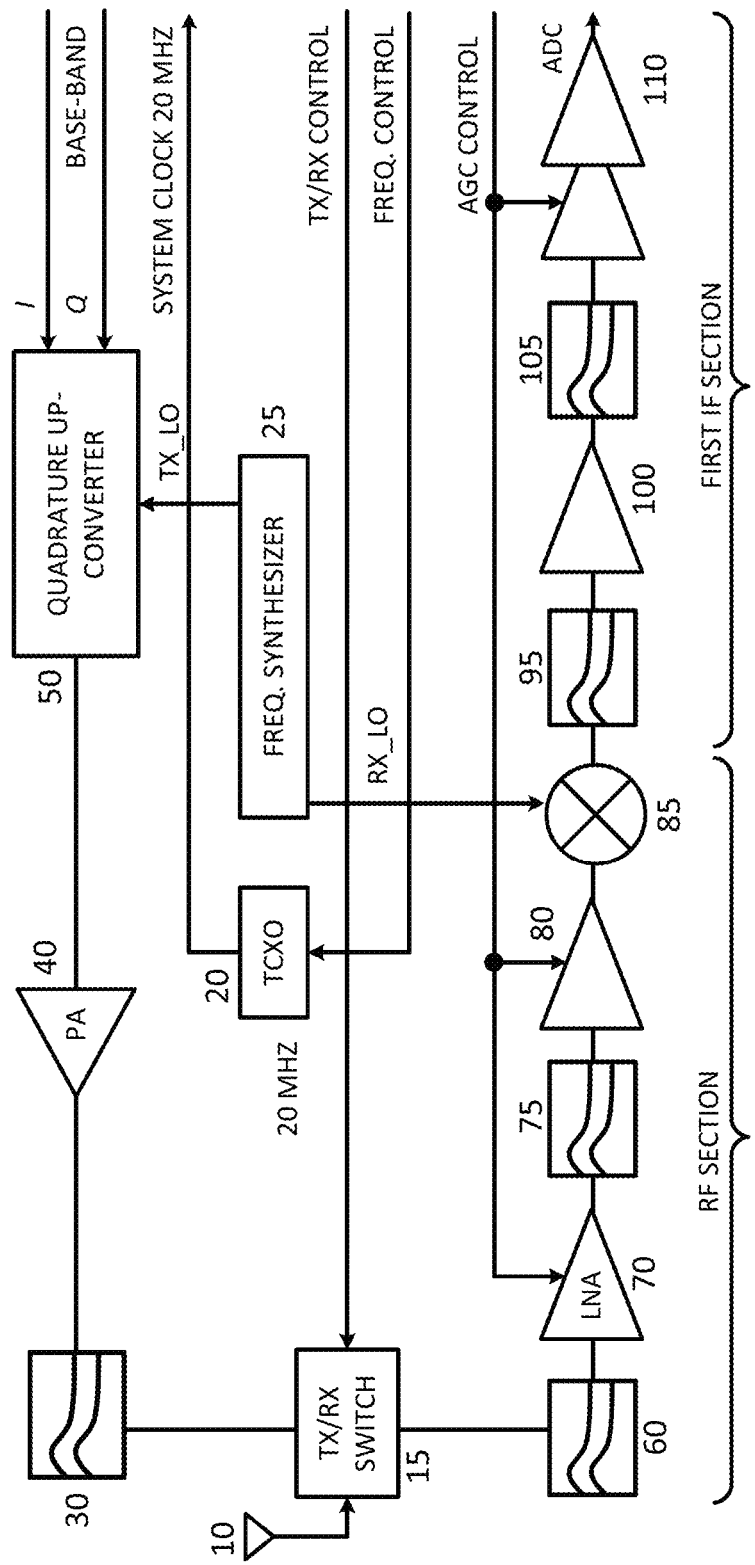
FIG. 3A, FIG. 3B and FIG. 3C illustrate block diagrams of master and slave units of an RF mobile tracking and locating system, in accordance with an embodiment.
Figure 3B:
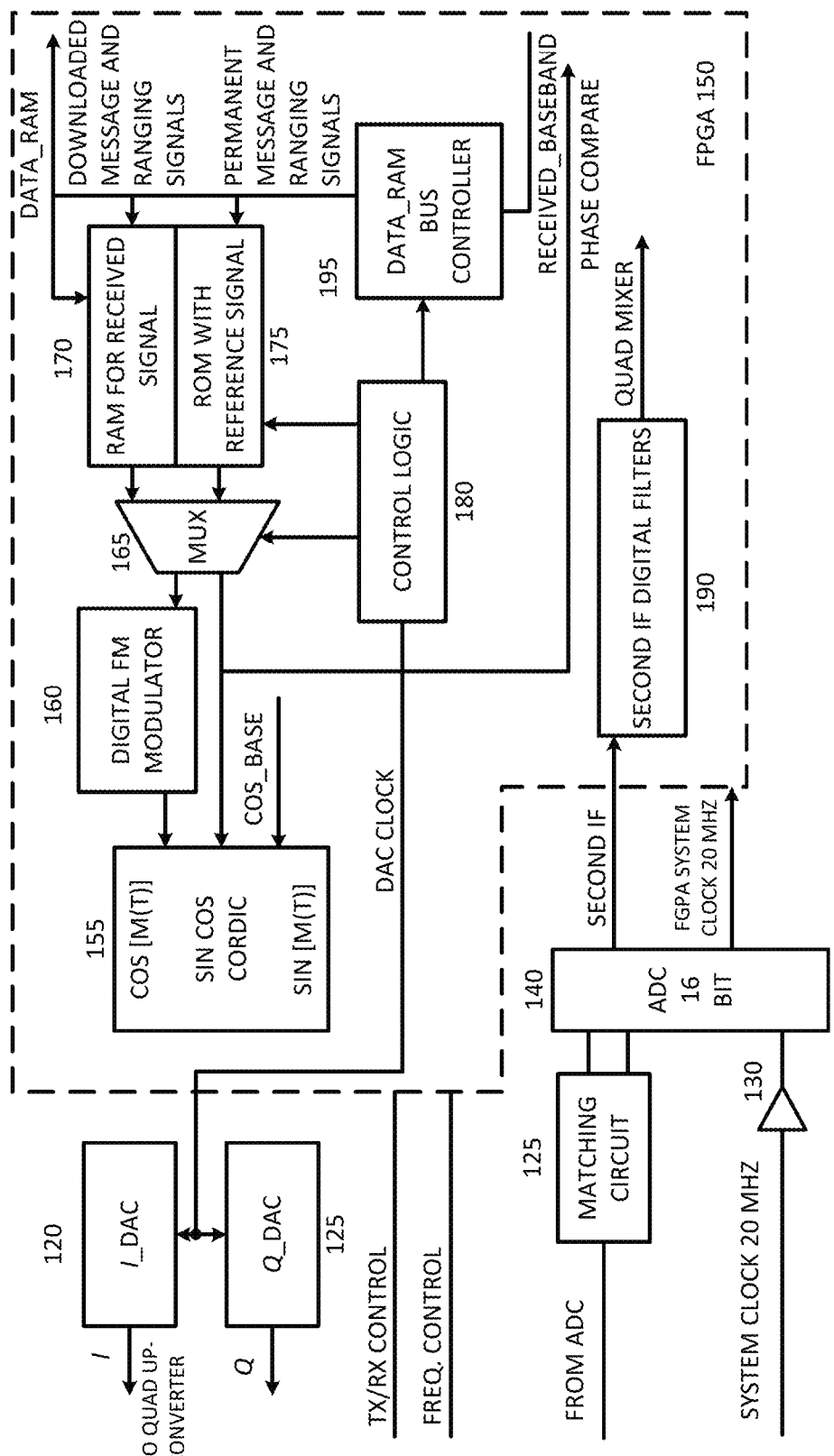
Figure 3C:
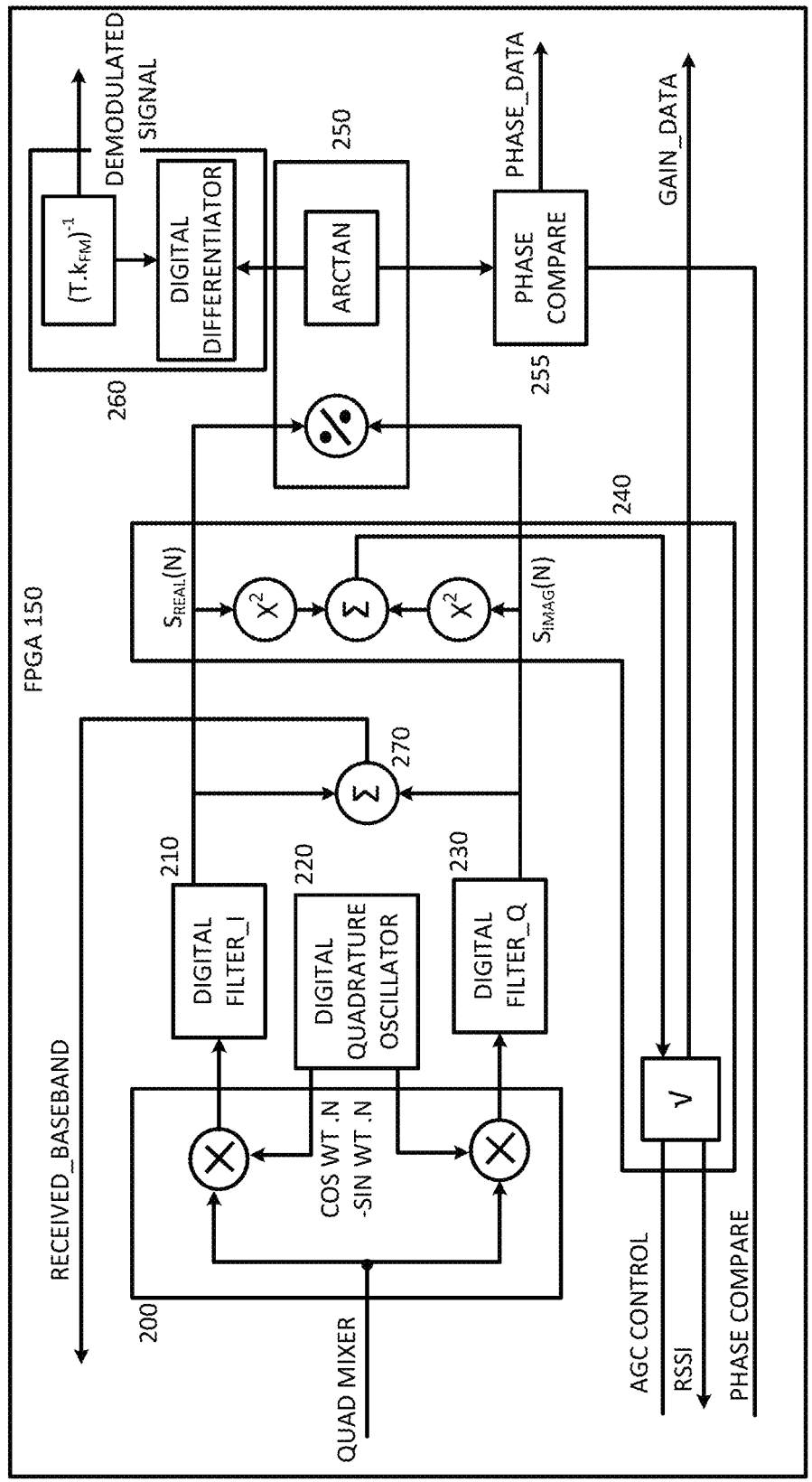

FIGS. 3A, 3B and 3C depict block diagrams of a master or a slave unit (tag) of an RF mobile tracking and locating system. $F_{OSC}$ refers to the frequency of the device system clock (crystal oscillator 20 in FIG. 3A). All frequencies generated within the device are generated from this system clock crystal oscillator. The following definitions are used: M is a master device (unit); AM is a tag (target) device (unit). The tag device is operating in the transponder mode and is referred to as transponder (AM) unit.

In an embodiment, the device consists of the RF front-end and the RF back-end, base-band and the multi-path mitigation processor. The RF back-end, base-band and the multi-path mitigation processor are implemented in the FPGA 150 (see FIGS. 3B and 3C). The system clock generator 20 (see FIG. 3A) oscillates at: $F_{OSC}$=20 MHz; or $\omega_{OSC}$=2π20×10⁶. This is an ideal frequency because in actual devices the system clocks frequencies are not always equal to 20 MHz: $F_{OSC}^M = F_{OSC} \gamma^M$; $F_{OSC}^{AM} = F_{OSC} \gamma^{AM}$.

Note that $$\gamma^M = \frac{F_{OSC}^M}{F_{OSC}}, \gamma^{AM} = \frac{F_{OSC}^{AM}}{F_{OSC}}; \text{ and } \beta^M = \frac{1}{\gamma^M}, \beta^{AM} = \frac{1}{\gamma^{AM}}$$

It should be noted that other than 20 MHz $F_{OSC}$ frequencies can be used without any impact on system performance.

Both units' (master and tag) electronic makeup is identical and the different modes of operations are software programmable. The base band ranging signal is generated in digital format by the master' FPGA 150, blocks 155-180 (see FIG. 2B). It consists of two frequency components each containing multiple periods of cosine or sine waves of different frequency. At the beginning, t=0, the FPGA 150 in a master device (FIG. 3B) outputs the digital base-band ranging signal to its up-converter 50 via I/Q DACs 120 and 125. The FPGA 150 starts with $F_1$ frequency and after time $T_1$ start generating $F_2$ frequency for time duration of $T_2$.

Since crystal oscillator's frequency might differ from 20 MHz the actual frequencies generated by the FPGA will be $F_1 \gamma^M$ and $F_2 \gamma^M$. Also, time $T_1$ will be $T_1 \beta^M$ and $T_2$ will be $T_2 \beta^M$. IT is also assumed that $T_1$, $T_2$, $F_1$, $F_2$ are such that $F_1 \gamma^{M} * T_1 \beta^M = F_1 T_1$ and $F_2 \gamma^{M} * T_2 \beta^M = F_2 T_2$, where both $F_1 T_1$ & $F_2 T_2$ are integer numbers. That means that the initial phases of $F_1$ and $F_2$ are equal to zero.

Since all frequencies are generated from the system crystal oscillator 20 clocks, the master' base-band I/Q DAC(s) 120 and 125 outputs are as follows: $F_1 = \gamma^M 20 \times 10^6 \times K_{F_1}$ and $F_2 = \gamma^M 20 \times 10^6 \times K_{F_2}$, where $K_{F_1}$ and $K_{F_2}$ are constant coefficients. Similarly, the output frequencies TX_LO and RX_LO from frequency synthesizer 25 (LO signals for mixers 50 and 85) can be expressed through constant coefficients. These constant coefficients are the same for the master (M) and the transponder (AM)—the difference is in the system crystal oscillator 20 clock frequency of each device.

The master (M) and the transponder (AM) work in a half-duplex mode. Master's RF front-end up-converts the base-band ranging signal, generated by the multi-path mitigation processor, using quadrature up-converter (i.e., mixer) 50 and transmits this up-converted signal. After the base-band signal is transmitted the master switches from TX to RX mode using RF Front-end TX/RX Switch 15. The transponder receives and down-converts the received signal back using its RF Front-end mixer 85 (producing First IF) and ADC 140 (producing Second IF).

Thereafter, this second IF signal is digitally filtered in the Transponder RF back-end processor using digital filters 190 and further down-converted to the base-band ranging signal using the RF back-end quadrature mixer 200, digital I/Q filters 210 and 230, a digital quadrature oscillator 220 and a summer 270. This base-band ranging signal is stored in the transponder's memory 170 using Ram Data Bus Controller 195 and control logic 180.

Subsequently, the transponder switches from RX to TX mode using RF front-end switch 15 and after certain delay $t_{RTX}$ begins re-transmitting the stored base-band signal. Note that the delay is measured in the AM (transponder) system clock. Thus, $t_{RTX}^{AM} = t_{RTX} \beta^{AM}$. The master receives the transponder transmission and down-converts the received signal back to the base-band signal using its RF back-end quadrature mixer 200, the digital I and Q filters 210 and 230, the digital quadrature oscillator 220 (see FIG. 3C).

Thereafter, the master calculates the phase difference between $F_1$ and $F_2$ in the received (i.e., recovered) base-band signal using multi-path mitigation processor arctan block 250 and phase compare block 255. The amplitude values are derived from the RF back-end RS SI block 240.

For improving the estimation accuracy it is always desirable to improve the SNR of the amplitude estimates from block 240 and phase difference estimates from block 255. In an embodiment, the multi-path mitigation processor calculates amplitude and phase difference estimates for many time instances over the ranging signal frequency component duration ($T_f$). These values, when averaged, improve SNR. The SNR improvement can be in an order that is proportional to $\sqrt{N}$, where N is a number of instances when amplitude and phase difference values were taken (i.e., determined).

Another approach to the SNR improvement is to determine amplitude and phase difference values by applying matching filter techniques over a period of time. Yet, another approach would be to estimate the phase and the amplitude of the received (i.e., repeated) base band ranging signal frequency components by sampling them and integrating over period $T \leq T_f$ against the original (i.e., sent by the master/reader) base-band ranging signal frequency components in the I/Q form. The integration has the effect of averaging of multiple instances of the amplitude and the phase in the I/Q format. Thereafter, the phase and the amplitude values can be translated from the I/Q format to the $|\hat{A}(f_n)|$ and $\angle \hat{A}(f_n)$ format.

Let's assume that at t=0 under master' multi-path processor control the master base-band processor (both in FPGA 150) start the base-band ranging sequence.

$$\varphi_{FPGA}^M(t) = \gamma^M \times \omega_{OSC} \times (K_{F_1}(t)), t < T_1 \beta^M, t < T_1 \beta^M;$$

$$\varphi_{FPGA}^M(t) = \gamma^M \times \omega_{OSC} \times (K_{F_1}(T_1 \beta^M) + K_{F_2}(t - T_1 \beta^M)), t > T_1 \beta^M,$$

where $T_f \geq T_1 \beta^M$.

The phase at master's DAC(s) 120 and 125 outputs are as follows:

$$\varphi_{DAC}^M(t) = \gamma^M \times \omega_{OSC} \times (K_{F_1}(t - t_{DAC}^M)) \pm \varphi_{DAC}^M(0), t < T_1 \beta^M + t_{DAC}^M;$$

$$\varphi_{DAC}^M(t) = \gamma^M \times \omega_{OSC} \times (K_{F_1}(T_1 \beta^M) + K_{F_2}(t - T_1 \beta^M - t_{DAC}^M)) + \varphi_{DAC}^M(0), t > T_1 \beta^M + t_{DAC}^M$$

Note that DACs 120 and 125 have internal propagation delay, $t_{DAC}^M$, that does not depend upon the system clock.

Similarly, the transmitter circuitry components 15, 30, 40 and 50 will introduce additional delay, $t_{TX}^M$, that does not depend upon the system clock.

As a result, the phase of the transmitted RF signal by the master can be calculated as follows:

$$\varphi_{RF}^M(t) = \gamma^M \times \omega_{OSC} \times (K_{F_1}(t - t_{DAC}^M - t_{TX}^M) + K_{SYN\_TX}(t - t_{TX}^M)) + \varphi_{DAC}^M(0) + \varphi_{SYN\_TX}^M(0), t < T_1 \beta^M + t_{DAC}^M + t_{TX}^M;$$

$$\varphi_{RF}^M(t) = \gamma^M \times \omega_{OSC} \times (K_{F_1}(T_1 \beta^M) + K_{F_2}(t - T_1 \beta^M - t_{DAC}^M - t_{TX}^M) + K_{SYN\_TX}(t - t_{TX}^M)) + \varphi_{DAC}^M(0) + \varphi_{SYN\_TX}^M(0), t > T_1 \beta^M + t_{DAC}^M + t_{TX}^M$$

The RF signal from the master (M) experiences a phase shift $\varphi^{MULT}$ that is a function of the multi-path phenomena between the master and tag.

The $\varphi^{MULT}$ values depend upon the transmitted frequencies, e.g. $F_1$ and $F_2$. The transponder (AM) receiver' is not able to resolve each path because of limited (i.e., narrow) bandwidth of the RF portion of the receiver. Thus, after a certain time, for example, 1 microsecond (equivalent to ~300 meters of flight), when all reflected signals have arrived at the receiver antenna, the following formulas apply:

$$\varphi_{ANT}^{AM}(t) = \gamma^M \times \omega_{OSC} \times K_{F_1}(t - t_{DAC}^M - t_{TX}^M) + K_{SYN\_TX}(t - T_{TX}^M) + \varphi_{F_1}^{MULT} + \varphi_{DAC}^M(0) + \varphi_{SYN\_TX}^M(0), 10^{-6} < t < T_1 \beta^M + t_{DAC}^M + t_{TX}^M;$$

$$\varphi_{ANT}^M(t) = \gamma^M \times \omega_{OSC} \times (K_{F_1}(T_1 \beta^M) + K_{F_2}(t - T_1 \beta^M - t_{DAC}^M - t_{TX}^M) + K_{SYN\_TX}(t - t_{TX}^M)) + \varphi_{F_2}^{MULT} + \varphi_{DAC}^M(0) + \varphi_{SYN\_TX}(0), t > T_1 \beta^M + t_{DAC}^M + t_{TX}^M + 10^{-6}$$

In the AM (transponder) receiver at the first down converter, element 85, an output, e.g. first IF, the phase of the signal is as follows:

$$\varphi_{IF\_1}^{AM}(t) = \gamma^M \times \omega_{OSC} \times (K_{F_1}(t - t_{DAC}^M - t_{TX}^M - t_{RX}^{AM}) + K_{SYN\_TX}(t - t_{TX}^M - t_{RX}^{AM})) - \gamma^{AM} \times \omega_{OSC} \times (K_{SYN\_R\_1}t) + \varphi_{F_1}^{MULT} + \varphi_{SYN\_TX}^M(0) - \varphi_{SYN\_RX\_1}^{AM}(0), 10^{-6} t < T_1 \beta^M + t_{DAC}^M - t_{TX}^M - t_{RX}^{AM};$$

$$\varphi_{IF\_1}^{AM}(t) = \gamma^M \times \omega_{OSC} \times (K_{F_1}(T_1 \beta^M) + K_{F_2}(t - T_1 \beta^M - t_{DAC}^M - t_{TX}^M - t_{RX}^{AM}) + K_{SYN\_TX}(t - t_{TX}^M - t_{RX}^{AM})) - \gamma^{AM} \times \omega_{OSC} \times (K_{SYN\_RX\_1}t) + \varphi_{F_2}^{MULT} + \varphi_{SYN\_TX}^M(0) - \varphi_{SYN\_RX\_1}^{AM}(0), t > T_1 \beta^M + t_{DAC}^M + t_{TX}^M + t_{RX}^{AM} + 10^{-6}$$

Note that the propagation delay t in the receiver RF section (elements 15 and 60-85) does not depend upon the system clock. After passing through RF Front-end filters and amplifiers (elements 95-110 and 125) the first IF signal is sampled by the RF Back-end ADC 140. It is assumed that ADC 140 is under-sampling the input signal (e.g., first IF). Thus, the ADC also acts like a down-converter producing the second IF. The first IF filters, amplifiers and the ADC add propagation delay time. At the ADC output (second IF):

$$\varphi_{ADC}^{AM}(t) = \gamma^M \times \omega_{OSC} \times (K_{F_1}(t - t_{DAC}^M - t_{TX}^M - t_{RX}^{AM} - t_{IF\_1}^{AM} - t_{ADC}^{AM})) + K_{SYN\_TX}(t - t_{TX}^M - t_{RX}^{AM} - t_{IF\_1}^{AM} - t_{ADC}^{AM})) - \gamma^{AM} \times \omega_{OSC} \times (K_{SYN\_RX\_1}(t - t_{IF\_1}^{AM} - t_{ADC}^{AM}) + K_{ADC}(t)) + \varphi_{F_1}^{MULT} + \varphi_{SYN\_TX}^{M}(0) - \varphi_{SYN\_RX\_1}^{AM}(0) - \varphi_{ADC\_CLK}^{AM}(0),$$
$$10^{-6} < t < T_1\beta^M + t_{DAC}^M + t_{TX}^M + t_{RX}^{AM} + t_{IF\_1}^{AM} + t_{ADC}^{AM};$$

$$\varphi_{ADC}^{AM}(t) = \gamma^M \times \omega_{OSC} \times (K_{F_1}(T_1\beta^M) + K_{F_2}(t - T_1\beta^M - t_{DAC}^M - t_{TX}^M - t_{RX}^{AM} - t_{IF\_1}^{AM} - t_{ADC}^{AM}) + K_{SYN\_TX}$$

$$(t - t_{TX}^M - t_{RX}^{AM} - t_{IF\_1}^{AM} - t_{ADC}^{AM})) - \gamma^{AM} \times \omega_{OSC} \times (K_{SYN\_RX\_1}(t - t_{IF\_1}^{AM} - t_{ADC}^{AM}) + K_{ADC}(t)) + \varphi_{F_2}^{MULT} + \varphi_{SYN\_TX}^{M}(0) - \varphi_{SYN\_RX\_1}^{AM}(0) - \varphi_{ADC\_CLK}^{AM}(0), t < T_1\beta^M + t_{DAC}^M + t_{TX}^M + t_{RX}^{AM} + t_{IF\_1}^{AM} + t_{ADC}^{AM} + 10^{-6}$$

In the FPGA 150 the second IF signal (from the ADC output) is filtered by the RF Back-end digital filters 190 and further down-converted back to base-band ranging signal by the third down-converter (i.e., quadrature mixer 200, digital filters 230 and 210 and digital quadrature oscillator 220), summed in the summer 270 and is stored in the memory 170. At the third down-converter output (i.e., quadrature mixer):

$$\varphi_{BB}^{AM}(t) = \gamma^M \times \omega_{OSC} \times \begin{pmatrix} K_{F_1}(t - t_{DAC}^M - t_{TX}^M - t_{RX}^{AM} + t_{IF\_1}^{AM} + t_{ADC}^{AM} - t_{FIR}\beta^{AM}) + \\ K_{SYN\_TX}(t - t_{TX}^M - t_{RX}^{AM} - t_{IF\_1}^{AM} - t_{ADC}^{AM} - t_{FIR}\beta^{AM}) \end{pmatrix} -$$
$$\gamma^{AM} \times \omega_{OSC} \times (K_{SYN\_RX\_1}(t - t_{IF\_1}^{AM} - t_{ADC}^{AM} - t_{FIR}\beta^{AM}) + K_{ADC}(t - t_{FIR}\beta^{AM}) + K_{SYN\_RX\_1}t) +$$
$$\varphi_{F_1}^{MULT} +$$
$$\varphi_{SYN\_TX}^M(0) - \varphi_{SYN\_RX\_1}^{AM}(0) - \varphi_{ADC\_CLK}^{AM}(0) - \varphi_{SYN\_RX\_2}^{AM}(0),$$
$$10^{-6} < t < T_1\beta^M + t_{DAC}^M + t_{TX}^M + t_{RX}^{AM} + t_{IF\_1}^{AM} + t_{ADC}^{AM} + t_{FIR}\beta^{AM};$$

$$\varphi_{BB}^{AM}(t) = \gamma^M \times \omega_{OSC} \times \begin{pmatrix} K_{F_1}(T_1\beta^M) + K_{F_2}(t - T_1\beta^M - t_{DAC}^M - t_{TX}^M - t_{RX}^{AM} - t_{IF\_1}^{AM} - t_{ADC}^{AM} - t_{FIR}\beta^{AM}) + \\ K_{SYN\_TX}(t - t_{TX}^M - t_{RX}^{AM} - t_{IF\_1}^{AM} - t_{ADC}^{AM} - t_{FIR}\beta^{AM}) \end{pmatrix} -$$
$$\gamma^{AM} \times \omega_{OSC} \times (K_{SYN\_RX\_1}(t - t_{IF\_1}^{AM} - t_{ADC}^{AM} - t_{FIR}\beta^{AM}) + K_{ADC}(t - t_{FIR}\beta^{AM}) + K_{SYN\_RX\_2}t) +$$
$$\varphi_{F_2}^{MULT} +$$
$$\varphi_{SYN\_TX}^M(0) - \varphi_{SYN\_RX\_1}^{AM}(0) - \varphi_{ADC\_CLK}^{AM}(0) - \varphi_{SYN\_RX\_2}^{AM}(0),$$
$$t > T_1\beta^M + t_{DAC}^M + t_{TX}^M + t_{RX}^{AM} + t_{IF\_1}^{AM} + t_{ADC}^{AM} + t_{FIR}\beta^{AM} + 10^{-6}$$

Note that propagation delay $t_{FIR}^{AM} = t_{FIR}\beta^{AM}$ in the FIR section 190 does not depend upon the system clock.

After RX→TX delay the stored (in memory 170) base-band ranging signal from the master (M) is retransmitted. Note that RX→TX delay $t_{RTX}^{AM} = t_{RTX}\beta^{AM}$.

$$\varphi_{RF}^{AM}(t) = \gamma^M \times \omega_{OSC} \times \begin{pmatrix} K_{F_1}(t - t_{DAC}^M - t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM}) + \\ K_{SYN\_TX}(t - t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM}) \end{pmatrix} -$$
$$\gamma^{AM} \times \omega_{OSC} \times \begin{pmatrix} K_{SYN\_RX\_1}(t - t_{IF\_1}^{AM} - t_{ADC}^{AM} - t_{FIR}\beta^{AM} - t_{RTX}\beta^{AM} - t_{DAC}^{AM} - t_{TX}^{AM}) + \\ K_{ADC}(t - t_{FIR}\beta^{AM} - t_{RTX}\beta^{AM} - t_{DAC}^{AM} - t_{TX}^{AM}) + \\ K_{SYN\_RX\_2}(t - t_{RTX}\beta^{AM} - t_{DAC}^{AM} - t_{TX}^{AM}) - K_{SYN\_TX}(t - t_{TX}^{AM}) \end{pmatrix} +$$
$$\varphi_{F_1}^{MULT} + \varphi_{SYN\_TX}^M(0) - \varphi_{SYN\_RX\_1}^{AM}(0) - \varphi_{ADC\_CLK}^{AM}(0) - \varphi_{SYN\_RX\_2}^{AM}(0) + \varphi_{SYN\_TX}^{AM}(0),$$
$$10^{-6} < t < T_1\beta^M + t_{DAC}^M + t_{TX}^M + t_{RX}^{AM} + t_{IF\_1}^{AM} + t_{ADC}^{AM} + t_{FIR}\beta^{AM} + t_{RTX}\beta^{AM} + t_{DAC}^{AM} + t_{TX}^{AM};$$

$$\varphi_{RF}^{AM}(t) = \gamma^M \times \omega_{OSC} \times \begin{pmatrix} K_{F_1}(T_1\beta^M) + K_{F_2}(t - T_1\beta^M - t_{DAC}^M - t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM}) + \\ K_{SYN\_TX}(t - t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM}) \end{pmatrix} -$$
$$\gamma^{AM} \times \omega_{OSC} \times \begin{pmatrix} K_{SYN\_RX\_1}(t - t_{IF\_1}^{AM} - t_{ADC}^{AM} - t_{FIR}\beta^{AM} - t_{RTX}\beta^{AM} - t_{DAC}^{AM} - t_{TX}^{AM}) + \\ K_{ADC}(t - t_{FIR}\beta^{AM} - t_{RTX}\beta^{AM} - t_{DAC}^{AM} - t_{TX}^{AM}) + K_{SYN\_RX\_2}(t - t_{RTX}\beta^{AM} - t_{DAC}^{AM} - t_{TX}^{AM}) - \\ K_{SYN\_TX}(t - t_{TX}^{AM}) \end{pmatrix} +$$
$$\varphi_{F_2}^{MULT} + \varphi_{SYN\_TX}^M(0) - \varphi_{SYN\_RX\_1}^{AM}(0) - \varphi_{ADC\_CLK}^{AM}(0) - \varphi_{SYN\_RX\_2}^{AM}(0) + \varphi_{SYN\_TX}^{AM}(0),$$
$$t > T_1\beta^M + t_{DAC}^M + t_{TX}^M + t_{RX}^{AM} + t_{IF\_1}^{AM} + t_{ADC}^{AM} + t_{FIR}\beta^{AM} + t_{RTX}\beta^{AM} + t_{DAC}^{AM} + t_{TX}^{AM} + 10^{-6}$$

By the time the signal from the transponder reaches the master' (M) receiver antenna the RF signal from transponder (AM) experiences another phase shift $\varphi^{MULT}$ that is a function of the multi-path. As discussed above, this phase shift happens after a certain time period when all reflected signals have arrived at the master' receiver antenna:

$$\varphi^M_{ANT}(t) = \gamma^M \times \omega_{OSC} \times \begin{pmatrix} K_{F_1}(t - t^M_{DAC} - t^M_{TX} - t^{AM}_{RX} - t^{AM}_{IF\_1} - t^{AM}_{ADC} - t_{FIR}\beta^{AM} - t_{RTX}\beta^{AM} - t^{AM}_{DAC} - t^{AM}_{TX}) + \\ K_{SYN\_TX}(t - t^M_{TX} - t^{AM}_{RX} - t^{AM}_{IF\_1} - t^{AM}_{ADC} - t_{FIR}\beta^{AM} - t_{RTX}\beta^{AM} - t^{AM}_{DAC} - t^{AM}_{TX}) \end{pmatrix} -$$

$$\gamma^{AM} \times \omega_{OSC} \times \begin{pmatrix} K_{SYN\_RX\_1}(t - t^{AM}_{IF\_1} - t^{AM}_{ADC} - t_{FIR}\beta^{AM} - t_{RTX}\beta^{AM} - t^{AM}_{DAC} - t^{AM}_{TX}) + \\ K_{ADC}(t - t_{FIR}\beta^{AM} - t_{RTX}\beta^{AM} - t^{AM}_{DAC} - t^{AM}_{TX}) + \\ K_{SYN\_RX\_2}(t - t_{RTX}\beta^{AM} - t^{AM}_{DAC} - t^{AM}_{TX}) - K_{SYN\_TX}(t - t^{AM}_{TX}) \end{pmatrix} +$$

$$2 \times \varphi^{MULT}_{F_1} + \varphi^M_{SYN\_TX}(0) - \varphi^{AM}_{SYN\_RX\_1}(0) - \varphi^{AM}_{ADC\_CLK}(0) - \varphi^{AM}_{SYN\_RX\_2}(0) + \varphi^{AM}_{SYN\_TX}(0),$$

$$2 \times 10^{-6} < t < T_1\beta^M + t^M_{DAC} + t^M_{TX} + t^{AM}_{RX} + t^{AM}_{IF\_1} + t^{AM}_{ADC} + t_{FIR}\beta^{AM} + t_{RTX}\beta^{AM} + t^{AM}_{DAC} + t^{AM}_{TX};$$

$$\varphi^M_{ANT}(t) = \gamma^M \times \omega_{OSC} \times \begin{pmatrix} K_{F_1}(T_1\beta^M) + K_{F_2}(t - T_1\beta^M - t^M_{DAC} - t^M_{TX} - t^{AM}_{RX} - t^{AM}_{IF\_1} - t^{AM}_{ADC} - t_{FIR}\beta^{AM} - t_{RTX}\beta^{AM} - t^{AM}_{DAC} - t^{AM}_{TX}) + \\ K_{SYN\_TX}(t - t^M_{TX} - t^{AM}_{RX} - t^{AM}_{IF\_1} - t^{AM}_{ADC} - t_{FIR}\beta^{AM} - t_{RTX}\beta^{AM} - t^{AM}_{DAC} - t^{AM}_{TX}) \end{pmatrix} -$$

$$\gamma^{AM} \times \omega_{OSC} \times \begin{pmatrix} K_{SYN\_RX\_1}(t - t^{AM}_{IF\_1} - t^{AM}_{ADC} - t_{FIR}\beta^{AM} - t_{RTX}\beta^{AM} - t^{AM}_{DAC} - t^{AM}_{TX}) + \\ K_{ADC}(t - t_{FIR}\beta^{AM} - t_{RTX}\beta^{AM} - t^{AM}_{DAC} - t^{AM}_{TX}) + K_{SYN\_RX\_2}(t - t_{RTX}\beta^{AM} - t^{AM}_{DAC} - t^{AM}_{TX}) - \\ K_{SYN\_TX}(t - t^{AM}_{TX}) \end{pmatrix} +$$

$$2 \times \varphi^{MULT}_{F_2} + \varphi^M_{SYN\_TX}(0) - \varphi^{AM}_{SYN\_RX\_1}(0) - \varphi^{AM}_{ADC\_CLK}(0) - \varphi^{AM}_{SYN\_RX\_2}(0) + \varphi^{AM}_{SYN\_TX}(0),$$

$$t > T_1\beta^M + t^M_{DAC} + t^M_{TX} + t^{AM}_{RX} + t^{AM}_{IF\_1} + t^{AM}_{ADC} + t_{FIR}\beta^{AM} + t_{RTX}\beta^{AM} + t^{AM}_{DAC} + t^{AM}_{TX} + 2 \times 10^{-6}$$

In the master receiver the signal from transponder goes through the same down-conversion process as in the transponder receiver. The result is the recovered base-band ranging signal that was originally sent by the master.

For the first frequency component $F_1$:

$$\varphi^M_{BB\_RECOV}(t) = \gamma^M \times \omega_{OSC} \times \begin{pmatrix} K_{F_1}(t - t^M_{DAC} - t^M_{TX} - t^{AM}_{RX} - t^{AM}_{IF\_1} - t^{AM}_{ADC} - t_{FIR}\beta^{AM} - t_{RTX}\beta^{AM} - t^{AM}_{DAC} - t^{AM}_{TX} - t^M_{RX} - t^M_{IF\_1} - t^M_{ADC} - t_{FIR}\beta^M) + \\ K_{SYN\_TX}(t - t^M_{TX} - t^{AM}_{RX} - t^{AM}_{IF\_1} - t^{AM}_{ADC} - t_{FIR}\beta^{AM} - t_{RTX}\beta^{AM} - t^{AM}_{DAC} - t^{AM}_{TX} - t^M_{RX} - t^M_{IF\_1} - t^M_{ADC} - t_{FIR}\beta^M) - \\ K_{SYN\_RX\_1}(t - t^M_{IF\_1} - t^M_{ADC} - t_{FIR}\beta^M) - K_{ADC}(t - t_{FIR}\beta^M) - \\ K_{SYN\_RX\_2}(t) \end{pmatrix} -$$

$$\gamma^{AM} \times \omega_{OSC} \times \begin{pmatrix} K_{SYN\_RX\_1}(t - t^{AM}_{IF\_1} - t^{AM}_{ADC} - t_{FIR}\beta^{AM} - t_{RTX}\beta^{AM} - t^{AM}_{DAC} - t^{AM}_{TX} - t^M_{RX} - t^M_{IF\_1} - t^M_{ADC} - t_{FIR}\beta^M) + \\ K_{ADC}(t - t_{FIR}\beta^{AM} - t_{RTX}\beta^{AM} - t^{AM}_{DAC} - t^{AM}_{TX} - t^M_{RX} - t^M_{IF\_1} - t^M_{ADC} - t_{FIR}\beta^M) + \\ K_{SYN\_RX\_2}(t - t_{RTX}\beta^{AM} - t^{AM}_{DAC} - t^{AM}_{TX} - t^M_{RX} - t^M_{IF\_1} - t^M_{ADC} - t_{FIR}\beta^M) - \\ K_{SYN\_TX}(t - t^{AM}_{TX} - t^M_{RX} - t^M_{IF\_1} - t^M_{ADC} - t_{FIR}\beta^M) \end{pmatrix} +$$

$$2 \times \varphi^{MULT}_{F_1} + \varphi^M_{SYN\_TX}(0) - \varphi^{AM}_{SYN\_RX\_1}(0) - \varphi^{AM}_{ADC\_CLK}(0) - \varphi^{AM}_{SYN\_RX\_2}(0) + \varphi^{AM}_{SYN\_TX} - \varphi^M_{SYN\_RX\_1}(0) - \varphi^M_{ADC\_CLK}(0) - \varphi^M_{SYN\_RX\_2}(0),$$

$$2 \times 10^{-6} < t < T_1\beta^M + t^M_{DAC} + t^M_{TX} + t^{AM}_{RX} + t^{AM}_{IF\_1} + t^{AM}_{ADC} + t_{FIR}\beta^{AM} + t_{RTX}\beta^{AM} + t^{AM}_{DAC} + t^{AM}_{TX} + t^M_{RX} + t^M_{IF\_1} + t^M_{ADC} + t_{FIR}\beta^M;$$

For the second frequency component F2:

$$\varphi^M_{BB\_RECOV}(t) =$$

$$\gamma^M \times \omega_{OSC} \times \begin{pmatrix} K_{F_1}(T_1\beta^M) + K_{F_2}(t - T_1\beta^M - t^M_{DAC} - t^M_{TX} - t^{AM}_{RX} - t^{AM}_{IF\_1} - t^{AM}_{ADC} - t_{FIR}\beta^{AM} - t_{RTX}\beta^{AM} - t^{AM}_{DAC} - t^{AM}_{TX} - t^M_{RX} - t^M_{IF\_1} - t^M_{ADC} - t_{FIR}\beta^M) + \\ K_{SYN\_TX}(t - t^M_{TX} - t^{AM}_{RX} - t^{AM}_{IF\_1} - t^{AM}_{ADC} - t_{FIR}\beta^{AM} - t_{RTX}\beta^{AM} - t^{AM}_{DAC} - t^{AM}_{TX} - t^M_{RX} - t^M_{IF\_1} - t^M_{ADC} - t_{FIR}\beta^M) - \\ K_{SYN\_RX\_1}(t - t^M_{IF\_1} - t^M_{ADC} - t_{FIR}\beta^M) - K_{ADC}(t - t_{FIR}\beta^M) - \\ K_{SYN\_RX\_2}(t) \end{pmatrix} -$$

-continued $$\gamma^{AM} \times \omega_{OSC} \times \begin{pmatrix} K_{SYN\_RX\_1}(t - t_{IF\_1}^{AM} - t_{ADC}^{AM} - t_{FIR}\beta^{AM} - t_{RTX}\beta^{AM} - t_{DAC}^{AM} - t_{TX}^{AM} - t_{RX}^{M} - t_{IF\_1}^{M} - t_{ADC}^{M} - t_{FIR}\beta^{M}) + \\ K_{ADC}(t - t_{FIR}\beta^{AM} - t_{RTX}\beta^{AM} - t_{DAC}^{AM} - t_{TX}^{AM} - t_{RX}^{M} - t_{IF\_1}^{M} - t_{ADC}^{M} - t_{FIR}\beta^{M}) + \\ K_{SYN\_RX\_2}(t - t_{RTX}\beta^{AM} - t_{DAC}^{AM} - t_{TX}^{AM} - t_{RX}^{M} - t_{IF\_1}^{M} - t_{ADC}^{M} - t_{FIR}\beta^{M}) - \\ K_{SYN\_TX}(t - t_{TX}^{AM} - t_{RX}^{M} - t_{IF\_1}^{M} - t_{ADC}^{M} - t_{FIR}\beta^{M}) \end{pmatrix} +$$

$$2 \times \varphi_{F_2}^{MULT} + \varphi_{SYN\_TX}^{M}(0) - \varphi_{SYN\_RX\_1}^{AM}(0) - \varphi_{ADC\_CLK}^{AM}(0) - \varphi_{SYN\_RX\_2}^{AM}(0) + \varphi_{SYN\_TX}^{AM} - \varphi_{SYN\_RX\_1}^{M}(0) - \varphi_{ADC\_CLK}^{M}(0) - \varphi_{SYN\_RX\_2}^{M}(0),$$

$$t > T_1\beta^M + t_{DAC}^M + t_{TX}^M + t_{RX}^M + t_{IF\_1}^{AM} + t_{ADC}^{AM} + t_{FIR}\beta^{AM} + t_{RTX}\beta^{AM} + t_{DAC}^{AM} + t_{TX}^{AM} + t_{RX}^M + t_{IF\_1}^M + t_{ADC}^M + t_{FIR}\beta^M + 2 \times 10^{-6}$$

Substitutions:

$$T_{D\_M-AM} = t_{DAC}^M + t_{TX}^M + t_{RX}^{AM} + t_{IF\_1}^{AM} + t_{ADC}^{AM} + t_{FIR}\beta^{AM} + t_{RTX}\beta^{AM} + t_{DAC}^{AM} + t_{TX}^{AM} + t_{RX}^M + t_{IF\_1}^M + t_{ADC}^M + t_{FIR}\beta^M; \qquad 15$$

where $T_{D\_M-AM}$ is the propagation delay through master (M) and transponder (AM) circuitry.

$$\varphi_{BB\_M-AM}(0) = \varphi_{SYN\_TX}^M(0) - \varphi_{SYN\_RX\_1}^{AM}(0) - \varphi_{ADC\_CLK}^{AM}(0) - \varphi_{SYN\_RX\_2}^{AM}(0) + \varphi_{SYN\_TX}^{AM} - \varphi_{SYN\_RX\_1}^M(0) - \varphi_{ADC\_CLK}^M(0) - \varphi_{SYN\_RX\_2}^M(0) = \text{Const}; \qquad 20$$

where: $\varphi_{BB\_M-AM}(0)$ is the LO phase shift, at time t=0, from master (M) and transponder (AM) frequency mixers, including ADC(s).

Also: $K_{SYN\_TX} = K_{SYN\_RX\_1} + K_{ADC} + K_{SYN\_RX\_2}$

First Frequency Component F1:

$$\varphi_{BB\_RECOV}^M(t) = \gamma^M \times \omega_{OSC} \times \begin{pmatrix} K_{F_1}(t - T_{D\_M-AM}) - K_{SYN\_TX}(t) + K_{SYN\_RX\_1}(t) - K_{ADC}(t) - K_{SYN\_RX\_2}(t) + \\ K_{SYN\_TX}(-t_{TX}^{AM} - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM} - t_{RX}^M - t_{IF\_1}^M - t_{ADC}^M - t_{FIR}\beta^M) - \\ K_{SYN\_RX\_1}(-t_{IF\_1}^M - t_{ADC}^M - t_{FIR}\beta^M) - K_{ADC}(-t_{FIR}\beta^M) \end{pmatrix} -$$

$$\gamma^{AM} \times \omega_{OSC} \times \begin{pmatrix} K_{SYN\_RX\_1}(t) + K_{ADC}(t) + K_{SYN\_RX\_2}(t) - K_{SYN\_TX}(t) + \\ K_{SYN\_RX\_1}(t - t_{IF\_1}^{AM} - t_{ADC}^{AM} - t_{FIR}\beta^{AM} - t_{RTX}\beta^{AM} - t_{DAC}^{AM}) + K_{ADC}(-t_{FIR}\beta^{AM} - t_{RTX}\beta^{AM} - t_{DAC}^{AM}) + \\ K_{SYN\_RX\_2}(-t_{RTX}\beta^{AM} - t_{DAC}^{AM}) \\ K_{SYN\_RX\_1}(-t_{TX}^{AM} - t_{RX}^M - t_{IF\_1}^M - t_{ADC}^M - t_{FIR}\beta^M) + K_{ADC}(-t_{TX}^{AM} - t_{RX}^M - t_{IF\_1}^M - t_{ADC}^M - t_{FIR}\beta^M) + \\ K_{SYN\_RX\_2}(-t_{TX}^{AM} - t_{RX}^M - t_{IF\_1}^M - t_{ADC}^M - t_{FIR}\beta^M) - K_{SYN\_TX}(-t_{TX}^{AM} - t_{RX}^M - t_{IF\_1}^M - t_{ADC}^M - t_{FIR}\beta^M) \end{pmatrix} +$$

$$2 \times \varphi_{F_1}^{MULT} + \varphi_{BB\_M-AM}(0),$$

$$2 \times 10^{-6} < t < T_1\beta^M + T_{D\_M-AM};$$

First Frequency Component F1 Continued:

$$\varphi_{BB\_RECOV}^M(t) = \gamma^M \times \omega_{OSC} \times \begin{pmatrix} K_{F_1}(t - T_{D\_M-AM}) + \\ K_{SYN\_TX}(-t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM} - t_{RX}^M - t_{IF\_1}^M - t_{ADC}^M - t_{FIR}\beta^M) - \\ K_{SYN\_RX\_1}(-t_{IF\_1}^M - t_{ADC}^M - t_{FIR}\beta^M) - K_{ADC}(-t_{FIR}\beta^M) \end{pmatrix} -$$

$$\gamma^{AM} \times \omega_{OSC} \times \begin{pmatrix} K_{SYN\_RX\_1}(-t_{IF\_1}^{AM} - t_{ADC}^{AM} - t_{FIR}\beta^{AM} - t_{RTX}\beta^{AM} - t_{DAC}^{AM}) + K_{ADC}(-t_{FIR}\beta^{AM} - t_{RTX}\beta^{AM} - t_{DAC}^{AM}) + \\ K_{SYN\_RX\_2}(-t_{RTX}\beta^{AM} - t_{DAC}^{AM}) \end{pmatrix} +$$

$$2 \times \varphi_{F_1}^{MULT} + \varphi_{BB\_M-AM}(0),$$

$$2 \times 10^{-6} < t < T_1\beta^M + T_{D\_M-AM};$$

Second Frequency Component F2:

$$\varphi_{BB\_RECOV}^{M}(t) = \gamma^{M} \times \omega_{OSC} \times \begin{pmatrix} K_{F_1}(T_1\beta^M) + K_{F_2}(t - T_1\beta^M - T_{D\_M-AM}) - K_{SYN\_TX}(t) + K_{SYN\_RX\_1}(t) - K_{ADC}(t) - K_{SYN\_RX\_2}(t) + \\ K_{SYN\_TX}(-t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM} - t_{RX}^{M} - t_{IF\_1}^{M} - t_{ADC}^{M} - t_{FIR}\beta^M) - \\ K_{SYN\_RX\_1}(-t_{IF\_1}^M - t_{ADC}^M - t_{FIR}\beta^M) - K_{ADC}(-t_{FIR}\beta^M) \end{pmatrix} -$$

$$\gamma^{AM} \times \omega_{OSC} \times \begin{pmatrix} K_{SYN\_RX\_1}(t) + K_{ADC}(t) + K_{SYN\_RX\_2}(t) - K_{SYN\_TX}(t) + \\ K_{SYN\_RX\_1}(t - t_{IF\_1}^{AM} - t_{ADC}^{AM} - t_{FIR}\beta^{AM} - t_{RTX}\beta^{AM}) + \\ K_{ADC}(-t_{FIR}\beta^{AM} - t_{RTX}\beta^{AM} - t_{DAC}^{AM}) + K_{SYN\_RX\_2}(-t_{RTX}\beta^{AM} - t_{DAC}^{AM}) + \\ K_{SYN\_RX\_1}(-t_{TX}^{AM} - t_{RX}^M - t_{IF\_1}^M - t_{ADC}^M - t_{FIR}\beta^M) + K_{ADC}(-t_{TX}^{AM} - t_{RX}^M - t_{IF\_1}^M - t_{ADC}^M - t_{FIR}\beta^M) + \\ K_{SYN\_RX\_2}(-t_{TX}^{AM} - t_{RX}^M - t_{IF\_1}^M - t_{ADC}^M - t_{FIR}\beta^M) - K_{SYN\_TX}(-t_{TX}^{AM} - t_{RX}^M - t_{IF\_1}^M - t_{ADC}^M - t_{FIR}\beta^M) \end{pmatrix} +$$

$$2 \times \varphi_{F_2}^{MULT} + \varphi_{BB\_M-AM}(0),$$

$t > T_1\beta^M + T_{D\_M-AM} + 2 \times 10^{-6}$

Second Frequency Component F2, Continued:

$$\varphi_{BB\_RECOV}^{M}(t) = \gamma^{M} \times \omega_{OSC} \times \begin{pmatrix} K_{F_1}(T_1\beta^M) + K_{F_2}(t - T_1\beta^M - T_{D\_M-AM}) + \\ K_{SYN\_TX}(-t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM} - t_{RX}^M - t_{IF\_1}^M - t_{ADC}^M - t_{FIR}\beta^M) - \\ K_{SYN\_RX\_1}(-t_{IF\_1}^M - t_{ADC}^M - t_{FIR}\beta^M) - K_{ADC}(-t_{FIR}\beta^M) \end{pmatrix} -$$

$$\gamma^{AM} \times \omega_{OSC} \times \begin{pmatrix} K_{SYN\_RX\_1}(-t_{IF\_1}^{AM} - t_{ADC}^{AM} - t_{FIR}\beta^{AM} - t_{RTX}\beta^{AM}) + K_{ADC}(-t_{FIR}\beta^{AM} - t_{RTX}\beta^{AM} - t_{DAC}^{AM}) + \\ K_{SYN\_RX\_2}(-t_{RTX}\beta^{AM} - t_{DAC}^{AM}) \end{pmatrix} +$$

$$2 \times \varphi_{F_2}^{MULT} + \varphi_{BB\_M-AM}(0),$$

$t > T_1\beta^M + T_{D\_M-AM} + 2 \times 10^{-6}$

Further Substituting:

$$\alpha = \gamma^{M} \times \omega_{OSC} \times \begin{pmatrix} K_{SYN\_TX}(-t_{TX}^M - t_{RX}^{AM} - t_{IF\_1}^{AM} - t_{ADC}^{AM} - t_{FIR}\beta^{AM} - t_{RTX}\beta^{AM} - t_{DAC}^{AM} - t_{TX}^{AM} - t_{RX}^M - t_{IF\_1}^M - t_{ADC}^M - t_{FIR}\beta^M) - \\ K_{SYN\_RX\_1}(-t_{IF\_1}^M - t_{ADC}^M - t_{FIR}\beta^M) - K_{ADC}(-t_{FIR}\beta^M) \end{pmatrix} -$$

$$\gamma^{AM} \times \omega_{OSC} \times \begin{pmatrix} K_{SYN\_RX\_1}(-t_{IF\_1}^{AM} - t_{ADC}^{AM} - t_{FIR}\beta^{AM} - t_{RTX}\beta^{AM}) + \\ K_{ADC}(-t_{FIR}\beta^{AM} - t_{RTX}\beta^{AM} - t_{DAC}^{AM}) + K_{SYN\_RX\_2}(-t_{RTX}\beta^{AM} - t_{DAC}^{AM}) \end{pmatrix},$$

where $\alpha$ is a constant.
Then the final phase equations is:

$\varphi_{BB\_RECOV}^{M}(t) = \gamma^{M} \omega_{OSC} \times (K_{F_1}(t - T_{D\_M-AM})) + 2 \times \varphi_{F_1}^{MULT} + \varphi_{BB\_M-AMN}(0) + \alpha, 2 \times 10^{-6} < t < T_1\beta^M + T_{D\_M-AM};$ $\varphi_{BB\_RECOV}^{M}(t) = \gamma^{M} + \omega_{OSC} \times (K_{F_1}(T_1\beta^M) + K_{F_2}(t - T_1\beta^M - T_{D\_M-AM})) + 2 \times \varphi_{F_2}^{MULT} + \varphi_{BB\_M-AM}(0) + \alpha, t > T_1\beta^M + T_{D\_M-AM} + 2 \times 10^{-6}$ (5)

From the equation (5):

$$L\hat{A}_{RT}(f_n) = \begin{cases} 2 \times \varphi_{F_1}^{MULT}; 2 \times \varphi_{F_1}^{MULT} + 2 \times \Delta\Phi_{F_1/F_2}; 2 \times \varphi_{F_1}^{MULT} + 2 \times \Delta\Phi_{F_1/F_2}; 2 \times \varphi_{F_1}^{MULT} + \\ 2 \times \Delta\Phi_{F_1/F_4}; \ldots ; 2 \times \varphi_{F_1}^{MULT} + 2 \times \Delta\Phi_{F_1/F_i}; \end{cases}$$

where $i = 2, 3, 4 \ldots$; and $2 \times \Delta\Phi_{F_1/F_i}$ is equal to $2 \times (\varphi_{F_i}^{MULT} - \varphi_{F_1}^{MULT})$.

For example, the difference $2 \times (\varphi_{F_2}^{MULT} \varphi_{F_1}^{MULT})$ at time instances t1 and t2:

$2 \times \omega_{F_2}^{MULT} - 2 \times \varphi_{F_1}^{MULT} = 2 \times \Delta\Phi_{F_1/F_2} = \varphi_{BB\_RECOV}^{M}(t_2) - \varphi_{BB\_RECOV}^{M}(t_1) - \gamma^M \times \omega_{OSC} \times [K_{F_1}(T_1\beta^M) + (K_{F_2}(t_2 - T_1\beta^M - T_{D\_M-AM})) - (K_{F_1}(t_1 - T_{D\_M-AM}))],$
$2 \times 10^{-6} < t_1 < T_1\beta^M + T_{D\_M-AM}; t_2 > T_1\beta^M + T_{D\_M-AM} + 2 \times 10^{-6}$ To find $2 \times \Delta\Phi_{F_1/F_2}$ difference we need to know $T_{D\_M-AM}$:

$T_{D\_M-AM} = T_{LB\_M}\beta^M + T_{LB\_AM}\beta^{AM} + t_{RTX}\beta^{AM};$ $$T_{LB\_M} + t_{DAC}{}^{M} + t_{TX}{}^{M} + t_{RX}{}^{M} + t_{IF\_1}{}^{M} + t_{ADC}{}^{M} + t_{FIR}\beta^{M};$$
$$T_{LB\_AM} = t_{DAC}{}^{AM} + t_{TX}{}^{AM} + t_{RX}{}^{AM} + t_{IF\_1}{}^{AM} + t_{ADC}{}^{AM} + t_{FIR}\beta^{AM},$$

where $T_{LB\_M}$ and $T_{LB\_AM}$ are propagation delays through the master (M) and transponder (AM) TX and RX circuitries that are measured by placing devices in the loop-back mode. Note that the master and the transponder devices can measure $T_{LB\_M}$ and $T_{LB\_AM}$ automatically; and we also know the $t_{RTX}$ value.

From the above formulas and $t_{RTX}$ value $T_{D\_M-AM}$ can be determined and consequently, for a given $t_1$, and $t_2$ the $2 \times \Delta \Phi_{F_1/F_2}$ value can be found as follows:

$$2 \times \Delta \Phi_{F_1/F_2} = \varphi_{BB\_RECOV}^{M}(t_2) - \varphi_{BB\_RECOV}^{M}(t_1) - \gamma^{M} \times \omega_{OSC} \times \begin{bmatrix} K_{F_1}(T_1\beta^{M}) + K_{F_2}t_2 - K_{F_2}T_1\beta^{M} - K_{F1}t_1 - K_{F_2}T_{LB\_M}\beta^{M} + K_{F_1}T_{LB\_M}\beta^{M} - \\ K_{F_2}(T_{LB\_AM}\beta^{AM}\beta^{M} + t_{RTX}\beta^{M}) + K_{F_1}(T_{LB\_AM}\beta^{AM}\beta^{M} + t_{RTX}\beta^{M}) \end{bmatrix}, \quad (6)$$

$$2 \times 10^{-6} < t_1 < T_1\beta^{M} + T_{D\_M-AM}; t_2 = t_1 + T_1\beta^{M}$$

$$2 \times \Delta \Phi_{F_1/F_2} = \varphi_{BB\_RECOV}^{M}(t_2) - \varphi_{BB\_RECOV}^{M}(t_1) - \gamma^{M} \times \omega_{OSC} \times$$

$$[K_{F_2}t_2 - K_{F1}t_1 - (K_{F_2} - K_{F_1}) \times T_1\beta^{M} - (K_{F_2} - K_{F_1}) \times T_{LB\_M}\beta^{M} - (K_{F_2} - K_{F_1}) \times (T_{LB\_AM}\beta^{AM}\beta^{M} + t_{RTX}\beta^{M})],$$

$$2 \times 10^{-6} < t_1 < T_1\beta^{M} + T_{D\_M-AM}; t_2 = t_1 + T_1\beta^{M}$$

$$2 \times \Delta \Phi_{F_1/F_2} = \varphi_{BB\_RECOV}^{M}(t_2) - \varphi_{BB\_RECOV}^{M}(t_1) - \gamma^{M} \times \omega_{OSC} \times$$

$$[K_{F_2}t_2 - K_{F1}t_1 - (K_{F_2} - K_{F_1}) \times (T_1\beta^{M} - T_{LB\_M}\beta^{M} - T_{LB\_AM}\beta^{AM}\beta^{M} - t_{RTX}\beta^{M})],$$

$$2 \times 10^{-6} < t_1 < T_1\beta^{M} + T_{D\_M}; t_2 = t_1 + T_1\beta^{M};$$

Or, assuming that $\beta^{M} = \beta^{AM} = 1$:

$$2 \times \Delta \omega_{F_1/F_2} = \varphi_{BB\_RECOV}^{M}(t_2) - \varphi_{BB\_RECOV}^{M}(t_1) - \gamma^{M} \times$$
$$\omega_{OSC} \times [K_{F_2}t_2 - K_{F1}t_1 - (K_{F_2} - K_{F_1}) \times (T_1 - T_{D\_M-AM})],$$
$$2 \times 10^{-6} < t_1 < T_1 + T_{D\_M-AM}; t_2 = t_1 + T_1; \quad (6A)$$

From the equation (6) it can be concluded that at operating frequency(s) ranging signal(s) complex amplitude values can be found from processing the returned base-band ranging signal.

The initial phase value $2 \times \varphi_{F_1}^{MULT}$ can be assumed to be equal zero because the subspace algorithms are not sensitive to a constant phase offset. If necessary, the $2 \times \varphi_{F_1}^{MULT}$ value (phase initial value) can be found by determining the TOA (Time Of Arrival) using the narrow-bandwidth ranging signal method as described in U.S. Pat. No. 7,561,048, incorporated herein by reference in its entirety. This method estimates the ranging signal round trip delay, which is equal to $2 \times T_{FLT}\beta^{M}$ and the $2 \times \varphi_{F_1}^{MULT}$ value can be found from the following equation:

$$2 \times \varphi_{F_1}^{MULT} = 2 \times \beta^{M} \times \gamma^{M} \times \omega_{OSC} \times (K_{SYN\_TX} + K_{F_1}) \times (T_{FLT}),$$

Or:

$$2 \times \varphi_{F_1}^{MULT} = 2 \times \omega_{OSC} \times (K_{SYN\_TX} + K_{F_1}) \times (T_{FLT}),$$

In an embodiment, the returned base-band ranging signal phase values $\varphi_{BB\_RECOV}^{M}(t)$ are calculated by the multi-path processor's arctan block 250. To improve SNR, the multi-path mitigation processor phase compare block 255 calculates $2 \times \Delta \Phi_{F_1/F_i} = \varphi_{BB\_RECOV}^{M}(t_m) - \varphi_{BB\_RECOV}^{M}(t_n)$ for many instances n (n=2, 3, 4 . . . ) using the equation (6A), and then average them out to improve SNR. Note that $2 \times 10^{-6} < t_n < T_f + T_{D\_M-AM}; t_m = t_1 + T_f$.

From the equations 5 and 6 it becomes apparent that the recovered (i.e., received) base-band ranging signal has the same frequency as the original base-band signal that was sent by the master. Thus, there is no frequency translation despite the fact that the master (M) and the transponder (AM) system clocks can differ. Because the base-band signal consists of several frequency components, each component is consists of multiple periods of a sinusoid, it is also possible to estimate the phase and the amplitude of the received ranging signal by sampling the received base-band signal individual component frequency with the corresponding original (i.e., sent by the master) base-band signal individual frequency component and integrating the resulting signal over period $T \le T_f$.

This operation generates complex amplitude values $\hat{A}_{RT}(f_n)$ of received ranging signal in the I/Q format. Note that each base-band signal individual frequency component that was sent by the master has to be shifted in time by the $T_{D\_M-AM}$. The integration operation produces effect of averaging out the multiple instances of the amplitude and the phase (e.g., increasing the SNR). Note that the phase and the amplitude values can be translated from the I/Q format to the $|\hat{A}(f_n)|$ and $\angle \hat{A}_{RT}(f_n)$ format.

This method of sampling, integrating over period of $T \le T_f$ and subsequent conversion from the I/Q format to the $|\hat{A}(f_n)|$ and $\angle \hat{A}_{RT}(f_n)$ format can be implemented in the phase compare block 255 in FIG. 3C. Thus, depending upon the block's 255 design and implementation, either the method of the embodiment, based on the equation (5), or an alternative method, described in this section, can be used.

Although the ranging signal bandwidth is narrow, the frequency difference $f_n - f_1$ can be relatively large, for example, in an order of several megahertz. As a result, the receiver's bandwidth has to be kept wide enough to pass all of the $f_1 : f_n$ ranging signal frequencies components. This wide receiver bandwidth impacts the SNR. To reduce the receiver effective bandwidth and improve the SNR, the received ranging signal base-band frequency components can be filtered by the RF back-end processor in FPGA 150 by the digital narrow bandwidth filters tuned for each individual frequency component of the received base-band ranging signal. However, this large number of digital filters (the number of filters equals to the number of individual frequency components, n) puts additional burden on the FPGA resources, increasing its cost, size and power consumption.

In an embodiment, only two narrow bandwidth digital filters are used: one filter is always tuned for $f_1$ frequency component and the other filter can be tuned for all other frequencies components: $f_2 : f_n$. Multiple instances of ranging signal are sent by the master. Each instance consists of only two frequencies: $f_1 : f_2; f_1 : f_3 \ldots ; f_1 : f_i \ldots ; f_1 : f_n$. Similar strategies are also possible.

Please note that it is also entirely possible to keep the base-band ranging signal components to only two (or even one) generating the rest of the frequency components by adjusting the frequency synthesizers, e.g. changing $K_{SYN}$. It is desirable that LO signals for up-converters and down-converters mixers are generated using the Direct Digital Synthesis (DDS) technology. For high VHF band frequencies this can present an undesired burden on the transceiver/ FPGA hardware. However, for lower frequencies this might be a useful approach. Analog frequency synthesizers can also be used, but may take additional time to settle after frequency is changed. Also, in case of analog synthesizers, two measurements at the same frequency would have to be made in order to cancel a phase offset that might develop after changing the analog synthesizer's frequency.

The actual $T_{D\_M-AM}$ that is used in the above equations is measured in both: the master (M) and the transponder (AM) systems clocks, e.g. $T_{LB\_AM}$ and $t_{RTX}$ are counted in the transponder (AM) clocks and $T_{LB\_M}$ is counted in the master (M) clock. However, when $2 \times \Delta\Phi_{F_1/F_2}$ is calculated both: $T_{LB\_AM}$ and $t_{RTX}$ are measured (counted) in master (M) clock. This introduces an error:

$$2 \times \Delta\Phi_{ERROR} = \gamma^M \times \omega_{OSC} \times (K_{F_2} - K_{F_1}) \times (T_{LB\_AM}(\beta^{AM}\beta^M - \beta^{AM}) + t_{RTX}(\beta^M - \beta^{AM})) \quad (7)$$

The phase estimation error (7) impacts the accuracy. Therefore, it is necessary to minimize this error. If $\beta^M = \beta^{AM}$, in other words, all master(s) and transponders (tags) system clocks are synchronized, then the contribution from the $t_{RTX}$ time is eliminated.

In an embodiment, the master and the transponder units (devices) are capable of synchronizing clocks with any of the devices. For example, a master device can serve as a reference. Clock synchronization is accomplished by using the remote control communication channel, whereby under FPGA 150 control, the frequency of temperature compensated crystal oscillator TCXO 20 is adjusted. The frequency difference is measured at the output of the summer 270 of the master device while the selected transponder device is transmitting a carrier signal.

Thereafter, the master sends a command to the transponder to increase/decrease TCXO frequency. This procedure may be repeated several times to achieve greater accuracy by minimizing frequency at the summer 270 output. Please note that in an ideal case the frequency at the summer 270 output should become equal to zero. An alternative method is to measure the frequency difference and make a correction of the estimated phase without adjusting the transponder' TCXO frequency.

While $\beta^M - \beta^{AM}$ can be considerably reduced there is a phase estimation error when $\beta^M \neq 1$. In this case the margin of error depends upon a long term stability of the reference device (usually master (M)) clock generator. In addition, the process of clock synchronization may take considerable amount of time, especially with large number of units in the field. During the synchronization process the track-locate system becomes partially or fully inoperable, which negatively impacts the system readiness and performance. In this case the abovementioned method that does not require the transponder' TCXO frequency adjustment is preferred.

Commercially available (off the shelf) TCXO components have high degree of accuracy and stability. Specifically, TCXO components for the GPS commercial applications are very accurate. With these devices, the phase error impact on locating accuracy can be less than one meter without the need for frequent clock synchronization.

After narrow bandwidth ranging signal multi-path mitigation processor obtains the returned narrow bandwidth ranging signal complex amplitude $\hat{A}_{RT}(f_n)$, the further processing (i.e., execution of super-resolution algorithms), is implemented in the software-based component, which is a part of the multi-path mitigation processor. This software component can be implemented in the master (reader) host computer CPU and/or the microprocessor that is embedded in the FPGA 150 (not shown). In an embodiment the multi-path mitigation algorithm(s) software component is executed by the master host computer CPU.

The super-resolution algorithm(s) produce estimation of $(2\pi \times \tau_K)$ "frequencies", e.g. $\tau_K$ values. At the final step the multi-path mitigation processor selects $\tau$ with the smallest value (i.e., the DLOS delay time).

In certain cases where the ranging signal narrow bandwidth requirements are somewhat relaxed, the DLOS path can be separated from MP paths by employing a continuous (in time) chirp. In an embodiment this continuous chirp is Linear Frequency Modulation (LFM). However, other chirp waveforms can be also used.

Let's assume that under multi-path mitigation processor control a chirp with bandwidth of B and duration of T is transmitted. That gives a chirp rate of $$\beta = 2\pi \frac{B}{T}$$

radians per second. Multiple chirps are transmitted and received back. Note that chirps signals are generated digitally with each chirp started at the same phase.

In the multi-path processor each received single chirp is aligned so that the returned chirp is from the middle of the area of interest.

The chirp waveform equation is:

$s(t) = \exp(i(\omega_0 t + \beta t^2))$, where $\omega_0$ is the initial frequency for $0 < t < T$.

For a single delay round-trip $\tau$, e.g. no multi-path, the returned signal (chirp) is $s(t-\tau)$.

The multi-path mitigation processor then "deramps" the $s(t-\tau)$ by performing complex conjugate mix with the originally transmitted chirp. The resulting signal is a complex sinusoid:

$$f_\tau(t) = \exp(\omega_0 \tau)\exp(-2i\tau\beta t)\exp(i\beta\tau^2), \quad (8)$$

where $\exp(-iw_0\tau_k)$ is the amplitude and $2\beta\tau$ is the frequency and $0 \leq t \leq T$. Note that the last term is a phase and it is negligible.

In case of multi-path, the composite deramped signal consists of multiple complex sinusoids:

$$f_{MP}(t) = \sum_{k=0}^{k=L} \exp(-iw_0\tau_k)\exp(-i2\beta\tau_k)(t), \quad (9)$$

where L is the number of ranging signal paths, including the DLOS path and $0 \leq t \leq T$.

Multiple chirps are transmitted and processed. Each chirp is individually treated/processed as described above. Thereafter, the multi-path mitigation processor assembles results of individual chirps processing:

$$f_{MP}^N(t) = \left[\sum_{n=0}^{n=N-1} P(t-n\rho)\right] \times \left[\sum_{k=0}^{k=L} \exp(-iw_0\tau_k)\exp(-i2\beta\tau_k)t\right] \quad (10)$$

where N is the number of chirps, $$P(t) = \begin{cases} 1; 0 \le t \le T \\ 0; t > T \end{cases}, \rho = T + t_{dead}; t_{dead}$$

is the dead time zone between two consecutive chirps; $2\beta\tau_k$ are artificial delay "frequencies". Again, the most interesting is the lowest "frequency", which corresponds to the DLOS path delay.

In the equation (10) $f_{MP}^N(t)$ can be thought of as N samples of a sum of complex sinusoids at times:

$$0 \le t_\alpha \le T; t_1 = t_\alpha + \rho; t_2 = t_\alpha + 2\rho \ldots ; t_{m-1} = t_\alpha + (N-1)\rho; m \in 0: m-1;$$

Thus, the number of samples can be a multiple of N, e.g. $\alpha N$; $\alpha = 1, 2, \ldots$.

From the equation (10) the multi-path mitigation processor produces $\alpha N$ complex amplitude samples in time domain that are used in further processing (i.e., execution of super-resolution algorithms). This further processing is implemented in the software component, which is a part of the multi-path mitigation processor. This software component can be executed by the master (reader) host computer CPU and/or by the microprocessor that is embedded in the FPGA 150 (not shown), or both. In an embodiment the multi-path mitigation algorithm(s) software is executed by the master host computer CPU.

The super-resolution algorithm(s) produce estimation of $2\beta\tau_k$ "frequencies", e.g. $\tau_K$ values. At the final step the multi-path mitigation processor selects $\tau$ with the smallest value, i.e. the DLOS delay time.

An explanation will be given of a special processing method, called the "threshold technique," which can serve as an alternative to the super-resolution algorithms. In other words, it is used to enhance reliability and accuracy in distinguishing DLOS path from other MP paths using the artificially generated synthetic wider bandwidth ranging signal.

The frequency domain base-band ranging signal shown in FIG. 1 and FIG. 1A can be converted into time domain base-band signal s(t):

$$s(t) = \frac{\sin \pi (2N+1) \Delta f t}{\sin \pi \Delta f t} \quad (11)$$

It is readily verified that s(t) is periodic with period $1/\Delta t$, and for any integer k, that $s(k/\Delta t) = 2N+1$, which is the peak value of the signal. Where n=N in FIG. 1 and FIG. 1A.

Figure 4:
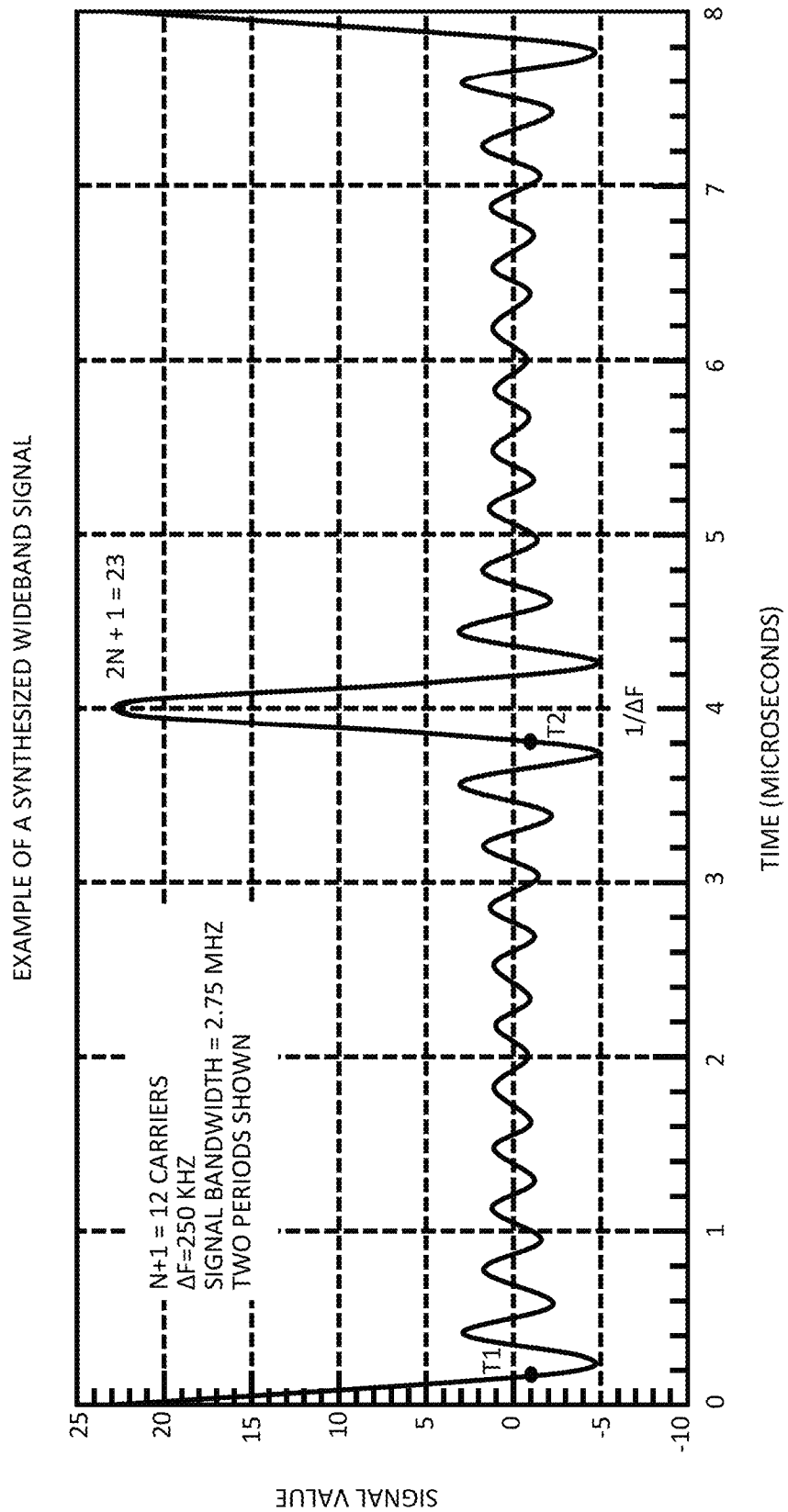
FIG. 4 illustrates an embodiment synthesized wideband base band ranging signal.

FIG. 4 shows two periods of s(t) for the case where N=11 and $\Delta f$=250 kHz. The signal appears as a sequence of pulses of height 2N+1=23 separated by $1/\Delta f$=4 microseconds. Between the pulses is a sinusoidal waveform with varying amplitude and 2N zeros. The wide bandwidth of the signal can be attributed to the narrowness of the tall pulses. It can be also seen that the bandwidth extends from zero frequency to $N\Delta f$=2.75 MHz.

The basic idea of the thresholded method that is used in an embodiment is to enhance the artificially generated synthetic wider bandwidth ranging reliability and accuracy in distinguishing DLOS path from other MP paths. The threshold method detects when the start of the leading edge of a wideband pulse arrives at a receiver. Because of filtering in the transmitter and receiver, the leading edge does not rise instantaneously, but rises out of the noise with smoothly increasing slope. The TOA of the leading edge is measured by detecting when the leading edge crosses a predetermined threshold T.

A small threshold is desirable because it gets crossed sooner and the error delay $\tau$ between the true start of the pulse and the threshold crossing is small. Thus, any pulse replica arriving due to multi-path has no effect if the start of the replica having a delay greater than $\tau$. However, the presence of noise places a limit on how small the threshold T can be. One way to decrease the delay $\tau$ is to use the derivative of the received pulse instead of the pulse itself, because the derivative rises faster. The second derivative has an even faster rise. Higher order derivatives might be used, but in practice they can raise the noise level to an unacceptable value, so the thresholded second derivative is used.

Although the 2.75 MHz wide signal depicted in FIG. 4 has a fairly wide bandwidth, it is not suitable for measuring range by the abovementioned method. That method requires transmitted pulses each having a zero-signal precursor. However, it is possible to achieve that goal by modifying the signal so that the sinusoidal waveform between the pulses is essentially cancelled out. In an embodiment, it is done by constructing a waveform which closely approximates the signal on a chosen interval between the tall pulses, and then subtracting it from the original signal.

The technique can be illustrated by applying it to the signal in FIG. 1. The two black dots shown on the waveform are the endpoints of an interval I centered between the first two pulses. The left and right endpoints of the interval I, which have been experimentally determined to provide the best results, are respectively at:

$$t_1 = \frac{1.1}{(2N+1)\Delta f} = \frac{1.1}{23 \times 250,000} \equiv 191.3\, nsec \quad (12)$$

$$t_2 = \frac{1}{\Delta f} - t_1 = \frac{1}{250,000} - \frac{1.1}{23 \times 250,000} \cong 3,808.7\, nsec$$

An attempt to generate a function g(t) which essentially cancels out the signal s(t) on this interval, but does not cause much harm outside the interval, is performed. Since the expression (11) indicates that s(t) is the sinusoid $\sin \pi(2N+1)\Delta ft$ modulated by $1/\sin \pi\Delta ft$, first a function h(t) which closely approximates $1/\sin \pi\gamma ft$ on the interval I is found, and then form g(t) as the product:

$$g(t) h(t) \sin \pi(2N+1)\Delta ft \quad (13)$$

h(t) is generated by the following sum:

$$h(t) = \sum_{k=0}^{M} a_k \phi_k(t) dt, \ t \in I \text{ where} \quad (14)$$

$$\phi_0(t) \equiv 1, \phi_k(t) = \sin k\pi ft \text{ for } k = 1, 2, \ldots, M \quad (15)$$

and the coefficients $\alpha_k$ are chosen to minimize the least-square error $$J = \int_{t_1}^{t_2} \left( 1/\sin\pi\Delta ft - \sum_{k=0}^{M} a_k \phi_k(t) \right)^2 dt \quad (16)$$

over the interval I.

The solution is readily obtained by taking partial derivatives of J with respect to the $\alpha_k$ and setting them equal to zero. The result is the linear system of M+1 equations $$\sum_{k=0}^{M} a_k R_{jk} = R_j, \, j = 0, 1, 2, \ldots, M \quad (17)$$

that can be solved for the $\alpha_k$, where $$R_j = \int_{t_1}^{t_2} \phi_j \cdot 1/\sin\pi\Delta ft \, dt, \, R_{jk} = \int_{t_1}^{t_2} \phi_j(t)\phi_k(t) \, dt \quad (18)$$

Then, $$g(t) = h(t)\sin\pi(2N+1)\Delta ft \quad (19)$$

$$= \left(\sum_{k=0}^{M} a_k \phi_k(t)\right)\sin\pi(2N+1)\Delta ft$$

Using the definition of the functions $\phi_k(t)$ given by (12)

$$g(t) = \left(a_0 + \sum_{k=1}^{M} a_k \sin k\pi\Delta ft\right)\sin\pi(2N+1)\Delta ft \quad (20)$$

The g(t) is subtracted from s(t) to get a function r(t), which should essentially cancel s(t) on the interval I. As indicated in the Appendix, an appropriate choice for the upper limit M for the summation in the equation (20) is M=2N+1. Using this value and the results from the Appendix, $$r(t) = s(t) - g(t) = b_0 + \sum_{k=1}^{2N+1} b_k \cos 2\pi k\Delta ft + c\sin 2\pi\left(N + \frac{1}{2}\right)\Delta ft \quad (21)$$

where $$b_0 = 1 - \frac{1}{2}a_{2N+1} \quad (22)$$

$$b_k = 2 - \frac{1}{2}a_{2(N-k)+1} \text{ for } k = 1, 2, \ldots, N$$

$$b_k = -\frac{1}{2}a_{2(k-N)-1} \text{ for } k = N+1, N+2, \ldots, 2N+1$$

$$c = -a_0$$

Figure 5:
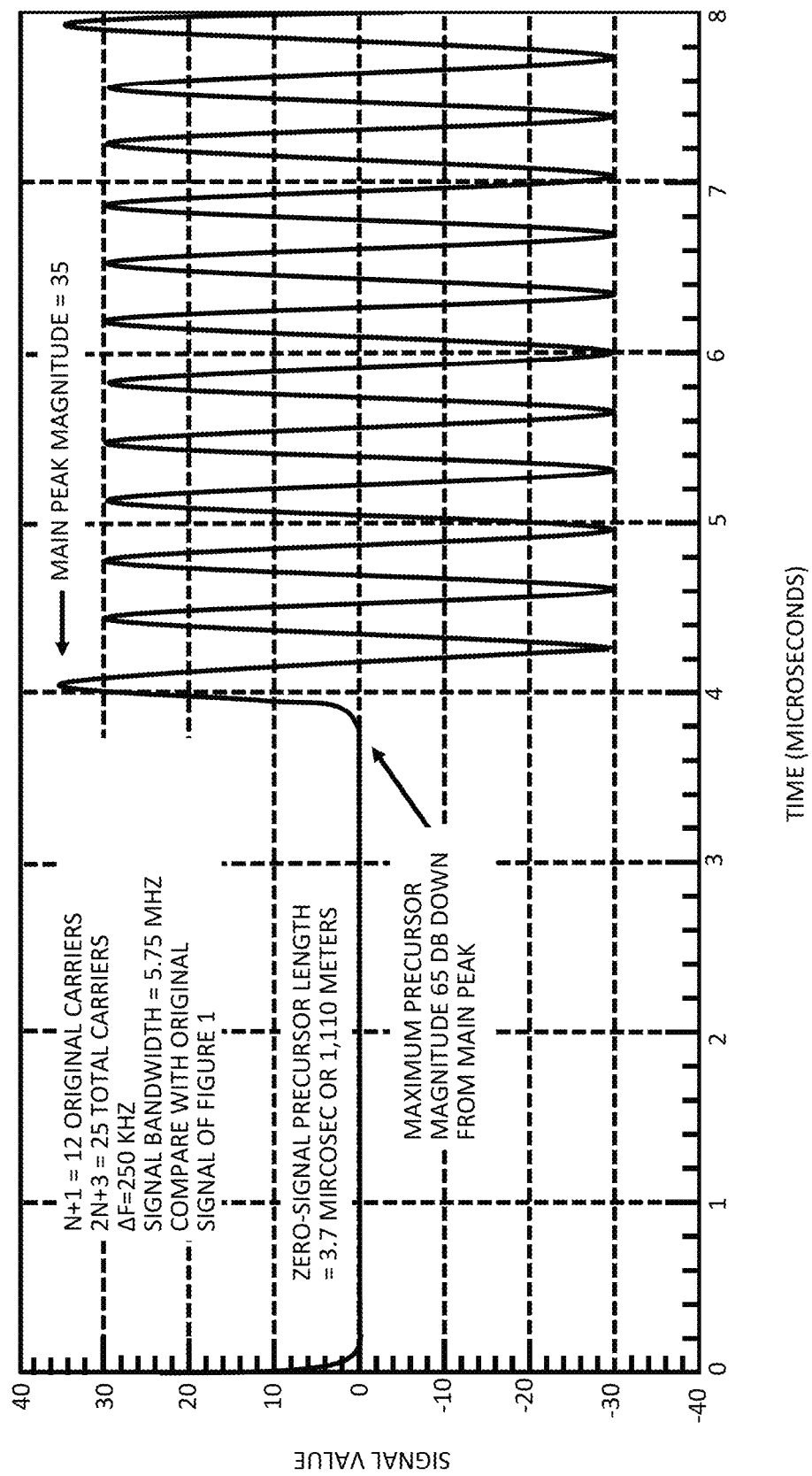
FIG. 5 illustrates elimination of signal precursor by cancellation, in accordance with an embodiment.

From the equation (17) it is seen that a total of 2N+3 frequencies (including the zero-frequency DC term) are required to obtain the desired signal r(t). FIG. 5 shows the resulting signal r(t) for the original signal s(t) shown in FIG. 1, where N=11. In this case the construction of r(t) requires 25 carriers (including the DC term $b_0$).

The important characteristics of r(t) as constructed above are as follows:

1. The lowest frequency is zero Hz and the highest frequency is (2N+1)Δf Hz, as seen from (14). Thus, the total bandwidth is (2N+1)Δf Hz.

2. All carriers are cosine functions (including DC) spaced Δf apart, except for one carrier, which is a sine function located at frequency (N+½)Δf.

3. Although the original signal s(t) has period 1/Δf, r(t) has period 2/Δf. The first half of each period of r(t), which is a full period of s(t), contains a cancelled portion of the signal, and the second half-period of r(t) is a large oscillatory segment. Thus, cancellation of the precursor occurs only in every other period of s.

This occurs because the canceling function g(t) actually strengthens s(t) in every other period of s(t). The reason is that g(t) reverses its polarity at every peak of s(t), whereas s(t) does not. A method of making every period of s(t) contain a cancelled portion to increase processing gain by 3 dB is described below.

4. The length of the cancelled portion of s(t) is about 80-90% of 1/Δf. Therefore, Δf needs to be small enough to make this length long enough to eliminate any residual signal from previous non-zero portions of r(t) due to multi-path.

5. Immediately following each zero portion of r(t) is the first cycle of an oscillatory portion. In an embodiment, in the TOA measurement method as described above, the first half of this cycle is used for measuring TOA, specifically the beginning of its rise. It is interesting to note that the peak value of this first half-cycle (which will be called the main peak) is somewhat larger than the corresponding peak of s(t) located at approximately the same point in time. The width of the first half-cycle is roughly inversely proportional to N Δf 6. A large amount of processing gain can be achieved by:
(a) Using the repetitions of the signal r(t), because r(t) is periodic with period 2/Δf. Also, an additional 3 dB of processing gain is possible by a method to be described later.
(b) Narrowband filtering. Because each of the 2N+3 carriers is a narrowband signal, the occupied bandwidth of the signal is much smaller than that of a wideband signal spread out across the entire allocated band of frequencies.

For the signal r(t) shown in FIG. 5, where N=11 and Δf=250 kHz, the length of the cancelled portion of s(t) is about 3.7 microseconds or 1,110 meters. This is more than enough to eliminate any residual signal from previous non-zero portions of r(t) due to the multi-path. The main peak has value of approximately 35, and the largest magnitude in the precursor (i.e., cancellation) region is about 0.02, which is 65 dB below the main peak. This is desirable for getting good performance using the TOA measurement thresholded technique as described above.

Figure 6:
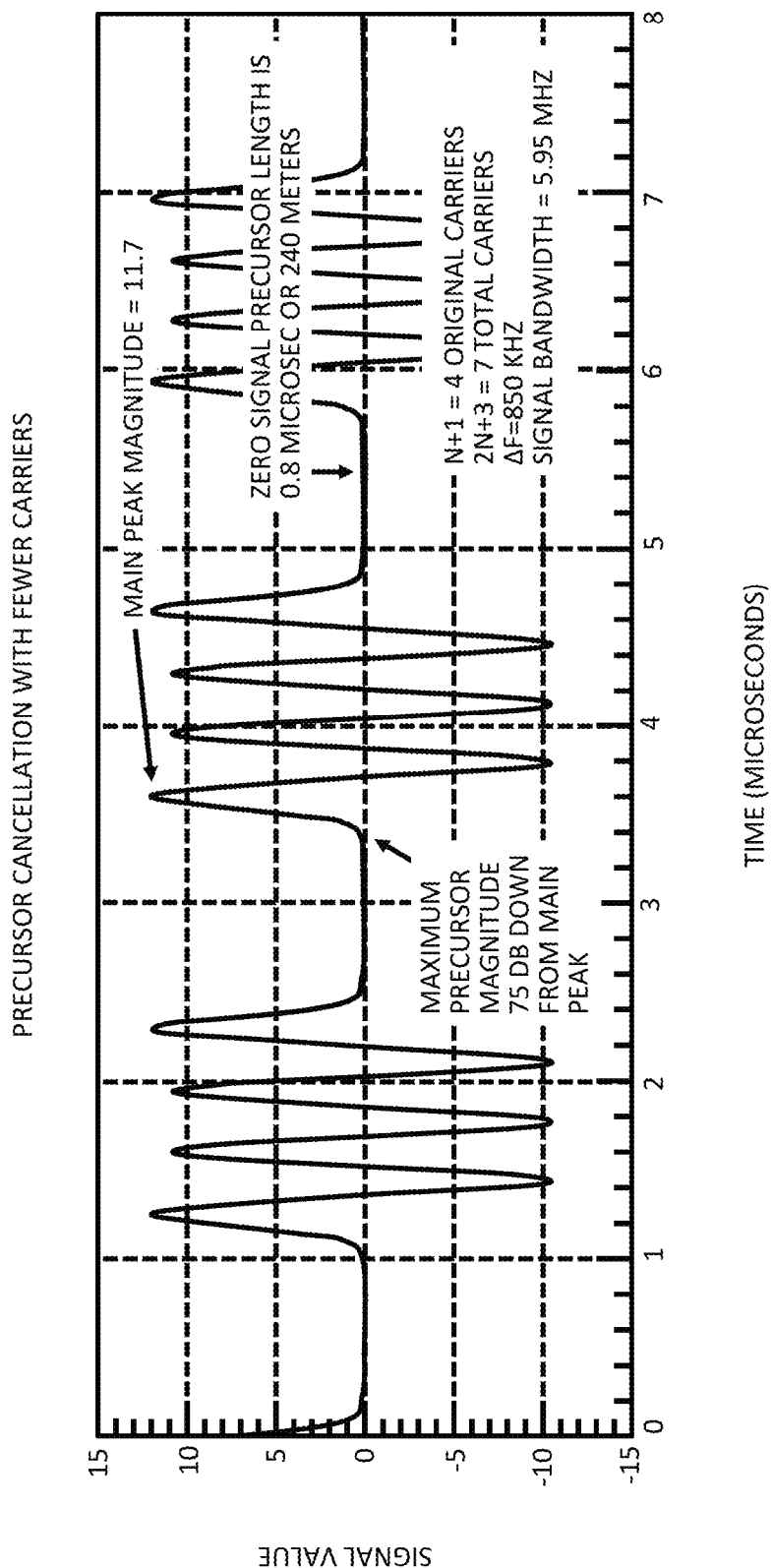
FIG. 6 illustrates precursor cancellation with fewer carriers, in accordance with an embodiment.

Use of fewer carriers is depicted in FIG. 6, which illustrates a signal that is generated using Δf=850 kHz, N=3, and M=2N+1=7, for a total of only 2N+3=9 carriers. In this case, the period of the signal is only 2/Δf≅2.35 microseconds as compared to the signal in FIG. 5, where the period is 8 microseconds. Since this example has more periods per unit time, one might expect that more processing gain could be achieved.

However, since fewer carriers are used, the amplitude of the main peak is about ⅓ as large as before, which tends to cancel the expected extra processing gain. Also, the length of the zero-signal precursor segments is shorter, about 0.8 microseconds or 240 meters. This should still be enough to eliminate any residual signal from previous non-zero portions of r(t) due to the multi-path. Note that the total bandwidth of (2N+1)Δf=5.95 MHz is about the same as before, and that the width of the half-cycle of the main peak is also roughly the same. Since fewer carriers are used, there should be some extra processing gain when each carrier is narrowband filtered at the receiver. Moreover, the largest magnitude in the precursor (i.e., cancellation) region is now about 75 dB below the main peak, a 10 dB improvement from the previous example.

Transmission at RF Frequencies: up to this point r(t) has been described as a base-band signal for purposes of simplicity. However, it can be translated up to RF, transmitted, received, and then reconstituted as a base-band signal at the receiver. To illustrate, consider what happens to one of the frequency components $\omega_k$ in the base-band signal r(t) traveling via one of the multi-path propagation paths having index j (radian/sec frequencies are used for notational simplicity):

$b_k \cos \omega_k t$ (at baseband in transmitter)

$b_k \cos(\omega+\omega_k)t$ (translated by frequency $\omega$ up to RF)

$a_j b_k \cos [(\omega+\omega_k)(t-\tau_j)+\phi_j]$ (at receiver antenna)

$a_j b_k \cos [\omega_k(t-\tau_j)+\phi_j+\theta]$ (translated by frequency $-\omega$ to baseband) (23)

It is assumed here that the transmitter and receiver are frequency synchronized. The parameter $b_k$ is the $k^{th}$ coefficient in expression (21) for r(t). The parameters $\tau_j$ and $\phi_j$ are respectively the path delay and phase shift (due to dielectric properties of a reflector) of the $j^{th}$ propagation path. The parameter $\theta$ is the phase shift occurring in the down-conversion to base-band in the receiver. A similar sequence of functions can be presented for the sine component of the equation (21).

It is important to note that as long as the zero-signal precursors in r(t) have length sufficiently larger than the largest significant propagation delay, the final base-band signal in the equation (20) will still have zero-signal precursors. Of course, when all frequency components (index k) over all paths (index j) are combined, the base-band signal at the receiver will be a distorted version of r(t), including all phase shifts.

Sequential Carrier Transmissions and Signal Reconstruction are illustrated in FIG. 1 and FIG. 1A. It is assumed that the transmitter and the receiver are time and frequency synchronized, the 2N+3 transmitted carriers need not be transmitted simultaneously. As an example, consider the transmission of the signal whose base-band representation is that of FIG. 1A and FIG. 6.

In FIG. 6, N=3, and suppose each of the 9 frequency components for 1 millisecond are sequentially transmitted. The start and the end times for each frequency transmission are known at the receiver, so it can sequentially start and end its reception of each frequency component at those respective times. Since the signal propagation time is very short compared to 1 millisecond (it will normally be less than several microseconds in the intended application), a small portion of each received frequency component should be ignored, and the receiver can easily blank it out.

The entire process of receiving 9 frequency components can be repeated in 9-millisecond blocks of additional reception to increase the processing gain. In one second of total reception time there would be about 111 such 9-millisecond blocks available for processing gain. Additionally, within each block there would be additional processing gain available from $0.009/(2/\Delta f) \cong 383$ main peaks.

It is worth noting that in general the signal reconstruction can be made very economical, and will inherently permit all possible processing gain. For each of the 2N+3 received frequencies:

1. Measure the phase and amplitude of each 1-millisecond reception of that frequency to form a sequence of stored vectors (phasors) corresponding to that frequency.
2. Average the stored vectors for that frequency.
3. Finally, use the 2N+3 vector averages for the 2N+3 frequencies to reconstruct 1 period of base-band signal having duration $2/\Delta f$, and use the reconstruction to estimate signal TOA.

This method is not restricted to 1-millisecond transmissions, and the length of the transmissions may be increased or decreased. However, the total time for all transmissions should be short enough to freeze any motion of the receiver or transmitter.

Obtaining Cancellation on Alternate Half-Cycles of r(t): by simply reversing the polarity of the canceling function g(t), cancellation between the peaks of s(t) is possible where r(t) was formerly oscillatory. However, to obtain cancellation between all peaks of s(t), the function g(t) and its polarity reversed version must be applied at the receiver, and this involves coefficient weighting at the receiver.

Coefficient Weighting at the Receiver: if desired, the coefficients $b_k$ in the equation (21) are used for construction of r(t) at the transmitter and may be introduced at the receiver instead. This is easily seen by considering the sequence of signals in the equation (20) in which the final signal is the same if $b_k$ is introduced at the last step instead of at the beginning. Ignoring noise, the values are as follows:

$\cos \omega_k t$ (at baseband in transmitter)

$\cos(\omega+\omega_k)t$ (translated by frequency $\omega$ up to RF)

$a_j \cos [(\omega+\omega_k)(t-\tau_j)+\phi_j]$ (at receiver antenna)

$a_j \cos [\omega_k(t-\tau_j)+\phi_j+\theta]$ (translated by frequency $-\omega$ to baseband)

$a_j b_k \cos[\omega_k(t-\tau_j)+\phi_j+\theta]$ (weighted by coefficient $b_k$ at baseband)

The transmitter can then transmit all frequencies with the same amplitude, which simplifies its design. It should be noted, that this method also weights the noise at each frequency, the effect of which should be considered. It should also be noted that coefficient weighting should be done at the receiver in order to effect the polarity reversal of g(t) to get twice as many useable main peaks.

Scaling of $\Delta f$ to Center Frequencies in Channels: to meet the FCC requirements at the VHF or lower frequencies a channelized transmission with constant channel spacing will be required. In a channelized transmission band with constant channel spacing that is small compared to the total allocated band, which is the case for the VHF and lower frequencies band(s), small adjustments to $\Delta f$, if necessary, permit all transmitted frequencies to be at channel centers without materially changing performance from original design values. In the two examples of base-band signals previously presented, all frequency components are multiples of $\Delta f/2$, so if the channel spacing divides $\Delta f/2$, the lowest RF transmitted frequency can be centered in one channel and all other frequencies fall at the center of channels.

In some Radio Frequency (RF)-based identification, tracking and locating systems in addition to performing the distance measurement function, both: the Master Unit and the Tag Unit also perform voice, data and control communication functions. Similarly, in an embodiment both the Master Unit and the Tag perform voice, data and control communication functions in addition to the distance measurement function.

According to an embodiment, the ranging signal(s) are subject to the extensive sophisticated signal processing techniques, including the multi-path mitigation. However, these techniques may not lend themselves to the voice, data and control signals. As a result, the operating range of the proposed system (as well as other existing systems) may be limited not by its ability to measure distance reliably and accurately, but by being out of range during voice and/or data and/or control communications.

In other Radio Frequency (RF)-based identification, tracking and locating systems the distance measurement functionality is separated from the voice, data and control communication functionality. In these systems separate RF Transceivers are used to perform voice, data and control communication functions. The drawback of this approach is system increased cost, complexity, size, etc.

To avoid abovementioned drawbacks, in an embodiment, a narrow bandwidth ranging signal or base-band narrow bandwidth ranging signal several individual frequency components are modulated with the identical data/control signals and in case of voice with digitized voice packets data. At the receiver the individual frequency components that have the highest signal strength are demodulated and the obtained information reliability may be further enhanced by performing "voting" or other signal processing techniques that utilize the information redundancy.

This method allows to avoid the "null" phenomena, wherein the incoming RF signals from multiple paths are destructively combining with the DLOS path and each other, thus significantly reducing the received signal strength and associated with it SNR. Moreover, such method allows to find a set of frequencies at which the incoming signals from multiple paths are constructively combining with DLOS path and each other, thus increasing the received signal strength and associated with it SNR.

As mentioned earlier, spectrum estimation-based super-resolution algorithms generally use the same model: a linear combination of complex exponentials and their complex amplitudes of frequencies. This complex amplitude is given by equation 3 above.

All spectrum estimation-based super-resolution algorithms require a priori knowledge of number of complex exponentials, i.e., the number of multipath paths. This number of complex exponentials is called the model size and is determined by the number of multi-path components L as shown in equations 1-3. However, when estimating path delay, which is the case for RF track-locate applications, this information is not available. This adds another dimension, i.e., the model size estimation, to the spectrum estimation process via super-resolution algorithms.

It has been shown (Kei Sakaguchi et al., Influence of the Model Order Estimation Error in the ESPRIT Based High Resolution Techniques) that in case of model size underestimation the accuracy of frequency estimation is impacted and when the model size is overestimated the algorithm generates spurious, e.g., non-existent, frequencies. Existing methods of model size estimation such as AIC (Akaikes Information Criterion), MDL (Minimum Description Length), etc. have a high sensitivity to correlation between signals (complex exponentials). But in the case of RF multipath, this is always the case. Even, for example, after Forward-Backward smoothing algorithms are applied, there will always be a residual amount of correlation.

In the Sakaguchi paper, it is suggested to use an overestimated model and differentiating actual frequencies (signals) from spurious frequencies (signals) by estimating these signals power (amplitude) and then rejecting the signals with very low power. Although this method is an improvement over existing methods, it is not guaranteed. The inventors implemented the Kei Sakaguchi et al. method and ran simulations for more complex cases with a larger model size. It was observed that, in some cases, a spurious signal may have amplitude that is very close to actual signals amplitude.

All spectrum estimation-based super-resolution algorithms work by splitting the incoming signal complex amplitude data into two sub-spaces: the noise sub-space and signals sub-space. If these sub-spaces are properly defined (separated), then the model size is equal to the signal sub-space size (dimension).

In one embodiment, the model size estimation is accomplished using an "F" statistic. For example, for ESPRIT algorithm, the singular value decomposition of the estimate of the covariance matrix (with forward/backward correlation smoothing) is ordered in ascending order. Thereafter, a division is made whereby the (n+1) eigenvalue is divided by the n-th eigenvalue. This ratio is an "F" random variable. The worst case is an "F" random variable of (1,1) degree of freedom. The 95% confidence interval for a "F" random variable with (1,1) degrees of freedom is 161. Setting that value as a threshold determines the model size. Note also that for the noise subspace, the eigenvalues represent an estimate of the noise power.

This method of applying "F" statistics to the ratio of the eigenvalues is a more accurate method of estimating the model size. It should be noted that other degrees of freedom in "F" statistics can be also used for threshold calculation and consequently model size estimation.

Nevertheless, in some cases, two or more very closely spaced (in time) signals can degenerate into one signal because of real-world measurement imperfections. As a result, the above mentioned method will underestimate the number of signals, i.e., the model size. Since model size underestimation reduces the frequency estimation accuracy, it is prudent to increase the model size by adding a certain number. This number can be determined experimentally and/or from simulations. However, when signals are not closely spaced, the model size will be overestimated.

In such cases spurious, i.e., non-existent, frequencies may appear. As noted earlier, using signal amplitude for spurious signals detection does not always work because in some cases a spurious signal(s) was observed to have amplitude that is very close to actual signal(s) amplitude. Therefore, in addition to the amplitude discrimination, filters can be implemented to improve spurious frequencies elimination probability.

The frequencies that are estimated by super-resolution algorithms are artificial frequencies (equation 2). In fact, these frequencies are individual paths delays of the multipath environment. As a result, there should be no negative frequencies and all negative frequencies that are produced by a super-resolution algorithm are spurious frequencies to be rejected.

Furthermore, a DLOS distance range can be estimated from the complex amplitude $\hat{A}(f_n)$ values obtained during measurements using methods that are different from super-resolution methods. While these methods have lower accuracy, this approach establishes range that is used to discriminate delays, i.e., frequencies. For example, the ratio of $$\frac{\Delta[\angle \hat{A}(2\pi\Delta f)]}{2\pi\Delta f}$$

in $\Delta f$ intervals where the signal amplitude $|\hat{A}(f_n)|$ is close to maximum, i.e., avoiding nulls, provides a DLOS delay range. Although actual DLOS delay can be up to two times larger or smaller, this defines a range that helps to reject spurious results.

In the embodiment, the ranging signal makes a round-trip. In other words, it travels both ways: from a master/reader to a target/slave and from the target/slave back to the master/reader:

Master transmits a tone: $\alpha x e^{-j\omega t}$, where $\omega$ is an operating frequency in the operating band and $\alpha$ is the tone signal amplitude.

At the target's receiver, the received signal (one-way) is as follows:

$$S_{one-way}(t) = \alpha \times \sum_{m=0}^{m=N} K_m \times e^{-j\omega t} \times e^{-j\omega \tau_m} \quad (25)$$

Where: N is number of signal paths in the multipath environment; K0 and $\tau_0$ are amplitude and time-of-flight of the DLOS signal; $|K_0|=1$, $K_0>0$, $|K_{m\neq 0}|\leq 1$ and $K_{m\neq 0}$ can be positive or negative.

$$S_{one-way}(t) = \alpha x e^{-j\omega t} \times A(\omega) \times e^{-j\theta(\omega)} \quad (26)$$

Where:

$$A(\omega) \times e^{-j\theta(\omega)} = \sum_{m=0}^{m=N} K_m \times e^{-j\omega \tau_m}$$

is one-way multipath RF channel transfer function in the frequency domain; and $A(\omega) \geq 0$.

Target retransmits the received signal:

$$S_{retransmit}(t) = \alpha x e^{-j\omega t} \times A(\omega) \times e^{-j\theta(\omega)} \quad (27)$$

At the master receiver, the round-trip signal is:

$$S_{round\_trip}(t) = \alpha \times e^{-j\omega t} \times A(\omega) \times e^{-j\theta(\omega)} \times \sum_{m=0}^{m=N} K_m \times e^{-j\omega \tau_m} \quad (28)$$

Or:

$$S_{round\_trip}(t) = \alpha \times e^{-j\omega t} \times A^2(\omega) \times e^{-j2\theta(\omega)}$$

On the other hand from equations (26) and (28):

$$S_{round\_trip}(t) = \alpha \times e^{-j\omega t} \times A^2(\omega) \times \left(\sum_{m=0}^{m=N} K_m \times e^{-j\omega \tau_m}\right)^2 \quad (29)$$

Where:

$$A^2(\omega) \times \left(\sum_{m=0}^{m=N} K_m \times e^{-j\omega \tau_m}\right)^2 = A^2(\omega) \times e^{-j2\theta(\omega)}$$

is roundtrip multipath RF channel transfer function in the frequency domain.

From equation 29, the roundtrip multipath channel has a larger number of paths than one-way channel multipath because the $$\left(\sum_{m=0}^{m=N} K_m \times e^{-j\omega \tau_m}\right)^2$$

expression in addition to the $\tau_0 \div \tau_N$ paths delays, includes combinations of these paths delays, for example: $\tau_0+\tau_1$, $\tau_0+\tau_2 \ldots, \tau_1+\tau_2, \tau_1+\tau_3, \ldots$, etc.

These combinations dramatically increase the number of signals (complex exponentials). Hence the probability of very closely spaced (in time) signals will also increase and may lead to significant model size underestimation. Thus, it is desirable to obtain one-way multipath RF channel transfer function.

In an embodiment, the one-way amplitude values $|\hat{A}(f_n)|$ are directly obtainable from target/slave device. However, the one-way phase values $\angle \hat{A}(f_n)$ cannot be measured directly. It is possible to determine the phase of the one-way from the roundtrip phase measurements observation:

$$\left(\sum_{m=0}^{m=N} K_m \times e^{-j\omega \tau_m}\right)^2 = e^{-j2\theta(\omega)} \text{ and } \left(\sum_{m=0}^{m=N} K_m \times e^{-j\omega \tau_m}\right) = e^{-j\theta(\omega)}$$

However, for each value of $\omega$, there are two values of phase $\alpha(\omega)$ such that $$e^{j2\alpha(\omega)} = e^{j\beta(\omega)}$$

A detailed description of resolving this ambiguity is shown below. If the ranging signal different frequency components are close to each other, then for most part the one-way phase can be found by dividing the roundtrip phase by two. Exceptions will include the areas that are close to the "null", where the phase can undergo a significant change even with small frequency step. Note: the "null" phenomena is where the incoming RF signals from multiple paths are destructively combining with the DLOS path and each other, thus significantly reducing the received signal strength and associated with it SNR.

Let h(t) be the one-way impulse response of a communications channel. The corresponding transfer function in the frequency domain is $$H(\omega) = \int_{-\infty}^{\infty} h(t)e^{-j\omega t}dt = A(\omega)e^{j\alpha(\omega)} \quad (30)$$

where $A(\omega) \geq 0$ is the magnitude and $\alpha(\omega)$ is the phase of the transfer function. If the one-way impulse response is retransmitted back through the same channel as it is being received, the resulting two-way transfer function is $$G(\omega) = B(\omega)e^{j\beta(\omega)} = H^2(\omega) = A^2(\omega)e^{j2\alpha(\omega)} \quad (31)$$

where $B(\omega) \geq 0$. Suppose the two-way transfer function $\alpha(\omega)$ is known for all $\omega$ in some open frequency interval ($\omega_1$, $\omega_2$). Is it possible to determine the one-way transfer function $H(\omega)$ defined on ($\omega_1$, $\omega_2$) that produced $G(\omega)$?

Since the magnitude of the two-way transfer function is the square of the one-way magnitude, it is clear that $$A(\omega)=\sqrt{B(\omega)} \quad (32)$$

However, in trying to recover the phase of the one-way transfer function from observation of $G(\omega)$, the situation is more subtle. For each value of $\omega$, there are two values of phase $\alpha(\omega)$ such that $$e^{j2\alpha(\omega)}=e^{j\beta(\omega)} \quad (33)$$

A large number of different solutions might be generated by independently choosing one of two possible phase values for each different frequency $\omega$.

The following theorems, which assume that any one-way transfer function is continuous at all frequencies, help resolve this situation.

Theorem 1: Let I be an open interval of frequencies $\omega$ containing no zeros of the two-way transfer function $G(\omega)=B(\omega)e^{j\beta(\omega)}$. Let $J(\omega)=\sqrt{B(\omega)}e^{j\gamma(\omega)}$ be a continuous function on I where $\beta(\omega)=2\gamma(\omega)$. Then $J(\omega)$ and $-J(\omega)$ are the one-way transfer functions which produce $G(\omega)$ on I, and there are no others.

Proof: One of the solutions for the one-way transfer function is the function $H(\omega)=\sqrt{B(\omega)}e^{j\alpha(\omega)}$, continuous on I since it is differentiable on I, and where $\beta(\omega)=2\alpha(\omega)$. Since $G(\omega)\neq 0$ on I, $H(\omega)$ and $J(\omega)$ are nonzero on I. Then, $$\frac{H(\omega)}{J(\omega)} = \frac{\sqrt{B(\omega)}\, e^{j\alpha(\omega)}}{\sqrt{B(\omega)}\, e^{j\gamma(\omega)}} = e^{j[\alpha(\omega)-\gamma(\omega)]} \quad (34)$$

Since $H(\omega)$ and $J(\omega)$ are continuous and nonzero on I, their ratio is continuous on I, hence the right side of (34) is continuous on I. The conditions $\beta(\omega)=2\alpha(\omega)=2\gamma(\omega)$ imply that for each $\omega\in I$, $\alpha(\omega)-\gamma(\omega)$ is either 0 or $\pi$. However, $\alpha(\omega)-\gamma(\omega)$ cannot switch between these two values without causing a discontinuity on the right side of (34). Thus, either $\alpha(\omega)-\gamma(\omega)=0$ for all $\omega\in I$, or $\alpha(\omega)-\gamma(\omega)=\pi$ for all $\omega\in I$. In the first case, we get $J(\omega)=H(\omega)$, and in the second we get $J(\omega)=-H(\omega)$.

This theorem proves that to get a one-way solution on any open interval I containing no zeros of the transfer function $G(\omega)=B(\omega)e^{j\beta(\omega)}$, we form the function $J(\omega)=(\omega)=\sqrt{\beta(\omega)}e^{j\gamma(\omega)}$, choosing the values of $\gamma(\omega)$ satisfying $\beta(\omega)=2\gamma(\omega)$ in such a way as to make $J(\omega)$ continuous. Since it is known that there is a solution having this property, namely $H(\omega)$, it is always possible to do this.

An alternate procedure for finding a one-way solution is based on the following theorem:

Theorem 2: Let $H(\omega)=A(\omega)e^{j\alpha(\omega)}$ be a one-way transfer function and let I be an open interval of frequencies $\omega$ containing no zeros of $H(\omega)$. Then the phase function $\alpha(\omega)$ of $H(\omega)$ must be continuous on I.

Figure 7:
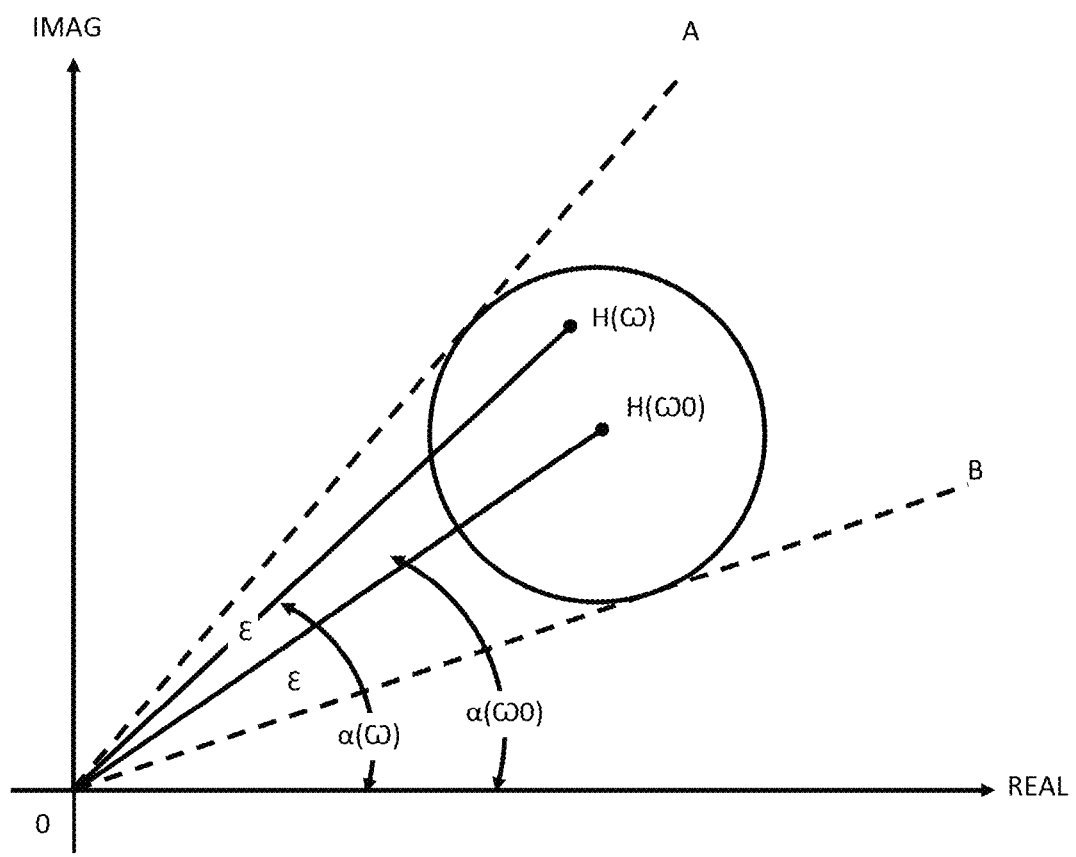
FIG. 7 illustrates an embodiment of one-way transfer function phase.
Figure 8:
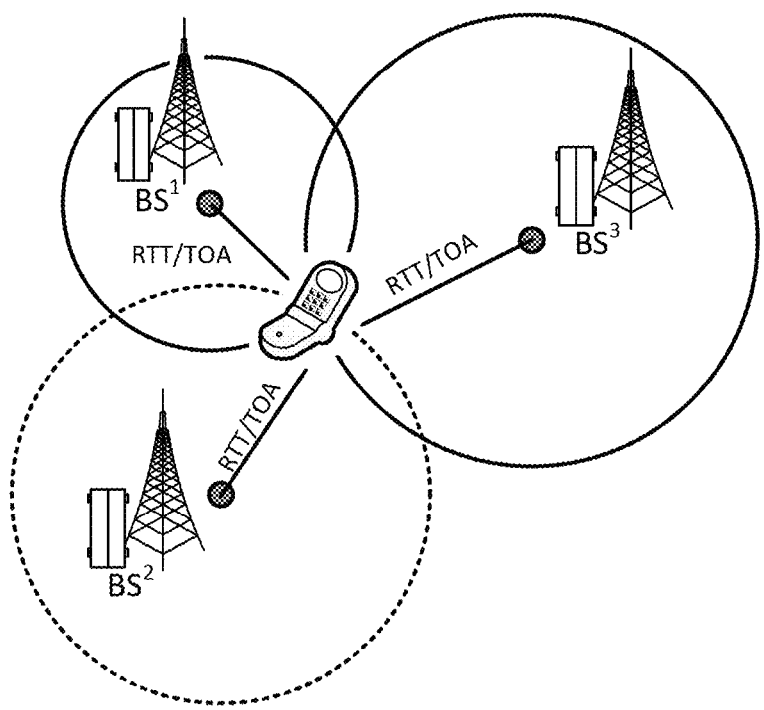
FIG. 8 illustrates an embodiment of a location method.

Proof: Let $\omega_0$ be a frequency in the interval I. In FIG. 7, the complex value $H(\omega_0)$ has been plotted as a point in the complex plane, and by hypothesis, $H(\omega_0)\neq 0$. Let $\varepsilon>0$ be an arbitrarily small real number, and consider the two angles of measure $\varepsilon$ shown in the FIG. 7, as well as the circle centered at $H(\omega_0)$ and tangent to the two rays OA and OB. By assumption, $H(\omega)$ is continuous for all $\omega$. Thus, if $\omega$ is sufficiently close to $\omega_0$, the complex value $H(\omega)$ will lie in the circle, and it is seen that $|\alpha(\omega)-\alpha(\omega_0)|<\varepsilon$. Since $\varepsilon>0$ was chosen arbitrarily, we conclude that $\alpha(\omega)\to\alpha(\omega_0)$ as $\omega\to\omega_0$, so that the phase function $\alpha(\omega)$ is continuous at $\omega_0$.

Theorem 3: Let I be an open interval of frequencies $\omega$ containing no zeros of the two-way transfer function $G(\omega)=B(\omega)e^{j\beta(\omega)}$. Let $J(\omega)=\sqrt{B(\omega)}e^{j\gamma(\omega)}$ be a function on I where $\beta(\omega)=2\gamma(\omega)$ and $\gamma(\omega)$ is continuous on I. Then $J(\omega)$ and $-J(\omega)$ are the one-way transfer functions which produce $G(\omega)$ on I, and there are no others.

Proof: The proof is similar to the proof of Theorem 1. We know that one of the solutions for the one-way transfer function is the function $H(\omega)=\sqrt{B(\omega)}e^{j\alpha(\omega)}$, where $\beta(\omega)=2\alpha(\omega)$. Since $G(\omega)\neq 0$ on I, $H(\omega)$ and $J(\omega)$ are nonzero on I. Then, $$\frac{H(\omega)}{J(\omega)} = \frac{\sqrt{B(\omega)}\, e^{j\alpha(\omega)}}{\sqrt{B(\omega)}\, e^{j\gamma(\omega)}} = e^{j[\alpha(\omega)-\gamma(\omega)]} \quad (35)$$

By hypothesis $\gamma(\omega)$ is continuous on I and by Theorem 2 $\alpha(\omega)$ is also continuous on I. Thus, $\alpha(\omega)-\gamma(\omega)$ is continuous on I. The conditions $\beta(\omega)=2\alpha(\omega)=2\gamma(\omega)$ imply that for each $\omega\in I$, $\alpha(\omega)-\gamma(\omega)$ is either 0 or $\pi$. However, $\alpha(\omega)-\gamma(\omega)$ cannot switch between these two values without becoming discontinuous on I. Thus, either $\alpha(\omega)-\gamma(\omega)=0$ for all $\omega\in I$, or $\alpha(\omega)-\gamma(\omega)=\pi$ for all $\omega\in I$. In the first case, we get $J(\omega)=H(\omega)$, and in the second $J(\omega)=-H(\omega)$.

Theorem 3 tells us that to get a one-way solution on any open interval I containing no zeros of the transfer function $G(\omega)=B(\omega)e^{j\beta(\omega)}$, we simply form the function $J(\omega)=\sqrt{B(\omega)}e^{j\gamma(\omega)}$, choosing the values of $\gamma(\omega)$ satisfying $\beta(\omega)=2\gamma(\omega)$ in such a way as to make the phase function $\gamma(\omega)$ continuous. Since it is known that there is a solution having this property, namely $H(\omega)$, it is always possible to do this.

Although the above theorems show how to reconstruct the two one-way transfer functions which generate the two-way function $G(\omega)$, they are useful only on a frequency interval I containing no zeros of $G(\omega)$. In general, $G(\omega)$ will be observed on a frequency interval $(\omega_1, \omega_2)$ which may contain zeros. The following is a method that might get around this problem, assuming that there are only a finite number of zeros of $G(\omega)$ in $(\omega_1, \omega_2)$, and that a one-way transfer function has derivatives of all orders on $(\omega_1,\omega_2)$, not all of which are zero at any given frequency $\omega$:

Let $H(\omega)$ be a one-way function that generates $G(\omega)$ on the interval $(\omega_1,\omega_2)$ and assume that $G(\omega)$ has at least one zero on $(\omega_1,\omega_2)$. The zeros of $G(\omega)$ will separate $(\omega_1,\omega_2)$ into a finite number of abutting open frequency intervals $J_1$, $J_2$, ..., $J_n$. On each such interval the solution or $H(\omega)$ or $-H(\omega)$ will be found using either Theorem 1 or Theorem 3. We need to "stitch together" these solutions so that the stitched solution is either $H(\omega)$ or $-H(\omega)$ across all of $(\omega_1,\omega_2)$. In order to do this, we need to know how to pair the solutions in two adjacent subintervals so that we aren't switching from $H(\omega)$ to $-H(\omega)$ or from $-H(\omega)$ to $H(\omega)$ in moving from one subinterval to the next.

We illustrate the stitching procedure starting with the first two adjacent open subintervals $J_1$ and $J_2$. These subintervals will abut at a frequency $\omega_1$ which is a zero of $G(\omega)$ (of course, $\omega_1$ is not contained in either subinterval). By our above assumption about the properties of a one-way transfer function, there must be a minimum positive integer n such that $H^{(n)}(\omega_1)\neq 0$, where the superscript (n) denotes the $n^{th}$ derivative. Then the limit of the $n^{th}$ derivative of our one-way solution in $J_1$ as $\omega\to\omega_1$ from the left will be either $H^{(n)}(\omega_1)$ or $-H^{(n)}(\omega_1)$ according to whether our solution in $J_1$ is $H(\omega)$ or $-H(\omega)$. Similarly, the limit of the $n^{th}$ derivative of our one-way solution in $J_2$ as $\omega\to\omega_1$ from the right will be either $H^{(n)}(\omega_1)$ or $-H^{(n)}(\omega_1)$ according to whether our solution in $J_2$ is $H(\omega)$ or $-H(\omega)$. Since $H^{(n)}(\omega_1)\neq 0$, the two limits will be equal if and only if the solutions in $J_1$ and $J_2$ are both $H(\omega)$ or both $-H(\omega)$. If the left and right hand limits are unequal, we invert the solution in subinterval $J_2$. Otherwise, we don't.

After inverting the solution in subinterval $J_2$ (if necessary), we perform an identical procedure for subintervals $J_2$ and $J_3$, inverting the solution in subinterval $J_3$ (if necessary). Continuing in this fashion, we eventually build up a complete solution on the interval $(\omega_1, \omega_2)$.

It would be desirable that high-order derivatives of $H(\omega)$ not be required in the above reconstruction procedure, since they are difficult to compute accurately in the presence of noise. This problem is unlikely to occur, because at any zero of $G(\omega)$ it seems very likely that the first derivative of $H(\omega)$ will be nonzero, and if not, very likely that the second derivative will be nonzero.

In a practical scheme, the two-way transfer function $G(\omega)$ will be measured at discrete frequencies, which must be close enough together to enable reasonably accurate computation of derivatives near the zeros of $G(\omega)$.

For RF-based distance measurements it is necessary to resolve an unknown number of closely spaced, overlapping, and noisy echoes of a ranging signal with a priori known shape. Assuming that ranging signal is a narrow-band, in frequency domain this RF phenomena can be described (modeled) as a sum of a number of sine waves, each per multipath component, and each with the complex attenuation and propagation delay of the path.

Taking the Fourier transform of the above mentioned sum will express this multipath model in the time domain. Exchanging the role of time and frequency variables in this time domain expression, this multipath model will become harmonic signals spectrum in which the propagation delay of the path is transformed to a harmonic signal.

The super (high) resolution spectral estimation methods are designed to distinguish closely-placed frequencies in the spectrum and used for estimating the individual frequencies of multiple harmonic signals, e.g., paths delays. As a result, path delays can be accurately estimated.

The super resolution spectral estimation makes use of the eigen-structure of the covariance matrix of the baseband ranging signal samples and covariance matrix intrinsic properties to provide a solution to an underlying estimation of individual frequencies, e.g. paths delays. One of the eigen-structure properties is that the eigenvalues can be combined and consequently divided into orthogonal noise and signal eigenvectors, aka subspaces. Another eigen-structure property is the rotation-invariant signal subspaces property.

The subspace decomposition technology (MUSIC, root-MUSIC, ESPRIT, etc.) relies on breaking the estimated covariance matrix of the observed data into two orthogonal subspaces, the noise subspace and the signal subspace. The theory behind the subspace decomposition methodology is that the projection of the observable onto the noise subspace consists of only the noise and the projection of the observable onto the signal subspace consists of only the signal.

The spectral estimation methods assume that signals are narrow-band, and the number of harmonic signals is also known, i.e., the size of the signal subspace needs to be known. The size of the signal subspace is called as the model size. In general, it cannot be known in any detail and can change rapidly—particularly indoors—as the environment changes. One of the most difficult and subtle issues when applying any subspace decomposition algorithm is the dimension of the signal subspace that can be taken as the number of frequency components present, and which is the number multipath reflections plus the direct path. Because of real-world measurement imperfections there always will be an error in the model size estimation, which in turn will result in loss of accuracy of frequencies estimation, i.e., distances.

To improve the distance measurement accuracy, one embodiment includes six features that advance the state of the art in the methodology of subspace decomposition high resolution estimation. Included is combining two or more algorithms estimating individual frequencies by using different eigen-structure properties that further reduces the delay path determination ambiguity.

Root Music finds the individual frequencies, that when the observable is projected onto the noise subspace, minimizes the energy of the projection. The Esprit algorithm determines the individual frequencies from the rotation operator. And in many respects this operation is the conjugate of Music in that it finds the frequencies that, when the observable is projected onto the signal subspace, maximizes the energy of the projection.

The model size is the key to both of these algorithms, and in practice, in a complex signal environment such as seen in indoor ranging—the model size which provides the best performance for Music and Esprit are in general not equal, for reasons that will be discussed below.

For Music it is preferable to err on the side of identifying a basis element of the decomposition as a "signal eigen value" (Type I Error). This will minimize the amount of signal energy that is projected on the noise subspace and improve the accuracy. For Esprit—the opposite is true—it is preferable to err on the side of identifying a basis element of the decomposition as a "noise eigenvalue." This is again a Type I Error. This will minimize the impact of noise on the energy projected onto the signal subspace. Therefore, the model size for Music will, in general, be somewhat larger than that for Esprit.

Secondly, in a complex signal environment, there arise occasions where, with the strong reflections and the potential that the direct path is in fact much weaker than some of the multipath reflections, the model size is difficult to estimate with sufficient statistical reliability. This issue is addressed by estimating a "base" model size for both Music and Esprit and the processing the observable data using Music and Esprit in a window of model sizes defined by the base model size for each. This results in multiple measurements for each measurement.

The first feature of the embodiment is the use of the F-statistic to estimate the model size (see above). The second feature is the use of different Type I Error probabilities in the F-statistic for Music and Esprit. This implements the Type I Error differences between Music and Esprit as discussed above. The third feature is the use of a base model size and a window in order to maximize the probability of detecting the direct path.

Because of the potentially rapidly changing physical and electronic environment, not every measurement will provide robust answers. This is addressed by using cluster analysis on multiple measurements to provide a robust range estimate. The fourth feature of the embodiment is the use of multiple measurements.

Because there are multiple signals present, the probability distribution of the multiple answers resulting from multiple measurements, each using multiple model sizes from both a Music and Esprit implementation, will be multimodal. Conventional cluster analysis will not be sufficient for this application. The fifth feature is the development of multi-modal cluster analysis to estimate the direct range and equivalent range of the reflected multipath components. The sixth feature is the analysis of the statistics of the range estimates provided by the cluster analysis (range and standard deviation and combing those estimates that are statistically identical. This results in a more accurate range estimate.

The abovementioned methods can be also used in wide bandwidth ranging signal location-finding systems.

For the derivation of r(t) in the thresholded method, starting with expression (20), we obtain $$g(t) = \left(a_0 + \sum_{k=1}^{M} a_k \sin k\pi\Delta ft\right) \sin \pi(2N+1)\Delta ft \quad (A1)$$

$$= a_0 \sin \pi(2N+1)\Delta ft +$$

$$\sum_{k=1}^{M} a_k \sin \pi(2N+1)\Delta ft \sin k\pi\Delta ft$$

$$= a_0 \sin \pi(2N+1)\Delta ft +$$

$$\sum_{k=1}^{M} \frac{1}{2} a_k \cos \pi(2N+1-k)\Delta ft -$$

$$\sum_{k=1}^{M} \frac{1}{2} a_k \cos \pi(2N+1+k)\Delta ft$$

$$= a_0 \sin 2\pi\left(N+\frac{1}{2}\right)\Delta ft +$$

$$\sum_{k=1}^{M} \frac{1}{2} a_k \cos 2\pi\left(N+\frac{1}{2}-\frac{k}{2}\right)\Delta ft -$$

$$\sum_{k=1}^{M} \frac{1}{2} a_k \cos 2\pi\left(N+\frac{1}{2}+\frac{k}{2}\right)\Delta ft$$

where the trigonometric identity sin x sin y=½ cos (x−y)−½ cos(x+y) is used.

Except for $a_0$, the coefficients $a_k$ are zero for even k. The reason for this is that on the interval I, the function $1/\sin \pi\Delta ft$ that we are trying to approximate by h(t) is even about the center of I, but the basis functions $\sin k\pi\Delta ft$ for even k, k≠0, are odd about the center of I, hence are orthogonal to $1/\sin \pi\Delta ft$ on I. Thus, we can make the substitution k=2n+1 and let M be an odd positive integer. In fact, we will let M=2N+1. This choice has been experimentally determined to provide a good amount of cancellation of the oscillations in the interval I.

$$g(t) = a_0 \sin 2\pi\left(N+\frac{1}{2}\right)\Delta ft + \quad (A2)$$

$$\sum_{n=0}^{N} \frac{1}{2} a_{2n+1} \cos 2\pi(N-n)\Delta ft - \sum_{n=0}^{N} \frac{1}{2} a_{2n+1} \cos 2\pi(N+n+1)\Delta ft$$

Now we make the substitution k=N−n in the first summation and k=N+n+1 in the second summation to obtain $$g(t) = a_0 \sin 2\pi\left(N+\frac{1}{2}\right)\Delta ft + \sum_{k=0}^{N} \frac{1}{2} a_{2(N-k)+1} \cos 2\pi k\Delta ft - \quad (A3)$$

$$\sum_{k=N+1}^{2N+1} \frac{1}{2} a_{2(k-N)-1} \cos 2\pi k\Delta ft = a_0 \sin 2\pi\left(N+\frac{1}{2}\right)\Delta ft + \frac{1}{2} a_{2N+1} +$$

-continued $$\sum_{k=1}^{N} \frac{1}{2} a_{2(N-k)+1} \cos 2\pi k\Delta ft - \sum_{k=N+1}^{2N+1} \frac{1}{2} a_{2(k-N)-1} \cos 2\pi k\Delta ft$$

Subtracting g(t) from s(t) results in $$r(t) = s(t) - g(t) \quad (A4)$$

$$= 1 + 2\sum_{k=1}^{N} \cos 2\pi k\Delta ft -$$

$$\frac{1}{2} a_{2N+1} - \sum_{k=1}^{N} \frac{1}{2} a_{2(N-k)+1} \cos 2\pi k\Delta ft +$$

$$\sum_{k=N+1}^{2N+1} \frac{1}{2} a_{2(k-N)-1} \cos 2\pi k\Delta ft - a_0 \sin 2\pi\left(N+\frac{1}{2}\right)\Delta ft$$

Now let $b_0 = 1 - \frac{1}{2} a_{2N+1}$ $b_k = 2 - \frac{1}{2} a_{2(N-k)+1}$ for k=1,2,...,N $b_k = \frac{1}{2} a_{2(k-N)-1}$ for k=N+1,N+2,...,2N+1

$c = -a_0 \quad (A5)$

Then (A4) can be written as $$r(t) = b_0 + \sum_{k=1}^{2N+1} b_k \cos 2\pi k\Delta ft + c \sin 2\pi\left(N+\frac{1}{2}\right)\Delta ft \quad (A6)$$

The present embodiments relate to a positioning/locating method in wireless communication and other wireless networks that substantially obviate one or more of the disadvantages of the related art. The present embodiments advantageously improve the accuracy of tracking and locating functionality in multiple types of wireless network by utilizing multi-path mitigation processes, techniques and algorithms, described in U.S. Pat. No. 7,872,583, These wireless networks include Wireless Personal Area Networks (WP-GAN) such as ZigBee and Blue Tooth, wireless local area network (WLAN) such as WiFi and UWB, Wireless Metropolitan Area Networks, (WMAN) typically consisting of multiple WLANs, WiMax being the primary example, wireless Wide Area Networks (WAN) such as White Space TV Bands, and Mobile Devices Networks (MDN) that are typically used to transmit voice and data. MDNs are typically based on Global System for Mobile Communications (GSM) and Personal Communications Service (PCS) standards. A more recent MDN is based on the Long Term Evolution (LTE) standard. These wireless networks are typically comprised of a combination of devices, including base stations, desktop, tablet and laptop computers, handsets, smartphones, actuators, dedicated tags, sensors as well as other communication and data devices (generally, all these devices are referred to as "wireless network devices").

Existing location and positioning information solutions use multiple technologies and networks, including GPS, AGPS, Cell Phone Tower Triangulation, and Wi-Fi. Some of the methods used to derive this location information include RF Fingerprinting, RSSI, and TDOA. Although acceptable for the current E911 requirements, existing location and ranging methods do not have the reliability and accuracy required to support the upcoming E911 requirements as well as LBS and/or RTLS applications requirements, especially indoors and urban environments.

Figure 10:
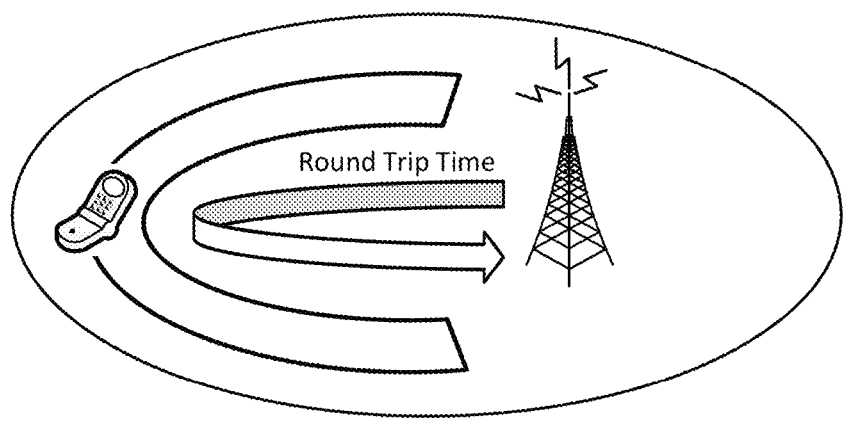
FIG. 10 illustrates an embodiment of an enhanced Cell ID+RTT locating technique.

The methods described in U.S. Pat. No. 7,872,583 significantly improve the ability to accurately locate and track targeted devices within a single wireless network or a combination of multiple wireless networks. The embodiment is a significant improvement to the existing implementation of tracking and location methods used by wireless networks that use Enhanced Cell-ID and OTDOA (Observed Time Difference of Arrival), including DL-OTDOA (Downlink OTDOA), U-TDOA, UL-TDOA and others Cell ID location technique allows estimating the position of the user (UE—User Equipment) with the accuracy of the particular sector coverage area. Thus, the attainable accuracy depends on the cell (base station) sectoring scheme and antenna beam-width. In order to improve accuracy the Enhanced Cell ID technique adds RTT (Round Trip Time) measurements from the eNB. Note: Here, the RTT constitutes the difference between transmission of a downlink DPCH-Dedicated Physical Channel, (DPDCH)/DPCCH: Dedicated Physical Data Channel/Dedicated Physical Control Channel) frame and the beginning of a corresponding uplink physical frame. In this instance the abovementioned frame(s) act as a ranging signal. Based on the information of how long this signal propagates from eNB to the UE, the distance from eNB can be calculated (see FIG. 10).

In the Observed Time Difference of Arrival (OTDOA) technique the time of arrival of the signal coming from neighboring base stations (eNB) is calculated. The UE position can be estimated in the handset (UE-based method) or in the network (NT-based, UE-assisted method) once the signals from three base stations are received. The measured signal is the CPICH (Common Pilot Channel). The propagation time of signals is correlated with a locally generated replica. The peak of correlation indicates the observed time of propagation of the measured signal. Time difference of arrival values between two base stations determines a hyperbola. At least three reference points are needed to define two hyperbolas. The location of the UE is in the intersection of these two hyperbolas (see FIG. 11).

Idle Period Downlink (IPDL) is further OTDOA enhancement. The OTDOA-IPDL technique is based on the same measurements as the regular OTDOA Time measurements are taken during idle periods, in which serving eNB ceases its transmissions and allows the UE within the coverage of this cell to hear pilots coming from distant eNB(s). Serving eNB provides idle periods in continuous or burst mode. In the continuous mode, one idle period is inserted in every downlink physical frame (10 ms). In the burst mode, idle periods occur in a pseudo-random way. Further improvement is obtained via Time Aligned IPDL (TA-IPDL). Time alignment creates a common idle period, during which, each base station will either cease its transmission or transmit the common pilot. The pilot signal measurements will occur in idle period. There are several other techniques that may further enhance the DL OTDOA-IPDL method, for example Cumulative Virtual Blanking, UTDOA (Uplink TDOA), etc. All these techniques improve the ability to hear other (non-serving) eNB(s).

One significant drawback of the OTDOA based techniques is that the base stations timing relationships must be known, or measured (synchronized), for this method to be viable. For unsynchronized UMTS networks the 3GPP standard offers suggestion of how this timing may be recovered. However, networks operators are not implementing such solution. As a result, an alternative that uses the RTT measurements in lieu of the CPICH signal measurements was proposed (see U.S. Patent Publication No. 20080285505, John Carlson et al., SYSTEM AND METHOD FOR NETWORK TIMING RECOVERY IN COMMUNICATIONS NETWORKS).

All abovementioned methods/techniques are based on the terrestrial signals time of arrival and/or time difference of arrival measurements (RTT, CPICH, etc.). An issue with such measurements is that these are severely impacted by the multi-path. This, in turn, significantly degrades the abovementioned methods/techniques locate/track accuracy (see Jakub Marek Borkowski: Performance of Cell ID+RTT Hybrid Positioning Method for UMTS).

One Multi-path mitigation technique uses detections/measurements from excess number of eNB(s) or Radio Base Stations (RBS). The minimum is three, but for multipath mitigation the number of RBS's required is at least six to eight (see METHOD AND ARRANGEMENT FOR DL-OTDOA (DOWNLINK OBSERVED TIME DIFFERENCE OF ARRIVAL) POSITIONING IN A LTE (LONG TERM EVOLUTION) WIRELESS COMMUNICATIONS SYSTEM, WO/2010/104436). However, the probability of an UE hearing from this large number of eNB(s) is much lower than from three eNB(s). This is because with large number of RBS (eNBs) there will be several ones that are far away from the UE and the received signal from these RBS (es) may fall below the UE receiver sensitivity level or the received signal will have low SNR.

In case of RF reflections (e.g., multi-path), multiple copies of the RF signal with various delay times are superimposed onto the DLOS (Direct Line of Site) signal. Because CPICH, uplink DPCCH/DPDCH and other signals that are used in various CELL ID and OTDOA methods/techniques, including the RTT measurements, are of a limited bandwidth the DLOS signal and reflected signals cannot be differentiated without proper multi-path processing/mitigation; and without this multi-path processing these reflected signals will induce an error in the estimated time difference of arrival (TDOA) and time of arrival (TOA) measurements, including RTT measurements.

For example, 3 G TS 25.515 v.3.0.0 (199-10) standards define the RTT as " . . . the difference between transmission of a downlink DPCH frame (signal) and the reception of the beginning (first significant path) of the corresponding uplink DPCCH/DPDCH frame (signal) from UE". The standard does not define what constitutes this "first significant path". The standard goes on noting that "The definition of the first significant path needs further elaboration". For example, in heavy multipath environment it is a common occurrence whereby the DLOS signal, which is the first significant path, is severely attenuated (10 dB-20 dB) relatively to one or more reflected signal(s). If the "first significant path" is determined by measuring the signal strength, it may be one of the reflected signal(s) and not the DLOS signal. This will result in erroneous TOA/DTOA/RTT measurement(s) and loss of locating accuracy.

In prior wireless networks generations the locating accuracy was also impacted by the low sampling rate of frames (signals) that are used by the locate methods—RTT, CPCIH and other signals. The current third and following wireless network generations have much higher sampling rate. As a result, in these networks the locating accuracy real impact is from the terrestrial RF propagation phenomena (multipath).

The embodiment can be used in all wireless networks that employ reference and/or pilot signals, and/or synchronization signals, including simplex, half-duplex and full duplex modes of operation. For example, the embodiment operates with wireless networks that employ OFDM modulation and/or its derivatives. Thus, the embodiment operates with LTE networks.

It is also applicable to other wireless networks, including WiMax, WiFi, and White Space. Other wireless networks that do not use reference and/or pilot or synchronization signals may employ one or more of the following types of alternate modulation embodiments as described in U.S. Pat. No. 7,872,583: 1) where a portion of frame is dedicated to the ranging signal/ranging signal elements as described in U.S. Pat. No. 7,872,583; 2) where the ranging signal elements (U.S. Pat. No. 7,872,583) are embedded into transmit/receive signals frame(s); and 3) where the ranging signal elements (described in U.S. Pat. No. 7,872,583) are embedded with the data.

These alternate embodiments employ multi-path mitigation processor and multi-path mitigation techniques/algorithms described in U.S. Pat. No. 7,872,583 and can be used in all modes of operation: simplex, half-duplex and full duplex.

It is also likely that multiple wireless networks will, at the same time, utilize the preferred and/or alternate embodiments. By way of example, a smart phone can have Blue Tooth, WiFi, GSM and LTE functionality with the capability of operating on multiple networks at the same time. Depending on application demands and/or network availability, different wireless networks can be utilized to provide positioning/locating information.

The proposed embodiment method and system leverages the wireless network reference/pilot and/or synchronization signals. Furthermore, the reference/pilot signal/synchronization signals measurements might be combined with RTT (Round Trip Time) measurements or system timing. According to an embodiment, RF-based tracking and locating is implemented on 3GPP LTE cellular networks, but could be also implemented on other wireless networks, for example WiMax, Wi-Fi, LTE, sensors networks, etc. that employ a variety of signaling techniques. Both the exemplary and mentioned above alternative embodiments employ multi-path mitigation method/techniques and algorithms that are described in U.S. Pat. No. 7,872,583. The proposed system can use software implemented digital signal processing.

The system of the embodiment leverages User Equipment (UE), e.g. cell phone or smart phone, hardware/software as well as Base Station (Node B)/enhanced Base Station (eNB) hardware/software. A base station generally consists of transmitters and receivers in a cabin or cabinet connected to antennas by feeders. These base stations include, Micro Cell, Pico Cell, Macro Cell, Umbrella Cell, Cell Phone towers, Routers and Femtocells. As a result, there will be little or no incremental cost to the UE device and overall system. At the same time the locate accuracy will be significantly improved.

The improved accuracy comes from the multipath mitigation that is provided by the present embodiments and U.S. Pat. No. 7,872,583. The embodiments use multi-path mitigation algorithms, network reference/pilot and/or synchronization signals and network node (eNB). These might be supplemented with RTT (Round Time Trip) measurements. The multi-path mitigation algorithms are implemented in UE and/or base station (eNB), or both: UE and eNB The embodiments advantageously use the multi-path mitigation processor/algorithms (see U.S. Pat. No. 7,872,583) that allow separating the DLOS signal and reflected signals, even when DLOS signal is significantly attenuated (10 dB 20 dB lower) relatively to one or more reflected signals. Thus, the embodiments significantly lower the error in the estimated ranging signal DLOS time-of-flight and consequently TOA, RTT and DTOA measurements. The proposed multi-path mitigation and DLOS differentiating (recognizing) method can be used on all RF bands and wireless systems/networks. And it can support various modulation/demodulation techniques, including Spread Spectrum techniques, such as DSS (Direct Spread Spectrum) and FH (Frequency Hopping).

Additionally, noise reduction methods can be applied in order to further improve the method's accuracy. These noise reduction methods can include, but are not limited to, coherent summing, non-coherent summing, Matched filtering, temporal diversity techniques, etc. The remnants of the multi-path interference error can be further reduced by applying the post-processing techniques, such as, maximum likelihood estimation (e.g., Viterbi Algorithm), minimal variance estimation (Kalman Filter), etc.

In present embodiments the multi-path mitigation processor and multi-path mitigation techniques/algorithms do not change the RTT, CPCIH and other signals and/or frames. The present embodiments leverage wireless network reference, pilot and/or synchronization signals that are used to obtain the channel response/estimation. The invention uses the channel estimation statistics that is generated by UE and/or eNB (see Iwamatsu et al., APPARATUS FOR ESTIMATING PROPAGATION PATH CHARACTERISTICS, US 2003/008156; U.S. Pat. No. 7,167,456 B2).

Figure 9:
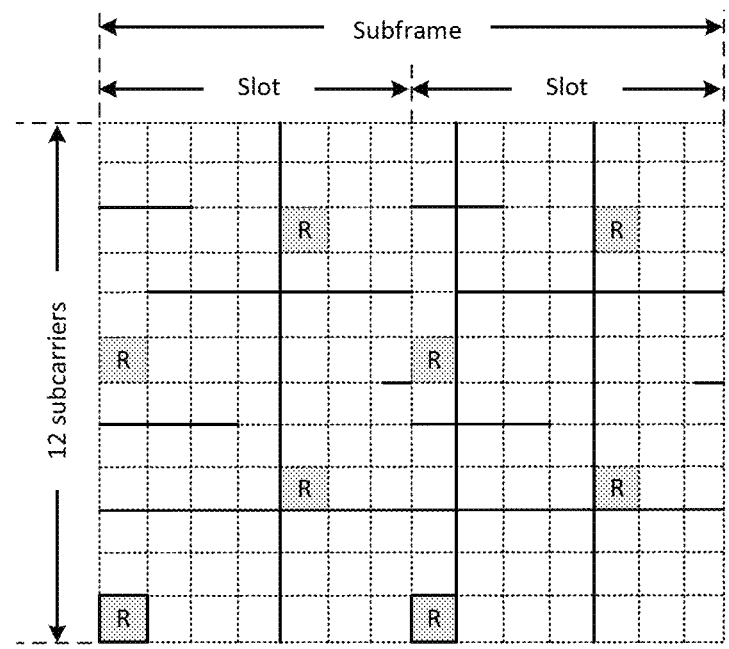
FIG. 9 illustrates LTE reference signals mapping.

LTE networks use specific (non-data) reference/pilot and/or synchronization s signals (known signals) that are transmitted in every downlink and uplink subframe, and might span entire cell bandwidth. For simplicity from now on we will refer to reference/pilot and synchronization signals as reference signals. An example of the LTE reference signals is FIG. 9 (these signals are interspersed among LTE resource elements). From FIG. 9, reference signals (symbols) are transmitted every sixth subcarrier. Further, reference signals (symbols) are staggered in both time and frequency. In total, reference signals are covering every third subcarrier.

These reference signals are used in the initial cell search by the UE, downlink signal strength measurements, scheduling and handover, etc. Included in the reference signals are UE-specific reference signals for channel estimation (response determination) for coherent demodulation. In addition to the UE-specific reference signals, other reference signals may be also used for channel estimation purposes, (see Chen et al., US patent publication No. 2010/0091826 A1).

LTE employs the OFDM (Orthogonal Frequency Division Multiplexing) modulation (technique). In LTE the ISI (Inter Symbol Interference) caused by multipath is handled by inserting Cyclic prefix (CP) at the beginning of each OFDM symbol. The CP provides enough delay so that delayed reflected signals of the previous OFDM symbol will die out before reaching the next OFDM symbol.

An OFDM symbol consists of multiple very tightly spaced subcarriers. Inside the OFDM symbol time-staggered copies of the current symbol (caused by multipath) result in Inter Carrier Interference (ICI). In LTE the ICI is handled (mitigated) by determining the multipath channel response and correcting the channel response in the receiver.

In LTE the multipath channel response (estimation) is computed in the receiver from subcarriers bearing the reference symbols. Interpolation is used to estimate the channel response on the remaining subcarriers. The channel response is calculated (estimated) in form of channel amplitude and phase. Once the channel response is determined (by periodic transmission of known reference signals), the channel distortion caused by multipath is mitigated by applying an amplitude and phase shift on a subcarrier-by-subcarrier basis (see Jim Zyren, Overview of the 3GPP Long Term Evolution Physical Layer, white paper).

LTE multipath mitigation is designed to remove the ISI (by inserting a Cyclic Prefix) and ICI, but not to separate the DLOS signal from reflected signals. For example, time-staggered copies of the current symbol make each modulated subcarrier signals spread in time, thus causing ICI. Correcting multipath channel response using the abovementioned LTE technique will shrink modulated subcarrier signals in time, but this type of correction does not guarantee that the resulting modulated subcarrier signals (inside the OFDM symbol) are DLOS signals. If DLOS modulated subcarrier signals are significantly attenuated relatively to delayed reflected signal(s), the resulting output signal will be the delayed reflected signal(s) and the DLOS signal will be lost.

In LTE compliant receiver, further signal processing includes DFT (Digital Fourier Transformation). It is well known that DFT technique(s) can resolve (remove) only copies of signal(s) that are delayed for times that are longer than or equal to the time that is inversely proportional to the signal and/or channel bandwidth. This method accuracy may be adequate for an efficient data transfer, but not accurate enough for precise distance measurement in a heavy multipath environment. For example, to achieve thirty meters accuracy, the signal and receiver channel bandwidths should be larger than or equal to ten megahertz ($\frac{1}{10}$ MHz=100 ns.). For better accuracy the signal and receiver channel bandwidths should be wider—one hundred megahertz for three meters.

However, CPICH, uplink DPCCH/DPDCH and other signals that are used in various CELL ID and OTDOA methods/techniques, including the RTT measurements, as well as the LTE received signal subcarriers have bandwidths that are significantly lower than ten megahertz. As a result, the currently employed (in LTE) method/technique will produce locating errors in the range of 100 meters.

To overcome the abovementioned limitations the embodiments use a unique combination of implementations of subspace decomposition high resolution spectral estimation methodologies and multimodal cluster analysis. This analysis and related multi-path mitigation method/techniques and algorithms, described in U.S. Pat. No. 7,872,583, allow a reliable and accurate separation of DLOS path from other reflected signals paths.

Compared to methods/techniques used in the LTE, in a heavy multipath environment this method/techniques and algorithms (U.S. Pat. No. 7,872,583) deliver 20× to 50× accuracy improvement in the distance measurement via reliable and accurate separation of DLOS path from other multi-path (MP) paths.

Methods/techniques and algorithms described in U.S. Pat. No. 7,872,583 require ranging signal complex amplitude estimation. Accordingly, the LTE reference signals used for channel estimation (response determination) as well as other reference signals (including pilot and/or synchronization signals, can be also construed as a ranging signal in methods/techniques and algorithms described in U.S. Pat. No. 7,872,583. In this case the ranging signal complex amplitude is the channel response that is calculated (estimated) by the LTE receiver in form of amplitude and phase. In other words, the channel response statistics that is calculated (estimated) by the LTE receiver can provide complex amplitude information that is required by the method/techniques and algorithms described in U.S. Pat. No. 7,872,583.

In ideal open space RF propagation environment with no multipath the phase change of the received signal (ranging signal), e.g. channel response phase, will be directly proportional to the signal's frequency (a straight line); and the RF signal time-of-flight (propagation delay) in such environment can be directly computed from the phase vs. frequency dependency by computing first derivative of the phase vs. frequency dependency. The result will be the propagation delay constant.

In this ideal environment the absolute phase value at initial (or any) frequency is not important because the derivative is not affected by the phase absolute values.

In a heavy multipath environment the received signal phase change vs. frequency is a complicated curve (not a straight line); and the first derivative does not provide information that could be used for accurate separation of DLOS path from other reflected signals paths. This is the reason for employing multipath mitigation processor and method(s)/techniques and algorithms described in U.S. Pat. No. 7,872,583.

If the phase and frequency synchronization (phase coherency) achieved in a given wireless network/system is very good, then multipath mitigation processor and method(s)/techniques and algorithms described in U.S. Pat. No. 7,872,583 will accurately separate DLOS path from other reflected signals paths and determine this DLOS path length (time-of-flight).

In this phase coherent network/system no additional measurements are required. In other words, one way ranging (simplex ranging) can be realized.

However, if the degree of synchronization (phase coherency) achieved in a given wireless network/system is not accurate enough, then in a heavy multipath environment the received signal phase and amplitude change vs. frequency might be very similar for measurements conducted at two or more different locations (distances). This phenomenon might lead to an ambiguity in received signal DLOS distance (time-of-flight) determination.

To resolve this ambiguity it is necessary to know the actual (absolute) phase value for at least one frequency.

However, the amplitude and phase vs. frequency dependency that is computed by the LTE receiver does not include an actual phase value because all amplitude and phase values are computed from the downlink/uplink reference signals, e.g. relative to each other. Thus, the amplitude and phase of the channel response that is calculated (estimated) by the LTE receiver needs actual phase value at least at one frequency (subcarrier frequency).

In LTE this actual phase value can be determined from one or more RTT measurement(s), TOA measurements; or from time-stamping of one or more received reference signals, provided that 1) these time stamps of transmitting these signals by eNB are also known at the receiver (or vice versa), 2) the receiver and eNB clocks are well synchronized in time, and/or 3) by using multilateration techniques.

All of the above methods provide the time-of-flight values of one or more reference signals. From the time-of-flight values and frequencies of these reference signals actual phase values at one or more frequencies can be calculated.

The present embodiments achieve a highly accurate DLOS distance determination/locating in a heavy multipath environment by combining multi-path mitigation processor, method(s)/techniques and algorithms described in U.S. Pat. No. 7,872,583 with: 1) the amplitude and phase vs. frequency dependency that is computed by the LTE UE and/or eNB receiver or 2) a combination of the amplitude and phase vs. frequency dependency that is computed by the LTE UE and/or eNB receiver and actual phase value(s) for one or more frequencies obtained via RTT and/or TOA; and/or time-stamping measurements.

In these cases the actual phase value(s) is affected by the multipath. However, this does not impact the performance of methods/techniques and algorithms described in U.S. Pat. No. 7,872,583.

In LTE RTT/TOA/TDOA/OTDOA, including DL-OTDOA, U-TDOA, UL-TDOA, etc., measurements can be carried out with the resolution of 5 meters. RTT measurements are carried during dedicated connections. Thus, multiple simultaneous measurements are possible when UE is in handover state and times when UE periodically collects and reports measurements back to the UE, in which the DPCH frames are exchanged between the UE and different networks (base stations). Similar to RTT, TOA measurements provide the signal's time-of-flight (propagation delay), but TOA measurements cannot be made simultaneously (Jakub Marek Borkowski: Performance of Cell ID+RTT Hybrid Positioning Method for UMTS).

In order to locate UE on plane DLOS distances have to be determined at least from/to three eNB(s). To locate UE in three-dimensional space minimum four DLOS distances from/to four eNB(s) would have to be determined (assuming that at least one eNB is not on the same plane).

An example of UE positioning method is shown in FIG. 1.

In case of very good synchronization RTT measurements are not required.

If the degree of synchronization is not accurate enough, then methods like OTDOA, Cell ID+RTT and others, for example AOA(Angle-of-Arrival) and its combinations with other methods, can be used for the UE locating.

The Cell ID+RTT track-locate method accuracy is impacted by the multipath (RTT measurements) and the eNB (base station) antenna beamwidth. Base stations antennas beamwidths are between 33 and 65 degrees. These wide beamwidths results in locating error of 50-150 meters in urban areas (Jakub Marek Borkowski: Performance of Cell ID+RTT Hybrid Positioning Method for UMTS). Considering that in a heavy multipath environment the current LTE RTT distance measurement average error is approximately 100 meters, the overall expected average locate error of the currently employed by LTE Cell ID+RTT method is approximately 150 meters.

One of the embodiments is the UE locating based on the AOA method, whereby one or more reference signals from the UE is used for the UE locate purposes. It involves an AOA determination device location for determining the DLOS AOA. The device can be collocated with the base station and/or installed at another one or more locations independent from the base station location. The coordinates of these locations are presumably known. No changes are required on the UE side.

This device includes a small antenna array and is based on a variation of the same multipath mitigation processor, method(s)/techniques and algorithms described in U.S. Pat. No. 7,872,583. This one possible embodiment has the advantage of precise determination (very narrow beamwidth) of the AOA of the DLOS RF energy from an UE unit.

In one other option this added device is receive only device. As a result, its size/weight and cost are very low.

The combination of embodiments in which accurate DLOS distance measurements are obtained and embodiments in which an accurate DLOS AOA determination can be made will greatly improve the Cell ID+RTT track-locate method precision 10X or greater. Another advantage of this approach is that the UE location can be determined at any moment with a single tower, (does not require placing UE in soft handover mode). Because an accurate location fix can be obtained with a single tower there is no need to synchronize multiple cell towers. Another option of determining the DLOS AOA is to use the existing eNB antenna array and the eNB equipment. This option may further lower the cost of implementation of the improved Cell ID+RTT method. However, because eNB antennas are not designed for the locating applications, the positioning accuracy may be degraded. Also, network operators may be unwilling to implement required changes in base station (software/hardware).

In the LTE (Evolved Universal Terrestrial Radio Access (E-UTRA); Physical channels and modulation; 3GPP TS 36.211 Release 9 technical Specification) Positioning Reference Signals (PRS), were added. These signals are to be used by the UE for the DL-OTDA (Downlink OTDOA), positioning. Also, this release 9 requires eNB(s) to be synchronized. Thus, clearing the last obstacle for OTDOA methods (see paragraph 274 above). The PRS improves UE hear-ability at UE of multiple eNBs. Note: the Release 9 did not specify the eNB synchronization accuracy (some proposals: 100 ns.).

The U-TDOA/UL-TDOA are in a study phase; to be standardized in 2011.

The DL-OTDOA method (in Release 9) is detailed in the US patent US 2011/0124347 A1 (Method and Apparatus for UE positioning in LTE networks, Chen, at al.). The Release 9 DL-OTDOA suffers from the multipath. Some of the multipath mitigation can be achieved via increased PRS signal bandwidth. However, the trade-off is increased scheduling complexity and longer times between UE positions fixes. Moreover, for networks with limited operating bandwidth, for example 10 MHz, the best possible accuracy is 100 meters, see Chen, Table 1.

The above numbers are the best possible case. Other cases, especially when the DLOS signal strength is significantly lower (10-20 dB) compared to the reflected signal(s) strength, result in significantly larger (2×-4×) of the above-mentioned locate/ranging errors.

Embodiments described herein allow for up to 50× ranging/locate accuracy improvement for a given signal bandwidth over the performance achieved by the Release 9 DL-OTDOA method and the UL-PRS method of Chen et al. described in the Background section. Thus, applying embodiments of the methods described herein to the Release 9 PRS processing reduces the locate error down to 3 meters or better in 95% of all possible cases. In addition, this accuracy gain will reduce the scheduling complexity and the time between UE position fixes.

With the embodiments described herein further improvements for the OTDOA method are possible. For example, the ranging to the serving cell can be determined from other serving cells' signals, thus improving the neighboring cells hearability and reducing the scheduling complexity, including the time between UE positions fixes.

Embodiments also enable the accuracy of the U-TDOA method and UL-TDOA from Chen et al. (described in the Background) to be improved up to 50 times. Applying embodiments to the Chen's UL-TDOA variant, reduces the locate error down to 3 meters or better in 95% of all possible cases. Moreover, this accuracy gain further reduces the scheduling complexity and the time between UE positions fixes.

Again, with the present embodiments, Chen's UL-TDOA method accuracy can be improved up to 50×. Thus, applying the present embodiments to the Chen's U-TDOA variant, will reduce the locate error down to 3 meters or better in 95% of all possible cases. Moreover, this accuracy gain will further reduce the scheduling complexity and the time between UE positions fixes.

The abovementioned DL-TDOA and U-TDOA/UL-TDOA methods rely on one-way measurements (ranging). Present embodiments and practically all other ranging technologies require that the PRS and/or other signals used in the process of one-way ranging would be frequency and phase coherent. The OFDM based systems, like LTE, are frequency coherent. However, the UE units and eNB(s) are not phase or time synchronized by a common source—like UTC, to a couple nanoseconds, e.g. there exists a random phase adder.

To avoid the phase coherency impact on the ranging accuracy, the embodiment of the multipath processor calculates the differential phase between the ranging signal(s), e.g. reference signals, individual components (subcarriers). This eliminates the random phase term adder.

As identified above in the discussion of Chen et al., applying the embodiments described herein result in significant accuracy improvement in indoor environments compared to the performance achieved by Chen et al. For example, according to Chen, at al. the DL-OTDOA and/or U-TDOA/UL-TDOA are mostly for outdoor environments, indoors (buildings, campuses, etc.) the DL-OTDOA and U-TDOA technologies may not perform well. Several reasons are noted (see Chen, #161-164), including the Distributed Antenna Systems (DAS) that are commonly employed indoors, whereby each antenna does not have a unique ID.]

The embodiment described below operates with wireless networks that employ OFDM modulation and/or its derivatives; and reference/pilot/and or synchronization signals. Thus, the embodiment described below operates with LTE networks and it is also applicable to other wireless systems and other wireless networks, including other types of modulation, with or without reference/pilot/and/or synchronization signals.

The approach described herein is also applicable to other wireless networks, including WiMax, WiFi, and White Space. Other wireless networks that do not use reference/pilot and/or synchronization signals may employ one or more of the following types of alternate modulation embodiments as described in U.S. Pat. No. 7,872,583: 1) where a portion of frame is dedicated to the ranging signal/ranging signal elements; 2) where the ranging signal elements are embedded into transmit/receive signals frame(s); and 3) where the ranging signal elements are embedded with the data.

Embodiments of the multipath mitigation range estimation algorithm described herein (also described in U.S. Pat. Nos. 7,969,311 and 8,305,215) works by providing estimates of the ranges in the ensemble made up of the direct path (DLOS) of a signal plus the multipath reflections.

The LTE DAS system produces multiple copies of the same signal seen at various time offsets to a mobile receiver (UE). The delays are used to uniquely determine geometric relationships between the antennas and the mobile receiver. The signal seen by the receiver resembles that seen in a multipath environment—except the major "multipath" components result from the sum of the offset signals from the multiple DAS antennas.

The signal ensemble seen by the receiver is identical to the type of signal ensemble embodiments are designed to exploit—except that in this case the major multipath components are not traditional multipath. The present multipath mitigation processor (algorithms) is capable of determining the attenuation and propagation delay of the DLOS and each path, e.g. reflection, (see equations 1-3 and associated descriptions). While multipath can be present because of the dispersive RF channel (environment), the major multipath components in this signal ensemble are associated with transmissions from multiple antennas. Embodiments of the present multipath algorithm can estimate these multipath components, isolate the ranges of the DAS antennas to the receiver, and provide range data to the location processor (implemented in software). Depending on the antenna placing geometry, this solution can provide both X, Y and X, Y, Z location coordinates.

As a result, present embodiments do not require any hardware and/or new network signal(s) additions. Moreover, the positioning accuracy can be significantly improved by 1) mitigating the multipath and 2) in case of active DAS the lower bound of positioning error can be drastically reduced, such as reducing from approximately 50 meters to approximately 3 meters.

It is assumed that the position (location) of each antenna of a DAS is known. The signal propagation delay of each antenna (or relative to other antenna) also has to be determined (known).

For active DAS systems the signal propagation delay may be determined automatically, using the loopback techniques, whereby the known signal is sent round trip and this round trip time is measured. This loopback technique also eliminates the signal propagation delay changes (drift) with temperature, time, etc.

Using multiple macro cells and associated antennas, Pico cells and micro cells further enhance the resolution by providing additional reference points.

The embodiment described above of individual range estimates in a signal ensemble of multiple copies from multiple antenna can be further enhanced by changes to the signal transmit structure in the following two ways. The first is to time multiplex the transmissions from each antenna. The second approach is to frequency multiplex for each of the antennas. Using both enhancements, time and frequency multiplexing simultaneously, further improve the ranging and location accuracy of the system. Another approach is to add a propagation delay to each antenna. The delay values would be chosen to be large enough to exceed the delay spread in a particular DAS environment (channel), but smaller than the Cyclic Prefix (CP) length so that the multipath caused by additional delays will not result in ISI (Inter Symbol Interference).

The addition of a unique ID or unique identifier for each antenna increases the efficiency of the resulting solution. For example, it eliminates the need for the processor to estimate all the ranges from the signals from each of the antennas In one embodiment utilizing the LTE downlink, one or more reference signal(s) subcarriers, including pilot and or synchronization signal(s) subcarriers, are used to determine subcarriers phase and amplitude that are in turn applied to the multi-path processor for multipath interference mitigation and generation of range based location observables and locate estimate using multilateration and location consistency algorithms to edit out wild points.

Another embodiment takes advantage of the fact that the LTE uplink signaling also includes reference signals, mobile device to base, which also contains reference subcarriers. In fact there is more than one mode in which contain these subcarriers from a full sounding mode used by the network to assign a frequency band to the uplink device to a mode where are reference subcarriers are used to generate a channel impulse responses to aid in demodulation of the uplink signal, etc. Also, similarly to the DL PRS added in rel.9 additional UL reference signals might be added in the upcoming and future standard releases. In this embodiment, the uplink signal is processed by multiple base units (eNB) using the same range to phase, multipath mitigation processing to generate range related observables. In this embodiment, location consistency algorithms are used as established by the multilateration algorithm to edit wild point observables and generate a location estimate.

In another embodiment, one or more reference (including pilot and or synchronization) subcarriers of both the LTE downlink and LTE uplink are collected, the range to phase mapping is applied, multipath mitigation is applied and the range associated observable is estimated. These data would then be fused in such a way that would provide a more robust set of observables for location using the multilateration algorithm and location consistency algorithms. The advantage would be the redundancy that results in improved accuracy since the downlink and up link two different frequency bands or in case of the TDD (Time Division Duplexing) improving the system coherency.

In a DAS (Distributed Antenna System) environment where multiple antennas transmitting the same downlink signal from a microcell the location consistency algorithm(s) are extended to isolate the ranges of the DAS antennas from observables generated by the multipath mitigation processing from reference signal(s) (including pilot and/or synchronization) subcarriers and to obtain the location estimates from the multiple DAS emitters (antennas) ranges.

In a DAS system (environment) obtaining accurate location estimate is possible only if the signals paths from individual antennas can be resolved with a high accuracy, whereby the path error is only a fraction of the distance between antennas (accuracy of 10 meters or better). Because all existing techniques/methods cannot provide such accuracy in a heavy multipath environment (signals from multiple DAS antennas will appear as induced heavy multipath) the existing techniques/methods cannot take advantage of the abovementioned extension of the location consistency algorithm(s) and this locate method/technique in the DAS environment.

The InvisiTrack multi-path mitigation methods and systems for object identification and location finding, described in U.S. Pat. No. 7,872,583, is applied to the range to signal phase mapping, multipath interference mitigation and process to generate range based location observables utilizing the LTE downlink, uplink and/or both (downlink and uplink), one or more reference signal(s) subcarriers and using multilateration and location consistency to generate a location estimate.

In all above embodiments trilateration positioning algorithms can be also employed.

The DL-OTDOA locating was specified in the LTE release 9: Evolved Universal Terrestrial Radio Access (E-UTRA); Physical channels and modulation; 3GPP TS 36.211 Release 9 technical Specification. However, it has not been implemented by the wireless operators (carriers). In the meantime a Downlink locating can be implemented within current, e.g. unmodified, LTE network environment by using the existing physical layer measurements operation(s).

In LTE the UE and the eNB are required to make physical layer measurements of the radio characteristics. The measurement definitions are specified in 3GPP TS 36.214. These measurements are performed periodically and are reported to the higher layers and are used for a variety of purposes including intra- and inter-frequency handover, inter-radio access technology (inter-RAT) handover, timing measurements, and other purposes in support of RRM (Radio Resource Management).

For example, the RSRP (Reference Signal Received Power) is the average of the power of all resource elements which carry cell-specific reference signals over the entire bandwidth.

Another example is the RSRQ (Reference Signal Received Quality) measurement that provides additional information (RSRQ combines signal strength as well as interference level).

The LTE network provides the UE with eNB neighbor (to serving eNB) lists. Based on the network knowledge configuration, the (serving) eNodeB provides the UE with neighboring eNB's identifiers, etc. The UE then measures the signal quality of the neighbors it can receive. The UE reports results back to the eNodeB. Note: UE also measures the signal quality of the serving eNB.

According to the specification, the RSRP is defined as the linear average over the power contributions (in [W]) of the resource elements that carry cell-specific reference signals within the considered measurement frequency bandwidth. The measurement bandwidth that is used by the UE to determine RSRP is left up to the UE implementation with the limitation that corresponding measurement accuracy requirements have to be fulfilled.

Considering the measurement bandwidth accuracy requirements this bandwidth is fairly large and the cell-specific reference signals that are used in the RSRP measurements can be further processed to determine these reference signals subcarriers phase and amplitude that are in turn applied to the multi-path processor for multipath interference mitigation and generation of range based location observables. In addition, other reference signals that are used in the RSRP measurement, for example SSS (Secondary Synchronization Signal) might be also used.

Thereafter, based on range observables from three or more cells the location fix can be estimated using multilateration and location consistency algorithms.

As was mentioned previously while there are several causes of the RF fingerprinting database instability one of the major ones is the multipath (the RF signature is very sensitive to multipath). As a result, the RF Fingerprinting method(s)/technology locate accuracy is heavily impacted by multipath dynamics changes over time, environment (for example weather), people and/or objects movement, including vertical uncertainty: >100% variability depending upon device Z-height and/or antenna orientation (see Tsung-Han Lin, et al. Microscopic Examination of an RSSI-Signature-Based Indoor Localization System).

The present embodiments can significantly improve the RF Fingerprinting locate accuracy because of the ability (multipath processor) to find and characterize each individual path, including significantly attenuated DLOS. As a result, the RF Fingerprinting decision on the location fix can be supplemented with the real-time multipath distribution information As was mentioned above, the locate fix will require position references synchronization in time. In wireless networks these position references may include Access Points, Macro/Mini/Pico and Femto cells, as wells as so called Small cells (eNB). However, wireless operators do not implement the synchronization accuracy that is needed for an accurate position fix. For example, in case of LTE the standard does not require any time synchronization between eNB(s) for the FDD (Frequency Division Duplexing) networks. For LTE TDD (Time Division Duplexing) this time synchronization accuracy is limit is +/−1.5 microseconds. This is equivalent to 400+meters locate uncertainty. Although not required, the LTE FDD networks are also synchronized but use even larger (than 1.5 microseconds) limits.

Wireless LTE operators are using GPS/GNSS signals to synchronize eNB(s) in frequency and time. Note: The LTE eNB has to maintain a very accurate carrier frequency: 0.05 ppm for macro/mini cells and slightly less accurate for other type of cells (0.1–0.25 ppm). The GPS/GNSS signals can also enable a required (for locate) time synchronization accuracy of better than 10 nanoseconds. However, network operators and network equipment manufacturers are trying to reduce costs associated with the GPS/GNSS units in favor of Packet Transport/, e.g. Internet/Ethernet networking time synchronization by employing NTP (Network Time Protocol) and/or PTP (Precision Time Protocol), for example IEEE 1588v2 PTP.

The IP network based synchronization has a potential of meeting the minimum frequency and time requirements, but is lacking the GPS/GNSS precision that is needed for locate fix.

The approach described herein is based on the GPS/GNSS signals and signals generated by the eNB and/or AP, or other wireless networks equipment. It also can be based on the IP networking synchronization signals and Protocols and signals generated by the eNB and/or AP, or other wireless networks equipment. This approach is also applicable to other wireless networks, including WiMax, WiFi, and White Space.

Figure 12:
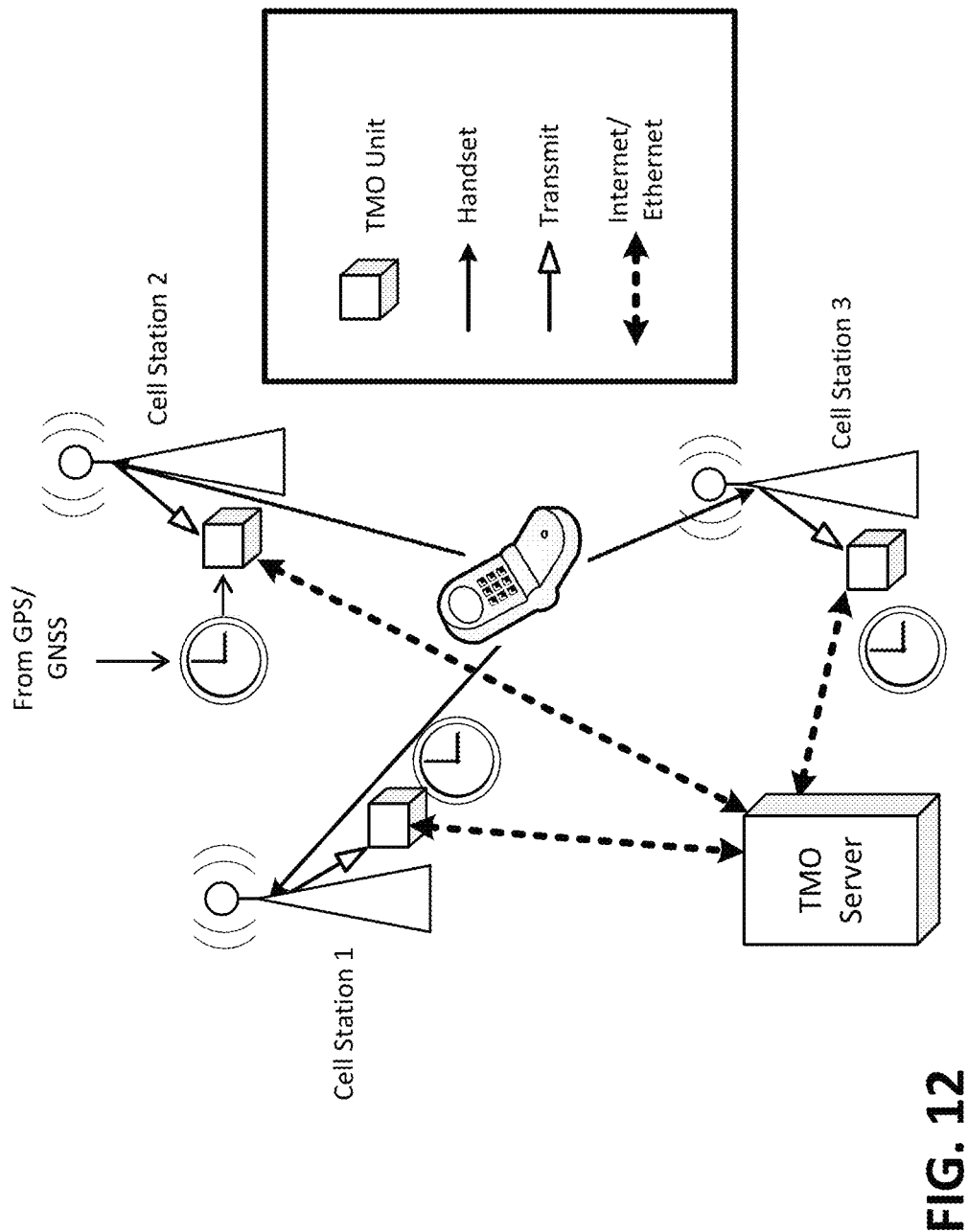
FIG. 12 illustrates the operation of a Time Observation Unit (TMO) installed at an operator's eNB facility, in accordance with an embodiment.

The eNB signals are received by the Time Observation Unit (TMO) installed at the operator's eNB facility (FIG. 12). The TMO also include the External Synchronization Source input.

The eNB signals are processed by the TMO and are time stamped using clocks that are synchronized with the External Synchronization Source input.

The External Synchronization Source could be from the GPS/GNSS and/or Internet/Ethernet networking, for example PTP or NTP, etc.

The time-stamped processed signal, for example the LTE frame start (could be other signals, especially in other networks), also includes the eNB(cell) location and/or cell ID, is sent via the Internet/Ethernet backhaul to a central TMO Server that creates, maintains and updates a data base of all eNBs.

The UE and/or eNB(s) involved in the process of ranging and obtaining a location fix will quire the TMO Server and the server will return the time synchronization offsets between the eNB(s) involved. These time synchronization offsets will be used by the UE and/or eNB(s) involved in the process of obtaining a location fix to adjust the location fix.

Alternatively, the location fix calculations and adjustment can be carried out by the TMO Server when UE and/or eNB(s) involved in the process of ranging will also supply the obtained ranging information to the TMO Server. The TMO Server will then return an accurate (adjusted) position (locate) fix.

If more than one cell eNB equipment is co-located together a single TMO can process and time stamp signals from all eNB(s).

The RTT (Round Time Trip) measurements (ranging) can be used for locating. The drawback is that the RTT ranging is subject to multipath which has drastic impact on the locate accuracy.

On the other hand, RTT locating does not require the position references synchronization (in time) in general and in case of LTE the eNB in particular.

At the same time, when operating with Pilot Reference and/or other signals of the wireless network the multipath mitigation processor, method(s)/techniques and algorithms described in U.S. Pat. No. 7,872,583 are capable of determining the channel response for the RTT signal(s), e.g. identify the multipath channel that the RTT signal(s) are going through. This allows for correction of the RTT measurements so that the actual DLOS time will be determined.

With DLOS time known it will be possible to obtain the location fix using trilateration and/or similar locating methods without the need of eNB or position references synchronization in time.

Even with TMO and TMO Server in place the InvisiTrack's technology integration will require changes in the macro/mini/pico and small cells and/or UE (cell phone). Although these changes are limited only to SW/FW (software/firmware) it takes a lot of effort to revamp the existing infrastructure. Also, in some cases network operators and/or UE/cell phone manufacturers/suppliers resisting equipment modifications. Note: UE is wireless network User Equipment.

This SW/FW change can be completely avoided if the TMO and TMO Server functionality is expanded to support the InvisiTrack locate technology. In other words, another embodiment described below operates with wireless networks signals, but do not require any modifications of the wireless network equipment/infrastructure. Thus, the embodiment described below operates with LTE networks and it is also applicable to other wireless systems/networks, including Wi-Fi.

In essence this embodiment creates a parallel wireless locate infrastructure that uses the wireless network signals to obtain location fix.

Similarly to TMO and TMO Server, the InvisiTrack's locate infrastructure will consists of one or more wireless Network Signals Acquisition Units (NSAU) and one or more Locate Server Units (LSU) that collect data from NSAU(s) and analyze it, determining range and locations, and to convert it into a table, e.g. of phone/UEs IDs and locations at an instant of time. The LSU interfaces to the wireless network via network's API.

Multiple of these units could be deployed in various locations in a large infrastructure. If NSAU(s) have coherent timing—the results for all can be used which will give better accuracy.

The coherent timing can be derived from the GPS clock and/or other stable clock sources.

The NSAU communicates with LSU via LAN (Local Area Network), Metro Area Network (MAN) and/or Internet.

In some installation/instances the NSAU and LSU could be combined/integrated into a single unit.

In order to support location services using LTE or other wireless networks, the transmitters are required to be clock and event synchronized to within tight tolerances. Normally this is accomplished by locking to the 1 PPS signal of GPS. This will result in timing synchronization in a local area to within 3 nanosecond 1-sigma.

However, there are many instances when this type of synchronization is not practical. This present embodiments provide time offset estimates between the downlink transmitters and tracking of the time offsets in order to provide delay compensation values to the location process so the location process can proceed as if the transmitters were clock and event synchronized. This is accomplished by prior knowledge of the transmit antenna (which is required for any location services) and a receiver with known a priori antenna location. This receiver called the synchronization unit will collect data from all the downlink transmitters and given its knowledge of the locations, calculate the offset timing from a preselected base antenna. These offsets are tracked by the system through the use of a tracking algorithm that compensates for clock drifts the downlink transmitters. Note: The processing to derive pseudo ranges from the received data will utilize the InvisiTrack Multipath mitigation algorithms (described in U.S. Pat. No. 7,872,583). Hence the synchronization will not be impacted by multipath.

These offset data are used by the location processor (Location Server, LSU) to properly align the data from each downlink transmitter so that it appears to have been generated by synchronized transmitters. The time accuracy is comparable with the best 1-PPS tracking and will support 3 meter location accuracy (1-sigma).

The synchronization receiver and/or receiver's antennas will be located based on optimal GDOP for best performance. In large installations multiple synchronization receivers can be utilized to provide an equivalent 3 nsec 1-sigma synchronization offset throughout the network. By utilizing synchronization receivers(s) the requirements for synchronization of the downlink transmitters is eliminated.

The synchronization receiver unit can be a standalone unit communicating with the NSAU and/or LSU. Alternatively this synchronization receiver can be integrated with the NSAU.

Figure 13:
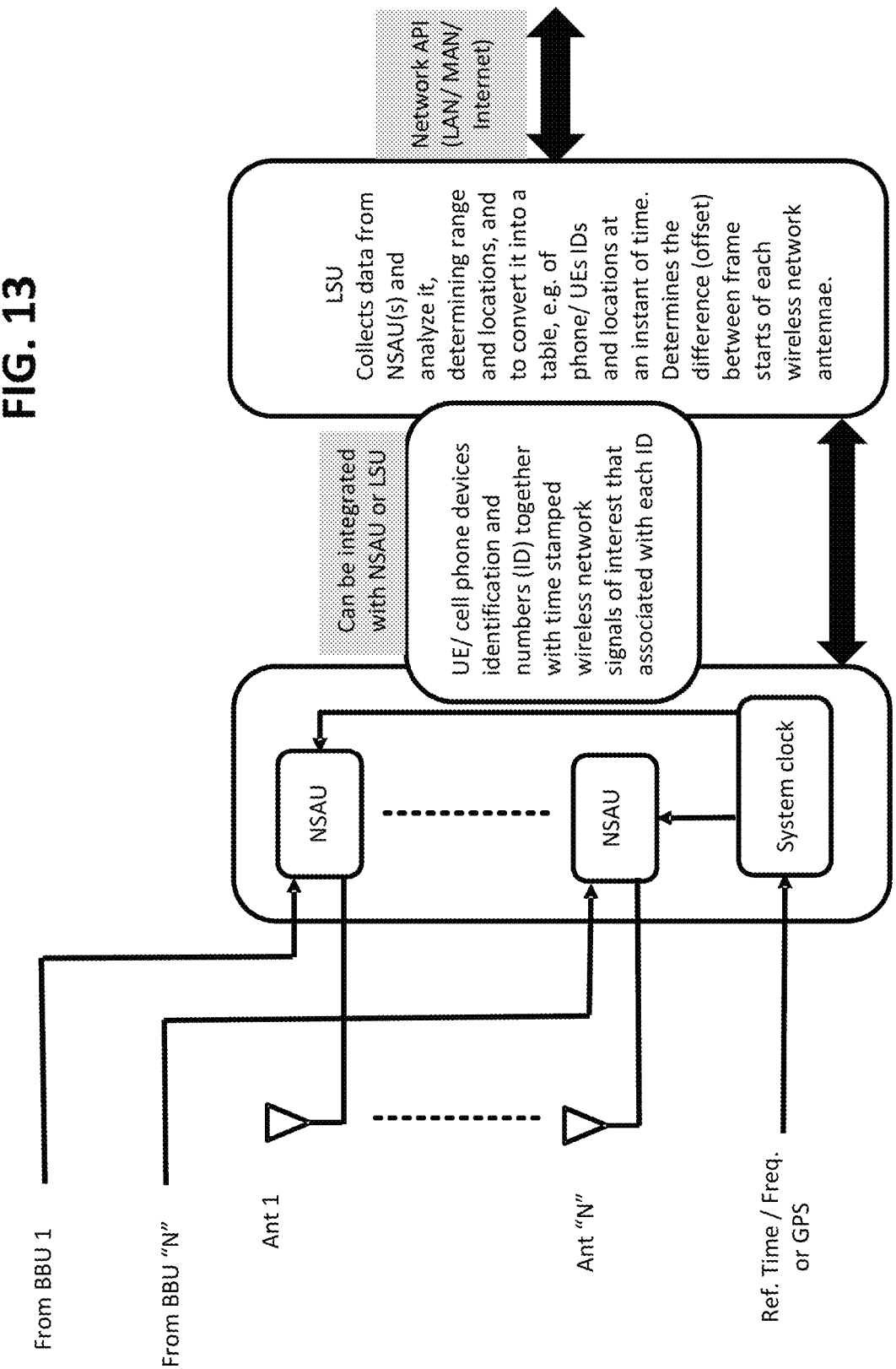
FIG. 13 illustrates an embodiment of a wireless network locate equipment diagram.

The exemplary wireless network locate equipment diagram is depicted in FIG. 13.

Figure 14:
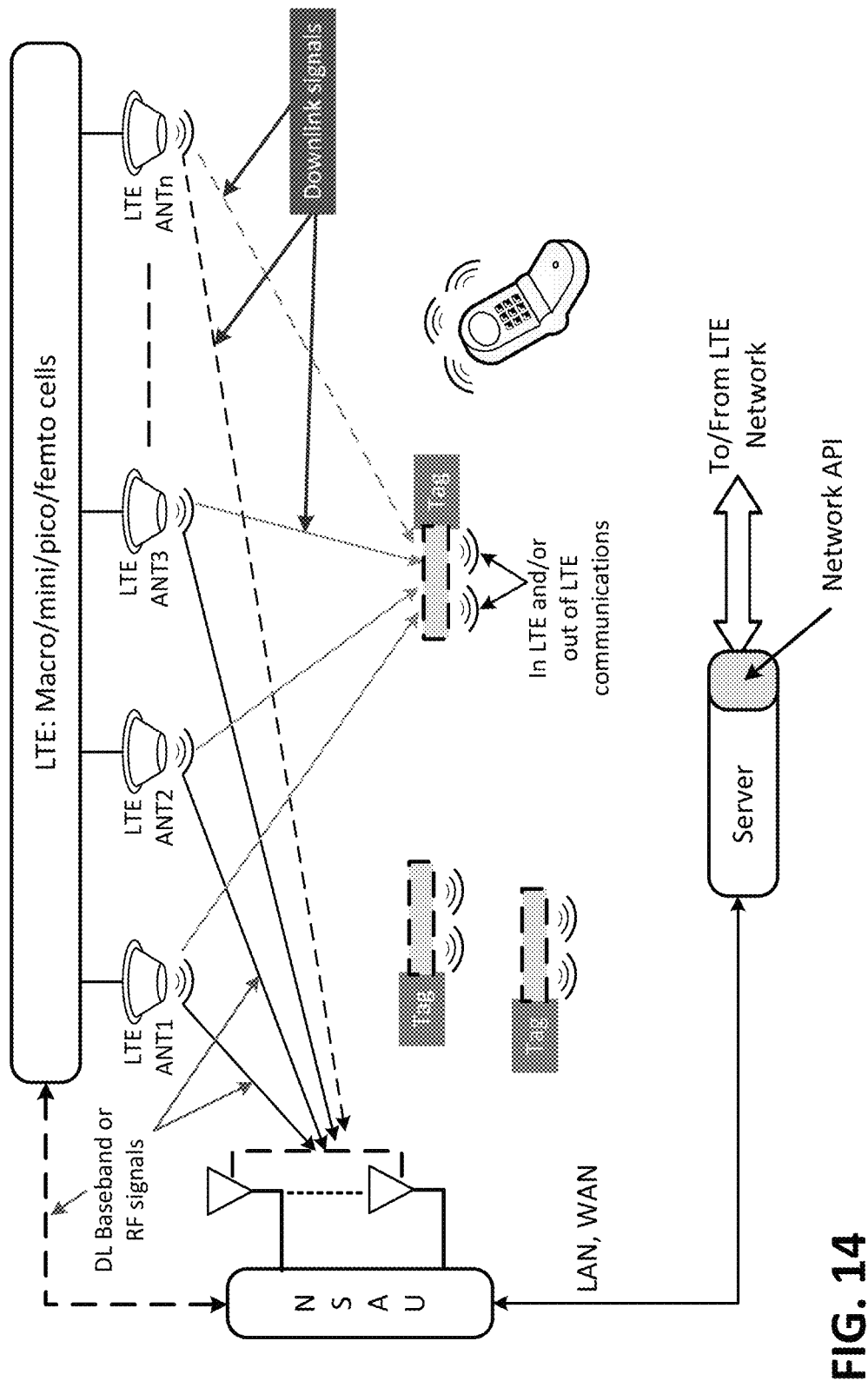
FIG. 14 illustrates an embodiment of a wireless network locate downlink ecosystem for enterprise applications.
Figure 15:
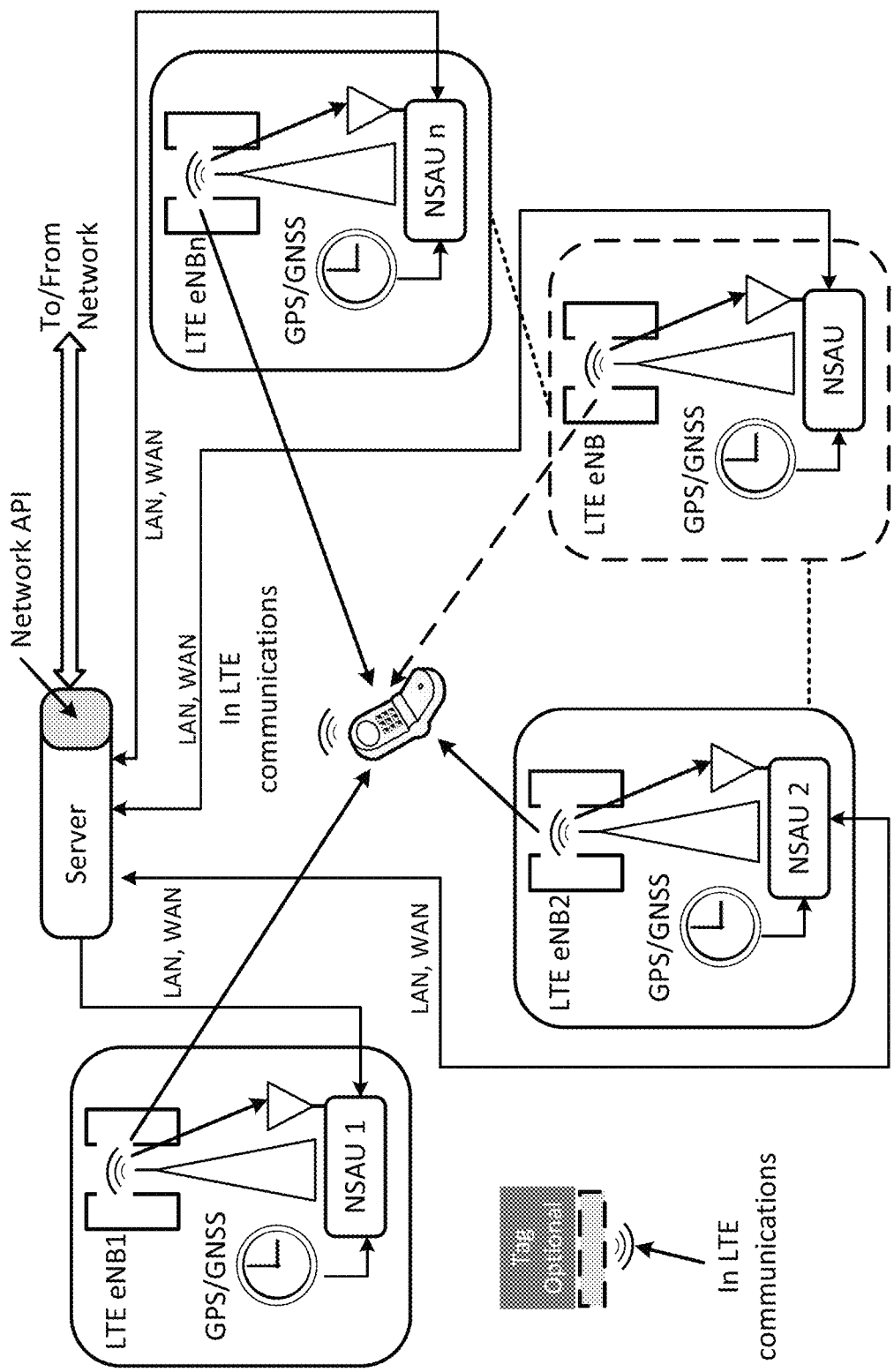
FIG. 15 illustrates an embodiment of a wireless network locate downlink ecosystem for network wide applications.

The embodiment of a completely autonomous system, no Customer Network Investment, which utilizes LTE signals operates in the following modes:
1. Uplink mode—uses wireless network Uplink (UL) signals for the purpose of locating (FIGS. 16 and 17)
2. Downlink mode—uses wireless network Downlink (DL) signals for the purpose of locating (FIGS. 14 and 15).
3. Two-way mode—uses both: UL and DL signals for locating.

In the Uplink mode multiple antennas are connected to one or more NSAUs. These antennae locations are independent from the wireless network antennas; NSAU(s) antennae locations are selected to minimize the GDOP (Geometric Dilution of Precision).

Network' RF signals from the UE/cell phone devices are collected by NSAU(s) antennae and are processed by NSAU(s) to produce time stamped samples of the processed network' RF signals during a time interval that is adequate for capturing one or more instances of all signals of interest.

Optionally, NSAU will also receive, process and time stamped samples of Downlink signals to obtain additional information, for example for determining UE/phone ID, etc.

From captured time stamped samples the UE/cell phone devices identification numbers (ID) together with time stamped wireless network signals of interest that associated with each UE/cell phone ID(s) will be determined (obtained). This operation can be performed either by the NSAU or by the LSU.

The NSAU will periodically supply data to the LSU. If unscheduled data is needed for one or more UE/cell phone ID(s) then LSU will request additional data.

No changes/modifications will be needed in wireless network infrastructure and/or existing UE/cell phone for the UL mode operation.

In the Downlink (DL) mode the InvisiTrack enabled UE will be required. Also, the cell phone FW would have to be modified if phone is used to obtain location fix.

In some instances operators can make baseband signals available from BBU(s) (Base Band Units). In such cases NSAU(s) will also be capable process these available base band wireless network signals instead of RF wireless network signals.

In the DL mode there is no need to associate the UE/cell phone ID with one or more wireless network signals because these signals will be processed in the UE/cell phone or UE/cell phone will periodically produce time stamped samples of the processed network' RF signals and send these to the LSU; and the LSU will send result(s) back to the UE/cell phone.

In the DL mode the NSAU will process and time stamp processed RF or baseband (when available) wireless network signals. From captured time stamped samples wireless network signals DL frames starts associated with the network antennas will be determined (obtained) and the difference (offset) between these frame starts will be calculated. This operation can be performed either by the NSAU or by the LSU. Frame starts offsets for network antennas will be stored on the LSU.

In the DL mode frame starts offsets of network antennas will be sent from LSU to the UE/phone device in case when the device will process/determine its own location fix using InvisiTrack technology. Otherwise, when UE/cell phone device will periodically send time stamped samples of the processed network' RF signals to the LSU, the LSU will determine the device's location fix and will send the location fix data back to the device.

In DL mode the wireless network RF signals will come from one or more wireless network antennae. To avoid multipath impact on results accuracy the RF signal should be sniffed out from the antenna or the antenna connection to the wireless network equipment.

The two-way mode encompasses determination of the location fix from both: UL and DL operations. This allows further improve the locate accuracy.

Some Enterprise set ups use one or more BBUs feeding one or more Remote Radio Heads (RRH), with each RRH in turn feeding multiple antennae with the same ID. In such environments, depending on wireless network configuration, determining the DL mode frame starts offsets of network antennas might not be required. This includes a single BBU set up as well as multiple BBUs, whereby antennae of each BBU are assigned to a certain zone and adjacent zones coverage's are overlapping.

On the other hand a configuration, configuration whereby antennae that are fed from multiple BBUs are interleaved in the same zone will require determining the DL mode frame starts offsets of network antennas.

In DL mode of operation in DAS environment multiple antennae may share the same ID.

In the present embodiments, location consistency algorithm(s) are extended/developed to isolate the ranges of the DAS antennas from observables generated by the multipath mitigation processing from reference signal(s) (including pilot and/or synchronization) subcarriers and to obtain the location estimates from the multiple DAS emitters (antennas) ranges.

However, these consistency algorithms have limits of number of antennae that emit the same ID. It is possible to reduce the number of antennae that emit the same ID by
1. For a given coverage zone interleave Antennas that are fed from different sectors of sectorized BBU (BBUs are capable of supporting up to six sectors)
2. For a given coverage zone interleave Antennas that are fed from different sectors of sectorized BBU as well as Antennas that are fed from different BBUs
3. Adding a propagation delay element to each antenna. The delay values would be chosen to be large enough to exceed the delay spread in a particular DAS environment (channel), but smaller than the Cyclic Prefix (CP) length so that the multipath caused by additional delays will not result in ISI (Inter Symbol Interference). The addition of a unique delay ID for one or more antenna further reduces the number of antennae that emit the same ID.

In an embodiment, an autonomous system with no Customer Network Investment can be offered. In such embodiment, the system can operate on a band other than the LTE band. For example, ISM (industrial Scientific and Medical) bands and/or White Space bands can be used in places where LTE services are not available.

The embodiment can be also integrated with the macro/mini/pico/femto station (s) and/or UE (cell phone) equipment. Although the integration may require Customer Network Investment, it can reduce cost overhead and can dramatically improve the TCO (Total Cost of Ownership).

As mentioned herein above, PRS can be used by the UE for the Downlink Observed Time Difference of Arrival (DL-OTDOA) positioning. Regarding the synchronization of neighboring base stations (eNBs), the 3GPP TS 36.305 (Stage 2 functional specification of User Equipment (UE) positioning in E-UTRAN) specifies transferring timing to the UE, the timing being relative to an eNode B service of candidate cells (e.g., neighboring cells). The 3GPP TS 36.305 also specifies Physical cell IDs (PCIs) and global cell IDs (GCIs) of candidate cells for measurement purposes.

According to the 3GPP TS 36.305, this information is delivered from the E-MLC (Enhanced Serving Mobile Location Centre) server. It is to be noted that the TS 36.305 does not specify the abovementioned timing accuracy.

Additionally, the 3GPP TS 36.305 specifies that the UE shall return to the E-MLC the downlink measurements, which includes Reference Signal Time Difference (RSTD) measurements.

The RSTD is the measurement taken between a pair of eNBs (see TS 36.214 Evolved Universal Terrestrial Radio Access (E-UTRA); Physical Layer measurements; Release 9). The measurement is defined as a relative timing difference between a subframe received from the neighboring cell j and a corresponding subframe of the serving cell i. Positioning Reference Signals are used to take these measurements. The results are reported back to the location server that calculates the position.

In an embodiment, a hybrid method can be defined to accommodate both the newly introduced PRS and the already existing reference signals. In other words, the hybrid method can use/operate with PRS, with other reference signals (e.g., cell or node-specific reference signals (CRS)), or with both signal types.

Such a hybrid method provides the advantage of allowing network operator(s) to dynamically choose the mode of operation depending on circumstances or network parameters. For example, the PRS have better hearability than CRS, but may result in up to 7% reduction in the data throughput. On the other hand, CRS signals do not cause any throughput reduction. In addition, CRS signals are backward compatible with all previous LTE releases, for example Rel-8 and lower. As such, the hybrid method provides a network operator the ability to trade-off or balance between hearability, throughput, and compatibility.

In Long Term Evolution (LTE) implementations, LTE downlink baseband signals (generated by a cell or wireless node and referred to herein as "nodes") are generally combined into downlink frames. A receiver for detecting and receiving such signals may detect downlink frames from multiple cells or nodes (two or more). Each downlink frame includes multiple CRS or reference signals. In a Downlink (DL) frame, these reference signals have predetermined positions in time and frequency, e.g., there are deterministic time offsets between the frame start and each CRS in a given frame.

In addition, each CRS is modulated with a special code. The modulation and the code are also predetermined. The CRS modulation is the same for all nodes, but the code (seed) is determined by the ID (identification) number of the node.

As a result, by knowing the node ID(s), it is possible to estimate a course location of a frame start time for each frame from each node (cell), in the spectrum of the reference signals. To do so, it is first necessary to determine the frame start times or frame starts for all DL signals from different nodes. For example, in an embodiment, by correlating the received DL baseband signal with known replicas of code modulated CRS (generated internally by a detector and/or a multipath mitigation processor) it is possible to find all CRS sequences or other reference signals from various nodes, and with this information find coarse location frame starts of all observable nodes. In an embodiment, the detector may also demodulate/decode the CRS and then correlate the demodulated/decoded CRS with baseband sub-carriers that are assigned to the CRS.

At the same time, in an embodiment, the CRS may also be used as ranging signals by the multipath mitigation processor. Therefore, in addition to finding coarse frame starts the detector's correlation process is also capable of isolating the CRS from other signals (such as payload) in the frame using the code that was used to modulate those signals. Thereafter, these isolated CRS, and associated frames starts, are transferred to a multipath mitigation processor for ranging.

A similar approach can be used in the Uplink mode, whereby timing offsets between different node receivers can be determined.

In a downlink embodiment, a system for tracking and locating one or more wireless network devices in communication with a network comprises a user equipment receiver configured to receive multiple signals from two or more nodes in communication with the network, the multiple signals being modulated with a code determined by an identification of each node of the two or more nodes transmitting the multiple signals, the user equipment receiver including a detector configured to detect and isolate reference signals from the multiple signals based on the identification, and a processor configured to use the reference signals as ranging signals from each node for tracking and locating the one or more wireless network devices.

In the embodiment, wherein the multiple signals from each node of the two or more nodes are combined into a frame that includes the reference signals, and wherein the detector is further configured to estimate a course location of frame starts from each node.

In the embodiment, wherein the detector is further configured to estimate the course location by correlating the reference signals with known replicas of such reference signals.

In the embodiment, wherein the detector is further configured to isolate the reference signals from any other signals in the frame, and wherein the detector is further configured to isolate the reference signals for each node of the two or more nodes.

In the embodiment, wherein the processor is at least one multipath mitigation processor, and wherein the multipath mitigation processor is configured to receive the course location and isolated reference signals and estimate a relative time of arrival of the ranging signals from each node.

In the embodiment, wherein the processor is at least one multipath mitigation processor.

In the embodiment, wherein the multiple signals from each node of the two or more nodes are in a frame, wherein the detector is further configured to estimate a course location of frame starts from each node, wherein the detector is configured to isolate the reference signals from any other signals in the frame, wherein the detector is further configured to isolate the reference signals for each node of the two or more nodes, wherein the detector is configured to pass the course location and isolated reference signals for each node to the multipath mitigation processor, and wherein the multipath mitigation processor is configured to receive the course location and isolated reference signals and estimate a relative time of arrival of the ranging signals from each node.

In the embodiment, the system further comprises an uplink embodiment where a node receiver is configured to receive device signals from the one or more wireless network devices, the device signals being modulated with a device code determined by a device identification of each wireless network device of the one or more wireless network devices transmitting the device signals, the node receiver including a device detector configured to detect and isolate device reference signals from the device signals based on the device identification, and a second processor is configured to use the device reference signals as ranging signals from each wireless network device for tracking and locating the one or more wireless network devices.

In an embodiment, a system for tracking and locating one or more wireless network devices in communication with a network, comprises a user equipment receiver configured to receive multiple signals from two or more nodes in communication with the network, the multiple signals being modulated with a code determined by an identification of each node of the two or more nodes transmitting the multiple signals, and a processor configured to detect and isolate reference signals from the multiple signals based on the identification and to use the reference signals as ranging signals from each node for tracking and locating the one or more wireless network devices.

In the embodiment, wherein the multiple signals from each node of the two or more nodes are combined into a frame that includes the reference signals, and wherein the processor is further configured to estimate a course location of frame starts from each node.

In the embodiment, wherein the processor is further configured to estimate the course location by correlating the reference signals with known replicas of the reference signals.

In the embodiment, wherein the processor is further configured to estimate a relative time of arrival of the ranging signals from each node based on the course location and isolated reference signals.

In the embodiment, wherein the processor is further configured to isolate the reference signals from any other signals in the frame, and wherein the processor is further configured to isolate the reference signals for each node of the two or more nodes.

In the embodiment, wherein the multiple signals from each node of the two or more nodes are in a frame, wherein the processor is further configured to estimate a course location of frame starts from each node by correlating the reference signals with known replicas of the reference signals, wherein the processor is further configured to isolate the reference signals from any other signals in the frame and to isolate the reference signals for each node of the two or more nodes, and wherein the processor is further configured to estimate a relative time of arrival of the ranging signals from each node based on the course location and isolated reference signals.

In an embodiment, a system for tracking and locating one or more wireless network devices in communication with a network, comprises a detector configured to receive multiple signals from two or more nodes in communication with the network, the multiple signals being modulated with a code determined by an identification of each node of the two or more nodes transmitting the multiple signals, and to detect and isolate reference signals from the multiple signals based on the identification, and a processor configured to use the reference signals as ranging signals from each node for tracking and locating the one or more wireless network devices.

In the embodiment, wherein the multiple signals from each node of the two or more nodes are combined into a frame that includes the reference signals, and wherein the detector is further configured to estimate a course location of frame starts from each node.

In the embodiment, wherein the detector is further configured to estimate the course location by correlating the reference signals with known replicas of such reference signals.

In the embodiment, wherein the detector is further configured to isolate the reference signals from any other signals in the frame, and wherein the detector is further configured to isolate the reference signals for each node of the two or more nodes.

In the embodiment, wherein the processor is at least one multipath mitigation processor, and wherein the multipath mitigation processor is configured to receive the course location and isolated reference signals and estimate a relative time of arrival of the ranging signals from each node.

In the embodiment, wherein the processor is at least one multipath mitigation processor.

In the embodiment, wherein the multiple signals from each node of the two or more nodes are in a frame, wherein the detector is further configured to estimate a course location of frame starts from each node, wherein the detector is configured to isolate the reference signals from any other signals in the frame, wherein the detector is further configured to isolate the reference signals for each node of the two or more nodes, wherein the detector is configured to pass the course location and isolated reference signals for each node to the multipath mitigation processor, and wherein the multipath mitigation processor is configured to receive the course location and isolated reference signals and estimate a relative time of arrival of the ranging signals from each node.

In an embodiment, a system for tracking and locating one or more wireless devices in communication with a network, comprises a node receiver configured to receive device signals from the one or more wireless network devices, the device signals being modulated with a device code determined by a device identification of each wireless network device of the one or more wireless network devices transmitting the device signals, the node receiver including a device detector configured to detect and isolate device reference signals from the device signals based on the device identification, and a processor configured to use the device reference signals as ranging signals from each wireless network device for tracking and locating the one or more wireless network devices.

Furthermore, the hybrid method can be transparent to the LTE UE positioning architecture. For instance, the hybrid method can operate in the 3GPP TS 36.305 framework.

In an embodiment, RSTD can be measured and, according to the 3GPP TS 36.305, transferred from a UE to an E-SMLC.

The UL-TDOA (U-TDOA) is currently in a study phase and is expected to be standardized in the upcoming release 11.

Figure 16:
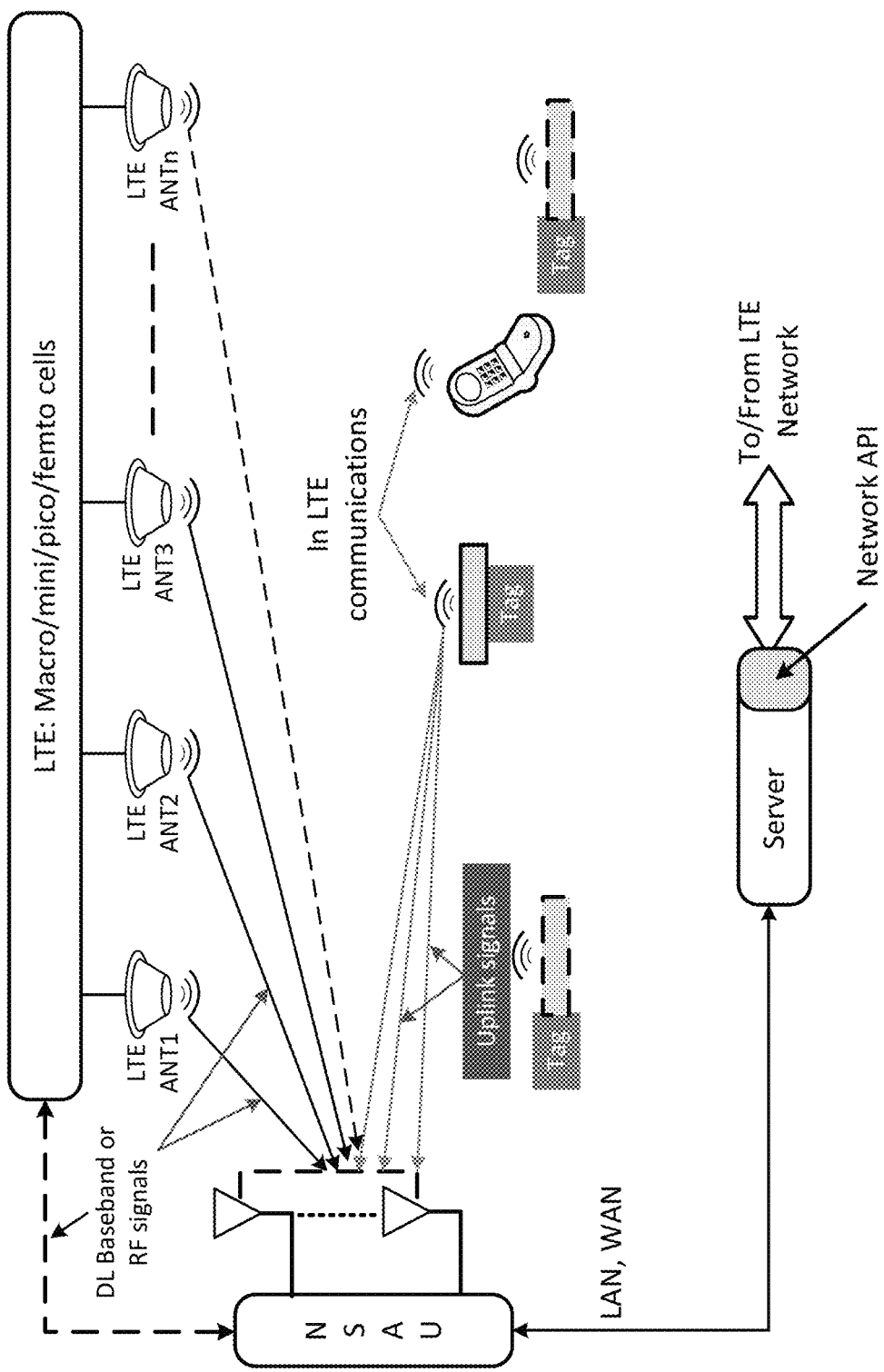
FIG. 16 illustrates an embodiment of a wireless network locate uplink ecosystem for enterprise applications.
Figure 17:
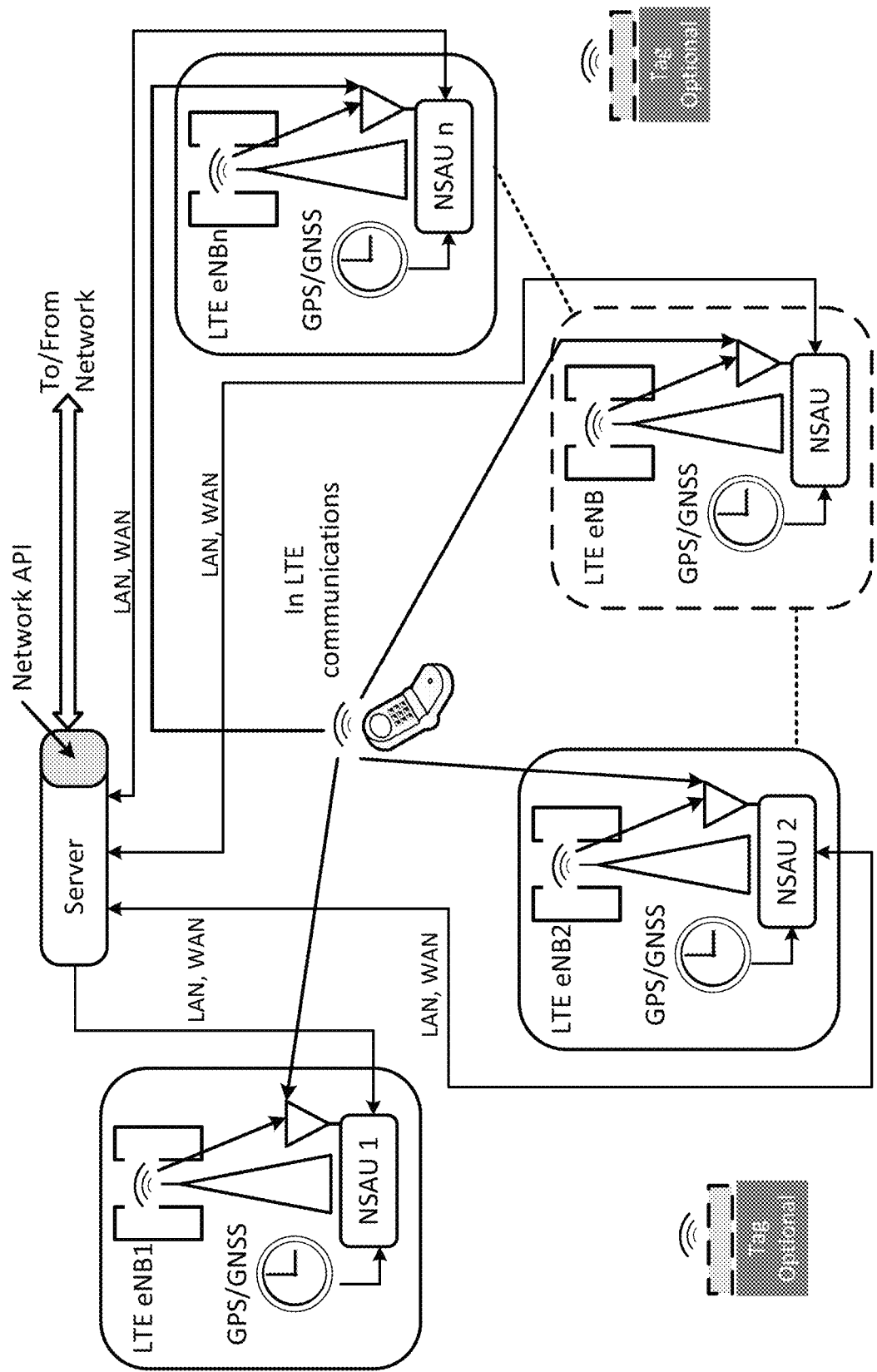
FIG. 17 illustrates an embodiment of a wireless network locate uplink ecosystem for network wide applications.
Figure 18:
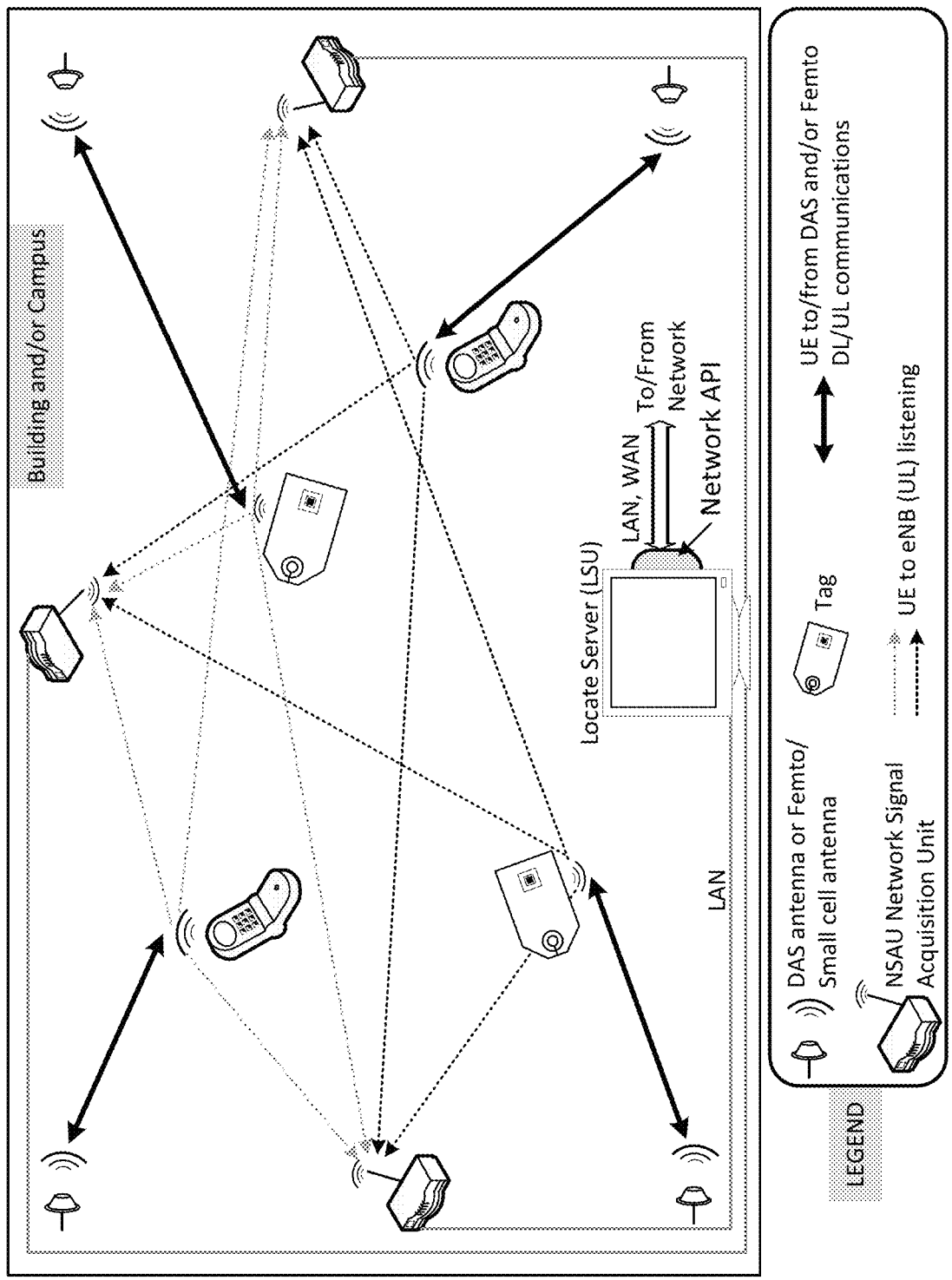
FIG. 18 illustrates an embodiment of an UL-TDOA environment that may include one or more DAS and/or femto/small cell antennas.
Figure 19:
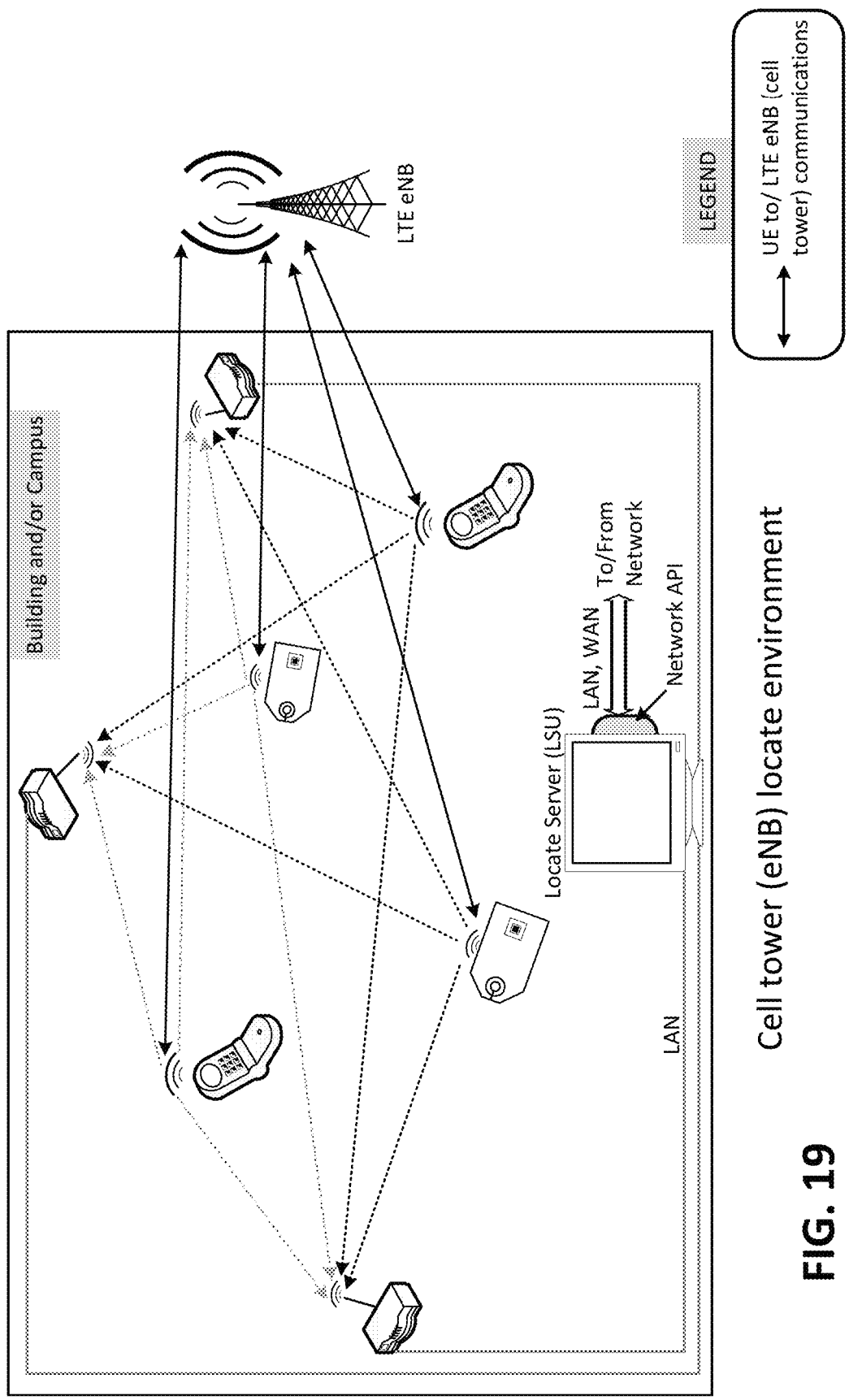
FIG. 19 illustrates an embodiment of an UL-TDOA like that of FIG. 18 that may include one or more cell towers that can be used in lieu of DAS base stations and/or femto/small cells.

Embodiments of the UL-TDOA (Uplink) are described herein above and are also shown in FIGS. 16 and 17. FIGS. 18 and 19, described herein below, provide examples of alternative embodiments of the UL-TDOA.

FIG. 18 presents an environment that may include one or more DAS and/or Femto/Small cell antennas. In this example embodiment, each NSAU is equipped with a single antenna. As depicted, at least three NSAUs are required. However, additional NSAUs can be added to improve hearability because each UE must be "heard" by at least three NSAUs.

Furthermore, the NSAU(s) can be configured as receivers. For example, each NSAU receives but does not transmit information over the air. In operation, each NSAU can listen to the wireless Uplink network signals from UEs. Each of the UEs can be a cell phone, a Tag, and/or another UE device.

Moreover, the NSAUs can be configured to communicate with a Locate Server Unit (LSU) over an interface, such as a wired service or a LAN. In turn, the LSU can communicate with a wireless or an LTE network. The communication can be via a network API, where the LSU can, for example, communicate with an E-SMLC of the LTE network and can use a wired service such as a LAN and/or a WAN.

Optionally, the LSU may also communicate directly with DAS base station(s) and or Femto/Small cells. This communication can use the same or a modified Network API.

In this embodiment, the Sounding Reference Signal (SRS) can be used for locate purposes. However, other signals may also be employed.

The NSAUs can convert the UE Uplink transmission signals to a digital format, for example I/Q samples, and can periodically send a number of the converted signals to the LSU with a time stamp.

The DAS base station(s) and or Femto/Small cells can pass to the LSU one or all of the following data:
1) the SRS, the I/Q samples, and the time stamp;
2) a list of served UE IDs; and
3) SRS schedule per UE with a UE ID, the schedule including SRS SchedulingRequestConfig information and SRS-UL-Config information.

The information passed to the LSU may not be limited by the abovementioned information. It can include any information needed to correlate each UE device uplink signal, such as a UE SRS, with each UE ID.

The LSU functionality can include ranging calculations and obtaining the location fix of a UE. These determinations/calculations can be based on the information passed from the NSAUs, the DAS bases stations, and/or Femto/Small cells to the LSU.

The LSU may also determine timing offsets from the available downlink transmission information passed from the NSAUs to the LSU.

In turn, the LSU can provide the wireless or LTE network with UE location fix and other calculations and data. Such information can be communicated via the Network API.

For synchronization purposes, each NSAU may receive, process, and time stamp samples of Downlink signals. Each NSAU may also periodically send a number of such samples to the LSU, including the time stamp(s).

Additionally, each NSAU may include an input configured for synchronization with external signal(s).

FIG. 19 depicts another embodiment of a UL-TDOA. In addition to the components depicted under FIG. 18, the environment of this embodiment may include one or more cell towers that can be used in lieu of the DAS base stations and/or Femto/Small cells. Data from the one or more cell towers can be used to obtain the location fix of a UE.

As such, an advantage of this embodiment includes obtaining a location fix with only a single cell tower (eNB). In addition, this embodiment can be configured to operate in a similar manner as described under FIG. 18, with the exception that one or more eNBs can replace the DAS base stations and/or the Femto/Small cells.

Figure 20:
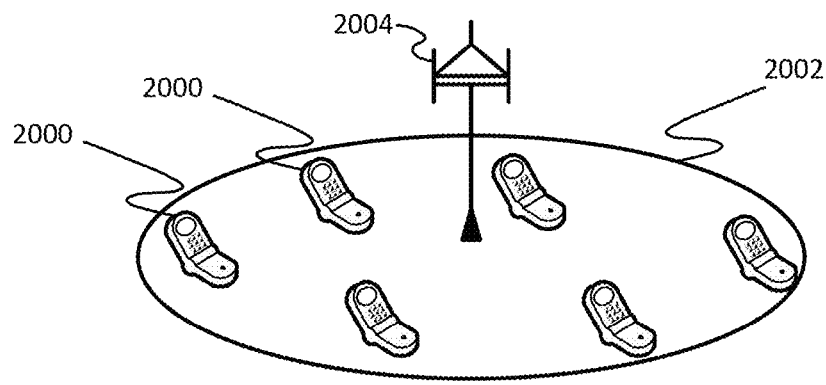
FIG. 20 illustrates an embodiment of cell level locating.
Figure 21:
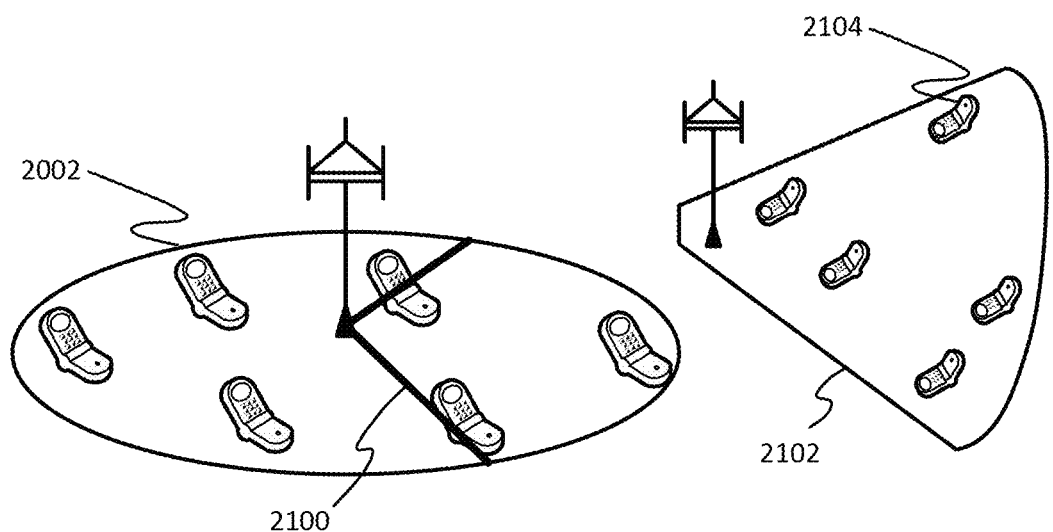
FIG. 21 illustrates an embodiment of serving cell and sector ID locating.

One method of uplink locating of UE is the Cell Identification method (CID). In the basic CID method the UE position may be determined on the cell level. This method is purely network based. As a result, the UE, for example a handset, is not aware of the fact that it is being tracked. While this is a relatively simple method, it lacks accuracy because the locate uncertainty is equal to the cell diameter. For example, as illustrated in FIG. 20, any of the handsets 2000 within the cell diameter 2002 of a serving cell tower 2004 effectively have the same location, even though they are not at the same location. The accuracy of the CID method can be improved when combined with serving sector identification (sector ID) knowledge. For example, as illustrated in FIG. 21, sector ID 2100 identifies a section 2102 within the cell diameter 2002 that includes a number of handsets 2104 that are known to have a different location than the other handsets 2000 in other sectors of the cell diameter 2002.

Further enhancement to the CID method may be possible through the Enhanced Cell ID (E-CID) method, which provides further refinements to the basic CID method described above. One enhancement uses timing measurements to calculate how far away the UE is from the eNB (the network node). This distance can be calculated as half the round trip time (RTT), or Timing Advance (TA) in LTE (LTE TA), times the speed of light. If the UE is connected, then RTT or TA may be used for distance estimation. In this case both: the serving cell tower or sector and the UE (upon the serving eNB command) will measure the timing difference between Rx sub-frames and Tx sub-frames. The UE will report its measurements to the eNB (also under the eNB control). It should be noted that LTE Rel-9 adds the TA type 2 measurements that rely on the timing advance estimated from receiving a PRACH preamble during the random access procedure. A PRACH (physical/packet random access channel) preamble specifies the maximum number of preambles to be sent during one PRACH ramping cycle when no response is received from the UE being tracked. The LTE Type 1 TA measurement is the equivalent to the RTT measurement, as follows:

RTT=TA(type 1)=*eNB(Rx-Tx)*+UE(*Rx-Tx*)

With knowledge of the eNB's coordinates and the height of the serving cell tower antenna, the position of the UE can be calculated by the network.

The E-CID locating method is still limited, however, because in one dimension the locate accuracy depends upon the sector width and the distance from the serving cell tower, and in the other dimension the error depends upon the TA (RTT) measurement accuracy. The sector width varies with network topology and is impacted by the propagation phenomena, specifically multipath. Sector accuracy estimates vary from 200 meters to in excess of 500 meters. The LTE TA measurement resolution is 4 Ts, which corresponds to 39 meters of maximum error. The actual error in the LTE TA measurement is even larger, however, due to calibration inaccuracies and the propagation phenomena (multipath), and may reach as much as 200 meters.

Figure 22:
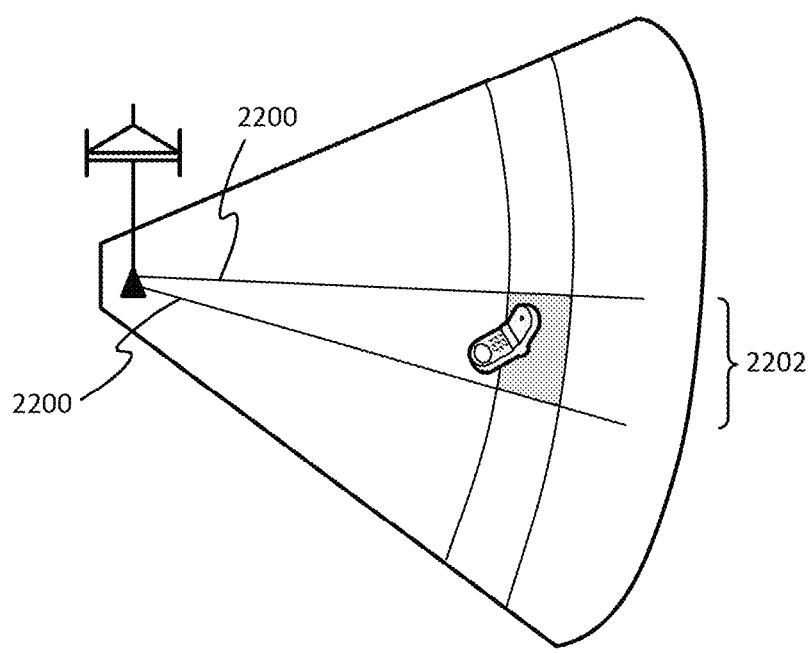
FIG. 22 illustrates an embodiment of E-CID plus AoA locating.
Figure 23:
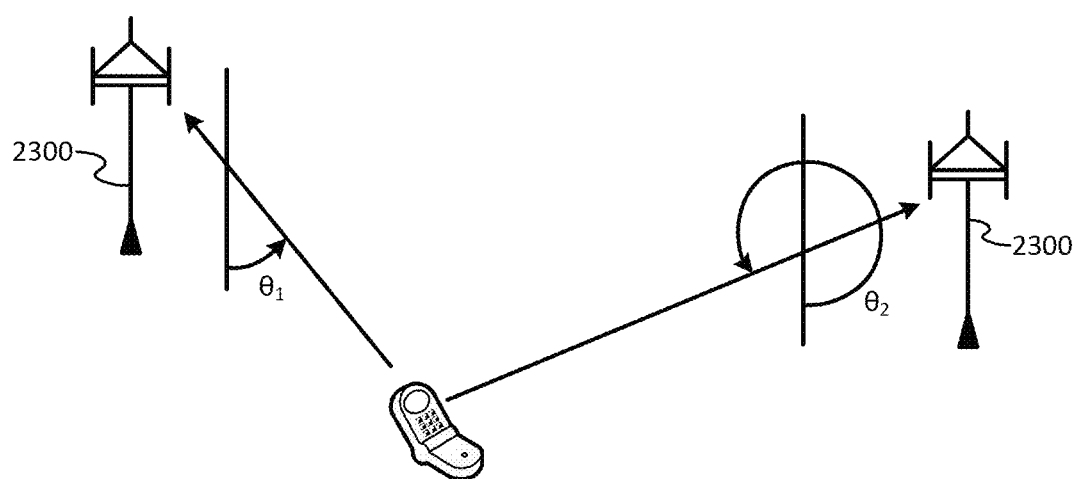
FIG. 23 illustrates an embodiment of AoA locating.

As illustrated in FIG. 22 the E-CID method may be further improved with the addition of a feature known as Angle of Arrival (AoA). The eNB estimates the direction from which the UE is transmitting using a linear array of equally spaced antenna elements 2200. Typically, reference signals are used for the AoA determination. When reference signals are received from the UE at two adjacent antenna elements 2200, the reference signals may be phase rotated, as shown in FIG. 23 by an amount which depends on the AoA, the carrier frequency, and the element spacing. The AoA will require each eNB to be equipped with antenna arrays/adaptive antennas. It is also exposed to multipath and topology variances. Nevertheless, sophisticated antenna arrays can significantly reduce the width 2202 of the sector 2100, which may lead to better locate accuracy. Moreover, if two or more serving cell towers 2300 (eNB's base stations equipped with directional antenna arrays) can be used to make the handset AoA determination, as illustrated in FIG. 23 then the accuracy may be considerably improved. In such a case, the accuracy is still subject to the multipath/propagation phenomena.

Deploying antenna arrays/adaptive antennas network-wide over multiple LTE bands requires a monumental effort in terms of capital, time, maintenance, etc. As a result, the antenna arrays/adaptive antennas have not been deployed for the purpose of UE locating. Other approaches, such as signal strength based methods, do not produce significant accuracy improvement. One such signal strength approach is fingerprinting, which requires creating and continuously updating an enormous, continuously changing (in time) fingerprint database, e.g. large capital and reoccurring expenses without significant accuracy improvement. Moreover, fingerprinting is UE based technology, whereby the UE position cannot be determined without UE assistance on the UE application level.

A solution to the limitations of other uplink location methods involves the use of AoA capabilities without the need for antenna arrays/adaptive antennas. Such an embodiment may employ TDOA (Time Difference of Arrival) location techniques for AoA determination, which may be based on estimating the difference in the arrival times of the signal from the source at multiple receivers. A particular value of the time difference estimate defines a hyperbola between two receivers in communication with a UE. When the distance between the receiving antennas is small relative to the distance of the emitter (the handset) being located, then the TDOA is equivalent to the angle between the baseline of the sensors (receivers antennas) and the incident RF energy from the emitter. If the angle between the baseline and true North is known, then the line of bearing (LOB) and/or AoA can be determined.

While general locate methods that use either TDOA or LOB (also known as AoA) are known, TDOA locate methods have not been used to determine LOB because the TDOA reference points are too close to one another to make the accuracy of such a technique acceptable. Rather, LOB is usually determined using directional antennas and/or beamforming antennas. The super resolution methods described herein, however, make it possible to use TDOA for LOB determination while dramatically improving accuracy. In addition, without the reference signal processing techniques described herein, it may not be possible to "hear", e.g. detect, reference signals coming from a UE outside of the serving sectors, e.g. by the non-serving sectors and/or antennas. Without the resolution and processing capabilities described herein, it may not be possible to employ TDOA for LOB determination because at least two points of reference are needed, e.g. two or more sectors and/or antennas). Similarly, a UE may not be able to detect reference signals coming to the UE from other than serving sectors, e.g. from the non-serving sectors and/or antennas.

Figure 24:
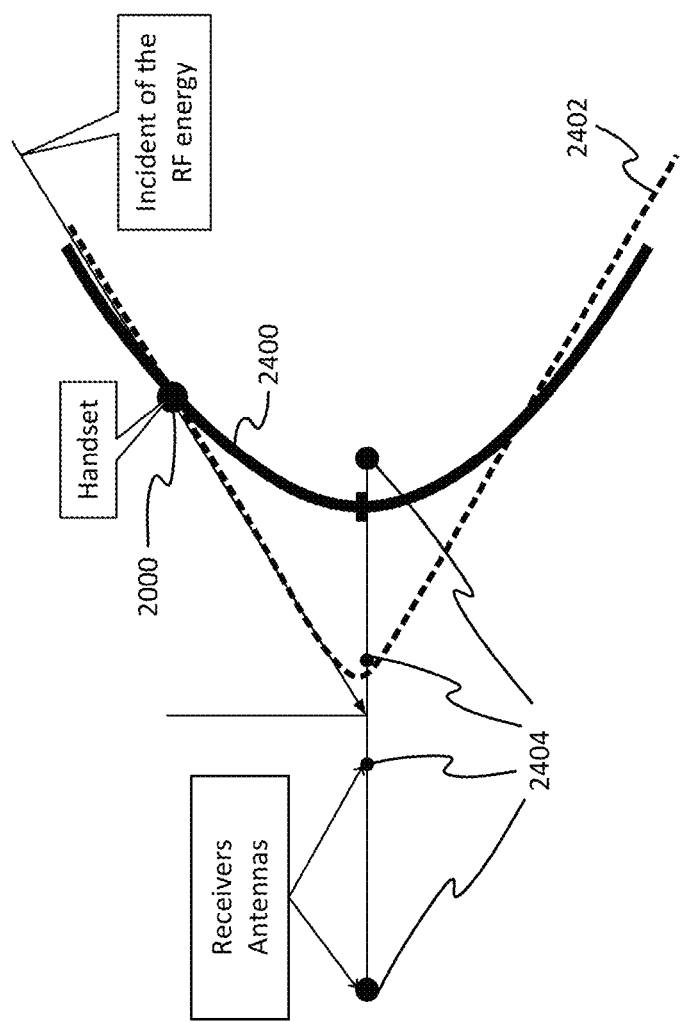
FIG. 24 illustrates an embodiment of TDOA with wide and close distances between receiving antenna.

For example, in FIG. 24 two antenna separation scenarios are illustrated: wide separation and close (small) separation. In both scenarios the hyperbola 2400 and the incident line 2402 are crossing at the handset 2000 location, but in the case of where the antenna 2404 separation is wide, this happens at a steeper angle, which in turn substantially reduces the locate error. At the same time, in case of the antennas 2404 being close to each other the hyperbola 2400 becomes interchangeable with the line 2402 of the RF energy incident or the LOB/AoA.

The formula set forth below can be used to determine the incident RF energy from the emitter, where the time difference in arrival time of RF energy between two antennas (sensors) is given by:

$$\Delta t = \frac{x \sin \Theta}{c}$$

where:
$\Delta t$ is the time difference in seconds;
x is the distance between the two sensors in meters;
$\Theta$ is the angle between the baseline of the sensors and the incident RF wave, in degrees; and
c is the speed of light.

Several locate strategies are available through use of the TDOA locating embodiment, including: (1) when the TDOA measurements (multilateration) between two or more serving cells are available, e.g., wide separation; (2) when the TDOA measurements are only from two or more sectors at one or more serving cells, e.g., small antenna separations, such LOB/AoA; (3) a combination of strategies (2) and (3); and (4) a combination of TA measurements and strategies (1)-(3), e.g., improved E-CID.

As further explained below, in the case of closely positioned antennas, the TDOA locating embodiment may use a line of bearing when the signals from two or more antennas are from the same cell tower. These signals can be detected in the received composite signal. By knowing the tower location and the azimuth of each sector and/or antenna, the line of bearing and/or AoA can be calculated and utilized in the location process. The LOB/AoA accuracy may be impacted by multipath, noise (SNR), etc., However, this impact may be mitigated by advanced signal processing and the multipath mitigation processing techniques described above, which may be based on super resolution technology. Such advanced signal processing includes, but is not limited to, signal correlation/correlating, filtering, averaging, synchronous averaging and other methods/techniques.

Figure 25:
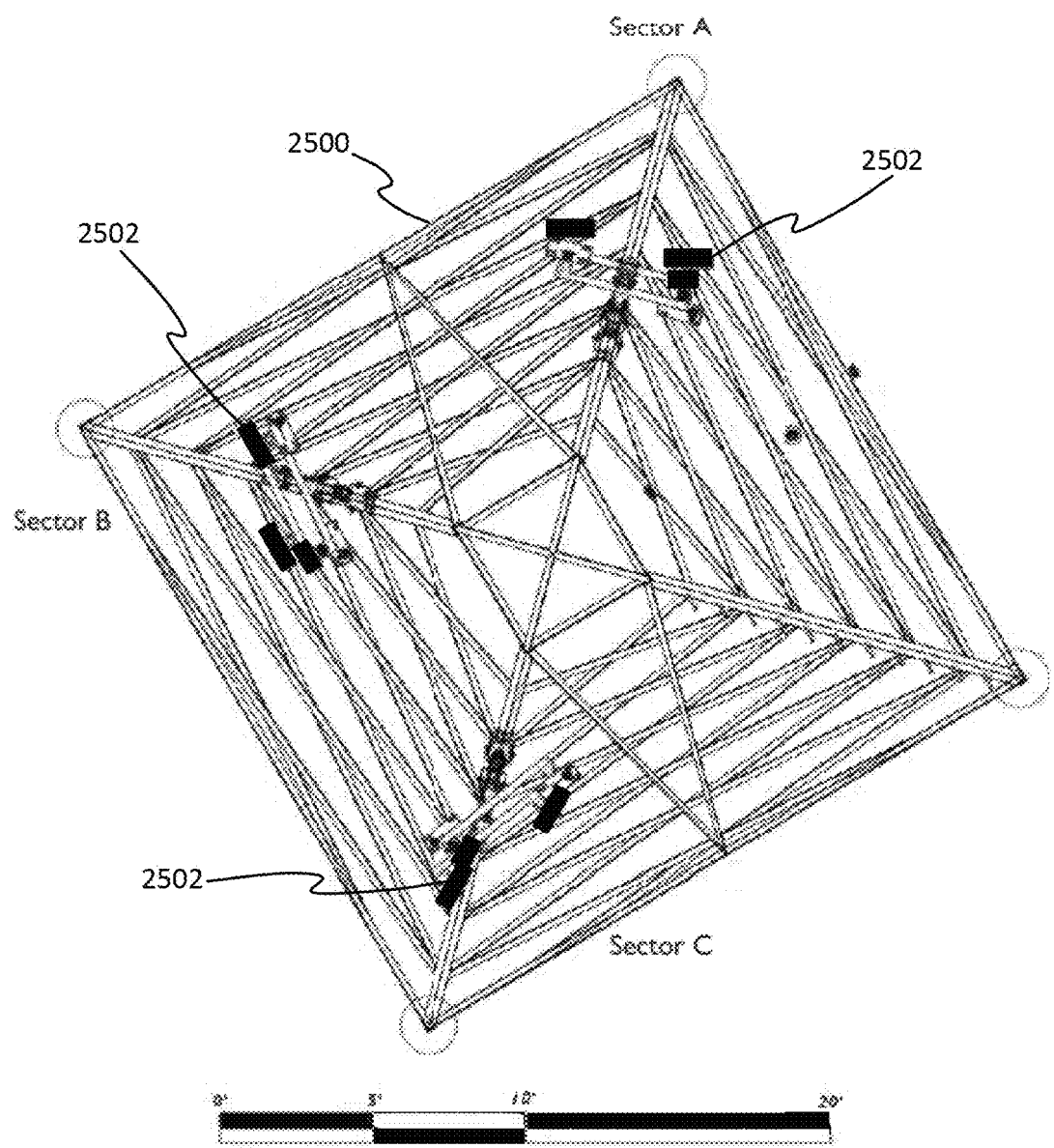
FIG. 25 illustrates an embodiment of a three sector deployment.

The serving cell tower 2500 typically consists of multiple sectors, as illustrated in FIG. 25 which shows a three sector (Sector A, Sector B and Sector C) configuration. The three sector deployment illustrated may include one or more antennas 2502 per sector. A single sector, such as sector A, may be in control of the UE (handset) because the handset transmissions will be in Sector A's main lobe (the main lobe's center coincides with the sector azimuth). At the same time the handset transmissions will fall outside Sectors B's and C's main lobes, e.g., into antennas side lobes. Thus, the handset signals will still be present in the output signal spectrums of Sectors B and C, but will be significantly attenuated relative to signals from other handset(s) that are located in Sector B's or Sector C's main lobes. Nevertheless, through the use of advanced signal processing, as described above and below, it is possible to obtain sufficient processing gain on ranging signals to make them detectable from the neighboring sectors' side lobes, such as the Sector B and Sector C side lobes. For network-based locating purposes, the LTE Uplink SRS (Sounding Reference Signals) may be employed as ranging signals.

In other words, while the UE uplink reference signal might be in the side lobe of the neighboring sector(s) antennas, the processing gain through reference signal processing methods described herein may be sufficient to allow a calculation of TDOA between the two (or more) sector antennas. The accuracy of this embodiment may be significantly enhanced by the multipath mitigation processing algorithms described above. Thus, LOB/AOA intersected with the annulus calculated by the LTE TA timing may provide a UE location to within an error ellipse of approximately 20 meters by 100 meters.

Further locate error reduction may be achieved when the UE can be heard by two or more LTE towers, which is highly probable with the processing gains and multipath mitigation technology described above, In such a case, the intersection of the TDOA hyperbola and one or more LOB/AoA lines may result in a 30 by 20 meter error ellipse (for a two sector cell tower). If each cell tower supports three or more sectors, then the error ellipse may be further reduced down to 10-15 meters. If the UE is heard by three or more eNB's (cell towers), then 5 to 10 meters accuracy may be achieved. In high value areas, such as malls, office parks and the like, additional small cells or passive listening devices may be used to create the necessary coverage.

As was mentioned, above each sector of the cell tower 2500 may include one or more antennas 2502. In a typical installation, for a given sector, signals from each antenna are combined at the sector's receiver input. As a result, for locate purposes, two or more sector antennas can be viewed as a single antenna with composite directionality pattern, azimuth and elevation. The hypothetical antenna composite directionality and its (main lobe) azimuth and elevation may also be assigned to the sector itself.

In an embodiment, the received signals (in a digital format) from all sectors of each serving cell tower and neighboring serving cell towers are sent to a locate server unit (LSU) for location determination. Also, SRS schedules and TA measurements per each served UE is provided to the LSU by each serving sector from each serving cell tower. Assuming that each serving cell tower and each neighboring cell tower location coordinates, the number of sectors per tower with each hypothetical (composite) sector antenna azimuth and elevation, and each sector position at the cell tower are known, the LSU may determine each UE position relative to the serving cell tower and/or neighboring cell towers. All of the abovementioned information may be sent through wired networks, for example LAN, WAN, etc., using one or more standardized or proprietary interfaces. The LSU may also interface the wireless network infrastructure using a standardized interface and/or a network carrier's defined interface/API. The location determination may also be split between the network node and the LSU or performed solely in the network node.

In an embodiment, the location determination may be performed in the UE or split between the UE and LSU or network node. In such cases, the UE may communicate over the air using standard networking protocols/interfaces. In addition, the location determination can be performed through a combination of the UE, the LSU and/or network nodes, or the LSU functionality can be implemented (embedded) into a SUPL server, a E-SMLC server, and/or a LCS (LoCation Services) system that can then be used in place of the LSU.

Embodiments of a Downlink (DL) locate method are reciprocals to the Uplink (UL) locate embodiments described above. In a DL embodiment, a sector may become a transmitter with a transmit pattern, azimuth and elevation that matches the sector's received directionality, azimuth and elevation. Unlike the uplink embodiments, in DL embodiments, the UE typically has a single receive antenna. Thus, for UE there is no sensors baseline that can be used to determine the RF wave incident. However, the UE can determine the TDOA(s) between different sectors and consequently a hyperbola(s) (multilateration) between sectors, and because the same cell tower sectors are close to each other the hyperbola becomes interchangeable with the line of the RF energy incident or the LOB/AoA, as described above with reference to FIG. 24 While the LOB/AoA accuracy may be impacted by multipath, noise (SNR), etc., this impact may be mitigated through use of the advanced signal processing and the multipath mitigation processing, which is based on the super resolution technology, described above.

As noted, UE DL locating can be accomplished in ways that are similar to the UE uplink locating, with the exception of that the RF wave incident angle cannot be determined from the formula above. Instead, the multilateration technique may be used for determining the LOB/AoA for each serving cell tower.

UE DL locate embodiments also employ reference signals. In the DL case, one approach for such network-based locating may be to employ the LTE Cell-Specific Reference Signals (CRS) as ranging signals. Also, Position Reference Signals (PRS) introduced in LTE Release 9 may be used. Thus, locate may be done using CRS only, PRS only, or both CRS and PRS.

As with UE uplink locate embodiments, for UE downlink locate embodiments, a snap-shot of the UE received signal in digital format may be sent to the LSU for processing. The UE may also obtain the TA measurements and provide those to the LSU. Optionally, TA measurements per each served UE may be provided to the LSU by each serving sector from each serving cell tower (network node). As previously noted, assuming that each serving cell tower and each neighboring cell tower location coordinates, the number of sectors per tower with each sector transmit pattern azimuth and elevation, and each sector position at the tower are known, the LSU may determine each UE position relative to the serving cell tower and/or neighboring cell towers. In embodiments, the location determination may be performed in the UE or split between the UE and LSU or network node. In embodiments, all location determinations can be performed in the LSU or the network node or split between the two.

The UE will communicate/receive measurements results and other information over the air using standard wireless protocols/interfaces. The information exchange between the LSU and network node(s) may be through wired networks, for example LAN, WAN, etc., using proprietary and/or one or more standardized interfaces. The LSU may interface the wireless network infrastructure using a standardized interface and/or network carrier's defined interface/API. The location determination may also be split between the network node and the LSU or performed solely in the network node.

Figure 26:
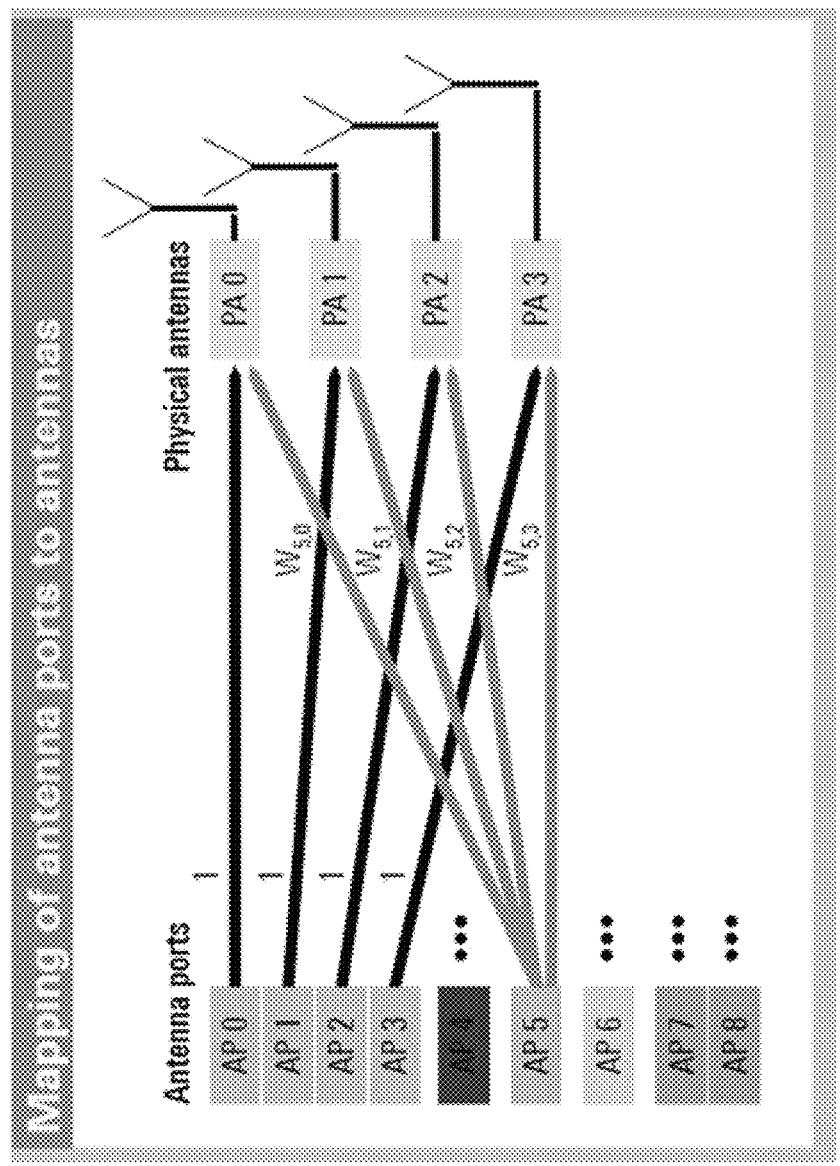
FIG. 26 illustrates an embodiment of antenna ports mapping.

For the UE DL location embodiments described above, antenna port mapping information can also be used to determine location. The 3GPP TS 36.211 LTE standard defines antenna ports for the DL. Separate reference signals (pilot signals) are defined in the LTE standard for each antenna port. Thus, the DL signals also carry the antenna port information. This information is included in the PDSCH (Physical Downlink Shared Channel). The PDSCH uses the following antenna ports: 0; 0 and 1; 0, 1, 2 and 3); or 5. These logical antenna ports are assigned (mapped) to the physical transmit antennas, as illustrated in FIG. 26 As a result, this antenna port information can be used for the antenna identification (antenna ID).

For example, the antenna port mapping information can be used to determine the RF wave incident and the hyperbola(s) (multilateration) between antennas (assuming that the antennas locations are known). Depending upon where the location determination is performed, the antenna mapping information has to be available to the LSU or UE, or network node. It should be noted that antenna ports are indicated by placing CRS signals in different time slots and different resource elements. Only one CRS signal is transmitted per DL antenna port.

In the event of MIMO (Multiple Input Multiple Outputs) deployment in the eNB or network node, receiver(s) may be able to determine the time differences of arrivals from a given UE. With knowledge of antennas to the receiver(s) mapping, e.g. MIMO mapping, including antennas locations, it may also be possible to determine the RF wave incident (LOB/AoA) to antennas and the hyperbola(s) (multilateration) for given eNB antennas. Likewise, at the UE, the UE receiver(s) may be able to determine the time differences of arrival(s) from two or more eNB or network node, and MIMO antennas. With knowledge of the eNB antenna locations and antennas mapping, it will be possible to determine the RF wave incident (LOB/AoA) from antennas and the hyperbola(s) (multilateration) for given eNB antennas. Depending on where the location determination is performed; the antenna mapping information has to be available to the LSU or UE, or network node.

There are other configurations that are subsets of MIMO, such as Single Input Multiple Outputs (SIMO), Single Output Multiple Inputs (SOMI), Single Input Single Output (SISO), etc. All of these configurations may be defined/determined by the antenna ports mapping and/or MIMO antenna mapping information for locate purposes.

In an aspect, the present embodiments relate to methods and systems for RF-based identification, tracking, and locating of objects, including RTLS. According to one embodiment, the methods and systems employ geographically distributed clusters of receivers and/or transmitters that are precisely synchronized in time, e.g., within 10 ns or better, within each cluster, while the inter-cluster time synchronization can be much less accurate or not required at all. While a precise synchronization time of 10 ns or better is described with respect to one particular embodiment, it is important to note that the predetermined synchronization time required to achieve an accurate location depends on the equipment being utilized. For example, for some wireless system equipment, where an accuracy of 3 m is required for an accurate location determination, the predetermined time may need to be 10 ns or better, but with other wireless system equipment, a location accuracy of 50 m may be more than sufficient. Hence, the predetermined time is based on the desired accuracy location for the wireless system. The disclosed methods and systems are a significant improvement to the existing implementation of tracking and location DL-OTDOA and U-TDOA techniques, which rely on geographically distributed standalone (individual) transmitters and/or receivers.

For example, in the DL-OTDOA technique, the relative timing difference between signals coming from neighboring base stations (eNB) is calculated and the UE position can be estimated in the network with the UE (handset) with or without UE assistance or in the UE (handset) with network assistance (control plane or user plane with SUPL based only) or without the network assistance. In DL-OTDOA, once the signals from three or more base stations are received, the UE measures the relative timing difference between signals coming from a pair of base stations and produces hyperbolic lines of position (LOPs). At least three reference points (base stations not belonging to a straight line) are needed to define two hyperbolas. The location (position fix) of the UE is in the intersection of these two hyperbolas (see FIG. 11). The UE position fix is relative to the base stations' RF emitters' (antennas) locations. As an example, when using the LPP (LTE Positioning Protocol, Rel-9) the DL-OTDOA locating is UE assisted and the E-SMLC (Evolved Serving Mobile Location Centre) is server based.

The U-TDOA technique is similar to the DL-OTDOA, but the roles are reversed. Here, the neighboring Location Management Unit (LMU) calculates the Relative Time of Arrival of the uplink signal coming from the UE (handset) and the UE position can be estimated in the network without the UE assistance. Thus, the U-TDOA is LMU assisted and the E-SMLC (Evolved Serving Mobile Location Centre) is server based. Once the Relative Time of Arrival values from three or more LMUs are available, the network's E-SMLC server produces hyperbolic lines of position (LOPs) and the location (position fix) of the UE (see FIG. 27). The UE position fix is relative to the LMUs antennas locations. In an aspect, unlike the DL-OTDOA, the eNB's (base station's) time synchronization in case of U-TDOA is not necessary—only the LMU(s) will need precision time synchronization for locating purposes. As an example, the LMU is essentially a receiver with computing capabilities. As a further example, the LMU receiver employs the SDR (Software Defined Radio) technology. In a further example, the LMU may be a small cell, macro cell or a special purpose small cell type device that only receives.

Regardless of the implementation, correlating the location of the SRS for the specific UE, as provisioned by the network, will enable identification and location of the UE. Location of the SRS may be done at the network level or within a local sector, such as a DAS for a building, a small cell or combination of small cells and macro cells that serve a specific area. If the location of the SRS for the UE is not known a priori, the solution may be able to correlate the UE's location through the covered area. Doing so will show the location history of where the UE has travelled. In some circumstances, it may be desirable to determine the location of the UE, even if the network does not provide an indication of where the SRS is located for a particular UE. The location of the UE may be correlated with the SRS by determining the location or proximity of the UE to a known point, thereby correlating the UE with the SRS it is transmitting. Such location can be accomplished through other location/proximity solutions, such as Wi-Fi and Bluetooth. The user may also identify their location via a UE application or by walking over to a predetermined location in order to identify their UE to a location solution.

Figure 11:
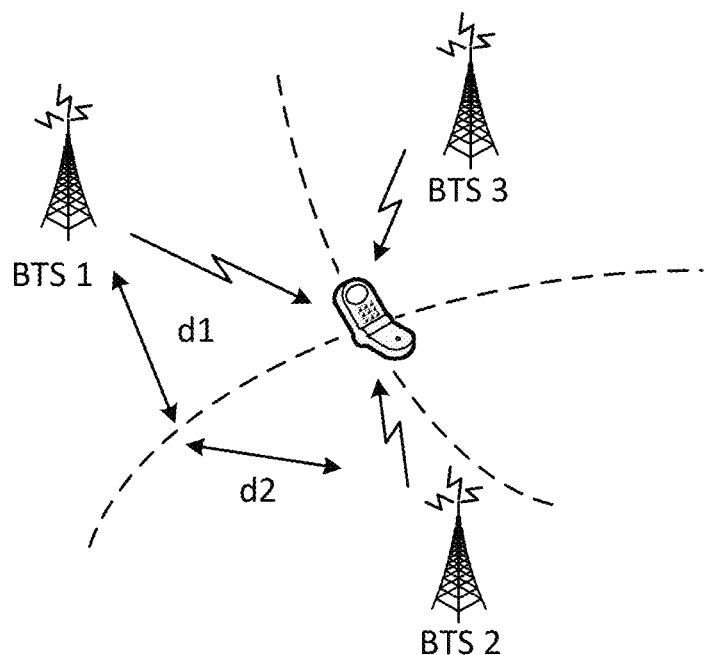
FIG. 11 illustrates an embodiment of an OTDOA locating technique.
Figure 27:
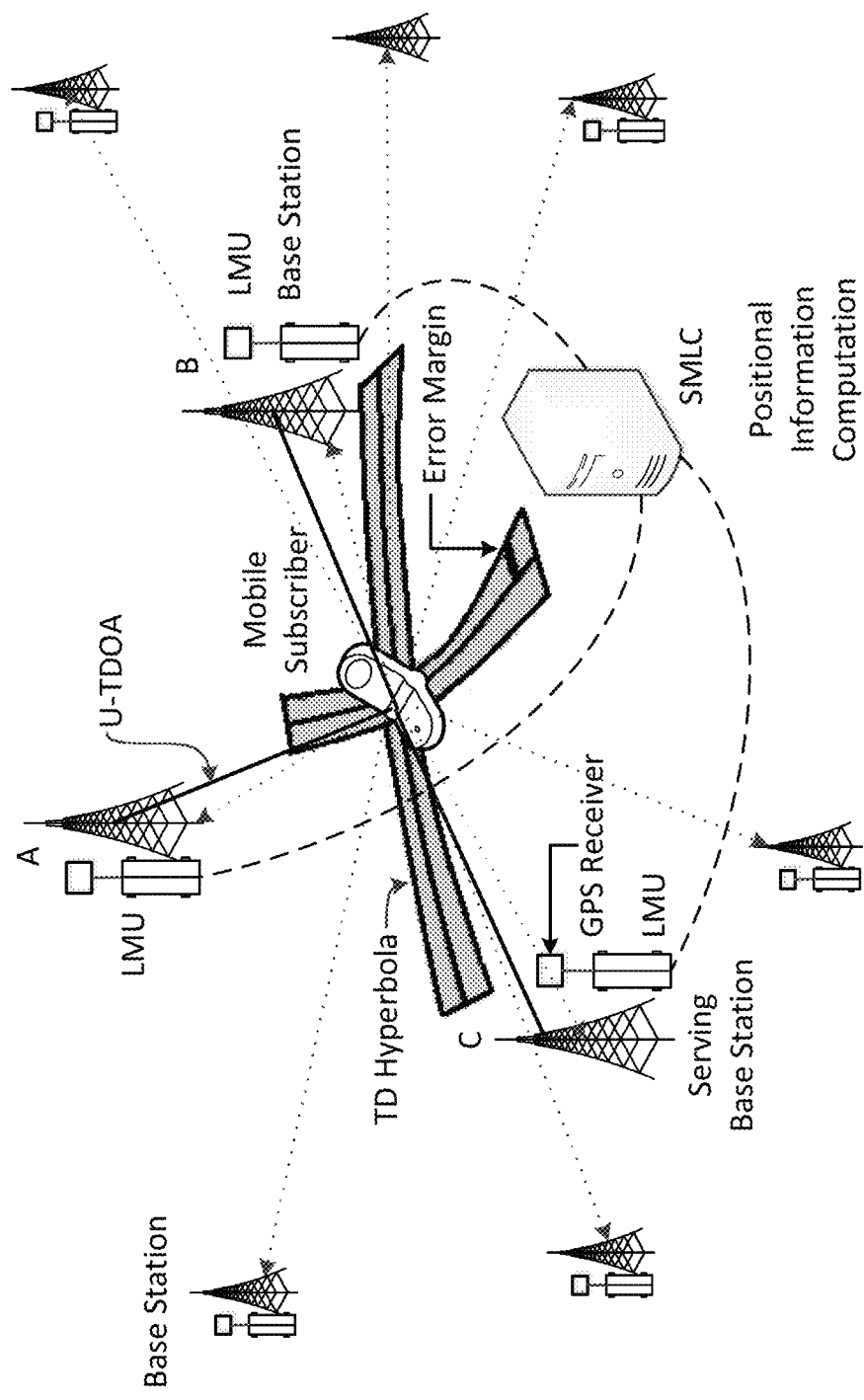
FIG. 27 illustrates an embodiment of an LTE Release 11 U-TDOA locating technique.

In FIGS. 11 and 27 only the macro base stations are shown. Also, FIG. 27 depicts the LMUs being co-located with the base stations. These depictions are valid options, but the LTE standards do not specify where the LMUs can be placed, as long as LMUs placement satisfies the multi-lateration/trilateration requirements.

In an aspect, a common deployment for indoor environments is DAS (Distributed Antenna System) and/or small cells, which are inexpensive base stations highly integrated with the RF. The LMU(s) can be placed indoors and/or within a campus-type environment as well, e.g. the U-TDOA can be used in a DAS and/or small cell environment. In another aspect, the U-TDOA based accurate indoors locating can be achieved with a combination of LMUs positioned indoors and macro cells that are positioned outside, e.g. without the need of deploying DAS and/or small cells; or have a reduced number of the small cells. Thus, the LMUs can be deployed with or without DAS and/or small cells being present. In a further aspect, the LMUs can be placed in environments where cellular signal amplifiers/boosters are used; with or without DAS and/or small cells being present.

The LTE release 11 also contemplates the integration of the LMU and the eNB into a single unit. This, however, will put additional burden on the time synchronization requirements between small cells if individual small cells eNBs are geographically distributed, which wireless/cellular service providers are not ready to meet, especially indoors and/or in other GPS/GNSS denied environments.

DAS systems are inherently time synchronized to a much higher degree (precision) than geographically distributed macro/mini/small cell/LMUs. Using a DL-DTOA solution in a DAS environment will alleviate the time synchronization issue, but in a DAS environment, a single base station serves a large number of distributed antennas, such that multiple antennas are transmitting the same downlink signal with the same cell ID (identification number). As a result, the traditional DL-OTDOA approach fails because there are no identifiable neighboring cells (antennas) generating signals with a different ID. Nevertheless, it is possible to use the DL-OTDOA technique when employing a multi-path mitigation processor and multi-path mitigation techniques/algorithms, as described in U.S. Pat. No. 7,872,583, and extending the use of location consistency algorithm(s), as described in U.S. Nonprovisional application Ser. No. 13/566,993, filed Aug. 3, 2012, entitled MULTI-PATH MITIGATION IN RANGEFINDING AND TRACKING OBJECTS USING REDUCED ATTENUATION RF TECHNOLOGY; which are incorporated herein by reference in their entirety. However, these consistency algorithms have limits of the number of antennae that emit signal(s) with the same ID. One solution is to reduce the number of antennae that emit the same ID, e.g., split a large number of DAS antennas into two or more time synchronized clusters with different IDs. Such an arrangement will increase the system cost (increase the number of base stations) and require the handset/UE to support the above-mentioned technology.

Employing U-TDOA in a DAS environment will also add cost relative to adding/installing LMU units. However, no changes to the UE (handset) will be needed; only the base station software would have to be upgraded to support the U-TDOA functionality. Also, it is possible to integrate multiple LMUs with (into) a DAS system. Therefore, using the U-TDOA method with LMUs has many advantages when utilized indoors, in campus environments, and in other GPS/GNSS challenging, geographically limited environments.

Precise time synchronization amongst geographically distributed multiple base stations and/or small cells and/or LMUs in indoors and other GPS/GNSS denied environments is more complex than time synchronizing macro cells and/or the LMU equipment used in the macro cell outdoor, e.g., GPS/GNSS friendly environment. This is because the macro cells in the outdoor environment have antennas, that are elevated and in the open. As a result, the GPS/GNSS signal(s) quality is very good and macro cells antennas transmissions and/or LMU receivers can be synchronized using GPS/GNSS to a very high accuracy standard deviation 10 ns, over a sufficiently large area.

In an aspect, for indoor and other GPS/GNSS denied environments, time synchronization amongst multiple distributed base station and/or small cells/LMUs is achieved by using an External Synchronization Source that produces the synchronization signal shared by many base stations and/or small cells and/or LMUs. This synchronization signal can be derived from GPS/GNSS, for example the 1 PPS signal, and/or Internet/Ethernet networking, for example PTP or NTP, etc. The latter is a low cost solution, but it cannot provide the time synchronization precision required for accurate location, the GPS/GNSS derived external synchronization signal(s) are more precise standard deviation down to 20 ns, but require additional hardware and installation requirements, e.g. wiring up these signals, is more complex/expensive. Also, changes to base station and/or small cells hardware/low level firmware might be needed to accommodate the external synchronization signal higher level of precision. Beside the 20 ns standard deviation is not accurate enough to satisfy the 3 meters requirements, e.g. standard deviation of about 10 ns.

Figure 28:
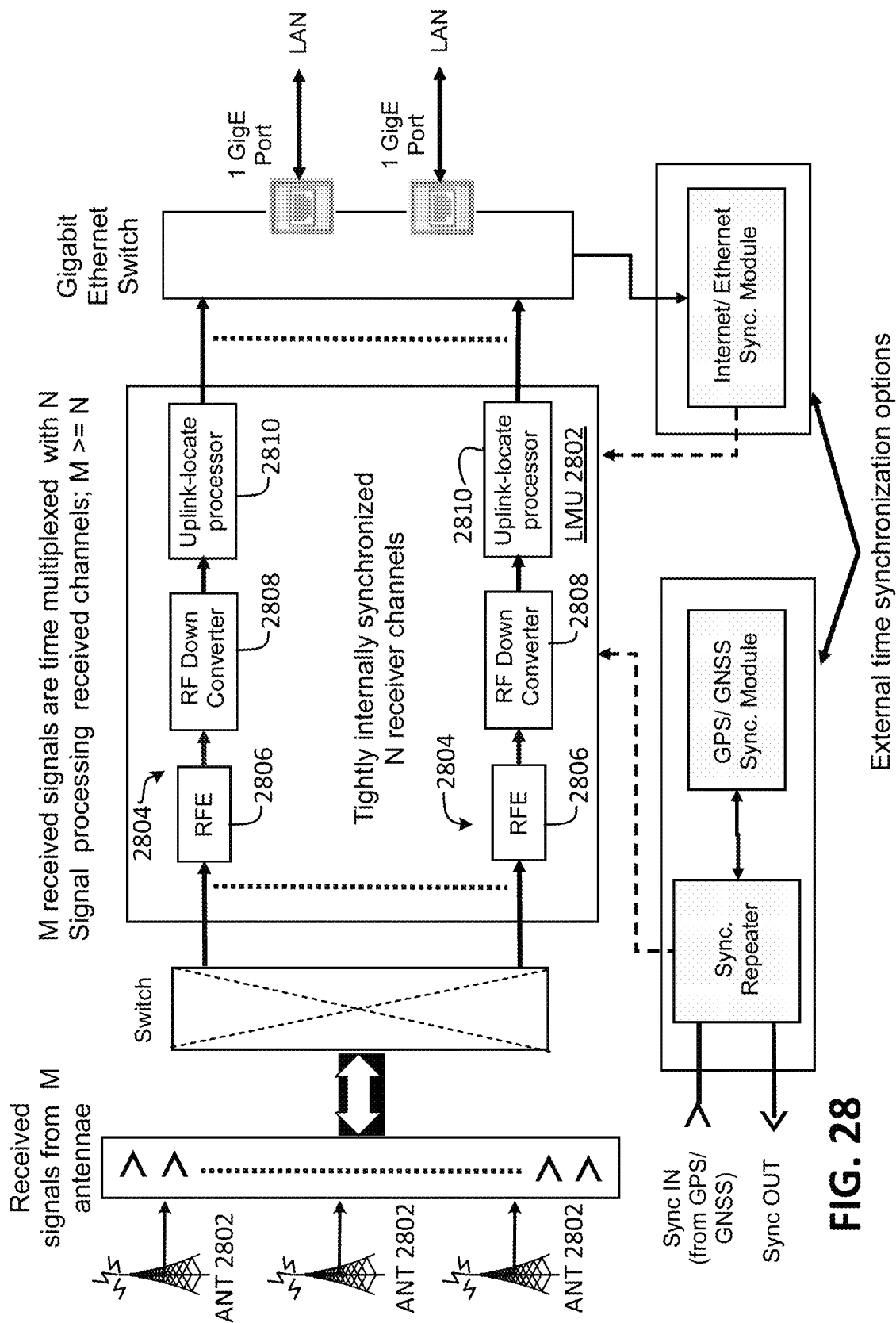
FIG. 28 illustrates an embodiment of a multichannel Location Management Unit (LMU) high level block diagram.

In order to overcome the above mentioned limitations, as illustrated by the multichannel LMU high level block diagram of FIG. 28, one embodiment uses a LMU device 2800 having multiple receive antennas 2802 and signal channels 2804. As an example, one or more signal channels 2804 can comprising signal processing components such as an RFE (RF front end) 2806, RF down converter 2808, and/or uplink-locate processor 2810. Other components and configurations can be used. In an aspect, the signal channels 2804 are co-located within the LMU device 2800 and tightly time synchronized (e.g., standard deviation of about 3 ns to about 10 ns). In another example, antennae 2802 from each LMU signal channel 2804 are geographically distributed (e.g., similarly to DAS). As a further example, external time synchronization components (e.g., GPS/GNSS, Internet/Ethernet, etc.) can be in communication with the LMU device 2800. The Precise time synchronization is more readily achieved inside the device (e.g., LMU device 2800) than it is by trying to tightly synchronize a number of geographically distributed devices.

As an example, when two or more multichannel LMUs (e.g., LMU device 2800) are deployed, the time synchronization between these LMUs can be relaxed so that a low cost and low complexity approach can be used to synchronize (using an external source signal) a number of distributed multichannel LMUs. For example, Internet/Ethernet networking synchronization can be used or a common sensor (device) can be deployed to provide timing synchronization between different multichannel LMUs.

On the other hand, the multichannel LMU approach reduces the number of hyperbolic lines of position (LOPs) that can be used in determining the position fix, but the time synchronization improvement overcomes this deficiency (see explanation and example below).

When using multilateration/trilateration methods, the UE positioning accuracy is a function of two factors: the geometrical dilution of precision (GDOP), which is due to geometrical arrangement of macro cell towers/small cells/LMUs, and the accuracy of single ranging $\sigma_{R\_pseudo}$ measurement (See Gunter Seeber, Satellite Geodesy, 2003):

$$\sigma_{POS} = GDOP \times \sigma_{R\_pseudo}$$

The GDOP is function of the geographical distribution of transmitting antennas (in case of DL-OTDOA) or receiving antennas (in case of U-TDOA). In case of the regularly placed antennae, the two dimensional GDOP estimation is equal to $2/\sqrt{N}$ (H. B. LEE, ACCURACY LIMITATIONS OF HYPERBOLIC MULTILATERATION SYSTEMS, 1973); where in case of cellular networks N is the number of emitters (macro cell towers/small cells/DAS antennas) that are "hearable" by the UE (in case of DL-OTDOA) or the number of LMUs/LMUs receive channels that can "hear" the UE uplink transmission (in case of U-TDOA). Therefore, the standard deviation of UE position error can be calculated as follows:

$$\sigma_{POS} = \frac{2}{\sqrt{N}} \times \sigma_{R\_pseudo}$$

Assume that eight geographically distributed (indoors) single receive channel LMUs (regularly placed) are detecting the UE uplink transmission and these LMUs are synchronized via the 1 PPS signal (e.g., standard deviation of 20 ns). In this case N=8 and there will be seven independent LOPs that can be used for UE position fix. Let's further assume that ranging error standard deviation, $\sigma_R$ is 3 meters (about 10 ns); then the accuracy of single ranging measurement is:

$\sigma_{R\_pseudo} = \sqrt{(\sigma_R^2)+(\sigma_{SYNC}^2)} = \sqrt{10^2+20^2} = 22.4$ ns (6.7 meters);

where $\sigma_{SYNC}$ is the external time synchronization signal standard deviation (20 ns).

In this case (N=8) the single ranging measurement and the standard deviation of UE position error $\sigma_{POS}$ is equal to 4.74 meters.

As an example, if two, four receive channel LMUs (e.g., multichannel LMU device 2800) with regularly placed distributed antennae, are detecting the UE uplink transmission, then each LMU will produce a set of three tightly time synchronized LOPs (e.g., standard deviation of about 3 ns); and for three independent LOPs the N=4. In this case, two UE position fixes is generated, each with standard deviation error $\sigma_{POS}$ of 3.12 meters. Combining these two position fixes by averaging and/or other means/methods will further reduce the UE position fix error. One estimate is that the error reduction is proportional to the square root of the number of the UE position fixes. In the present disclosure, this number is equal two and the final UE position fix error $\sigma_{POS\_FINAL}$ is 2.21 meter; obtained as: $3.12/\sqrt{2}$.

Figure 31:
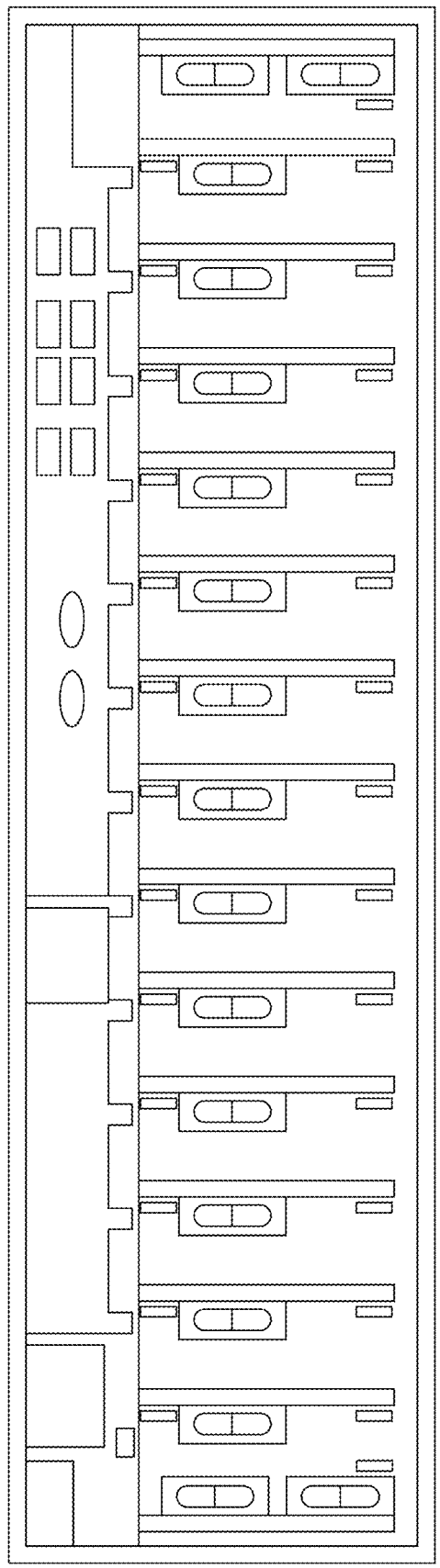
FIG. 31 illustrates an embodiment of a depiction of a rackmount enclosure.
Figure 32:
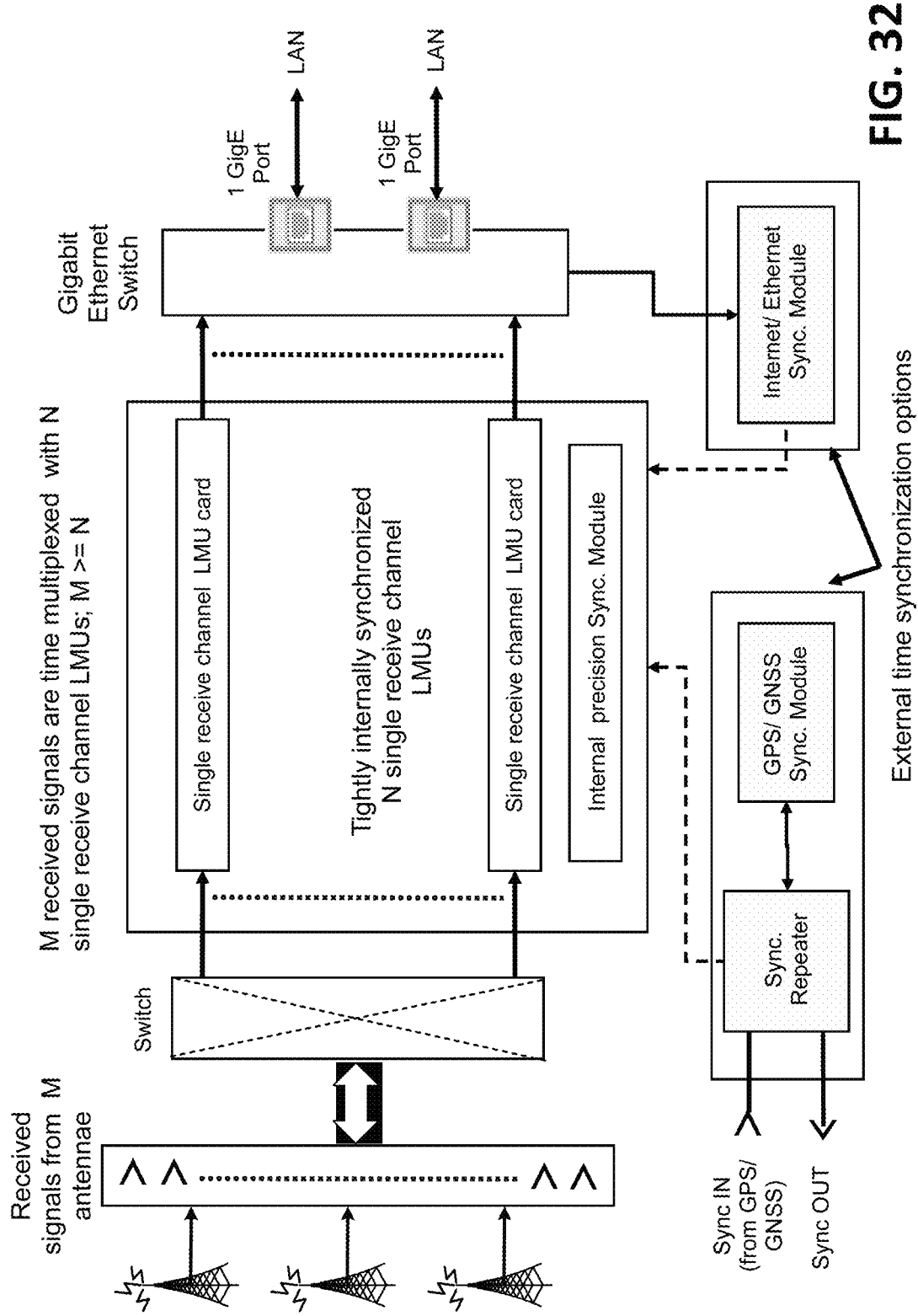
FIG. 32 illustrates an embodiment of a high level block diagram of multiple single channel LMUs clustered (integrated) in a rackmount enclosure.
Figure 33:
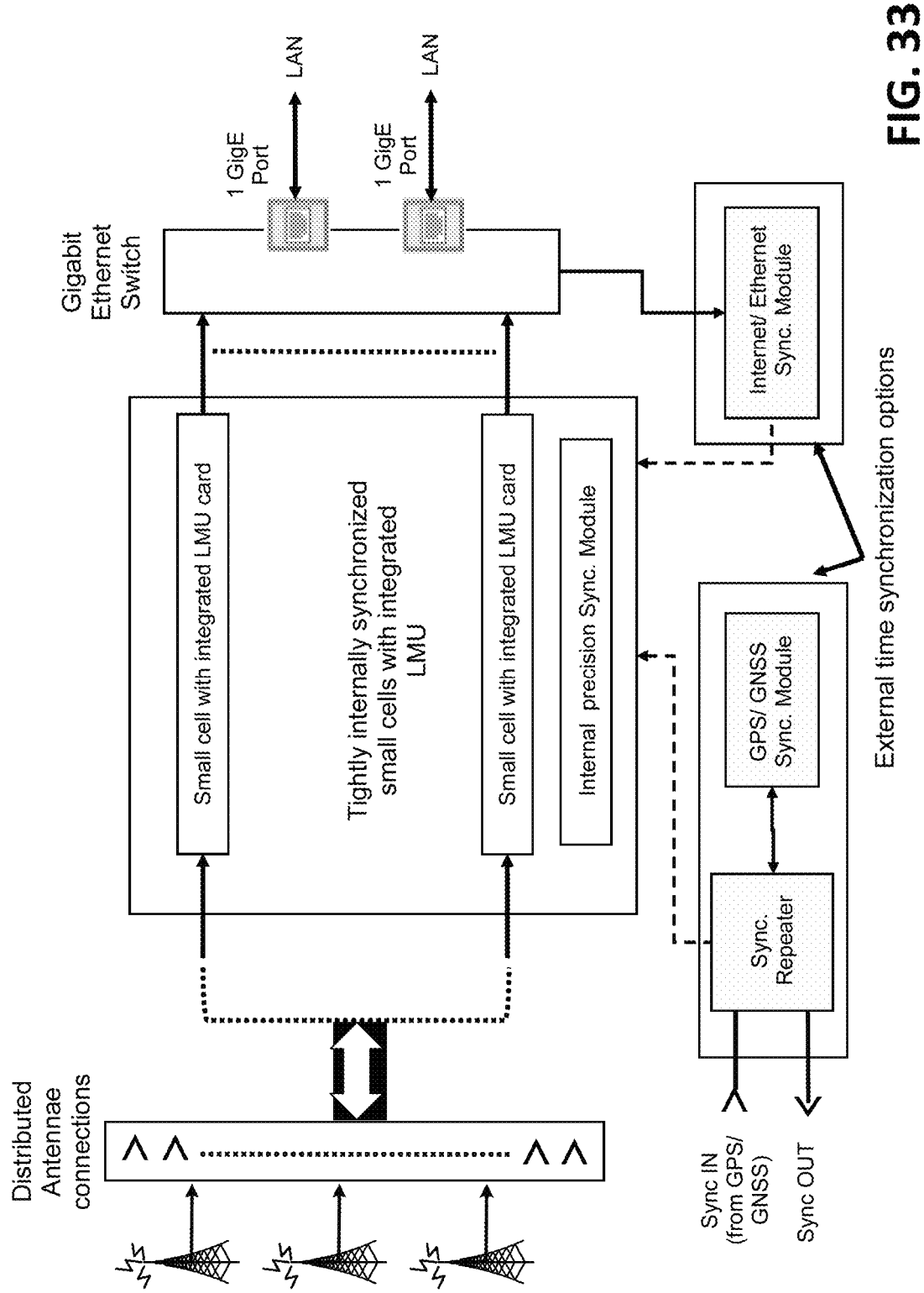
FIG. 33 illustrates an embodiment of a high level block diagram of multiple small cells with integrated LMU clustered (integrated) in a rackmount enclosure (one-to-one antenna connection/mapping)

In an aspect, several multichannel LMU (e.g., LMU device 2800) with relaxed synchronization between these multichannel LMUs can be used for indoors and other GPS/GNSS denied environments. As an example, within the multichannel LMU device, the LMUs can be tightly synchronized (e.g., standard deviation of between about 3 ns and about 10 ns). Another embodiment takes advantage of the fact that a number of single channel small cell/LMU and/or small cells with integrated LMU devices electronics (the LMU functionality is embedded into the eNB) can be clustered (e.g., integrated, co-located, etc.) in a rackmount enclosure (FIG. 31, FIG. 32 and FIG. 33) and/or a cabinet, for example a 19 inch rack. Each single channel device antenna can be geographically distributed, like in DAS. The devices within a cluster can be tightly time synchronized (e.g., standard deviation of less than or equal to 10 ns). Multiple rackmount enclosures can be synchronized per communication requirements, for example VoLTE, whereby a low cost and low complexity approach can be used. Precise (tight) time synchronization between a number of devices clustered (integrated) inside the rackmount enclosure/cabinet is more readily achieved and less costly than in the case of tightly time synchronizing a number of geographically distributed devices.

Figure 34:
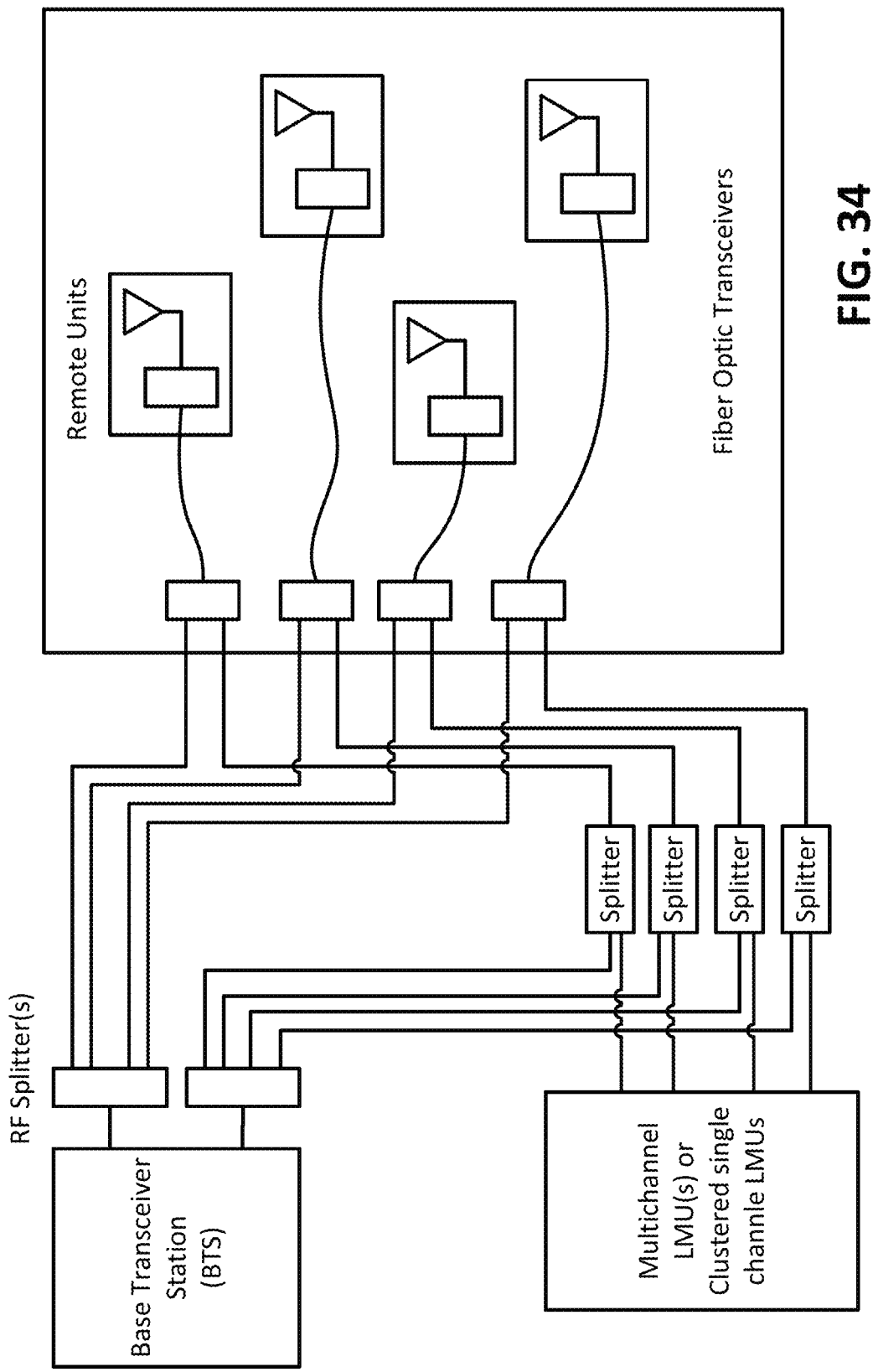
FIG. 34 illustrates an embodiment of a high level block diagram of LMUs and DAS integration.

In another aspect, multiple LMUs can be integrated with (into) the DAS system as illustrated in FIG. 34. As an example, the LMU receivers can share the received signal(s) generated by each DAS antenna, e.g., sharing DAS antennas. The actual distribution of these received signals depends upon the DAS implementation: active DAS vs. passive DAS. However, the LMU and DAS integration embodiment entails sharing the received signal(s) generated by each DAS antenna with LMU receiver channel and creating an almanac that matches (correlates) each DAS antenna coordinates with corresponding LMU/LMU receiver channel. Again, the clustering approach and/or employing multichannel LMU(s) are preferable ways for LMU and DAS integration.

Also, in a similar fashion, it is possible to share the received signal(s) generated by each small cell antenna with the LMU receiver channel. Here, the small cell's time synchronization can be relaxed, e.g. does not need to meet the locate requirements, while the LMU/LMU channels will require precision time synchronization. The clustering approach and/or employing multichannel LMU(s) are a preferable way for LMU(s) for such option.

Integration of the LMU and the eNB into a single unit has a cost advantage over a combination of standalone eNB and LMU devices. However, unlike the integrated LMU and the eNB receiver, a standalone LMU receive channel does not have to process the data payload from UE. Furthermore, because the UE uplink ranging signals (SRS, sounding reference signal, in case of LTE) are repeatable and time synchronized (to the serving cell), each standalone LMU receive channel can support (be time multiplexed with) two or more antennae, for example serve two or more small cells. This, in turn, can lower the number of LMUs (in small cells/DAS and/or other U-TDOA locate environments) and reduce the cost of the system (see also FIG. 28).

Figure 29:
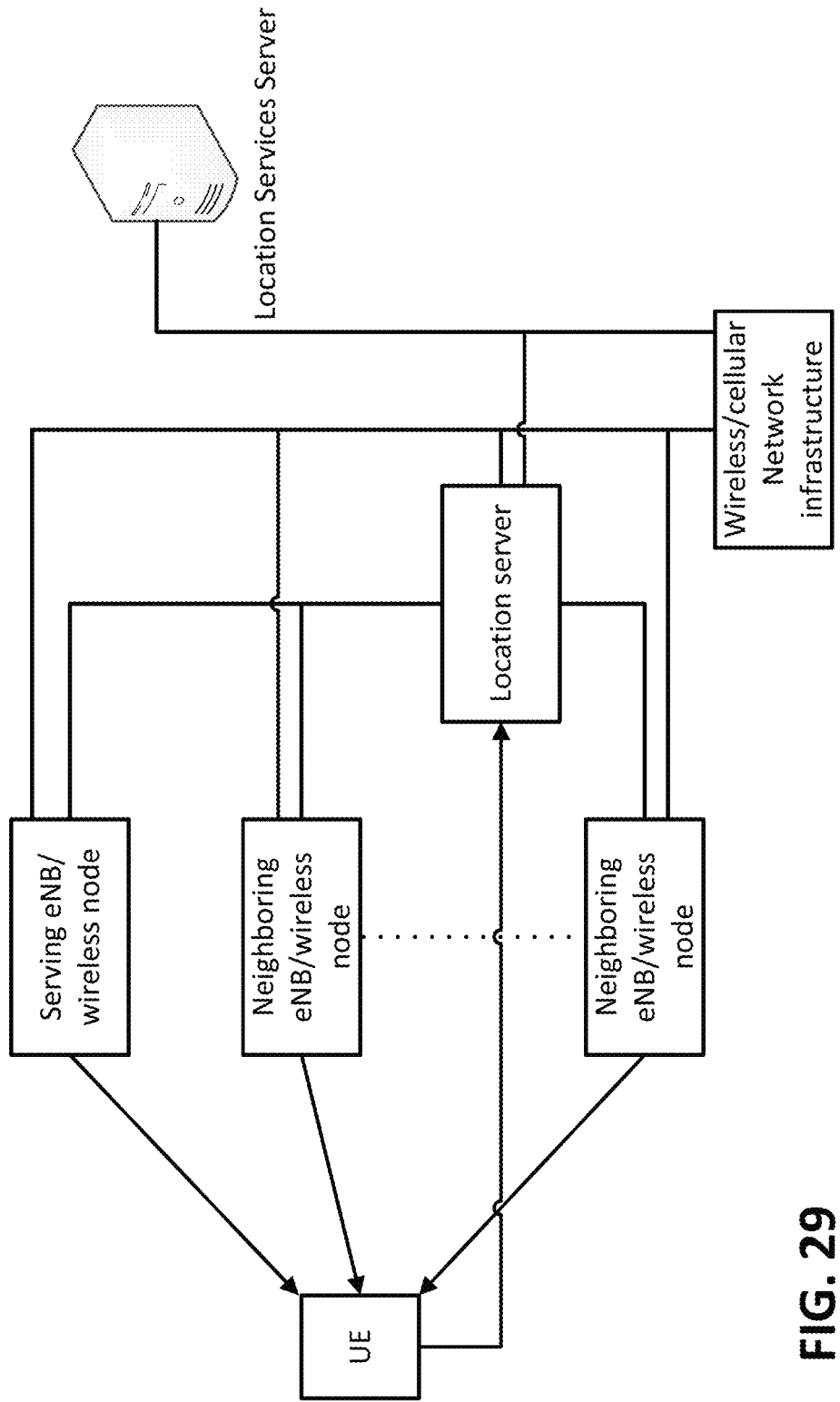
FIG. 29 illustrates an embodiment of a DL-OTDOA technique in wireless/cellular network with a location Server.
Figure 30:
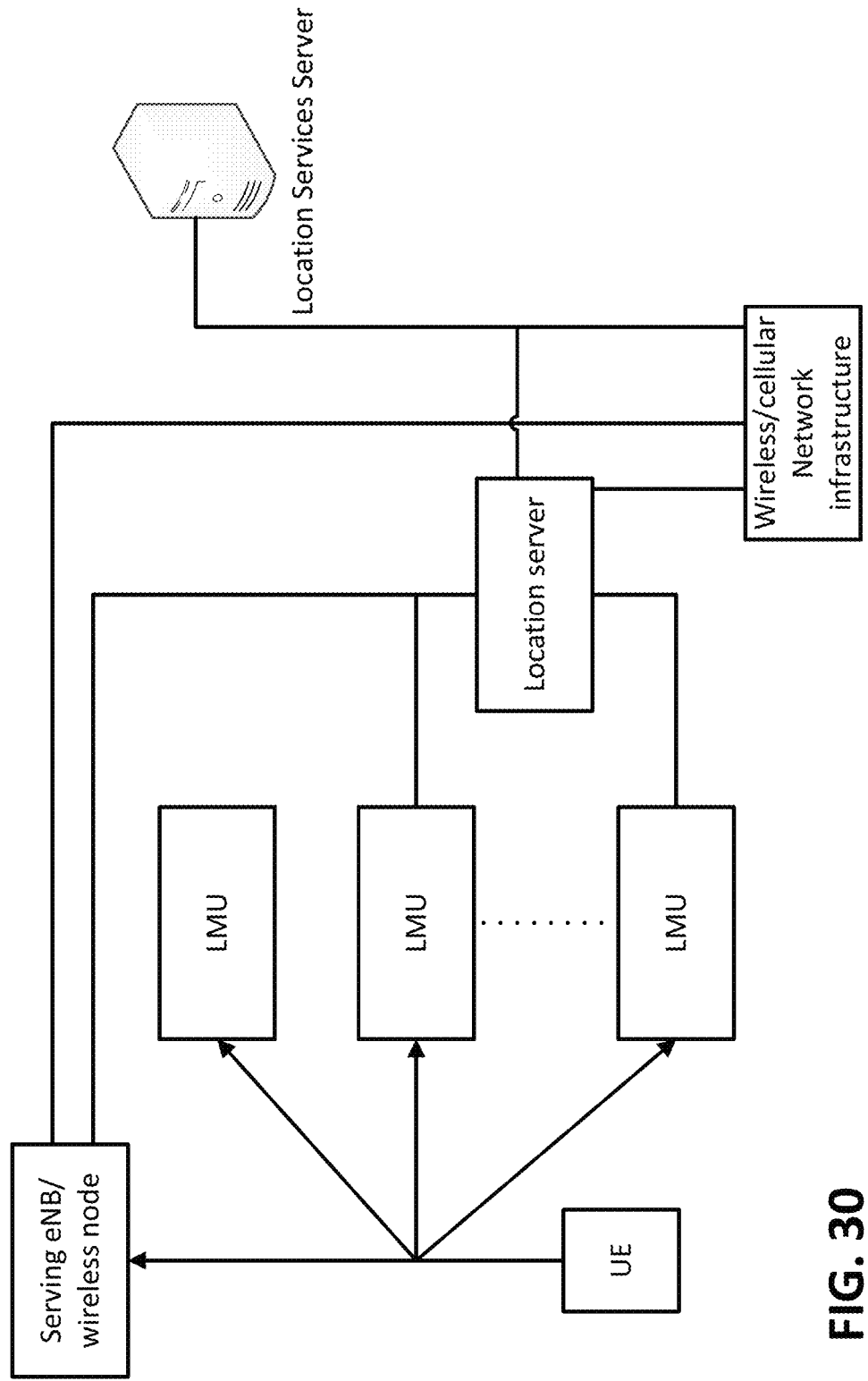
FIG. 30 illustrates an embodiment of a U-TDOA technique in wireless/cellular network with a location Server.

If wireless/cellular network E-SMLC server is lacking the functionality required for DL-OTDOA and/or U-TDOA techniques, this functionality can be carried out by a location server that can communicate with the UE and/or LMU and the wireless/cellular network infrastructure and/or a location services server (see FIG. 29 and FIG. 30). Other configurations can be used.

Figure 35:
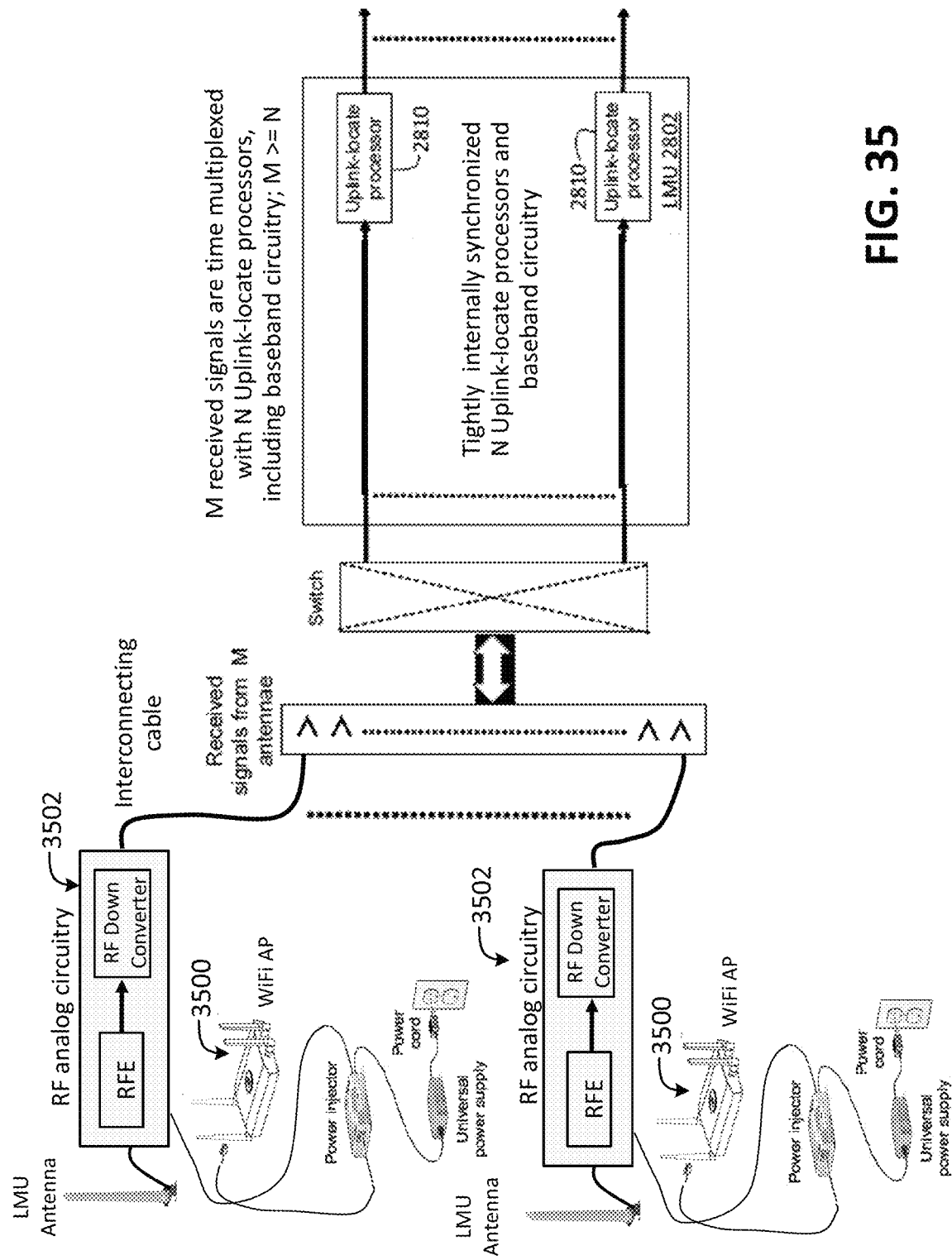
FIG. 35 illustrates an embodiment of a high level block diagram of LMUs and WiFi infrastructure integration.

In another aspect, one or more LMU devices (e.g., LMU 2802) can be deployed with WiFi infrastructure, for example, as illustrated in FIG. 35. Alternatively, a listening device could be used to monitor the LMU antenna in the same manner as the WiFi infrastructure. As such, the LMU devices and/or channel antennas servicing the LMUs can be co-located with one or more WiFi/listening devices 3500, such as one or more WiFi access points (APs). As an example, the WiFi devices 3500 can be geographically distributed.

In one embodiment the WiFi device 3500 can be connected to a power source. An RF analog portion 3502 (e.g., circuitry) of one or more LMU devices or channels can be integrated with the LMU antenna such that the RF analog portion 3502 can share the power source with the WiFi device 3500 (see FIG. 35). As an example, the RF analog portion 3502 of the LMU device or channel can be connected via cable to the Uplink-Locate processor circuitry (e.g., Uplink-Locate processor 2810), which can include the baseband signal processing. As a further example, because there can be signal amplification between the antenna and the interconnecting cable between the RF analog portion 3502 and the baseband circuitry, such an embodiment facilitates improved signal-to-noise ratio (SNR). Moreover, the RF analog portion 3502 can down-convert the received signal (e.g., down to the baseband) and, because the baseband signal frequencies are several magnitudes smaller than the received signal in antenna, the cable requirements can be relaxed. Such relaxation of cable requirements can translate into cost reduction of the connections and can significantly increase the transmission distance.

It is understood that the ranging signals are not limited to the SRS only and can utilize other reference signals, including MIMO, CRS (Cell-Specific Reference Signal), etc.

In a further embodiment, the network-centric locating approach of 5G may be improved by fusing downlink OTDOA and uplink TDOA methods. For example, in the macro-cell environment, the uplink TDOA method suffers from a lack of range. This is because uplink signal transmission by the UE is orders of magnitude lower in power than corresponding downlink signal transmissions by the macro-cell. As a result, the probability of the UE signals being detected by neighboring cells is low. For uplink TDOA, the 3GPP standards contemplate the deployment of LMUs to help improve the detectability of the uplink signals (i.e., LMUs are essentially uplink transmission receivers with additional signal processing capabilities). The deployment of many LMUs address the uplink signal detectability issue and enable multilateration positioning for locating UEs, but there is a significant cost associated with the deployment and maintaining a large number of such devices. As a result, wireless networks carriers did not deploy LMUs in the LTE 4G environment.

Accordingly, in order to enable uplink locating in 4G and 5G environments, it may be necessary to leverage serving cell antenna system characteristics (properties) for different methods of determining UE position. For example, depending on the serving cell antenna system design, it may be possible to use an uplink method that estimates the direction (angle) of arrival (DoA/AoA) of the UE reference signal transmissions in the horizontal (aka azimuth) plane. Theoretically, it may also be possible to estimate the DoA/AoA in the vertical (aka elevation) plane. By combining DoA/AoA calculations in both the horizontal and vertical plane, it may be it possible to locate the UE. In practice, however, because of macro-cell antennas designs, DoA/AoA estimates accuracy for the vertical plane are too low for precise position determination or the DoA/AoA estimation in the vertical plane cannot be carried at all because of lack of access to the antenna(s) elements in vertical plane.

To obtain a position fix using the uplink DoA/AOA method, it may therefore be necessary to estimate a distance from the UE to a serving cell. This distance may be derived from the round-trip time (RTT) and Time Advance (TA) information, which are based on measurements performed by the serving cell. However, because of the radio wave propagation phenomena these measurements may lack required precision. One possible way to address the precision issue is to use downlink OTDOA to estimate the distance between the UE and the serving cell. The drawback to this solution is that downlink OTDOA requires an accurate synchronization between the serving cell and neighboring cells that are used for the UE position determination, e.g., the locate accuracy is impacted by the synchronization error. Uplink TDOA in macro environment also suffers from the same effect, so that is no alternative.

However, uplink DoA/AoA is free from this error because only the serving cell is used, i.e. no neighboring cells are used, so no synchronization is required. In contrast, when downlink OTDOA is used to determine the distance between the serving cell and the UE, this measurement may include the aforementioned synchronization error, although that error may be mitigated if downlink OTDOA is only used to determine the initial UE position. Thereafter, as long as the same serving cell is used, the UE position may be calculated by state-of-the art tracking algorithms based on UE DoA/AoA and UE velocity (estimated from reference signals same as the DoA/AoA and/or other reference signals) measurements. Over time (i.e., a number of measurements), the tracking algorithms or tracker will reduce the impact of the synchronization error. It should be noted that soft/softer handover between serving cells is not supported by 4G LTE, so the initial UE distance to the serving cell measurement may have to be repeated every time the UE switched from one serving cell to another serving cell.

Tracking algorithms may be based on radar and sonar performance enhancement strategies. The tracking algorithms or tracker may provide the ability to predict future positions of multiple moving objects based on the history of positions and velocity of the individual objects reported by sensor systems. There are a number of different types of trackers, including particle filter algorithms, Kalman algorithms, etc. Use of a tracker may also improve UE positioning when the initial UE position is calculated based on RTT measurements as discussed above. The choice of whether to use downlink OTDOA or RTT/TA to measure the distance from the UE to the serving cell depends on the magnitude of error in the distance estimation. The larger the error, the more the performance of the tracker may be impacted. Also, after the handover it takes network some time for estimating the RTT. During this time the reported RTT measurements may not be valid. In an embodiment, two different independent trackers are utilized at the same time and use the position of the one that converges faster (i.e., is first to determine the position). Yet another embodiment is to estimate the distance using downlink OTDOA for every position measurement and to utilize a tracker to estimate the distance and to correct the synchronization error. This approach may yield the best accuracy.

As noted above, uplink methods are inherently network-centric as the relevant UE reference signal transmissions may be collected and pre-processed by the eNodeB and/or LMU integrated with eNodeB in macro environment or standalone LMU(s), LMU(s) integrated with DAS system(s), etc. in other environments and then forwarded to a LSU for further processing and UE position determination using one or more network protocols. In case of downlink OTDOA, the task of collecting and pre-processing the downlink reference signals is performed by the UE. The UE than sends collected downlink data to the LSU. The UE handles the communication with the LSU, using the control plane and/or the LTE user (data) plane. Consequently, signaling may be in line with the OMA Secure User Plane Location (SUPL) protocol and/or 3GPP, e.g., LTE Positioning Protocol (LPP).

Many uplink and downlink reference signals may be employed for UE position determination. The most commonly used for uplink locate include the Sounding Reference Signal (SRS) and/or Demodulation Reference Signal (DMRS). The most commonly used for downlink locate include Positioning Reference Signal (PRS) and/or Cell-Specific Reference Signal (CRS). The reference signals may be collected in a digital format, i.e., samples, which may be pre-processed before being sent to the LSU. The digital samples of the reference signal may be extracted from the baseband I/Q samples in time domain or the baseband I/Q samples in frequency domain, as well as the Resource Elements (RE) from the OFDM symbols. Resource Element is complex-valued coefficient representing one OFDM sub-carrier for the duration of one OFDM symbol. Thus, RE(s) can represent an LTE symbol in frequency domain. The I/Q values represent the signal in-phase (I) and quadrature (Q) components. As a result, the reference signals may be represented by the I/Q samples in time domain or the I/Q samples in frequency domain, or REs of symbols containing the reference signals.

In a downlink OTDOA UE embodiment, both the PRS and the CRS reference signals may be collected. In other words, this method may utilize PRS, CRS, or both types of signals. This hybrid mode of operation (i.e., PRS or CRS or both PRS and CRS) has the advantage of allowing network operator(s) to dynamically choose the mode of operation depending on the circumstances or certain network parameters. For example, PRS may have better hearability than CRS, but using PRS may cause a reduction in data throughput. CRS do not impact throughput and have a higher reference signal density, which is advantageous when the UE is moving. In addition, CRS is backward compatible with all previous LTE releases, for example Rel-8 and lower. As such, the hybrid method provides a network operator with the ability to trade-off or balance between hearability, throughput, compatibility and accurate locating/tracking of moving targets.

In an embodiment of downlink OTDOA, the UE receiver may include a detector configured to detect and isolate a number of OFDM symbols that carrying reference signals, for example PRS and/or CRS, from one or more downlink frames. This detector may be further configured to extract Resource Elements (REs) (see FIG. 9) from the OFDM symbols on a per symbol basis, and may be also configured to collect and store Resource Elements (REs) from a number of OFDM symbols on a per symbol basis, i.e., produce for each symbol identification (ID) a downlink data structure that includes REs correlated with this symbol ID. In addition, the detector may be configured to collect downlink metadata, including each frame start and other relevant and/or auxiliary information.

In an embodiment, an exemplary data structure of the OFDM symbols with CRS RE elements is as follows:
CRSR data sruct: [Number of captured radio slots in one capture block, Time interval (in number of slots) between capture blocks, CRS data length and CRS data (the Resource Elements)].

In an embodiment, exemplary metadata transferred from UE to LSU includes:
Serving cell information: [physCellId, cellGlobalId, CellGlobalIdEUTRA-AndUTRA, earfcn-DL, systemFrameNumber, Slot number, UTC timestamp, rsrp-Result, rsrq-Result,
ue-RxTxTimeDiff, DownlinkPathLoss, Bandwidth, in Physical Resource Blocks (PRB).
Neighbour cell information (0 to 32 neighbor cells): [physCellId, cellGloband, CellGlobalIdEUTRA-AndUTRA, earfcn-DL, systemFrameNumber, rsrp-Result, rsrq-Result.
UE information: [UE ID, UE category, Mobility state, MobilityHistoryReport].

In an embodiment of downlink OTDOA, the UE receiver may include a communication processor configured to signal and exchange downlink data with the LSU, including being configured to send RE data and metadata to the LSU and to receive commands and assistance information. It should be noted that the signaling may be in line with OMA SUPL protocol and/or 3GPP LPP, or combination of LPP and SUPL Furthermore, proprietary interfaces and/or protocols can be also utilized.

In an embodiment of downlink OTDOA, the UE receiver's detector may be configured to extract the reference signal I/Q samples in time domain from OFDM symbols on a per symbol basis, and also be configured to collect these I/Q samples in time domain from a number of OFDM symbols on a per symbol basis, i.e., produce for each symbol ID a downlink data structure that includes I/Q samples in time domain correlated with this symbol ID. In addition, the detector may be configured to collect downlink metadata, including each frame start and other relevant and/or auxiliary information.

In an embodiment of downlink OTDOA, the UE receiver's detector may be configured to collect the I/Q samples in frequency domain from a number of OFDM symbols on per symbol bases, i.e., produce for each symbol ID a downlink data structure that includes I/Q samples in frequency domain correlated with this symbol ID. In addition, the detector may be configured to collect downlink metadata, including each frame start and other relevant and/or auxiliary information.

In an embodiment of downlink OTDOA, the UE receiver's detector may be configured to collect RE(s) from a number of OFDM symbols on per symbol bases, i.e., produce for each symbol ID a downlink data structure that includes RE(s) correlated with this symbol ID. In addition, the detector may be configured to collect downlink metadata, including each frame start and other relevant and/or auxiliary information.

OFDM symbols carrying reference signals REs may include both payload and reference signals REs. As a result, the REs collected by the detector from a number of OFDM symbols, and consequently the downlink data structures generated from these collections, include both payload and reference signals REs. When this data is sent to the LSU, the payload REs becoming an overhead, reducing the uplink capacity.

The location of CRS and PRS reference signal REs in the symbol's frequency dimension may be determined by cell ID; antenna configuration; antenna port; the slot number within a radio frame and the OFDM symbol number within the slot (see also, 3GPP 36.211 v13 or ETSI TS 136 211 V13.0.0). If this information is known to the UE receiver's detector, the detector may be configured to remove the payload REs, thereby decreasing the size of the downlink data transmitted to the LSU, i.e., reducing the overhead. The amount of reduction may vary depending upon the reference signal type, neighbor cell IDs and other cell parameters. For example, for CRS, the data size reduction may be 3× (for a cell with a dual antenna sector). In other instances, there may be no appreciable reduction, but this may be rather rare because the reference signal REs locations in the symbol's frequency dimension are repeated on [(cell ID) mod 6] basis. Thus, for the CRS, on average, the data size reduction may be approximately 40% relatively to a worst-case scenario.

Further data size reduction may be obtained by compressing complex-valued RE(s) magnitude and phase into a smaller number of bits. There are many compression algorithms. Some are well known, for example A-law and u-law companding algorithms. Others are targeting the C-RAN (Centralized, Cooperative, Cloud Radio Access Network) architecture' baseband units (BBUs) pool and the remote radio units (RRUs) connection(s) bandwidth reduction. Note: In the C-RAN architecture, the baseband units (BBUs) are centrally located in a pool which is connected to the remote radio units (RRUs) via optical fiber. Furthermore, there are companding algorithms that are used in radar technology.

In an embodiment, the UE receiver's detector configured to compress RE sizes of 16-bit to 32-bit, into 8-bit RE size, e.g. 2× to 4× data size reduction.

In an embodiment of downlink OTDOA, the LSU is configured to process the downlink reference signal data and other relevant and/or auxiliary downlink information, including the frame start, that was sent from one or more UEs. This processing includes searching for all detectable (meeting certain criteria) reference signals emitters from the localized database/list. Also, the processing is carried out for each antenna, e.g. antenna port of the LTE device and/or relevant LTE network components. The output of the LSU is the position of the one or more UEs and other downlink position related metadata, such as Confidence Radius Values, FCC NG911 location accuracy metric, etc.

The LSU may include a downlink signal processor configured to estimate the time of arrival (ToA/TDOA) and/or time of flight (ToF) of reference signals from the downlink reference signal data and other information sent by the UE. This processor is also configured to determine the time difference (i.e., RSTD/TDOA, where RSTD means Reference Signal Time Difference) between the reference cell and a neighboring cell (measured cell). The downlink signal processor may include locating signal processing algorithms and other technology and techniques, including multi-path mitigation algorithms and methods, including advanced spectrum estimation algorithms, Constant False Alarm Rate (CFAR) detection algorithms, Space-Time Adaptive Processing (STAP), etc. In addition, the downlink signal processor may be configured to estimate the carrier frequency offset (CFO), utilizing one or more specific algorithms and/or techniques, which may allow the LSU to track one or more moving UEs and to mitigate clock frequency mismatch between the transmitter (cell) and receiver (UE). The CFO estimates are used to update (correct) the downlink reference signal data.

Majority of cell towers are employing MIMO antennas. Each cell tower sector has MIMO subsystem comprised from multiple (two or more) antennas. These antennas are fully coherent, i.e. time and phase synchronized. To avoid interference between reference signals transmissions: a) the Gold code seeds (used to encode/generate reference signals) are different for each antenna, b) different resource elements (subcarriers) are assigned for each antenna' reference signal transmission, and c) when one antenna from sector' MIMO subsystem is transmitting reference signals, transmissions from other antennas are muted. As a result, the UE receiver is capable to detect (differentiate) the reference signals transmissions from each sector' subsystem antenna.

Today the most commonly deployed are sector antenna subsystems with dual antennas; and like any MIMO antenna subsystem, these antennae are spatially separated (approx. 6 ft.). However, it is understood that the sector MIMO subsystems are not limited to two antennas and that the antennae separation distance may vary. The traditional way of selecting reference signals from different antennas of the same sector is selecting the antenna (signal) with the highest SNR (Signal to Noise Ratio) and/or SNIR (Signal to Noise+Interference Ratio). However, in many cases these criteria do not guarantee detection of the direct line of sight (DLOS) or direct path of the reference signals and the UE position fix will be determined from reflected signal(s). In this case, i.e. the DLOS/direct path is not detected, the locate accuracy is impacted. Thus, for accurate locating it is necessary to detect the (DLOS) or direct path signal.

Because wireless network is a terrestrial system, the DLOS path is frequently obstructed to various degrees and DLOS signal strength may often be significantly (15 dB or more) lower than a reflected signal strength. At the same time, the wireless network is a terrestrial system and even if the DLOS obstruction is severe (>15 dB), because of the RF propagation phenomena (a surface wave, Fresnel wave, etc.) there is always a direct path for the RF signal from sector antennas to the UE receiver. This direct path is somewhat longer than the DLOS path, but is much closer to the DLOS path length than a reflected path, i.e., has minimal impact on the position determination accuracy.

The sector antennas spatial separation is at least two orders of magnitude smaller than the distance from the UE to the sector antennas. As a result, each antenna signal propagation paths will be very close and should experience likewise attenuation. Yet, the sector antennas spatial separation is large enough for the reference signals from each sector antenna to experience the multipath phenomenon, which will impact DLOS/direct path signal strength as well as the reflected paths signals strength. The multipath interference can be constructive or destructive, i.e. amplify or attenuate signal(s); and because of sector' antennas spatial separation signals from each antenna will be affected differently, i.e. the impact is antenna dependent.

When comparing signals from two antennas of the same sector the reference signal from first antenna might have reflected signal(s) amplified while DLOS/direct path signal attenuated, for example the reflected signal power might be significantly higher (>20 dB) than the DLOS/direct path signal power. In comparison to the first antenna, the reference signal from the second antenna might have a higher DLOS/direct path signal strength, for example 3 dB or 4 dB, and reduced reflected signal strength, for example by 5 dB lower. At the same time, for both antennas the DLOS/direct path signal power is be much lower (possibly >=10 dB) than the reflected signal(s) power. As a result, the signal with greater reflected signal power, e.g. from the first antenna, will have a higher SNR/SNIR and will be selected (using traditional approach of selecting reference signals from antennas) for determining the UE position fix. However, the first antenna DLOS/direct path signal power might fall below the detection threshold, impacting the locate accuracy. Subsequently, to increase the probability of the DLOS/direct path detection is to select signal from the second antenna, with a higher DLOS/direct path signal strength (3 dB to 4 dB).

In an embodiment of the LSU downlink signal processor the ToA/ToF results for each antenna of a given sector are evaluated (compared) in order to determine the DLOS/direct path. By definition the DLOS/direct path represents the shortest, relatively to reflected paths, distance between UE and the tower. Thus, the DLOS/direct path will have the earliest ToA or the least ToF. Based on the aforementioned description the following are the possible outcomes when comparing ToA/TOF results from a pair of antennas:

1. Signals from both antennas produce the same earliest ToA and/or smallest ToF values.
2. The earliest signal ToA and/or smallest ToF values from one antenna are less than the earliest ToA and/or smallest ToF values from another antenna.

In the first case, the antenna (signal) selection is based on the confidence metric (see below). In the second case the antenna (signal) with lower ToA/ToF values is utilized for calculating the position fix, provided that this signal meets the confidence metric parameters threshold requirements. Note: This confidence metric qualifier is needed to avoid (mitigate) false alarm, e.g. erroneous DLOS/direct path detection (decision) caused by noise and/or interference exceeding the detection threshold.

If the cell tower sector antenna subsystem consists of three or more antennas, then an iterative process is employed, whereby: a) in step #1 a number of antennas pairs is formed and these pairs are evaluated, b) in step #2 from the remaining antennas subsets of antennas pairs are formed and each antenna pair is evaluated, and c) step #2 is repeated until pairs cannot be formed, i.e. only one antenna (signal) is left (available).

Furthermore, the downlink signal processor is configured to calculate the TOA confidence metric, which is for each ToA/ToF from each cell and each cell sector's antenna. This calculation may include whether the overall signal strength and/or SNR/SNIR of the received signal meets a desired threshold and the ToA/ToF signal statistics, such as standard deviation, Mean Absolute Deviation (MAD), etc. This calculation may also include whether the direct path/DLOS was found and the direct path/DLOS' SNR/SNIR, if the direct path was identified. Additional information may include whether the serving cell is the closest cell and whether the serving cell has the highest SNR/SNIR, as well as the Geometric Dilution Of Precision (GDOP) calculations for each RSTD combination. It should be noted that GDOP depends on the geometry of the cell locations and the sector' antenna subsystem directionality (in azimuth plane). The GDOP may state how this geometry will affect the final UE position estimate. The GDOP values may depend upon the angle at which two given RSTD/TDOA lines intersect. In the best case (where GDOP=1), this angle is at 90 degrees. In the worst case (where GDOP>20), the angle is small. An RSTD/TDOA hyperbolic line may also be called the line of position (LOP).

As in the case of the cell sector antenna subsystem, the UE may include multiple (two or more) antennas and associate these antennas with multiple receive channels. Any of these antennas may be receiving a reference signal, thereby giving the UE the option of collecting incoming signals from each UE antenna. The reference signals from each antenna may be collected and pre-processed by the UE and then sent to the LSU, as per the aforementioned downlink OTDOA UE embodiments. The UE antennas may be closely spaced which reduces the multipath impact variation between antennas. However, the UE antennas may be designed for polarization diversity. As a result, the above-mentioned antenna (signal) selection decision flow (algorithm) is expanded by repeating the sector' antenna selection algorithm for each UE antenna and then selecting between the remaining candidates using the aforementioned sector' antenna selection algorithm.

Embodiments of the LSU may include a downlink signal processor that compares results between ToA/ToF results from each antenna of a given cell/sector. The downlink signal processor may also compare results between each UE antenna as described above. The rationale behind such comparisons is that the antenna polarization phenomenon might result in attenuating some interference and/or reflected path while at the same time amplifying the DLOS/direct path signal. In other words, the information redundancy associated with such comparisons may increase the probability of the DLOS/direct path detection.

The downlink signal processor is also configured to estimate the carrier frequency offset (CFO). There are two main causes of the CFO: the first cause is the Doppler shift, which is a result of the relative motion between the transmitter (cell) and receiver (UE) present in mobile environments, and the second cause is clock frequency mismatch between the transmitter (cell) and receiver (UE), which results in residual CFO at the UE receiver after the down-conversion process. CFO estimation is required to maintain/preserve the orthogonality properties of the subcarriers because loss of orthogonality will degrade the OFDM system communication performance. Similarly, when OFDM reference signals are used as ranging signals for UE locating, i.e. to determine the ToA/TDOA and/or ToF time(s), the subcarriers frequency offset will impact the time of arrival (ToA/TDOA) and/or time of flight (ToF) estimation accuracy. Therefore, to mitigate the impact of the UE movement and/or clock frequency mismatches the downlink signal processor performing CFO estimation, which is used to correct the reference signals data to mitigate the impact of the UE movement and/or clock frequency offsets on the ToA/TDOA and/or ToF estimation accuracy. It should be noted that while UE receiver is synchronizing with the serving cell and calculating CFO relative to the serving cell, it is necessary to correct for the CFO(s) from multiple of neighboring cells which ToA/TDOA and/or ToF estimates that are used for the UE position determination. Here, depending upon handset movement direction relatively to cell location, the Doppler shift will be different for each cell. Also, clock frequency mismatch between each cell and receiver (UE) is cell dependent. Moreover, for precision locating these CFO(s) should be estimated with a higher accuracy than for the communication purpose.

In LTE and other OFDM based systems the CFO can be estimated using either time domain or frequency domain methods. In time domain it is the Cyclic Prefix (CP) method and the Training Sequence method that are commonly used. Frequency domain estimation methods can be further classified into Training Symbol method and Pilot method. Both: training sequence and training symbol methods require dedicated training sequences or training symbols that are not present (transmitted) in the LTE frame or symbol structures. Employing one of these approaches would require changes in the LTE frame/symbols format, which would impact the implementation into existing mobile wireless networks. On the other hand, CP and Pilot, aka reference, signals are part of the LTE frame or symbol structures. Compared to the CP based CFO estimation and the Pilot based method, produces more accurate CFO estimates. Moreover, the time domain CP based estimation, cannot be used in embodiment where Resource Elements are collected by the UE and sent to the LSU to determine position fix because the RE(s) data set does not include the CP data. Therefore, the inventors' CFO estimation embodiments utilizing multiple pilot, i.e. reference, signals in the LTE (OFDM) frame.

In an embodiment of CFO estimation, the CFO is estimated in frequency domain and the reference signals are compensated with the estimated CFO in the time domain. In this embodiment the which consists of FFT(s) of the across all slots reference signals subcarriers in frequency domain. The CFO estimation is by searching for a peak in two-dimensional space created in frequency domain, see process of CFO estimation process description below.

In the embodiment a single LTE frame is used to determine CFO. However, the single frame is not a limitation as two or more frames may be used as well as a fraction of frame, for example 10 slots (half frame). In the LTE frame a reference signal may not be present in every symbol, see CRS signal example in FIG. 9. On the other hand, from FIG. 9 each LTE frame slot has identically distributed CRS signals so that the CFO estimation can be carried out on the slot basis.

The following is description of the process of estimating the CFO. This process is applied to the individual reference signals from the serving cell and each of hearable neighboring cells.

Step 1: RE(s) of the reference signal are demodulated using matched filter in frequency domain.

Step 2: when using CRS, the demodulated CRS samples (at CRS subcarriers) in each slot are combined producing multiple combined CRS signals on per slot basis, i.e. at 0.5 milliseconds period (interval) or 20 signals per frame that is 10 milliseconds duration. Note: From the above description, the combined CRS samples sequence in each slot is in the frequency domain.

Step 3: the IFFT (Inverse Fast Fourie Transform) is applied to every slot CRS (CRS subcarriers in frequency domain) producing for each slot CRS sequence in the time domain. Thus, at the end of this step there will be 20 CRS sequences, each in time domain. The number of elements in every CRS sequence (in time domain) is same and is equal to the duration of the CRS signal divided by the ADC sampling rate (in time domain). Assuming that the number of elements in CRS sequence is N, for every n, where n belongs to 1, ..., N; it is possible to form a sequence of 20 elements. In such "n" sequence every element is from a different slot.

Step 4: The FFT (Fast Fourie Transform) is applied to every 20 elements "n" sequence producing total of N sequences by 20 elements each in frequency domain.

Step 5: The N×20 elements space in frequency domain is searched for a peak; and the CFO is calculated from this peak's maximum.

The peak maximum determination accuracy and consequently the CFO estimation precision is limited by time interval between slots and frame duration time. Therefore, in order to improve the accuracy in this embodiment an interpolation algorithm is employed when finding the peak' maximum.

In another embodiment, in step 4 an advanced spectrum estimation algorithm, like Matrix Pencil, MUSIC, ESPRIT, etc., is replacing the FFT operation. These algorithms enable further improvement in the peak's maximum determination accuracy.

It should also be appreciated that a) other reference signals can be processed in the similar fashion, b) reference signals may be combined on other than per slot basis, and c) that combining of reference signals may not be required if reference signals are available on per symbol basis.

In an LSU embodiment, the output (results) from the downlink signal processor, including ToA/ToF values, RSTD/TDOA values, a confidence metric, DLOS/direct path probability, etc., is passed to a navigation (position) processor configured to estimate one or more UE positions and produce other downlink position related metadata, such as Confidence Radius Values, FCC NG911 location accuracy metric, etc.

For downlink OTDOA UE locate embodiments, the LSU may include a navigation processor that utilizes multilateration techniques or methods, which is also known as hyperbolic navigation. Hyperbolic navigation is based on the difference in timing, i.e., RSTD/TDOA, without reference to a common clock. The navigation processor may also be configured to utilize the information redundancy discussed above, e.g., TOA/TOF, confidence metric, DLOS/direct path probability, etc., to mitigate ambiguities of the multilateration position fix, as well as applying location consistency algorithms.

Multilateration techniques and methods entail solving a number of hyperbolic (RSTD/TDOA) equations, for which a number of different algorithms/approaches may be used to find the right solution. Some algorithms/approaches involve iterative methods that may begin with an initial estimate or "guess" of the target (UE) location. That estimate may then be improved with each iteration by determining a local linear least-squares location solution. One drawback to this approach is that it requires the initial location estimate to be pretty close to the final location solution in order to guarantee convergence and/or the absence of local minima, which may result in a substantial position error. On the other hand, it may work well in the over-determined situation where there are more measurement equations than unknown quantities. In this regard, it should be noted that an over-determined situation reduces the possibility of ambiguous and/or extraneous solutions that might occur when only the minimum required number of measurements are available.

There are also non-iterative solutions to the hyperbolic position estimation problem. These solutions are in closed-form and may be valid for both distant and close sources, thereby eliminating the convergence and/or local minima issues of the iterative approaches. One drawback to non-iterative solutions is that they require a priori knowledge of the approximate location to be determined, such as the distance between the UE and a first cell, e.g., the serving cell. Another drawback to non-iterative solutions is that they are closed-form solutions that are not designed for over-determined situations. Nevertheless, it may be possible to make the non-iterative solutions work in the over-determined situation by transforming the original set of nonlinear TDOA equations into another set of linear equations with an extra variable. A weighted linear least square algorithm, for example, provides an initial location solution, and a second weighted least square then provides an improved position/location estimate using the known constraint of the source coordinates and the extra variable.

In an embodiment, when the over-determined situation arises, multiple sets of three RSTD/TDOA subsets are formed. Subsequently closed-form solution is found for each subset. Thereafter, location consistency algorithms utilized to finalize the position fix.

In another embodiment, the position fix is found through a combination of iterative and non-iterative solutions from the same set of RSTD/TDOA values.

Figure 37:
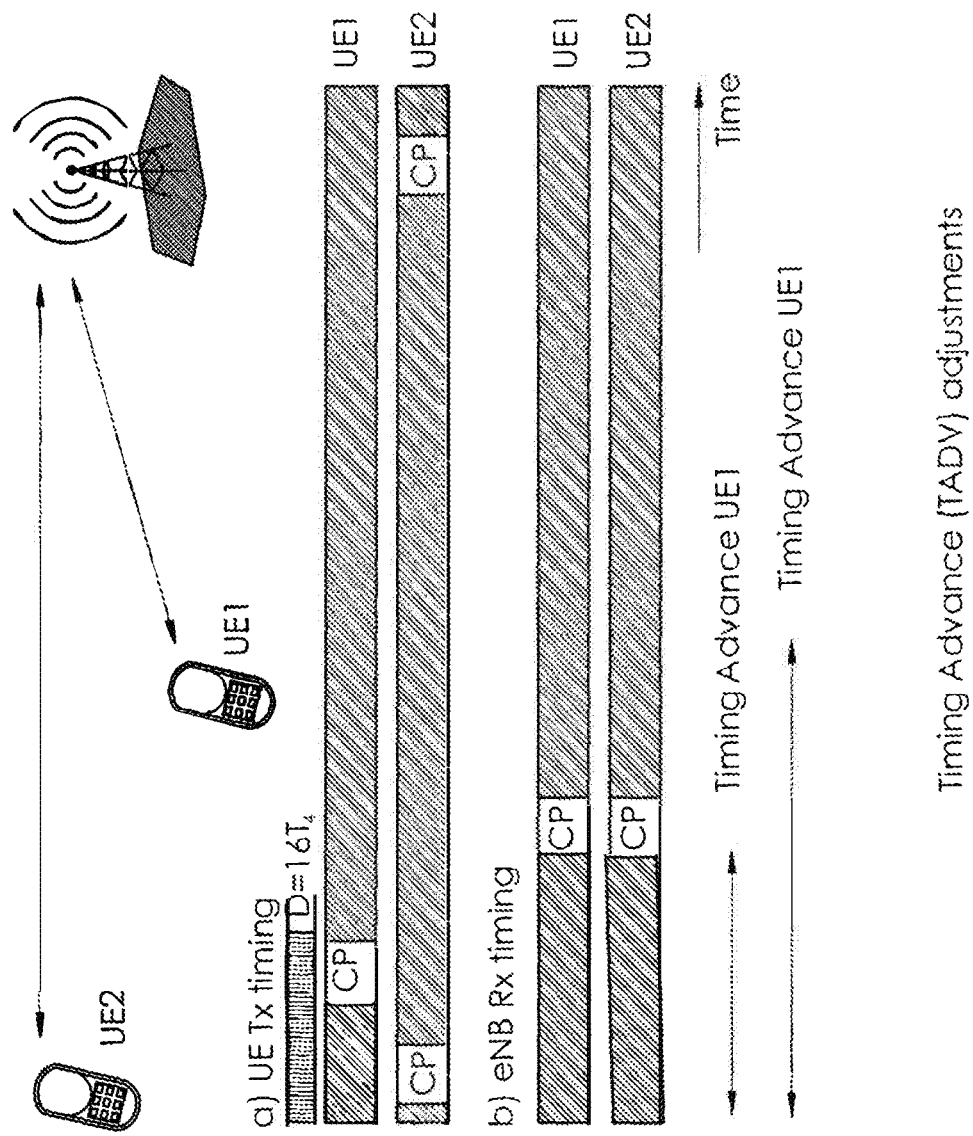
FIG. 37 illustrates Timing Advance adjustments.

From above, iterative and non-iterative approaches need to have a close initial estimate of the UE location. This estimate can be enhanced by the Time Advance (TADV or TA), aka RTT, information. A Timing Advance is used to compensate for the propagation delay as the signal travels between the UE and the serving cell tower. The serving cell base station assigns the TA to the UE based on how far away it measures the UE to be (see FIG. 37).

In LTE Timing Advance Type 1 measurement (see FIG. 38) is corresponding to the Round Trip Time, i.e. the signal round trip propagation delay. Although, the Timing Advance propagation delay may be from DLOS/Direct path or reflected path and includes the propagation delay through cell tower cables and base station/UE electronics. Furthermore, the UE adjusting its transmission timing with $4 \times T_s$ accuracy, where $T_s$ is the LTE system timing, which is equal to 32.55 ns.

Type 1 is defined as the sum of the receive-transmit timing difference at the eNB and the receive-transmit timing difference at the UE:

TADV=(*eNBRx-Tx* time difference)+(UE–*Tx* time difference).

Consequently, the distance d to the base station is estimated using:

d=c*(TADV/2), where c is the speed of light; or d□□c□□(RTT/2), where c is the speed of light;

The TA (RTT) is available from the serving cell and represents an independent UE range estimate from the serving sector. However, the TA is not available from the UE. Instead, UE provides access to the receive-transmit timing difference, i.e. UE Rx Tx. From the above the UE Rx-Tx=RTT−eNB Rx-Tx. On the other hand, from FIG. 37 and FIG. 38 when UE(s) TA(s) are adjusted the serving cell eNB Rx-Tx time difference will be the same for all UE(s). As a result, the UE Rx-Tx measurement will still correspond to the RTT, but with a bias that will depend upon the cell tower antennas cables length and base station electronics.

In an embodiment the antenna' cables length propagation delay can be estimated from the tower height and the propagation delay of base station electronics can be estimated from statistical data collected from various towers.

If RTT is known, the UE may be located along an arc defined by the serving sector's azimuth beam width and the RTT/2 range, aka radius. Because the serving sector's azimuth beam width can be a large value, reaching 120 degrees, the length of the arc quickly grows with that distance impacting the initial UE position estimate accuracy. However, the accuracy of the position/location estimate may be improved by virtue of the fact that the UE may also be located by the intersection of the azimuth beam widths of the serving sector and neighboring cell sectors. This approach helps to mitigate arc growth impact. Further improvement may also be achieved by considering sector antennas mechanical down-tilt angle and/or electrical down-tilt angle, antenna gain, elevation beam width (in addition to the azimuth beam width), as well as cell tower height and tower structure type.

LTE does not support soft UE handover, but in many instances the UE is being switched between two or more neighboring cells even if UE is stationary or quasi-stationary. In addition to the signal propagation disturbances this serving cell switch might be result of the wireless network eNB load equalization efforts.

In an embodiment, these frequent serving cell handovers are used to estimate RTT values from two or more geographically diverse serving cells. As was mentioned before, the UE may be located along an arc defined by the serving sector's azimuth beam width and the RTT/2 range. Consequently, there will be two or more such arcs defined from two or more geographically diverse serving cells and the UE location will be determined at the intersection of these arcs. It should be noted that because of inherent RTT estimation errors there might be multiple intersection points or none at all. However, the redundant arc(s) information further enhances the aforementioned RTT based position fix improvements which also utilized in this embodiment.

In order to develop an even finer initial UE position estimate, the LSU navigation processor may be configured to work with a LSU uplink signal processor. As with the LSU downlink signal processor, the LSU uplink signal processor may receive the uplink reference signal(s), for example SRS and/or DMRS, data that was collected from one or more UEs and pre-processed by the eNodeB(cell). At the eNodeB, digital samples of the uplink reference signals are extracted from the baseband and collected as uplink reference signal(s) data, together with relevant uplink metadata. The UE uplink data and the relevant uplink metadata is then sent to the LSU uplink signal processor. The uplink signal processor may be configured to determine the AoA/DoA observables based on the UE uplink data and the relevant uplink metadata, as well as the known configuration/parameters of the eNodeB sector antenna array, which is included in the uplink metadata. The AoA/DoA observables are then sent to the LSU navigation processor, which may reduce observables ambiguity and produce the AoA line of bearing (LOB) and/or direction of arrival (DoA) from the AoA observables and the uplink metadata.

In an embodiment, the AoA/DoA estimate produced by the LSU navigation processor will dramatically limit the arc growth versus distance from the eNodeB(serving sector). This is because, unlike the sector azimuth beam width that might reach 120 degrees, the error of AoA line of bearing (LOB) and/or direction of arrival (DoA) estimated by the LSU navigation processor is on the order of one degree or less. Thus, compared with the traditional usage of the sector azimuth beam width, the arc growth when utilizing the LSU uplink signal processor and LSU navigation processor may be 100× less. Consequently, the initial UE position estimate may be 100× more accurate. Thus, the AoA/DoA estimate can improve the navigation processor' downlink OTDOA UE positioning accuracy, and this more accurate downlink OTDOA UE locate, can in turn improve the navigation processor' uplink AoA/DoA/UE position fix. Accordingly, this enables an embodiment that utilizes joint uplink/downlink or downlink/uplink UE positioning.

Wireless network environments sometimes defy use of the multilateration method, which requires at least three reference points (for 2-D locate) in order to obtain the UE location. When four or more reference points are available, a 3-D location can also be extracted. Furthermore, if the signals are received by a MIMO antenna, the bearing of the UE can be established. Where there is vertical snapshot information is available from the MIMO antenna, the elevation can also be determined of the UE. For example, in some dense urban environments wireless networks use only two high power cell towers that flood a large area with RF signals. Although in this environment the DLOS is not available, the impact of DLOS absence is small because for data communication purposes, communications can be carried using the reflected signals as long as the reflected path delay is less than the Cyclic Prefix (CP) length. This creates a problem for common navigation techniques that rely on at least three reference points being detectable.

Figure 36:
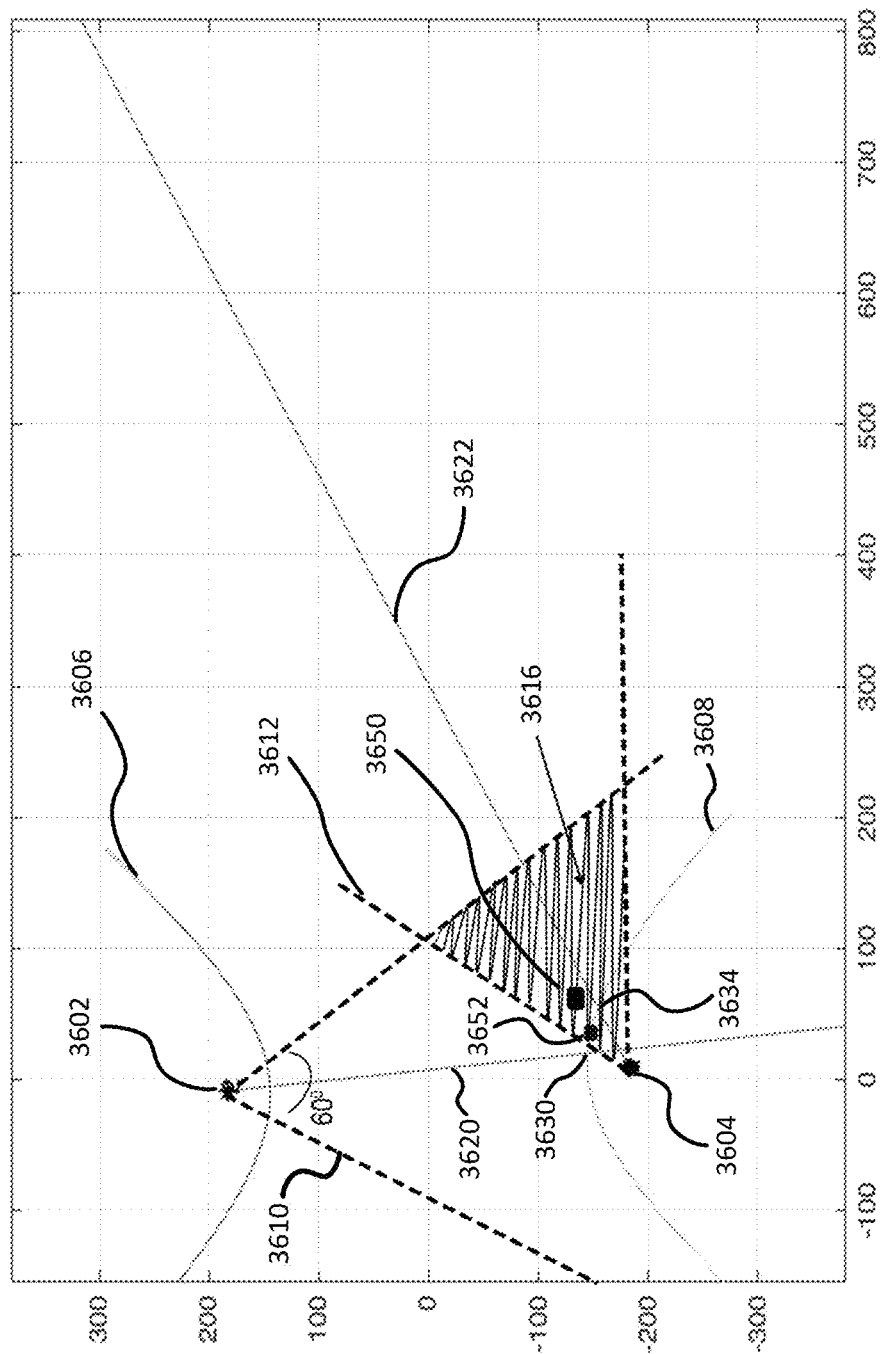
FIG. 36 illustrates an embodiment of a depiction of UE location fix in the "two towers" environment.

In an embodiment, the UE locate in a two tower/cell environment is further illustrated in FIG. 36. The method may start with plotting the TDOA hyperbolas for the two cell/tower sectors 3602 and 3604 that are detectable, such as hyperbolas 3606 and 3608, and finding the hyperbola to which the target UE belongs. The UE's hyperbola can be determined by finding which sector azimuth beam from each of the cells/towers 3602 and 3604 that the UE also resides within. The hyperbola that belongs to both sector azimuth beams is the chosen hyperbola. As illustrated in FIG. 36, cell/tower 3602 has a sector azimuth beam width 3610, while cell/tower 3604 has a sector azimuth beam width 3612. In FIG. 36 example sectors azimuths beam widths are same equal to 60 degrees. The intersection 3616 between sector azimuth beam width 3610 and sector azimuth beam width 3612 is the area of highest probability of where the UE is located. Hyperbola 3608, which belongs to this area of the highest probability is the chosen hyperbola.

If TA or UE Rx-Tx, aka RTT, measurements from at least one sector (tower) are is available, the UE may then be located along an arc defined by the serving sector azimuth beam width and the RTT/2 range, e.g., arc's radius. Thus, the UE may be positioned at the hyperbola and arc intersection vicinity. Note: Because of inherent RTT estimation errors there might be multiple intersection points or none at all. However, the redundant arc(s) information further enhances the RTT based position fix.

If the AoA/DoA estimate from at least one sector (tower) is available then the UE belongs to the LOB and the hyperbola intersection point. This solution might be the most accurate.

Yet, when neither RTT, nor the AoA/DoA estimate is available, then the UE location fix can be determined utilizing one or more heuristic approaches, for example by scoring intersection points corresponding to each cell/tower (sector) on the chosen hyperbola 3608. The score may be partly based on a cosine of the difference in angles between the direction a cell/tower is pointing and the direction to a point on the hyperbola being tested from the cell/tower sector. As shown in FIG. 36, cell/tower 3602 is pointing in the direction 3620 and cell/tower 3604 is pointing in direction 3622, which defines intersection points 3630 and 3634. The remaining part of the score may come from the distance from each point 3630 and 3634 to the corresponding cell/tower. Once a score for each point 3630 and 3634 has been determined, the point with the highest score from cell/tower 3602 and cell/tower 3604 may be determined. The two best scoring points on the hyperbola are then weighted according to their corresponding cell/tower's SNR. Finally, a point between the two best scoring points (closer to the higher weighted point by SNR) is picked as the UE location fix. As shown in FIG. 36, this results in a UE position 3650 being estimated, when the true location of the UE is location 3652.

Returning to the discussion of the LSU embodiment, the LSU may further include a communication processor configured for signaling and information exchange with the UE, the eNodeB, and the network elements. The signaling may be in line with the OMA SUPL protocol and/or 3GPP LPP/LPPa, or a combination of LPP, LPPa and SUPL, as well as other protocols that are or may be used for communication with the network, for example LCS-AP protocol. Furthermore, proprietary interfaces and/or protocols can be also utilized.

An example of the information so exchanged may be as follows:
  Site Name:
    Technology (i.e., 4G, 5G), Active (e.g., Y/N)(i.e., On-Air), In building (e.g., Y/N);
    Global CellID, PCI value, Frequency, IsGPSsynchronized, DL Tx configuration (i.e., number of Tx ports, maxTx power, DL bandwidth);
    Tower structure type (i.e., rooftop, monopole, building-side, etc.), cable length and losses; Antenna type (i.e., omni, directional), Latitude, Longitude, Antenna altitude AGL (i.e., above ground level), Towerbase altitude MSL (i.e., mean sea level), Geoid;
    Antenna Azimuth, Elevation, Mechanical down-tilt angle Electrical down-tilt angle, Gain, H-Beamwidth, V-Beamwidth;
    Cell Bandwidth, TA, Neighbour Cells list, PRS configuration;
    eNodeB Sector antenna array configuration.

Revisiting the UE power consumption in the IoT applications, the LTE modems supporting the IoT may pursue further power reduction options. For example, one option would be for the UE to send ranging signal(s) data only when the UE is already connected (to the network). Another option is for the UE to send ranging signal(s) data only when some conditions that are favorable to achieving a high location accuracy are met, for instance when the number of detected towers is larger than a threshold number N and/or the SNR/SNIR values exceed certain level, etc. Note: This approach may not apply when an instant location fix is needed, but might be acceptable for tracking (determining trajectory) of a UE on the move when some amount of delay is acceptable.

In an LSU embodiment, all LSU components/elements (such as the communication processor, downlink signal processor, uplink signal processor, and navigation processor) may be implemented in software that may be executed on one or more network core elements. In an embodiment, these LSU components may also be run on evolving 4.5G MEC (Mobile Edge Computing) server at a facility's edge, whereby, for example, the LSU components may be integrated as a hosted app on a 4.5G MEC.

In another embodiment, the LSU components in a 5G deployment may be hosted in the core network computing cloud. In this embodiment the LSU being hosted in the core network computing cloud supports the Location-as-a-Service (LaaS) data delivery, whereby the UE acts as a gateway to the core network computing cloud and LaaS specifically for protected physical location data.

All LSU components/elements (communication processor, downlink signal processor, uplink signal processor and navigation processor) are implemented in software.

Below are more system deployment options descriptions, including the LSU placement:

1. The LSU may be deployed inside the core network and/or operator's IP service network.
2. The LSU can be deployed on a server at Edge facility of cloud computing-based centralized RAN (C-RAN) baseband processing, for example evolving 4.5G MEC (Mobile Edge Computing) server, where it may be integrated as a hosted App. Note: RAN is Radio Access Network.
3. The LSU being hosted in the core network computing cloud and/or operator's service network cloud.
4. The LSU can be a fully hosted and managed cloud service, connecting to the operator' network core and/or core IP service network via a Secure Remote Internet Connection.

Embodiments 3 and 4 support the Location-as-a-Service (LaaS) data delivery, whereby UE acting as a gateway to the core network computing cloud and LaaS specifically for protected physical location data. However, option three is specifically for the 5G networks that have Evolved Packet Core (EPC), aka network's core, hosted in the computing Cloud. At the same time, option four is more appropriate for currently deployed wireless networks option as well as 5G deployments and, therefore, is an embodiment. It is to be understood that both the foregoing general description and the following detailed description are exemplary and explanatory and are intended to provide further explanation of the embodiments as claimed.

An embodiment of a system employing the forth option of the LSU deployment, which is based on the Architecture for UE positioning within E-UTRAN (3GPP TS 36.305 version 14.3.0 Release 14), is depicted in FIG. 39. This embodiment may leverage the OMA (Open Mobile Alliance) Secure User Plane Location (SUPL) architecture version 2.1 (OMA-AD-SUPL-V2_1-20120529-C). Unlike traditional E-UTRAN positioning that utilizes the LTE Control Plane, SUPL performs the E-UTRAN positioning over the LTE User Plane. The SUPL solution may utilize existing standards, for example LTE interfaces and protocols supporting UE positioning, to transfer assistance data and positioning data over a User Plane bearer, such as IP, to determine a SUPL Enabled Terminal (SET) position. In order to accomplish this task, the SUPL solution is extending existing LTE interfaces and protocols, for example the LPP protocol. Note: SET is a logical entity in a device, i.e. UE, that is capable of communicating with SUPL Location Platform (SLP). The SLP is responsible for Location Service Management and Position Determination. The SLP contains the SLC and SPC Functions. The SUPL Positioning Center (SPC) entity in the SUPL Network responsible for all messages and procedures required for position calculation and for the delivery of assistance data. The SUPL Location Center (SLC) coordinates the operations of SUPL in the network and interacts with the SET over User Plane bearer.

FIG. 40 depicting block diagram of an embodiment of system architecture underlying positioning. It is illustrating a) one or more LTE devices 4001, aka UE; b) the E-UTRAN eNodeB 4002; c) the network core elements: Mobile Management Entity (MME) 4005, Evolved Serving Mobile Location Center (E-SMLC) 4009, Serving Gateway (SGW) 4003 and Packet Gateway (PGW) 4004; d) the network' core IP service network 4006; e) PoLTE LSU 4007 and d) the standalone LMU(s) or LMU(s) integrated with DAS system(s) 4010. Included in FIG. 40 is an IP service network entity 4008 that is capable of managing/supporting the Location Service (LCS) tasks. Note: The unit 4008 might include other entities as well. In addition, LTE and SUPL interfaces and User Plane are identified in FIG. 40.

The embodiment is exploiting the SUPL Location Platform (SLP) solution to determine the device (UE) position. However, there are several important architectural differences between SUPL and PoLTE System architectures that require extension and/or modification of the SUPL solution as well as introduction of new elements/functionality. Listed below are these architectural differences:

First, the system depicted in FIG. 40 does not include the SLP. Instead, the SLP functionality, is carried out by the LSU 4007.

Second, SUPL architecture is placing the SUPL Location Platform (SLP) with the network' core either as a standalone entity or combining some element(s) of the Location Platform with the network core components, for example integrating the SUPL Positioning Center (SPC) in the E-SMLC 4009 or attaching the SPC to it via a proprietary interface (see 3GPP TS 36.305 version 14.3.0 Release 14, section B.2 SUPL 2.0 and LTE Architecture). However, to support LaaS, the LSU is hosted in cloud outside of the network' core and/or core IP service network. Consequently, in this architecture the positioning element(s) may not be integrated with the core and/or service network components. Instead, information may first be carried to the Relay (see FIG. 40) entity that is integrated in the E-SMLC and acts as a relay to pass this information to the LSU via the user plane utilizing SUPL Llp interface (through interface' protocol with extensions) or via proprietary interface and/or protocols.

Third, for the downlink positioning SUPL obtains the assistance data from the SET, i.e. operations which take place entirely within an LPP/LPPe session. However, in some downlink positioning cases the information from the eNodeB and UE needs to be merged for positioning operations. SUPL is by definition carried over the user plane and it does not support the operations that are terminating at the eNodeB. Thus, operations that require assistance data supplied by various eNodeBs must take place in combination with control-plane procedures over LPPa (see 3GPP TS 36.305 version 14.3.0 Release 14, section B.4 Procedures combining C-plane and U-plane operations). The LTE release 14 solution is integrating the SPC (SUPL Positioning Center) in the E-SMLC or attaching the SPC to it via a proprietary interface.

However, this solution is limited to the assistance data collection/transfers, e.g. does not support PoLTE uplink AoA/DoA and U-TDOA positioning operations that require reference signals' digital samples transfers. Also, this solution places some of positioning functionality in the network's core and, according to the above architectural differences discussion points, this solution cannot support the PoLTE system architecture (FIG. 40) where all of positioning functionality belongs to a single entity (LSU) that is outside of the network' core and/or core IP service network.

Fourth, PoLTE operations require collecting/extracting at UE and/or LMU and transferring to the LSU of the digital samples of the baseband I/Q samples of reference signals in time domain or the baseband I/Q samples in frequency domain, or the Resource Elements (RE) of the OFDM symbols carrying reference signals or RE of references signals from OFDM symbols. This is a unique requirement that is not supported neither by the LTE positioning standards, i.e. architectures for UE positioning within E-UTRAN, nor OMA SUPL architectures.

There are multiple advantages to this approach with main advantages listed below, while others are documented throughout this disclosure:

1. The UE is relieved of the heavy computational burden required for positioning (RSTDs calculations), therefore achieving significant UE power consumption improvements, which is very important for modems targeting IoT (Internet of Things) applications. At the same time, this approach allows the positioning engine to be continuously running in the background enabling ubiquitous high-accuracy positioning that provide up-to-date location information with a low latency and without compromising the UE power consumption.
2. The LMU (Location Management Unit) complexity is dramatically reduced, enabling seamless LMU integration with eNodeB. In its current form the LMU is a complex standalone device fully dedicated to receiving and processing the uplink reference signal(s) to calculate the RTOA (Relative Time of Arrival) values aka measurements. Thus, in its current form the LMU is not easily merged into eNodeB. On the other hand, collecting/extracting and transferring to the LSU the digital samples of the baseband reference signals is a low complexity task (effort) presenting only a minor computational load.
3. The LSU can be placed either inside the network and/or IP service network, or outside the network, hosted in the computing Cloud. Thus, enabling LaaS for most current and future network architectures/environments.
4. The digital samples of the baseband I/Q samples of reference signals can be carried through control plane and/or user plane, enabling uplink positioning over user plane, which cannot be accomplished by the SUPL solution.
5. The ability to process both: uplink and downlink reference signals in a single entity, LSU, makes possible advances features that were not feasible before, for example joint Uplink/Downlink or Downlink/Uplink UE positioning that improves the locate system reliability and position fix accuracy.
6. The ability to process multiple networks, combining Bluetooth, WLAN, LTE, etc.

Referring to FIG. 40, SET and LMU functionalities are modified and the underlying protocols (not shown in FIG. 40) delivering of messages/information over the LTE/SUPL interfaces (FIG. 40) are extended to accommodate system requirements. Also, a new Relay entity (see FIG. 40) is introduced. It is integrated in the E-SMLC passing digital samples of the uplink baseband reference signals, assistance data and other information to the LSU.

As was noted before the LMU functionality may be implemented as a standalone LMU unit or integrated with other elements of the wireless network infrastructure, for example LMU integrated with the eNodeB, LMU(s) integrated with DAS system(s), etc. However, in all variants the digital samples of the relevant UE uplink baseband reference signals are collected and pre-processed and will be forwarded to the LSU together with assistance data and other information for further processing.

Furthermore, the SLP and its major components the SLC and SPC are also modified and merged into the LSU. For example, modifications include utilizing signal processing and positioning calculations algorithms/techniques for uplink and/or downlink positioning, adding support for receiving/retrieval of uplink/downlink digital samples of the baseband reference signals, expanding Assistance Delivery Function(s) to accommodate uplink locate, etc. In addition, the Lup and Llp message support and underlying protocols are extended to enable transfer/passing of the digital samples of the baseband reference signals from the relay entity to the LSU.

The SET modification example includes adding the ability to retrieve, preprocess and send the digital samples of the downlink baseband reference signals to the LSU by the SUPL Positioning Calculation Function (SPCF). Also, SPCF modification may include preprocessing of these samples before transferring these to the LSU. SUPL has already extended the LPP (LTE positioning protocol) used to deliver information, including assistance, between the UE and the network' core elements over Uu interface and through the eNodeB, and also to the SLP over Lup. However, in an embodiment this extended LPP protocol, the LPPe, is further extended to accommodate the digital samples delivery. On the other hand, the SET functionality can be simplified by limiting it to retrieving and sending the digital samples to the LSU and to preprocessing of these samples.

In essence, for any of the abovementioned LMU(s) functionality the embodiment employing an alternative LMU functionality—just the ability to retrieve, preprocess and send the digital samples of the uplink baseband reference signals to PoLTE LSU via the Relay entity. Moreover, the eNodeB functionality can be extended to retrieve, preprocess and send the digital samples of the uplink baseband reference signals directly to PoLTE LSU or via the Relay entity.

Also, the LMU does not need to obtain obtain assistance information from eNodeB and E-SMLC as this information can be gathered by the Relay, e.g. the E-SMLC would deliver the assistance information directly to the Relay. The LMU communicating with E-SMLC and Relay entity over the SLm interface using the underlying SLm-AP protocol. The latter is extended to accommodate the digital samples transfers and LMU/Relay communications.

The embodiment introduces a new entity the Relay. Its purpose is to address the current LTE/SUPL architecture (3GPP TS 36.305 version 14.3.0 Release 14, section B.4 Procedures combining C-plane and U-plane operations) limitations noted in the architectural differences discussion (the third point). The Relay is passing the digital samples from the LMU to the server. Also, the Relay is enabling communications between the server and the E-SMLC permitting the assistance data delivered over the LPPa (LTE Positioning Protocol Annex) to be transferred to the server. The LPPa allows the eNodeB to exchange location information with the E-SMLC for the purpose of UE positioning, including assistance data. At the time of the server's request, the assistance data might be either already available at the E-SMLC, or the E-SMLC retrieves this data from appropriate eNodeBs. Note: The assistance data may be for uplink AoA/DoA, U-TDOA, downlink OTDOA as well as E-CID positioning. The Relay entity communicating with the server over the Llp interface or a proprietary interface. In case of the Llp interface its message support and underlying protocols are extended to enable transfer/passing of the digital samples of the baseband reference signals and/or assistance data.

The IP service network entity 4008 implementation is the MNO dependent. MNO is Mobile Network Operator, also known as a wireless service provider, wireless carrier, cellular company, etc. Thus, the server and unit 4008 command/control communications interfaces may be the MNO specific. In the embodiment, it is assumed that all communications with the server are over the Internet and this connection is secure. Also, unit 4008 would channel the positioning information exchange between the server and the system elements. There are several ways of channeling this information exchange, for example utilizing protocol tunneling techniques.

The embodiment is utilizing the user plane for positioning data transfers and communications within the system. However, the introduction of the Relay entity enabling another system embodiment, which utilizes the control plane for positioning data transfers and communications within the system. As was mentioned before, the traditional E-UTRAN positioning employing the LTE Control Plane for positioning data transfers and communications. The observables, i.e. RSTD, RTOA, AoA, etc., and data and assistance information are carried between UE(s) and/or LMU(s) and the E-SMLC via underlying LPP, LPPa and Slm-AP protocols. The E-SMLC is responsible for position fix determination (FIG. 39). Similarly, to an embodiment, the LPP/LPPa and the Slm-AP protocols are extended to support transfer/passing of the digital samples of the baseband reference signals and/or PoLTE-specific assistance data to the E-SMLC and ultimately to the Relay element. The Relay communications/data exchange with the server is via the IP service network entity 4008 (FIG. 40). The interface and protocol may be proprietary or one of the LTE/SUPL interfaces with modified/extended underlying protocols.

Furthermore, this alternative system embodiment results in complexity reduction: for example, the SET functionality is simplified or the whole SET element is eliminated; also, the SLP's SLC and SPC functions that are merged in server (in an embodiment) are significantly simplified and even completely removed.

Yet another embodiment is shown in FIG. 41. This embodiment may be utilizing just a small subset of the functionalities defined by the SUPL architecture, and include the standalone LMU functionality and its associated E-SMLC, or indeed just the LMU functionality in the eNB. Listed below are this embodiment's particular modes of operation:

1. The UE client and the LSU exchange data packets with proprietary format over the IP protocol, and:
   a. The packet content may include measurement data, auxiliary information or control commands.
   b. The data packets may be transported over the LTE user plane or any alternative form of secured data bearer such as Wi-Fi (4011) and/or Wi-Fi plus ePDG (4012) combination using for example the 3GPP LTE-WLAN Aggregation (LWA) or the 3GPP LTE WLAN Radio Level Integration with IPsec Tunnel (LWIP) technology (FIG. 41).
      i. Note: The ePDG entity 4012 is responsible for interworking between the LTE EPC (Evolved Packet Core) and non-3GPP networks that require secure access, such as a Wi-Fi, LTE metro, and femtocell access networks.
   c. The data packet may be exchanged directly between the UE and the LSU or via an Internet of Thing (IoT) platform such as Amazon Web Services (AWS) IoT, Google Cloud or AT&T M2x.
      i. Optionally, the Internet of Thing (IoT) platform may be part of the IP service network entity 4008.
2. The E-SMLC and the LSU exchange data packets with proprietary format over the IP protocol, and:
   a. The packet content may include measurement data, auxiliary information or control commands.
   b. The data packet may be exchanged directly between the E-SMLC and the LSU or via an Internet of Thing (IoT) platform such as Amazon Web Services (AWS) IoT, Google Cloud or AT&T M2x (FIG. 41).
3. The LMU (and/or the LMU in the eNB) and the LSU exchange data packets with proprietary format over the IP protocol, and:
   a. The data packet may be exchanged directly between the LMU and the LSU or via an Internet of Thing (IoT) platform such as Amazon Web Services (AWS) IoT, Google Cloud or AT&T M2x.
   b. The data packet may be also exchanged between the LMU and the LSU via E-SMLC (FIG. 41).

In an embodiment, exemplary LTE network' wireless device may interface with one or more communication networks and/or one or more dedicated locate systems (networks). These networks (systems) may employ downlink or uplink positioning, or both.

The downlink positioning involves the wireless device receiving signals, used for device localization, from one or more networks/systems. Currently the downlink positioning requires wireless devices to detect and process these signals, whereby processing involves computation of one or more of the following observables: GPS/GNSS—pseudo-ranges, pseudo Doppler, etc., timing—TOA, TDOA, etc., direction—AOA, Phase of Arrival, etc., utilized in wireless device position calculations (computations) that are made by the network's component—the E-SMLC. Alternatively, the wireless device may determine its own position by performing both of the aforementioned computations.

The uplink positioning involves one or more specific network' elements receiving signals, used for device localization, from one or more wireless devices. Similarly, to the downlink, the current uplink geolocation also requires the network element (for example LMU) to detect and process these signals and to compute, while position calculations are performed by another network component (E-SMLC). Also, in some instances the network element may also compute the wireless device's position.

The wireless device and/or the network' element may also receive an auxiliary/assistance information messages supporting localization. Although, in some implementations these messages and signals may be used for device localization, are combined. For example, the GNSS messages contain ranging codes (for timing calculating) and navigation data (auxiliary information).

In some instances, signals for wireless device positioning are used specifically for the purpose of device localization, i.e. dedicated usage. However, in other cases these signals are of dual use. For example, pilot signals that are present in many communication networks transmissions may be also used for device localization.

In the present embodiments (unlike current implementations) neither wireless device nor specific network element is computing the signals' observables. Instead, wireless device and/or specific network' element collect and pre-process one or more snap-shot(s) of signals that are used for wireless device positioning, with snap-shot(s) to be sent to the LSU, which determines the signals' observables, including GPS/GNSS pseudo-ranges/pseudo Doppler, etc., and performs wireless device localization. The computational load of collecting and pre-processing one or more snap-shot (s) is at least an order of magnitude lower than the currently needed computing power and resources. Therefore, in present embodiment wireless device and/or specific network element are relieved from heavy computational burden and require lesser amount of computational resources.

When communicating with the LSU (localization server), the snap-shot data consume a larger bandwidth than the current implementations. Subsequently, some of the energy savings achieved in the present embodiment will be offset by additional power consumed when transmitting the snap-shot data. Yet, according to inventors' power estimation calculations, the present disclosure still produces substantial power savings.

At the same time, the present embodiment advantages outweigh the snap-shot's larger communication overhead. For example, the overhead from the snap-shot's larger bandwidth is very small, for example does not exceed 1% of the LTE Uplink bandwidth (in any category). Also, pertaining the specific network element' communications with LSU, the larger snap-shot communication overhead has no relevance (impact).

Listed below are the present embodiment advantages:
Wireless device—longer battery life, better energy efficiency, lower complexity, cost and size.
Specific network element—

1) For a standalone element fully dedicated to receiving, detecting and processing signals used for device localization and to calculating observables it is a dramatically reduced complexity and lower power consumption that in turn enabling a seamless integration with other network elements.

2) For other network elements it is an easy expansion of a network' component functionality to include collecting and pre-processing of snap-shots of signals that are used for wireless device positioning, with snap-shots to be sent to the LSU.

For example, cellular networks' LMU (Location Management/Measurement Unit) is a complex standalone component computing the signals' observables, which in its current form cannot be easily merged with another cellular network component the eNodeB, without impacting the eNodeB's hardware and software. On the other hand, collecting and pre-processing of snap-shots and sending these to the LSU, is a low complexity task presenting only a minor additional computational load to the eNodeB.

Another example is the AP, WLAN component, that may be tasked with processing one or more signals used for the wireless device localization, including computing these signals' observables, resulting in a heavy computation and computational resources burden. Furthermore, computational constrains of the already installed APs (legacy) will prevent deployment of the state-of-the-art locating algorithms with a high computational load. At the same time, the present embodiment does not tax AP's computational resources because collecting and pre-processing of snap-shots and sending these to the LSU presenting only a minor computational load for the WLAN AP.
Other benefits include—

1) Deploying of high computational bandwidth advanced positioning algorithms providing superior localization accuracy, reliability without taxing the existing network infrastructure components resources.

2) Drastically reducing (minimizing) the upgrade logistical efforts; no HW/SW legacy restrictions.

3) Deploying state-of-the-art machine learning to further improve the localization reliability and position fix accuracy.

4) Continuously conducting wireless device positioning in the LSU, i.e. in the background, without increasing power consumption and without taxing the wireless device/specific network component computational resources.

In the present embodiments snap-shots of signals, used for device localization, may be collected in a digital format, i.e., digital samples. The digital samples are from the baseband signals; can be in time domain or in frequency domain, and can be represented by the I/Q samples, the Resource Elements (RE), Channel State Information (CSI), etc. The digital samples are also per antenna. Note: RE and CSI is complex-valued coefficient per each OFDM subcarrier. The I/Q values represent the signals' in-phase (I) and quadrature (Q) components.

In an embodiment, the wireless device' and/or network' element may include a detector a.k.a. logical entity configured to detect and extract digital samples of signals used for device localization and may be also configured to collect and store a number of digital samples per antenna and per signals' identification (ID). In addition, the detector may be configured to collect/store metadata, for example each frame starts, and other auxiliary/assistance information.

In an embodiment, the detector may be also configured to pre-process collected (stored) digital samples, for example to reduce the data size before being sent to the LSU, e.g. reduce communication bandwidth. This reduction may include extracting digital samples that represent only the signals that are used for device localization, i.e. exclude digital samples that are carrying the payload.

In an embodiment, the detector may be configured to collect and retain a subset of digital samples of data in the GPS/GNSS navigation message frame, i.e. a small portion of the message. This approach is feasible because most of the information carried in the navigation message will be available at the LSU (GPS/GNSS assistance data), including reference time, reference location, satellite ephemeris, clock corrections, Ionospheric Models, Earth Orientation Parameters, GNSS Time Offsets, Acquisition Assistance, Almanac, UTC Models, etc.

In an embodiment, the detector may be configured to obtain a further data size reduction by compressing digital samples into a smaller number of bits. Compressing the digital samples may be achieved by performing the correlation engine in the detector via the following method.

Emitter Detection: Reference signals have high autocorrelation and low cross correlation properties to support emitters (sources) detection (differentiation) during simultaneous transmissions from multiple emitters. Note: Reference signals can be differentiated based on the emitter's ID/parameters and/or reference signals configuration. The OFDM symbols containing the reference signals are captured by the receiver. Any number of OFDM symbols containing reference signals may be captured and processed, limited only by the available memory. Thus, the input to the emitter detection engine is a complex two-dimensional array. The input data elements include superposition of reference signals from multiple emitters. The emitter detection engine searches for presence in the input data of known reference signals generated by each emitter in a given localized database/list. This search is carried by cross-correlating the input data reference signals with known reference signals, i.e. the ideal replica of reference signals, including modulation, at the emitter's antenna. Thus, the Emitter detection function includes ideal replica generation producing the ideal replica of reference signals associated with emitter's ID/parameters and/or reference signals configuration. Like the input data, the ideal replica is in form of a two-dimensional array, containing the same number of RE(s) as the Positioning occasion data. It is also indexed by the same frequency-samples index, and the symbols index.

Cross Correlation: The emitter detection engine performs cross-correlation in the frequency domain by multiplying each received OFDM symbol with the conjugate of the ideal OFDM reference signal. This is the frequency domain equivalent of the time domain matched filter. When the cross-correlation between the received reference symbols and the ideal reference symbols have been applied, any encoding scheme employed in creating the reference signals has been removed, and the residual phase information for each sub-carrier is left over. The result of this operation is a phase coherent two-dimensional array. The phase coherent two-dimensional array is then integrated via summation. Any number of OFDM symbols may be integrated using this method. The magnitude and phase of the complex values in the output vector correspond to the presence and TOA of the reference signal sent by emitter at the receiver.

Detection: The detection process examines the magnitude and phase of the output of the cross-correlation to determine whether or not the reference signal sent by the emitter and captured at the receiver has sufficient properties in order for the TOA of the received signal to be correctly estimated.

Compression: If the properties of the signal are sufficient, the output of the cross-correlation is marked as valid and the non-zero portion of the complex vector is sent to a secondary processing block for TOA estimation. In this method, the TOA estimation block can be remotely located from the Emitter detection engine.

In the case of downlink location using CRS data received from a 2x MIMO emitter, there are 40 CRS OFDM symbols in one frame of LTE data. In the case of 10 MHz LTE bandwidth, there are 600 subcarriers contained within each OFDM symbol. If the receiver utilizes a 16 bit analog to digital receiver, each complex sub-carrier has a total bit depth of 32 bits. For data consisting of one frames worth of CRS data, the total size in bits of the dataset is 40×600×32 bits, or 768000 bits.

However, using our coherent compression scheme, the size of the resultant data used for TOA estimation is reduced to the non-zero portion of the cross-correlation output, times the number of emitters detected. The size of the data is reduced to 1×200×32 bits, or 6400 bits per emitter detected.

In the case of uplink location using SRS data received at a base station using a sub-frame configuration of 10, there are 8 SRS OFDM symbols in one frame of LTE data. In the case of 10 MHz LTE bandwidth, there are 600 subcarriers contained within each OFDM symbol. If the receiver utilizes a 16 bit analog to digital receiver, each complex sub-carrier has a total bit depth of 32 bits. For data consisting of one frames worth of SRS data, the total size in bits of the dataset is 8×600×32 bits, or 1536000 bits.

Assuming a full bandwidth SRS signal, the size of the data in this case is reduced to 1×288×32 bits, or 9216 bits per emitter detected.

The coherent compression process has reduced the amount of data required by the number of symbols used in the cross-correlation process.

Furthermore, there are many compression algorithms that can further reduce the size of the data. Some are well known, for example A-law and U-law Compounding Algorithms. Some lesser known algorithms are also used in radar technology, while others targeting optical fiber data transfers. Hence, the detector may be configured to compress digital sample size for example, from 32-bit to 16-bit or 32-bit into 8-bit, leading to 2X or 4X data size reduction.

In an embodiment, the detector may be configured to perform additional pre-processing (to further reduce data size), including matched filtering of signals used for device localization, calculating singular-value decomposition (SVD) principle eigenvalues of a matrix formed from one or more of the signals' digital samples. This additional pre-processing is a tradeoff between the computational load/ resources vs. reduction of communication bandwidth with a localization server.

For example, matched filtering combined with carrier frequency offset (CFO) processing per network node ID and followed by integration (in time) of a number of samples can further reduce the digital samples' data size. In an embodiment, the data associated with detection of the signal that is used to determine location is greater than the backhaul data used to send the compressed signal. This is especially true in IOT deployments. For example, a Cat-M modem that typically uses 1.4 MHz of bandwidth on the downlink to communicate with the LTE network can see up to 10 MHz of LTE signal bandwidth, including CRS signals that can be used to determine location. This is possible because Cat-M modems are typically deployed within (in-band) the 10 MHz channel that is used for normal LTE communication. The compressed information of the downlink signal can then be sent back to the LSU using the Cat-M uplink channel, or using Wi-Fi, Bluetooth, ZigBee, other IEEE 802.15 wireless technologies, or other lower bandwidth communication technologies now existing or hereafter developed. The same type of implementation can be used for NB-IOT, whereby more signal can be taken in by the modem, as an example, the Cat-M downlink signal, compressed and then sent back over the NB-IOT data channel to the LSU. The equivalent approach may be used in reverse for eNBs whereby the uplink signal can be taken in compressed and then passed to the LSU using lower bandwidth communication protocols, such as those discussed above. This enables the location solution to make more signal available for location calculation purposes. This may also result in better location results because: 1) it is well known that location accuracy is inversely proportional to bandwidth, and having more bandwidth results in better location accuracy; 2) having more bandwidth decreases the chance of the signal being suppressed by an interferer and also allows for better multipath mitigation, especially in consideration of the super resolution techniques described herein; and 3) allows for more signal to be available for integration.

In an embodiment, exemplary positioning LTE network, auxiliary/assistance information includes:

a. Serving cell information: [physCellId, cellGlobalId, CellGlobalIdEUTRA-AndUTRA, earfcn-DL, systemFrameNumber, Slot number, UTC timestamp, rsrp-Result, rsrq-Result];

b. ue-RxTxTimeDiff, DownlinkPathLoss, Bandwidth, in Physical Resource Blocks (PRB);

c. Neighbor cell information (0 to 32 neighbor cells): [physCellId, cellGloband, CellGlobalIdEUTRA-AndUTRA, earfcn-DL, systemFrameNumber, rsrp-Result, rsrq-Result];

d. UE information: [UE ID, UE category, Mobility state, MobilityHistoryReport].

In an embodiment, exemplary positioning LTE network, auxiliary/assistance information includes:

a. Site Name:

b. Technology (i.e., 4G, 5G), Active (i.e., On-Air), Indoors outdoors;

c. Global CellID, PCI value, Frequency, IsGPSsynchronized, DL Tx configuration (i.e., number of Tx ports, maxTx power, DL bandwidth);

d. Tower structure type (i.e., rooftop, monopole, buildingside, etc.), cable length and losses; Antenna type (i.e., omni, directional), Latitude, Longitude, Antenna altitude AGL (i.e., above ground level), Towerbase altitude MSL (i.e., mean sea level), Geoid;

e. For each antenna used for signal capture: Antenna Azimuth, Elevation, Mechanical down-tilt angle/Electrical down-tilt angle, Gain, H-Beamwidth, V-Beamwidth;

f. Cell Bandwidth, TA, Neighbour Cells list, PRS configuration, optional;
g. eNodeB Sector antenna array configuration.

In an embodiment, the Sounding Reference Symbols transmitted by the UE may be captured and reported together with the auxiliary information related to the configuration assigned to the UE at the time of the SRS transmission. This information may include some or all of the following elements of the UL Configuration IE as per 3GPP TS 36.355:
Serving cell PCI
Call Timing Advance
Cell UL-bandwidth
UL-CyclicPrefixLength
Cell srs-BandwidthConfig
UE srs-Bandwidth
UE srs-AntennaPort
srs-HoppingBandwidth
srs-cyclicShift
srs-ConfigIndex
transmissionComb
freqDomainPosition
groupHoppingEnabled
deltaSS
SFN Initialisation Time In an embodiment, the Sounding Reference Symbol data capture may be complemented or replaced by the capture of uplink Demodulation Reference Symbols transmitted by the UE.

In an embodiment, the Demodulation Reference Symbols shall be complemented by the following auxiliary/assistance information:
a. Time of PUSH transmission start: Frame and subframe number
b. Uplink grant information:
  (i) Frequency hopping flag
  (ii) Resource block assignment and hopping resource allocation
c. Cyclic shift for DM RS and OCC index
d. PUSCH configuration:
e. n-SB
f. hoppingMode
g. puschHoppingOffset
h. UL-ReferenceSignalsPUSH:
  (i) groupHoppingEnabled,
  (ii) groupAssignmentPUSCH
  (iii) sequenceHoppingEnabled
  (iv) cyclicShift In an embodiment, more than one block of Demodulation Reference Symbols and associated auxiliary information may be captured and reported.

In an embodiment, exemplary snap-shot metadata information includes: communication network/locate system description and type, location, signal classification (downlink or uplink), signal description, type, structure and parameters, date/time stamp, snap-shot data size, source of creation of the data (wireless device/device ID, network/system element (network/system element ID, etc.), data compression information, auxiliary/assistance information availability, time offset of the first reported digital sample relative to the start of the radio subframe, etc.

In present embodiments a snap-shot's data may be grouped (by the logical entity) with its metadata and associated auxiliary/assistance information and are termed as the positioning occasion. Positioning occasions may occur periodically.

According to an embodiment, the wireless device' and/or a network' element logical entity may include a communication processor configured to organize and exchange positioning occasion data (snap-shot data, metadata, auxiliary/assistance information), with the LSU; and to receive commands and other information. It should be noted that the signaling may be in line with industry standard interfaces/protocols, for example OMA SUPL protocol and/or 3GPP LPP, Internet Protocol Security (IPsec), etc. Also, proprietary interfaces and/or protocols can be utilized.

In present embodiments, the LSU may include positioning engine configured to determine a wireless device position/location from one or more relevant positioning occasions. The output of this engine may also include position related metadata (metric), such as Confidence Radius Values, GDOP, Wireless E911 Location Accuracy metrics from the Fourth Report and Order from the FCC, etc.

In an embodiment, the LSU may include a location management processor configured to interact with one or more wireless devices, one or more communication networks/locate systems—networks'/systems' components and/or services; as well as the positioning engine. The location management processor is configured to: a) manage all messages between one or more wireless devices, networks/systems (networks'/systems' elements, network services and the LSU; b) manage delivery of the positioning occasions (snap-shots' metadata and/or assistance/auxiliary data) from one or more logical entities to the positioning engine, and c) security.

In an embodiment, the location management processor receiving (from one or more logical entities) the positioning occasions and passing this information to the positioning engine for the target position calculation and tracking, i.e. navigation. Afterwards, the positioning engine returning (to the location management processor) the target's position and tracking information together with position/tracking related metadata that, for example, may be provided to the network's services, wireless devices, etc.

Precision localization methods employing two-step location process, whereby the first step entails calculation of one or more observables (observation results): TOA, TDOA, TOF, AOA/DOA, Received Signal Phase, and associated with these results metrics (SNR, std. deviation, confidence, etc.). During second step the observation results and their metrics are utilized to determine the wireless device (target) position/navigation.

At the same time, there are other location methods, for example probabilistic localization, including RF fingerprinting, Direct Position Determination, etc., that use one-step location process, i.e. does not require the aforementioned observation results (observables). However, the one-step's somewhat lower complexity comes at the price of accuracy degradation, localization ambiguity and other performance limiting phenomena.

According to the present disclosure, the two-step process' observables (TOA, TDOA, TOF, etc.) results accuracy may be uniquely enhanced by the multipath mitigation using advanced spectrum estimation (super resolution) algorithms described above. Similarly, AOA/DOA unique enhancements/adaptations combine the aforementioned super resolution estimates of time difference of the ranging signal, i.e. TDOA, as received at each antenna and the AOA/DOA technique that compares the phase difference of the ranging signal collected by each antenna.

According to the present disclosure, the second step in the aforementioned two-step location process (positioning/tracking) accuracy and robustness enhancements include heuristic Ad Hoc positioning/tracking techniques as well as adapting the common positioning algorithms to the communication networks signals structures and within the networks environment.

According to the present disclosure, the two-step process also accommodates the one-step location process. The wireless device' and/or network' element logical entity (detector) configured to detect and extract the probabilistic statistics (data) for device localization and may be also configured to collect and store this information per antenna and per signals' identification (ID). In addition, the detector may be configured to collect/store metadata and/or other auxiliary/assistance information. This detector may group these probabilistic statistics with its metadata and associated auxiliary/assistance information to produce the probabilistic positioning occasion. Thereafter, the communication processor, which is included into the logical entity, is configured to organize and exchange these positioning occasion data with the LSU.

In an embodiment, according to the two-step process, the positioning engine includes signal processing unit and data processing unit; with signal processing unit receiving the positioning occasions information from the location management processor and the location management processor receiving the target's position and tracking information together with position/tracking related metadata/metric from the data processing unit. Each unit is utilizing auxiliary/assistance information and the snap-shot's metadata that are included into the positioning occasion.

In an embodiment, the signal processing unit may be configured to estimate observables and their metrics of the downlink and/or uplink signals from one or more communication networks and/or one or more dedicated locate systems (networks).

In an embodiment, the signal processing unit may be configured to estimate the carrier frequency offset (CFO), utilizing one or more specific algorithms and/or techniques, which may allow the LSU's signal processing unit to track one or more moving wireless devices and to mitigate clock frequency mismatch between one or more the network's nodes and a wireless device. The CFO estimates are used to correct the snap-shots digital samples from which observables are calculated.

In an embodiment, the data processing unit may be configured to perform localization and tracking using the signal processing unit's output, i.e. observables/metrics. In addition to the target's position fix, the data processing unit generates metric data, including the covariance matrix of multiple localization results obtained from a number of combinations of observables and their std. deviations values.

In an embodiment, the data processing unit may be configured to perform downlink and uplink positioning/tracking utilizing observables and their metrics obtained from one or more communication networks and/or one or more dedicated locate systems (networks). The data processing unit may be also configured to use a combination of downlink and/or uplink observables/metrics from one or more communication networks and/or one or more dedicated locate systems, i.e. hybrid positioning/tracking.

In an embodiment, the data processing unit may utilize multilateration a.k.a. hyperbolic positioning, trilateration, triangulation and superior DOA/AOA/E-CID positioning methods to obtain position fix and its metric. The multilateration is further enhanced by forming the location cost function utilizing confidence metric to increase the probability of identifying the global minima of the cost function, e.g. the position fix.

In an embodiment, the signal and data processing units may be configured to perform the probabilistic localization algorithms to determine the wireless device position fix, i.e. to execute the one-step location process utilizing the probabilistic positioning occasion information from one or more wireless devices and/or one or more network' elements logical entities.

Wireless network deployments sometimes defy use of the multilateration/trilateration methods, which requires at least three reference points (for 2-D locate) in order to obtain the wireless device (UE) location. For example, in some environments only two high power cells or APs are deployed, flooding a large area with RF signals. This creates a problem for these methods that rely on at least three reference points being detectable. To mitigate this problem, the present disclosure employing heuristic Ad Hoc positioning/tracking techniques as well as adapting the common positioning algorithms to the communication networks signals structures and within the networks environment.

In an embodiment, multilateration/trilateration methods are further enhanced by dividing the set of all detectable reference points (network's nodes) in subsets of three or more, determining the target position for each subset and performing target localization by applying location consistency algorithms, including machine learning algorithms, to the resulting multiple position estimates.

In cellular networks, the present disclosure's superior DOA/AOA positioning is based on the described above E-CID method. This is a single tower-based uplink location process that utilizes two observables the round trip path delay (RTT), calculated by the serving cell, and the serving sector horizontal (azimuth) beamwidth. Because sector antennas in current deployments have large (60 or 120 degrees) horizontal plane beamwidth, this method suffers from lack of accuracy. As discussed above, the present disclosure's unique enhancement/adaptation utilizes existing sector antenna diversity (uses MIMO sector antennas for the AOA/DOA estimation). It is effectively reducing the AOA angular error to less than a one degree. However, to obtain a position fix in 2-D it is necessary, in addition to the AOA/DOA estimate, to know the distance from the UE to the serving cell. This distance may be derived from the round-trip time (RTT)/Time Advance (TA) estimates, which are based on measurements performed by the serving cell. Yet, when estimating RTT/TA the serving cell receiver does not mitigate the radio waves propagation phenomena, for example the multipath.

As a result, RTT measurement may lack required precision. One way to address the precision issue is to calculate the aforementioned distance (in lieu of RTT) from the downlink TOA observable(s) between the serving cell and the wireless device (UE), utilizing the present disclosure's algorithms. The drawback to this solution is that this downlink TOA is one-way measurement and requires an accurate synchronization between the serving cell and the wireless device, i.e. the locate accuracy is impacted by this synchronization error. On the other hand, because wireless device is locked to the serving cell and the mitigation of clock frequency mismatch provided by the disclosed above CFO estimation and correction this error is reduced to not to diminish the accuracy gains achieved by the present disclosure's algorithms.

In cellular networks, a Timing Advance (TA) is used to compensate for the propagation delay as the signal travels between the UE (wireless device) and the serving cell sector antenna(s). The serving cell base station assigns the TA to the UE based on how far away it measures the UE to be (see FIG. 37).

In LTE Timing Advance Type 1 measurement (see FIG. 38) is corresponding to the Round Trip Time (RTT), i.e. the signal round trip propagation delay. Although, the Timing Advance propagation delay may be from DLOS/Direct path or reflected path and includes the propagation delay through cell tower cables and base station/UE electronics. Furthermore, the UE adjusting its transmission timing with 4×Ts accuracy, where Ts is the LTE system timing, which is equal to 32.55 ns.

Type 1 is defined as the sum of the receive-transmit timing difference at the eNB and the receive-transmit timing difference at the UE:

TA=TADV=(*eNBRx-Tx* time difference)+(UE *Rx-Tx* time difference).

Consequently, the distance d to the base station is estimated using:
d=c*(TADV/2), where c is the speed of light; or
d=c*(RTT/2), where c is the speed of light.

The TA (RTT) is available from the serving cell and represents an independent UE range estimate from the serving sector. However, the TA is not available from the UE (wireless device). Instead, UE provides access to the receive-transmit timing difference, i.e., UE Rx-Tx. From the above, the UE's (Rx-Tx)=RTT−eNB Rx-Tx. However, from FIG. 37 and FIG. 38 when UE(s) TA(s) are adjusted the serving cell eNB's Rx-Tx time difference will be the same for all UE(s). As a result, the UE's Rx-Tx measurement will still correspond to the RTT.

The RTT is equivalent to TOF/TOA estimate that is biased depending upon the cell tower antennas cables length and base station electronics.

In an embodiment the antenna's cables length propagation delay can be estimated from the tower height and the propagation delay of base station electronics can be estimated from statistical data collected from various towers.

There are number of cases where the downlink and uplink joint positioning may be used to overcome drawbacks of a single downlink or uplink localization. For example, in environments where signals from only two nodes are available the combination of the downlink TOA/TDOA and the uplink AOA/DOA(from the serving B S) estimates can improve the location accuracy/reliability in cellular network. This is because the additional uplink AOA/DOA constraint reduces the UE (wireless device) 2-D locating ambiguity of the downlink, which arising from the number of reference points (cells) being less than three.

In another example, additional constraint from the AOA/DOA estimate may bring further improvements to the described above heuristic Ad Hoc positioning/tracking techniques.

Furthermore, even if observables from three or more nodes are available, additional AOA/DOA constraint helps to mitigate a number of networks' inherent errors that impact multilateration/trilateration methods, including nodes synchronization errors, poor GDOP, sector antennas coordinates errors (including height), uncompensated cables delays errors (calibration errors), etc. The serving cell AOA/DOA estimate is free from these errors because MIMO sector antennas used for the AOA/DOA estimation are time and phase coherent. Note: The AOA/DOA LOB is equivalent to the angle between the baseline of the sensors (antennas) and the incident RF energy from the wireless device. If the angle between the baseline and, for example, true North is known then the true line of bearing (LOB) and/or AOA can be determined. The base line angle error may also affect the AOA/DOA accuracy, but it is lower than the overall impact from the abovementioned errors.

At the same time, the RTT observables collected from the serving cell or the wireless device can also provide an additional TOF/TOA constraint helping to mitigate a number of aforementioned networks' inherent errors. Thus, the downlink and uplink hybrid positioning may also include additional constraints (from AOA/DOA and RTT's TOF/TOA observables) for localization error reduction.

The hybrid positioning can also stretch across two or more networks. For example, indoors wireless device positioning may be accomplished based on observables from WLAN and cellular networks. WLAN localization RSSI based systems are very common but are not accurate; and because clocks of the access points (APs) are only loosely synchronized with each other, the multilateration method accuracy is severely impacted. The lack of precise synchronization between the AP and the device also degrades the TOA/TOF precision. For precise localization AOA/DOA method is used with observables determined by the WLAN APs which are equipped with MIMO antennas (typically utilizing three or more individual antennas).

The present disclosure's unified framework/platform together with the unique enhancement of AOA/DOA algorithms enables the LSU's signal processing and data processing units to compute the precise LOB from one or more APs. As a result, this localization hybrid approach that is based on the combination of WLAN and cellular network will have higher accuracy than the single network-based positioning because the joint localization yielding better spatial diversity countering the RF propagation phenomena and also mitigating inherent individual networks' deficiencies.

In the present embodiment, the data processing unit may utilize multilateration a.k.a. hyperbolic positioning for wireless device localization. Hyperbolic navigation is based on the difference in timing, i.e. TDOA observables, without reference to a common clock. The data processing unit may also be configured to utilize the observables' metrics discussed above to mitigate ambiguities of the multilateration position fix, as well as applying location consistency algorithms, including machine learning algorithms.

Multilateration methods entail solving a number of hyperbolic (TDOA also known as RSTD/RTOA in cellular networks) equations, for which a number of different algorithms/approaches may be used to find the right solution. Note: RTOA (Relative Time of Arrival) observable is a form of TDOA in the uplink locate in cellular networks.

In the over-determined situation where there are more equations than unknown quantities, i.e. four or more independent observables are available for 2-D localization, the solution involves iterative approach that begins with an initial estimate or "guess" of the wireless device location. That estimate may then be improved with each iteration by determining a local linear least-squares location solution.

One drawback to this approach is that it requires the initial location estimate to be close to the final location solution in order to guarantee convergence and/or the absence of local minima, which may result in a substantial position error. On the other hand, an over-determined situation reduces the possibility of ambiguous and/or extraneous solutions that might occur when only the minimum required number of observables is available, e.g. three for 2-D locating.

From above, iterative approaches need to have a close initial estimate of the UE location. This estimate can be enhanced by employing one of disclosed above hybrid methods or single network's based downlink and uplink joint localization.

The present disclosure's unified framework/platform capability of processing of all-inclusive downlink/uplink signals from various networks/systems in a single entity, LSU, combined with enhancements/unique adaptations of positioning technologies, methods/techniques is enabling advanced hybrid/fusion localizations that were not feasible before, including joint Uplink-Downlink or Downlink-Uplink wireless positioning that improves the locate system reliability and position fix accuracy.

Returning to the discussion of the LSU embodiment, the LSU's location management processor may further include a communication processor configured for signaling and information exchange with wireless devices the communication network/locate system (network), including the network's/system's element. The signaling may be in line with the OMA SUPL protocol and/or 3GPP LPP/LPPa, or a combination of LPP, LPPa and SUPL, Internet Protocol Security (IPsec), as well as other protocols that are or may be used for communication with the network, for example the cellular LCS-AP protocol and/or IPSec/IKEv2 or proxy mobile IPv6 protocols. Note: The latter protocols employed by the Evolved Packet Data Gateway (ePDG) element responsible for secure interworking between cellular and other networks, such as a WiFi, LTE metro, and femtocell, etc. Furthermore, proprietary interfaces and/or protocols can also be utilized.

In the present embodiment, the communication processor is also configured to collect the world-wide GPS/GNSS satellite data from the World-Wide Reference Network (WWRN) stations. Note: World Wide Reference Networks are ground based monitoring stations, which have the so-called assistance data.

Assistance data will be used by the LSU's positioning engine (signal processing unit and data processing unit) for wireless device location determination.

Tracking algorithms or tracker providing the ability to predict future positions of multiple moving objects based on the history of positions and velocity of the individual objects reported by sensor systems.

In the present embodiment, wireless device (target) position fixes and its metric per positioning occasion are utilized by the tracker algorithm continuously estimating the target position and target velocity, including position/velocity confidence metrics. Thus, over time (i.e., a number of positioning occasions), tracking algorithm will reduce the position/velocity estimates standard deviation, improving the localization accuracy.

In an embodiment, the data processing unit may be configured to correct/smooth position and/or velocity estimates, e.g. perform tracking, utilizing Kalman filter, particle filter, enhanced alpha-beta filter to. The enhanced alpha-beta filter using position/velocity confidence metric to adjust alpha/beta values.

Yet, in another embodiment, the data processing unit may be also configured to generate the User Interface (UI) information from the tracker's output (position fixes and its metric) and other information contained in the position occurrence data.

In the present embodiment, all LSU components/elements (such as the signal and data processing units, location management processor, communication processor, etc.) may be implemented in software. Listed below are several options of the LSU deployment (server software execution):

1. The LSU may be deployed inside the core of a network and/or operator's IP service network.

2. The LSU may be deployed on a cellular network's server at Edge facility of cloud computing-based centralized RAN (C-RAN) baseband processing, for example evolving 4.5G MEC (Mobile Edge Computing) server, where it may be integrated as a hosted App. Note: RAN is Radio Access Network.

3. The LSU being hosted in the core network computing cloud and/or operator's service network cloud.

4. The LSU may be deployed outside of the core of a network and/or operator's IP service network, connected to one or more networks.

5. The LSU may be deployed outside of the core of a network and/or operator's IP service network, being fully hosted and managed cloud service and connected to one or more networks via a Secure Remote Internet Connection.

6. The LSU may be deployed in a cloud RAN architecture where some LSU components/elements (such as the signal data acquisition and data processing units) are instantiated and deployed integrated with or close to the virtual eNodeB instances (e.g. on the same cloud processing unit or in a processing unit with a direct interface to the cloud processing unit supporting the eNodeB instance).

7. The LSU may be deployed in any private radio network (such as Wireless LAN, Citizens Broadband Radio Service and LAA) as a standalone entity or integrated with some elements of that radio network.

8. The LSU can be integrated into the E-SMLC or a variant thereof or replace some of the functionality of the E-SMLC as it relates to the LSU's location determination.

Option 5 supporting: a) current 4G and upcoming 5G cellular wireless networks deployments, b) non-cellular networks/systems deployments, and c) the Location-as-a-Service (LaaS) localization data delivery, whereby wireless device acting as a gateway to (the LSU) protected physical location data. Therefore, this option is an embodiment of the present disclosure.

Furthermore, the embodiment is heterogeneous multi-network and/or multiple types of access nodes environment. In case of multi-network environment, one or more communication networks and/or locating specific systems exists as entirely separate entities, each serving a specific application, for example cellular, WLAN, etc., and/or one or more dedicated locate systems like GPS/GNSS, Terrestrial Beacon systems, etc. The case of multiple types of access nodes is termed as HetNet environment. Moreover, an environment combining one or more networks and HetNet is also supported.

Note: HetNet indicates the use of multiple types of access nodes in a wireless network. A Wide Area Network can use macro cells, small cells (micro/Pico/Femto) and/or DAS in order to offer wireless coverage in an environment with a wide variety of wireless coverage zones, ranging from an open outdoor environment to office buildings, homes, and underground areas.

Yet, there is also a special case of a HetNet Heterogeneous wireless network (HWN). Whereas a HetNet might also consist of elements/components with different capabilities in terms of operating systems, hardware, protocols, etc., a HWN is a wireless network which consists of devices using different underlying radio access technology (RAT).

The current multi-network and multiple types of access nodes environment is illustrated in FIG. 42. It includes the LTE and Wi-Fi wireless communication networks plus GPS/GNSS and Terrestrial Beacon dedicated locate systems.

Various Nodes types include Macrocell 4202 with base station 4203, Metrocell 4204, Small cell: outdoor/campus—4204, indoor—4214; WLAN AP 4218, active DAS (indoor/campus)—4230 and passive DAS (indoors only)—4224; Terrestrial Beacon 4208 and LMU (Location Measurement/Management Unit): indoor—4220, outdoor—4210, also an integrated LMU (not shown) that might reside in the Macrocell's base station 4203. It should be noted that the LMU is not integrated with the DAS base station (BS) 4225.

Also depicted in FIG. 42 is wireless device 4260, which is also known as UE, and may be a handset, a wireless IoT sensor or a Tag. The wireless device 4260 is also receiving downlink transmissions from the GPS/GNSS satellites 4250.

The current LTE EPC (Evolved Packet Core) is illustrated in FIG. 43A. Included in FIG. 43A is the network' core IP service network 4306 and the IP service network's entity 4308 that is capable of managing/supporting the Location Service (LCS) tasks; also, might include other entities as well. The IP service network 4306 and the IP service network's entity 4308 are not part of the EPC.

According to FIG. 43A, the aforementioned nodes are connected with the LTE EPC (Evolved Packet Core) via the Backhaul network 4240 (FIG. 42). The Backhaul in FIG. 42 includes one or more gateways/aggregation points 4242 that support Small cell, Metrocell and Wi-Fi connection to the EPC. For example, the WLAN Controller 4216 is connected to the EPC component, the PGW 4304, via the ePDG (Evolved Packet Data Gateway). The Backhaul network may also support connections between nodes and the LSU. The WWRN 4252, which is part of the GPS/GNSS system, is communicating with the EPC component.

As shown in FIG. 43A, the Macrocell's Backhaul connection terminates at the EPC MME 4305 and SGW 4303 components. Data from Metrocells, Small cells and/or Small Cell Controller 4212 are passed through gateway/aggregation points 4242 reaching MME 4305/SGW 4303 afterwards. At the same time, after passing the Backhaul gateway 4242 the data from WLAN controller 4216 are terminating at the PGW 4304. The LMU's indoor 4220 and/or outdoor 4210 nodes are communicating with the E-SMLC 4309 component as well as the WWRN 4252 that provides the necessary satellites/system assistance information to the E-SMLC which, in turn, disseminates it to wireless devices or the E-SMLC may also utilize this information when determining target's position fix in the AGPS/AGNSS mode.

Listed below are the embodiment's particular modes of operation. Unlike the current locate architecture, in this embodiment neither the E-SMLC 4309 nor the present disclosure's UE 4260 are performing the wireless device location calculations. Similarly, the present disclosure's LMU network element is not performing the wireless device location calculations either. Also, neither UE nor LMU are computing observables and their metrics. Furthermore, while in the current architecture the assistance/auxiliary information is collected and disseminated by the E-SMLC, in the embodiment's architecture this information is collected and distributed by the present disclosure's LSU.

Regarding command and control/status message exchange, it may be in line with industry standard interfaces/protocols/procedures, for example OMA SUPL or 3GPP (via E-SMLC), or alternatives like MQTT. Also, proprietary interfaces and/or protocols/procedures can be utilized.

1. The Downlink Localization:

The downlink positioning occasion data packets, including the GPS/GNSS, are sent from wireless device (by the device's resident present disclosure's logical entity) to the LSU. These data packets may be transported over the LTE user plane by extending the LPP (LTE positioning protocol) to carry the present disclosure's positioning occasion information.

Currently the LPP is used for data exchange between the UE and the network' core elements and, in case of OMA Secure User Plane Location Architecture (SUPL), the extended LPP (LPPe) is employed for data exchange between the UE and the SUPL Location Platform (SLP). This communication method (utilizing LPPe) can be also used by the LSU to provide the present disclosure's wireless device with assistance/aux. information, if necessary.

Alternatively, the data packets may be transported over any other form of secured data bearer such as Wi-Fi connected through Backhaul gateway to the EPC data (user) plane. Other Wi-Fi options include employing the 3GPP LTE-WLAN Aggregation (LWA) or the 3GPP LTE WLAN Radio Level Integration with IPsec Tunnel (LWIP) technologies.

Another option is to exchange data packets between the UE and the LSU via an Internet of Thing (IoT) platform such as Amazon Web Services (AWS) IoT, Google Cloud or AT&T M2x.

Yet, another way for the present disclosure's wireless device (UE) to pass (exchange) data to (with) the LSU is by the use of protocols like MQTT. The MQTT is a publish/subscribe messaging protocol designed for lightweight Machine to Machine (M2M) communications. It is used by Amazon Web Services, Azure and many other cloud based solutions. Further options include the Advanced Message Queuing Protocol (AMQP), Streaming Text Oriented Messaging Protocol (STOMP), the IETF Constrained Application Protocol, XMPP, DDS, OPC UA, and Web Application Messaging Protocol (WAMP).

One advantage of such a publish/subscribe mechanism is that the location server (LSU) does not have to know the cellular network UE identifier, such as the UE IMSI or IMEI, or its IP address. Instead, all communications make use of identifiers defined and managed by the location service. Communications could equally go over a 3G, 4G, 5G and/or Wi-Fi, etc. In fact, the communication does not have to make use of the cellular network. It may use any type of connection providing internet connectivity.

Furthermore, proprietary interfaces and/or protocols can be also utilized.

2. The Uplink Localization:

In its current form the LMU is a complex standalone device fully dedicated to receiving and processing the uplink reference signal(s) to calculate a form of TDOA: the RTOA (Relative Time of Arrival) observables a.k.a. uplink measurements. While LTE standards Release 11 and following stipulating the LMU and the eNodeB integration, in its current form the LMU is not easily merged into eNodeB and/or other devices.

On the other hand, for a network' element running the present disclosure's LMU logical entity is a low complexity task (effort) presenting only a minor computational load. This enabling an easy path for the LMU logical entity integration with all types of eNodeB Macrocell, Small cell, Metrocell, as well as other devices like the WLAN AP, active DAS head end unit, etc. Furthermore, the complexity, cost and power consumption of the present disclosure's standalone (indoor/outdoor) LMUs is greatly reduced.

Thus, in the embodiment, the uplink positioning occasion data packets are sent from the network element integrated with the present disclosure's LMU (by the LMU's resident logical entity) to the LSU. At the same time, the uplink positioning occasion data packets are also sent from the present disclosure's standalone (indoor/outdoor) LMUs.

In the current uplink architecture, the LMU is exchanging data packets with the E-SMLC over the SLm interface (see FIG. 43A), using the SLm interface Application Protocol SLmAP. Therefore, the data packets may be transported directly to the LSU using the SLm interface and extending the SLmAP to carry the positioning occasion information. This communication method can be also used by the LSU to provide the present disclosure's LMU with assistance/aux. information, if necessary.

Alternatively, the positioning occasion data packets may be transported over another form of secured data bearer over a connection providing internet connectivity, for example the Internet Protocol Security (IPsec). Furthermore, the uplink positioning occasion data may be sent to the LSU via the present disclosure's wireless device logical entity. This communication may be carried over a 3G, 4G, 5G and/or Wi-Fi, etc. The drawback of this approach is an additional overhead (load) for the available communication bandwidth.

Another option is to exchange data packets directly between the present disclosure's LMU and the LSU via Amazon Web Services (AWS) IoT, Google Cloud, AT&T M2x, Azure and many other cloud based solutions.

Yet, another option is similar to the downlink approach, whereby the present disclosure's LMU is to exchange data with the LSU by the use of protocols like MQTT, etc., employing Amazon Web Services, Azure and many other cloud based solutions.

With an established communication link between the present disclosure's LMU and the LSU, the uplink localization can be accomplished with the present disclosure's LMU integrated into Macrocell' eNodeB 4203, active DAS head end unit 4231, Small cell 4214/4206, Metrocell 4204 and WLAN AP 4218.

3. The Present Disclosure's LSU Connections:

FIG. 43B and FIG. 43C are illustrating the LSU embodiment's connections. In the embodiment, it is assumed that all communications with the LSU are over the Internet and this connection is secure, for example over the IPsec. Other options may be also used (see downlink and uplink descriptions above).

In an embodiment, all of positioning functionality belongs to a single entity, the LSU, that is outside of the network' core (EPC) and/or core IP service network 4306. Thus, as described in embodiments, all of the signal processing, localization, tracking and navigation is carried out in the LSU. Furthermore, in the embodiment's architecture the assistance/auxiliary information is also collected and distributed by the LSU, including the data from the WWRN received via the Backhaul network. Note: the WWRN is part of the GPS/GNSS system.

The LSU is also exchanging the positioning occasion data packets and other information with the present disclosure's one or more standalone LMUs and/or the present disclosure's one or more integrated LMUs. At the same time, the LSU exchanging the positioning occasion data packets and other information with the present disclosure's one or more wireless devices.

Here, data packets and other information exchange can be carried over the IP protocol and in proprietary format. Alternatively, data packets and other information can be exchanged via a platform such as Amazon Web Services (AWS), Google Cloud, AT&T M2x, Azure and many other cloud based solutions. Furthermore, protocols like MQTT can be also used for the data packets and other information exchange. Other options include Advanced Message Queuing Protocol (AMQP), Streaming Text Oriented Messaging Protocol (STOMP), etc. Also, proprietary interfaces and/or protocols can be utilized.

In an embodiment (FIG. 43C), all of the aforementioned LSU data packets and other information exchanges may be carried out v via the IP service network entity 4308.

In another embodiment (FIG. 43B), the communication links between one or more LMUs and the LSU and other sources of information are not using the IP service network entity 4308. Thus, the Backhaul network may also support direct connections between one or more network' nodes and the present disclosure's LSU.

In the embodiment, unit 4308 would channel the data packets and other information exchange between the present disclosure's LSU and the present disclosure's mobile devices and/or one or more network's elements, for example LMU. There are several ways of channeling this information exchange, for example utilizing protocol tunneling techniques.

The IP service network entity 4308 implementation is the MNO dependent. MNO is Mobile Network Operator, also known as a wireless service provider, wireless carrier, cellular company, etc. Thus, the present disclosure's LSU and unit 4308 command/control communications interfaces may be the MNO specific.

4. The E-SMLC:

In the embodiment, the present disclosure's LSU is essentially taking over the E-SMLC 4309 functionality with a possible exception of command and control/status message exchange that might be carried out via the E-SMLC in line with the 3GPP standard interfaces/protocols/procedures. At the same time, these tasks can be carried out in a fashion that is based on OMA SUPL approach or by employing alternatives, like MQTT protocol. In addition, proprietary interfaces and/or protocols/procedures can be utilized for this purpose. Thus, it is not necessary to employ the E-SMLC for command and control/status message exchange.

Another possible exception is when the assistance/aux. information from one or more eNodeB(s) is needed for wireless device localization. Note: The E-SMLC uses the LTE Positioning Protocol A(LPPa) to acquire this information. Once again, the LSU may be configured to obtain this information by other means.

However, during a phased implementation it might be necessary to utilize some of the E-SMLC services. This may be accomplished by including into the network' element, the E-SMLC, the present disclosure's logical entity, the Relay 4310 in FIG. 43B, FIG. 43C and FIG. 43D, configured to collect and store the aforementioned assistance/aux. information. The Relay may be also configured to deliver this information to the LSU. Furthermore, the Relay logical entity may be also configured to support the aforementioned command and control/status message exchange that is carried out via the E-SMLC in line with the 3GPP standards.

The Relay and the LSU can communicate via the IP service network entity 4308 consistent with the present disclosure's LSU connections description in part 3 above, or directly, without the IP service network entity 4308, by same means/methods explained in part 3 above. Also, proprietary interfaces and protocols can be used.

Based on the Above Description:

1. In an embodiment, the LSU location management processor may be configured to obtain the assistance/aux. information from one or more eNodeB(s) with or without interaction with the E-SMLC.

2. In an embodiment, the LSU location management processor may be configured to support command and control/status message exchanges per the 3GPP standard with or without interaction with the E-SMLC.

Yet, in an embodiment, the present disclosure's LSU location management processor may be configured to exchange positioning occasion data packets and other information with the present disclosure's one or more LMUs and with the present disclosure's one or more wireless devices, as well as all of assistance/aux. information via the E-SMLC; and to support command and control/status message exchanges with the E-SMLC.

Such embodiment is illustrated in FIG. 43D and will utilize the aforementioned Relay entity configured to collect all of the positioning occasion data packets and other information, including assistance/aux. information to be sent to the LSU. The Relay will be also responsible for communications between the present disclosure's LSU and the E-SMLC.

According to the embodiment the currently utilized (by E-SMLC) communication protocols may be extended to support the present disclosure's positioning occasion formats (data), including the LPP, SLmAP and the LPPa protocols.

According to this embodiment, all communications between the Relay logical entity and the present disclosure's LSU are over the Internet and this connection is secure. Other options may be also used (see descriptions above). Also, proprietary interfaces and protocols can be used.

According to this embodiment the present disclosure's Relay and the LSU can communicate via the IP service network entity 4308 consistent with the present disclosure's LSU connections description in part 3 above, or directly, without the IP service network entity 4308, by same means/methods explained in part 3.

In another embodiment, the present disclosure's LSU's positioning engine (signal processing and data processing units) functionality is merged with the E-SMLC. According to this embodiment, the LSU functionality is carried out in the EPC component the E-SMLC.

The embodiment of the unified framework/platform is illustrated in the FIG. 44. It is multi-network and multiple types of access nodes environment, including the LTE and Wi-Fi wireless communication networks plus GPS/GNSS and Terrestrial Beacon dedicated locate systems.

Unlike the current environment that is illustrated in FIG. 42, the embodiment supporting the present disclosure's LMUs integrated into Macrocell' eNodeB 4403, active DAS (4430) head end unit 4431, Small cell: indoor 4414 (Small cell controller 4412) and outdoor 4406, Metrocell 4404 and WLAN AP 4418 (WLAN controller 4416), the present disclosure's standalone LMUs: indoor 4120 and outdoor 4110. It should be noted that the present disclosure's LMU is not integrated with the DAS base station (BS) 4425.

Also depicted in FIG. 44 is wireless device 4460, which is also known as UE, and may be a handset, a wireless IoT sensor or a Tag. The IOT sensor can be embedded into objects that have a need to be tracked. The wireless device 4460 is also receiving downlink transmissions from the GPS/GNSS satellites 4450.

Communications between these elements and the present disclosure's LSU are carried through the Backhaul 4440 and outside of the EPC, i.e. without any of the EPC element(s) involvement. These communication links are shown in a blue color.

Also, communications (data) between the World-Wide Reference Network (WWRN 4452) and the present disclosure's LSU are carried through the Backhaul 4440 and outside of the EPC. This communication link is also depicted in a blue color.

In accordance with the disclosure above, a network-centric architecture has been described that supports LaaS data delivery, and which is designed for 5G and other networks when all signal processing and position estimates are done in the cloud, i.e., outside of the EU and/or eNodeB. There are several options in terms of how this can be done. In the case of uplink locate, the relevant UE reference signals transmissions can be collected/pre-processed by the eNodeB and forwarded to the Locate Server Unit (LSU) for further processing and UE position determination. In case of the downlink (OTDOA), the task of collecting and pre-processing of the downlink reference signals may be performed by the UE. The UE may then send collected downlink data to the LSU. In case of the downlink (OTDOA), the UE may also handle the communication with the LSU, using the Control Plane and/or the LTE User Plane. Consequently, signaling may be in line with OMA Secure User Plane Location (SUPL) protocol and/or 3GPP, for example LTE Positioning Protocol (LPP). In case of the uplink AoA/DoA the eNodeB may handle the communication with the LSU, using the LPPa and SLmAP (SLm Application Protocol) protocols. Furthermore, proprietary interfaces and/or protocols can be also utilized.

In accordance with the above, this network-centric architecture may enable advanced features that were not feasible before. These include: (a) utilizing the downlink OTDOA to determine the distance between the serving cell/tower and the UE and uplink AoA/DoA to determine the UE location, while also mitigating the OTDOA synchronization error impact on this uplink/downlink UE positioning by utilizing tracking algorithms/technology; (b) utilizing tracking algorithms/technology to improve the UE positioning in cases where the uplink AoA/DoA plus RTT method is used to determine the UE position; and (c) utilizing tracking algorithms/technology to estimate and to correct/mitigate the synchronization error in the downlink OTDOA locating method.

In accordance with the above, downlink (OTDOA) UE locate methods have also been described where the navigation processor is utilizing the multilateration technique/method, aka hyperbolic navigation. This multilateration technique entails solving a number of hyperbolic (RSTD/TDOA) equations. There are iterative methods and non-iterative (close form) solutions. In one embodiment, a hybrid approach is described that splits the number of available (hearable) reference points (base stations) to have multiple sets of three RSTD/TDOA subsets and finds closed-form solutions for each subset. Thereafter, location consistency algorithms may be utilized to finalize the position fix. In a second embodiment, the position fix may be improved utilizing a combination of iterative and non-iterative solutions from the same set of RSTD/TDOA values. In a third embodiment, initial position estimates may be determined for the UE location, based on iterative and non-iterative algorithms, by utilizing the uplink AoA/DoA estimate(s) and the RTT.

In accordance with the above, a wireless network environment has been described that sometimes defies the multilateration method, which requires at least three reference points (for 2-D locate) to obtain the locate fix because only two high power cells are used to flood a large area with RF signals. Accordingly, a method is described that when RTT is available, the UE is located along an arc defined by the serving sector azimuth beam width and the RTT/2 range. A method is also described, when AoA/DoA estimates are available, that the UE position may be determined at the hyperbola and arc intersection vicinity. Both of these methods may also be used. When neither RTT nor AoA/DoA estimates are available, the UE location is determined by scoring intersection points corresponding to each cell/tower (sector) on a chosen hyperbola 3608 (see FIG. 36). Scoring is based on a difference in angles between the direction a cell is pointing and the direction to a point on the hyperbola and a distance from each point to the corresponding cell/tower. Scores may be weighted according to their corresponding cell/tower's SNR.

In accordance with the above, the LSU may include a communication processor that is configured for signaling and information exchange with UEs, the eNodeB, and/or network elements. The signaling may be in line with the OMA SUPL protocol and/or 3GPP LPP/LPPa, or a combination of LPP, LPPa and SUPL, as well as other protocols that are or may be used for communication with the network, for example LCS-AP protocol. Furthermore, proprietary interfaces and/or protocols can be also utilized.

In accordance with the above, the LSU components may be instructions stored in memory and configured to execute on a processor of a 4.5G MEC (Mobile Edge Computing) server located at a communication network's edge, The LSU components may be integrated as a hosted app on 4.5G MEC. In a 5G deployment, the LSU components may be hosted in the core network computing cloud. The LSU being hosted in the core network computing cloud may support LaaS data delivery, whereby the UEs act as gateways to the core network computing cloud and LaaS specifically for protected physical location data.

In accordance with the above, the LSU may include a downlink signal processor as well as an uplink signal processor and a navigation processor.

Having thus described the different embodiments of a system and methods, it should be apparent to those skilled in the art that certain advantages of the described method and apparatus have been achieved. In particular, it should be appreciated by those skilled in the art that a system for tracking and locating objects can be assembled using FGPA or ASIC and standard signal processing software/hardware combination at a very small incremental cost. Such a system is useful in a variety of applications, e.g. locating people in indoor or in outdoor environments, harsh and hostile environments etc.

It should also be appreciated that various modifications, adaptations, and alternative embodiments thereof may be made within the scope and spirit of the present disclosure.

What is claimed:

1. A method at a detector for preparing RF data for use in determining a location of a wireless mobile device in a wireless communications environment, comprising:
    receiving signals from one or more receive channels that include parameters for a localization signal of the wireless mobile device, the parameters being associated with known in advance signals within the signals;
    receiving metadata related to the signals;
    detecting the known in advance signals from each receive channel among the one or more receive channels based on the parameters of the localization signal;
    buffering a plurality of samples in a digital format extracted from the known in advance signals;
    extracting data necessary for determining the location from the plurality of samples; and
    sending the extracted data, the parameters of the localization signal, and the metadata to a locate server physically remote from the detector for determination of the location.

2. The method of claim 1, wherein detecting the known in advance signals includes extracting the plurality of samples in the digital format from the known in advance signals.

3. The method of claim 2, wherein extracting the plurality of samples includes comprising collecting a number of the samples in the digital format per antenna at a receiver and collecting a signal identification corresponding to each sample in the digital format.

4. The method of claim 1, wherein the extracted data only represents the known in advance signals that will be used to determine the location.

5. The method of claim 1, wherein extracting the data includes pre-processing the data necessary for determining the location from the plurality of samples.

6. The method of claim 5, wherein pre-processing the data includes making a subset of data samples from each sample in the digital format available in a frame of a GPS/GNSS navigation message.

7. The method of claim 5, wherein the metadata includes assistance data, and wherein pre-processing the data includes carrying the assistance data in a remainder of a navigation message.

8. The method of claim 7, wherein the assistance data includes one or more of a reference time, a reference location, a satellite ephemeris, clock corrections, Ionospheric Models, Earth Orientation Parameters, GNSS Time Offsets, an Acquisition Assistance, an Almanac, UTC Models, or a combination thereof.

9. The method of claim 5, wherein extracting the data includes compressing the extracted data and the pre-processed data.

10. The method of claim 9, wherein pre-processing the data reduces the data size before sending the compressed data to the locate server.

11. The method of claim 9, wherein compressing the extracted data and the pre-processed data includes utilizing one or more of a A-law compounding algorithm and a U-law compounding algorithm.

12. The method of claim 9, wherein compressing the extracted data and the pre-processed data includes reducing a sample size of each digital sample size to a smaller number of bits.

13. The method of claim 9, wherein compressing the extracted data and the pre-processed data includes employing a coherent compression scheme wherein a size of a resultant data sample to be sent to the locate server is reduced to a non-zero portion of a cross-correlation output of the known in advance signals, and integrating a number of uniquely identified known in advance signals among the known in advance signals.

14. The method of claim 9, wherein compressing the extracted data and the pre-processed data includes employing a compression scheme including matched filtering of the known in advance signals combined with carrier frequency offset (CFO) processing per each uniquely identified known in advance signal among the known in advance signals.

15. The method of claim 9, wherein compressing the extracted data and the pre-processed data includes matched filtering of only known in advance signals used for determination of the location.

16. The method of claim 9, wherein compressing the extracted data and the pre-processed data includes calculating singular-value decomposition (SVD) principle eigenvalues of a matrix formed from one or more of the plurality of samples in digital format.

17. The method of claim 9, wherein compressing the extracted data and the pre-processed data includes performing additional pre-processing based on a tradeoff between a computational load resources required and a reduction of communication bandwidth with the locate server.

18. An apparatus comprising:
a detector;
one or more receivers;
one or more memory; and
one or more processors coupled to the one or more memory and the one or more receivers, the one or more processors configured to:
receive signals via the one or more receivers, the signals including parameters for a localization signal of a wireless mobile device, the parameters being associated with known in advance signals within the signals;
receive metadata related to the signals;
detect the known in advance signals from each receive channel among the one or more receive channels based on the parameters of the localization signal;
buffer a plurality of samples in a digital format extracted from the known in advance signals;
extract data necessary for determining a location of the wireless mobile device from the plurality of samples; and
send the extracted data, the parameters of the localization signal, and the metadata to a locate server physically remote from the detector for determination of the location.

19. The apparatus of claim 18, wherein the extraction of the data includes pre-processing the data necessary for determining the location from the plurality of samples.

20. A non-transitory computer-readable apparatus comprising a storage medium, the storage medium comprising a plurality of instructions configured to, when executed by one or more processors of a detector, cause a networked apparatus to:
receive signals via one or more receive channel, the signals including parameters for a localization signal of a wireless mobile device, the parameters being associated with known in advance signals within the signals;
receive metadata related to the signals;
detect the known in advance signals from each receive channel among the one or more receive channels based on the parameters of the localization signal;
buffer a plurality of samples in a digital format extracted from the known in advance signals;
extract data necessary for determining a location of the wireless mobile device from the plurality of samples; and
send the extracted data, the parameters of the localization signal, and the metadata to a locate server physically remote from the detector for determination of the location.

* * * * *